US009776117B2

(12) United States Patent
Grider et al.

(10) Patent No.: US 9,776,117 B2
(45) Date of Patent: Oct. 3, 2017

(54) PORTABLE INDUSTRIAL AIR FILTRATION DEVICE

(71) Applicant: Illinois Tool Works Inc., Glenview, IL (US)

(72) Inventors: Keith A. Grider, Chicago, IL (US); Derek J. Leatzow, Chicago, IL (US); Stephen J. McPhilliamy, Chicago, IL (US); Antonio J. Belton, Richton Park, IL (US); John S. White, Jr., Chicago, IL (US); Daniel J. Greene, Chicago, IL (US); Ryan L. Francis, Palatine, IL (US); Sean J. Corrigan, Chicago, IL (US); Charles Steven Pint, Evanston, IL (US); Frank E. Garrett, Jr., Barrington, IL (US)

(73) Assignee: Illinois Tool Works Inc., Glenview, IL (US)

( * ) Notice: Subject to any disclaimer, the term of this patent is extended or adjusted under 35 U.S.C. 154(b) by 142 days.

(21) Appl. No.: 14/200,879

(22) Filed: Mar. 7, 2014

(65) Prior Publication Data

US 2014/0260996 A1 Sep. 18, 2014

Related U.S. Application Data

(63) Continuation of application No. 14/199,242, filed on Mar. 6, 2014.

(Continued)

(51) Int. Cl.
*B01D 46/00* (2006.01)
*B01D 46/44* (2006.01)
(Continued)

(52) U.S. Cl.
CPC ..... *B01D 46/0004* (2013.01); *B01D 46/0024* (2013.01); *B01D 46/0041* (2013.01);
(Continued)

(58) Field of Classification Search
CPC ............ B01D 46/0004; B01D 46/0024; B01D 46/0041; B01D 46/0086; B01D 46/30;
(Continued)

(56) References Cited

U.S. PATENT DOCUMENTS 3,494,114 A 2/1970 Nelson et al.
3,780,260 A 12/1973 Elsner
(Continued)

FOREIGN PATENT DOCUMENTS

CN 101010142 A 8/2007
WO WO 2006012520 A2 2/2006

OTHER PUBLICATIONS

International Search Report and Written Opinion for International Application No. PCT/US2014/024800, mailed Oct. 13, 2014 (16 pages).
(Continued)

*Primary Examiner* — Amber R Orlando
*Assistant Examiner* — Brittany Precht
(74) *Attorney, Agent, or Firm* — Neal, Gerber & Eisenberg LLP

(57) ABSTRACT

Various embodiments of the present disclosure provide a portable industrial air filtration device employing an annular dual filter assembly to capture and remove impurities from the air surrounding the air filtration device, enabling the air filtration device to quickly and efficiently improve the quality and safety of the air. The air filtration device includes a two-piece housing including a lower housing component and a locking cover removably attachable to the lower housing component. The dual filter assembly is mounted within the housing between the locking cover and the lower housing component, and includes a removable self-supporting outer pre-filter surrounding a separately removable inner HEPA filter. The pre-filter initially filters the surrounding air (Continued)

by capturing relatively large or coarse impurities, and the HEPA filter further filters the air pulled through the pre-filter by capturing relatively small or fine impurities.

20 Claims, 80 Drawing Sheets

Related U.S. Application Data

(60) Provisional application No. 61/789,190, filed on Mar. 15, 2013.

(51) Int. Cl.
   *B01D 46/46* (2006.01)
   *B01D 46/30* (2006.01)

(52) U.S. Cl.
   CPC ......... *B01D 46/0086* (2013.01); *B01D 46/30* (2013.01); *B01D 46/44* (2013.01); *B01D 46/444* (2013.01); *B01D 46/446* (2013.01); *B01D 46/46* (2013.01); *B01D 2273/30* (2013.01)

(58) Field of Classification Search
   CPC .... B01D 46/44; B01D 46/444; B01D 46/446; B01D 46/46; B01D 2273/30
   See application file for complete search history.

(56) References Cited

U.S. PATENT DOCUMENTS

| | | |
|---|---|---|
| 4,314,832 A | 2/1982 | Fox |
| 4,552,058 A * | 11/1985 | Wooldridge .......... F24F 3/1603 165/270 |
| 4,560,477 A | 12/1985 | Moldow |
| 4,629,482 A * | 12/1986 | Davis ................. B01D 46/0005 55/385.2 |
| 4,658,707 A | 4/1987 | Hawkins et al. |
| 4,772,297 A | 9/1988 | Anzai |
| 4,786,295 A * | 11/1988 | Newman ............ B01D 46/0023 340/607 |
| 4,859,220 A | 8/1989 | Leber et al. |
| 4,940,474 A * | 7/1990 | Larsson ................ A47L 9/2821 55/DIG. 34 |
| 4,960,143 A | 10/1990 | Dore et al. |
| 4,971,052 A * | 11/1990 | Edwards ............... F04D 27/004 128/205.12 |
| 4,979,967 A * | 12/1990 | Walter ................... B01D 47/06 55/356 |
| 5,013,333 A * | 5/1991 | Beaufoy ................. A47L 9/20 15/352 |
| D320,071 S | 9/1991 | Cook |
| 5,049,170 A | 9/1991 | Parnoff |
| 5,069,691 A | 12/1991 | Travis et al. |
| 5,096,474 A * | 3/1992 | Miller, Jr. ............. B08B 15/026 55/356 |
| 5,120,331 A | 6/1992 | Landy |
| 5,163,818 A | 11/1992 | Betsill et al. |
| 5,230,723 A | 7/1993 | Travis et al. |
| 5,242,474 A * | 9/1993 | Herbst ................... A61B 18/00 417/42 |
| 5,433,763 A | 7/1995 | Shagott et al. |
| 5,436,216 A | 7/1995 | Toyao et al. |
| D362,906 S | 10/1995 | Chiu |
| D365,388 S | 12/1995 | Williams |
| D365,389 S | 12/1995 | Williams |
| 5,505,763 A * | 4/1996 | Reighard ............ B05B 15/1222 55/283 |
| 5,588,985 A | 12/1996 | Shagott et al. |
| 5,593,470 A | 1/1997 | Shagott et al. |
| D382,635 S | 8/1997 | Jane |
| D383,202 S | 9/1997 | Meister et al. |
| D386,576 S | 11/1997 | Wang et al. |
| D388,162 S | 12/1997 | Chiu |
| D390,910 S | 2/1998 | Sundquist |
| 5,753,000 A | 5/1998 | Chiu et al. |
| 5,813,089 A | 9/1998 | Nolan et al. |
| D401,306 S | 11/1998 | Ward et al. |
| 5,840,094 A | 11/1998 | Osendorf et al. |
| D403,414 S | 12/1998 | Shelton et al. |
| D404,807 S | 1/1999 | Nepsund et al. |
| 5,858,044 A | 1/1999 | Nepsund et al. |
| 5,862,737 A | 1/1999 | Chiu et al. |
| D407,808 S | 4/1999 | Nepsund et al. |
| 5,893,937 A | 4/1999 | Moessinger |
| D410,074 S | 5/1999 | Lee |
| 5,925,172 A * | 7/1999 | Rick ..................... B01D 46/10 55/467 |
| D416,317 S | 11/1999 | Bellil et al. |
| D416,613 S | 11/1999 | Bellil et al. |
| D416,614 S | 11/1999 | Bellil et al. |
| D417,911 S | 12/1999 | Jane et al. |
| 6,013,121 A | 1/2000 | Chiu et al. |
| D421,648 S | 3/2000 | Jane |
| D422,070 S | 3/2000 | Bellil et al. |
| 6,036,757 A | 3/2000 | Gatchell et al. |
| D423,659 S | 4/2000 | Schippanoski |
| 6,053,482 A | 4/2000 | Glenn |
| 6,062,977 A * | 5/2000 | Hague .................. A61G 13/108 454/341 |
| 6,065,424 A | 5/2000 | Shacham et al. |
| 6,066,194 A | 5/2000 | Hugghins et al. |
| 6,091,888 A | 7/2000 | Jane et al. |
| 6,099,608 A | 8/2000 | Harms et al. |
| D434,841 S | 12/2000 | Lozzio et al. |
| 6,156,085 A | 12/2000 | Chiu et al. |
| D437,635 S | 2/2001 | Lozzio et al. |
| D438,214 S | 2/2001 | Gieseke et al. |
| D438,944 S | 3/2001 | Terpko et al. |
| 6,209,347 B1 | 4/2001 | Corrigan et al. |
| 6,283,458 B1 | 9/2001 | Cox et al. |
| 6,290,739 B1 | 9/2001 | Gieseke et al. |
| D450,377 S | 11/2001 | Terpko et al. |
| 6,345,516 B1 | 2/2002 | Kesler et al. |
| 6,348,086 B1 | 2/2002 | Harms et al. |
| 6,361,590 B1 | 3/2002 | Gilbert, Jr. et al. |
| 6,391,102 B1 * | 5/2002 | Bodden ................. A61B 18/00 55/DIG. 34 |
| 6,494,940 B1 | 12/2002 | Hak |
| D470,216 S | 2/2003 | Gustafson et al. |
| 6,517,475 B1 | 2/2003 | Brown et al. |
| D480,127 S | 9/2003 | Cox et al. |
| D481,112 S | 10/2003 | Best et al. |
| 6,640,792 B2 | 11/2003 | Harvey et al. |
| 6,663,838 B1 | 12/2003 | Soller |
| 6,676,271 B2 | 1/2004 | Kohn |
| D491,654 S | 6/2004 | Gatchell et al. |
| 6,790,257 B2 * | 9/2004 | Jeng ..................... B01D 46/446 55/385.2 |
| D499,177 S | 11/2004 | Kosmider et al. |
| 6,899,745 B2 | 5/2005 | Gatchell et al. |
| D509,292 S | 9/2005 | Gatchell et al. |
| 6,938,886 B2 | 9/2005 | Glucksman |
| D513,797 S | 1/2006 | Wang |
| D515,190 S | 2/2006 | Bartholmey et al. |
| 7,014,686 B2 | 3/2006 | Gatchell et al. |
| 7,168,427 B2 | 1/2007 | Bachinski et al. |
| 7,258,715 B2 | 8/2007 | Cox et al. |
| D572,356 S | 7/2008 | Harber |
| 7,537,647 B2 | 5/2009 | Adair et al. |
| 7,594,944 B2 | 9/2009 | Oh |
| 7,808,246 B2 | 10/2010 | Sobue et al. |
| 7,815,705 B2 | 10/2010 | Ehrenberg |
| 7,874,431 B2 | 1/2011 | Eisengraeber-Pabst et al. |
| 7,892,337 B2 * | 2/2011 | Palmerton ............. A61B 18/00 55/385.1 |
| 7,915,847 B2 * | 3/2011 | Jeung .................... F04D 27/004 318/400.01 |
| 8,016,922 B2 | 9/2011 | Ehrenberg |
| D647,188 S | 10/2011 | Bergami |
| 8,042,694 B2 | 10/2011 | Driml et al. |
| D652,497 S | 1/2012 | Troxell et al. |
| D655,379 S | 3/2012 | Doyle et al. |

(56) References Cited

U.S. PATENT DOCUMENTS

| | | | |
|---|---|---|---|
| D659,257 S | 5/2012 | Desberg | |
| D671,633 S | 11/2012 | Glasbrenner | |
| 8,323,370 B2 | 12/2012 | Troxell et al. | |
| 8,486,170 B2 | 7/2013 | Conrad et al. | |
| D694,871 S | 12/2013 | Maholick et al. | |
| 8,640,360 B2* | 2/2014 | Stamm | F24F 3/1405 236/44 A |
| D707,338 S | 6/2014 | Ediger et al. | |
| D713,023 S | 9/2014 | Chen et al. | |
| D715,911 S | 10/2014 | Lin | |
| D732,647 S | 6/2015 | McPhilliamy | |
| D739,513 S | 9/2015 | Williams et al. | |
| 9,120,044 B2 | 9/2015 | Cornell | |
| 2002/0088209 A1 | 7/2002 | Stephens | |
| 2002/0124538 A1 | 9/2002 | Oh | |
| 2004/0035094 A1 | 2/2004 | Jersey | |
| 2004/0065202 A1 | 4/2004 | Gatchell et al. | |
| 2004/0134171 A1 | 7/2004 | Scott et al. | |
| 2004/0187455 A1 | 9/2004 | Niakan et al. | |
| 2007/0221061 A1 | 9/2007 | Steiner et al. | |
| 2014/0260144 A1 | 9/2014 | Williams et al. | |
| 2014/0339316 A1* | 11/2014 | Barooah | G06Q 50/06 236/49.3 |
| 2015/0284260 A1 | 10/2015 | Huda | |

OTHER PUBLICATIONS

International Search Report and Written Opinion for International Application No. PCT/US2014/024837, mailed Oct. 13, 2014 (15 pages).
Features of DefendAir HEPA 500, DRI-EAZ, available at http://www.drieaz.com/_DEC/DEC_Product_Base.aspx?decID=1041&AspxAutoDetectCookieSupport=1 (Features tab), printed Jul. 27, 2013 and available before Mar. 15, 2013 (1 page).
DRI-EAZ, Owner's Manual DefendAir HEPA 500 Air Scrubber 115v Model, available at http://www.drieaz.com/_Dec/Uploads/Document/Manuals/DefendAir%20HEPA%20500%20 Owner's %20Manual.pdf , Copyright 2004 (18 pages).
Guide to Air Scrubbing, DRI-EAZ, available at http://www.drieaz.com/_DEC/Uploads/Document/Docs/Guide%20to%20Aircl/020Scrubbing.pdf, printed Jul. 27, 2013 and available before Mar. 15, 2013 (16 pages).
DRI-WAZ Air Filtration HEPA 500 Flyer, available at http://www.drieaz.com/_DEC/Uploads/Document/Manuals/DE_HEPA500_Filters_Restoration_Print.pdf, printed Jul. 27, 2013 and available before Mar. 15, 2013 (1 page).
Photograph of filters of DRI-EAZ DefendAir HEPA 500, available at http://www.drieaz.com/_DEC/Uploads/Document/Manuals/F284_HEPA500_DOP_Carbon_Photo.jpg, printed Jul. 27, 2013 and available before Mar. 15, 2013 (1 page).
First Stage Pre-Filter for DefendAir Hepa 500, DRI-EAZ, available at http://www.drieaz.com/_DEC/DEC_Product_Base.aspx?decID=1097, printed Jul. 27, 2013 and available before Mar. 15, 2013 (1 page).
Second Stage Pre-Filter for DefendAir HEPA 500, DRI-EAZ, available at http://www.drieaz.com/_Dec/Dec_Product_Base.aspx?decID=1098, printed Jul. 27, 2013 and available before Mar. 15, 2013 (1 page).
Activated Carbon Filter for DefendAir HEPA 500, DRI-EAZ, available at http://www.drieaz.con/_DEC/DEC_Product_Base.aspx?decID=1109, printed Jul. 27, 2013 and available before Mar. 15, 2013 (1 page).
HEPA 500 Filters for DefendAir HEPA 500, DRI-EAZ, available at http://www.drieaz.com/_DEC/DEC_Product_Base.aspx?decID=1096, printed Jul. 27, 2013 and available before Mar. 15, 2013 (1 page).
DOP Stage 2 HEPA 500 Pre-Filter for DefendAir HEPA 500, DRI-EAZ, available at http://www.drieaz.com/_Dec/Dec_Product_Base.aspx?decID=1129, printed Jul. 27, 2013 and available before Mar. 15, 2013 (1 page).
Specs of DefendAir HEPA 500, DRI-EAZ, available at http://www.drieaz.con/_DEC/DEC_Product_Base.aspx?decID=1041&AspxAutoDetectCookieSupport=1 (Specs tab), printed Jul. 27, 2013 and available before Mar. 15, 2013 (1 page).
Overview of PRED600HC Portable Air Scrubber, Abatement Technologies, available at http://www.abatement.com/government-industry-schools/port-air-scrub-pred600hc.htm (Overview tab), Copyright 2013 (2 pages).
"The Predator 600 Portable Air Scrubber, Big Time Performance in a Small Package"; Brochure, available at http://www.abatement.com/pdf/pred600-brochure.pdf, Copyright 2012 (2 pages).
"Warning! Are the Molded Plastic Scrubbers You Are Using Safe? or, Could They Expose You to Fire and Safety Risks'?," White Paper by Abatement Technologies, available at http://www.abatement.com/pdf/benefits-rotational-molded-plastic-cabinets.pdf, printed Jul. 27, 2013 and available before Mar. 15, 2013 (1 pages).
Specs of PRED600HC Portable Air Scrubber, Abatement Technologies, available at http://www.abatement.com/government-industry-schools/port-air-scrub-pred600hc.htm (Specs tab), Copyright 2013 (2 pages).
Comparison of PRED600HC Portable Air Scrubber, Abatement Technologies, available at http://www.abatement.com/government-industry-schools/port-air-scrub-pred600hc.htm (Comparison tab), Copyright 2013 (3 pages).
Photos of PRED600HC Portable Air Scrubber, Abatement Technologies, available at http://www.abatement.com/government-industry-schools/port-air-scrub-pred600hc.htm (Photos tab), Copyright 2013 (2 pages).
Filters and Accessories for PRED600HC Portable Air Scrubber, Abatement Technologies, available at http://www.abatement.com/government-industry-schools/port-air-scrub-pred600hc.htm (Filters & Accessories tab), Copyright 2013 (2 pages).
Related Products for PRED600HC Portable Air Scrubber, Abatement Technologies, available at http://www.abatement.com/government-industry-schools/port-air-scrub-pred600hc.htm (Related Products tab), Copyright 2013 (3 pages).

* cited by examiner

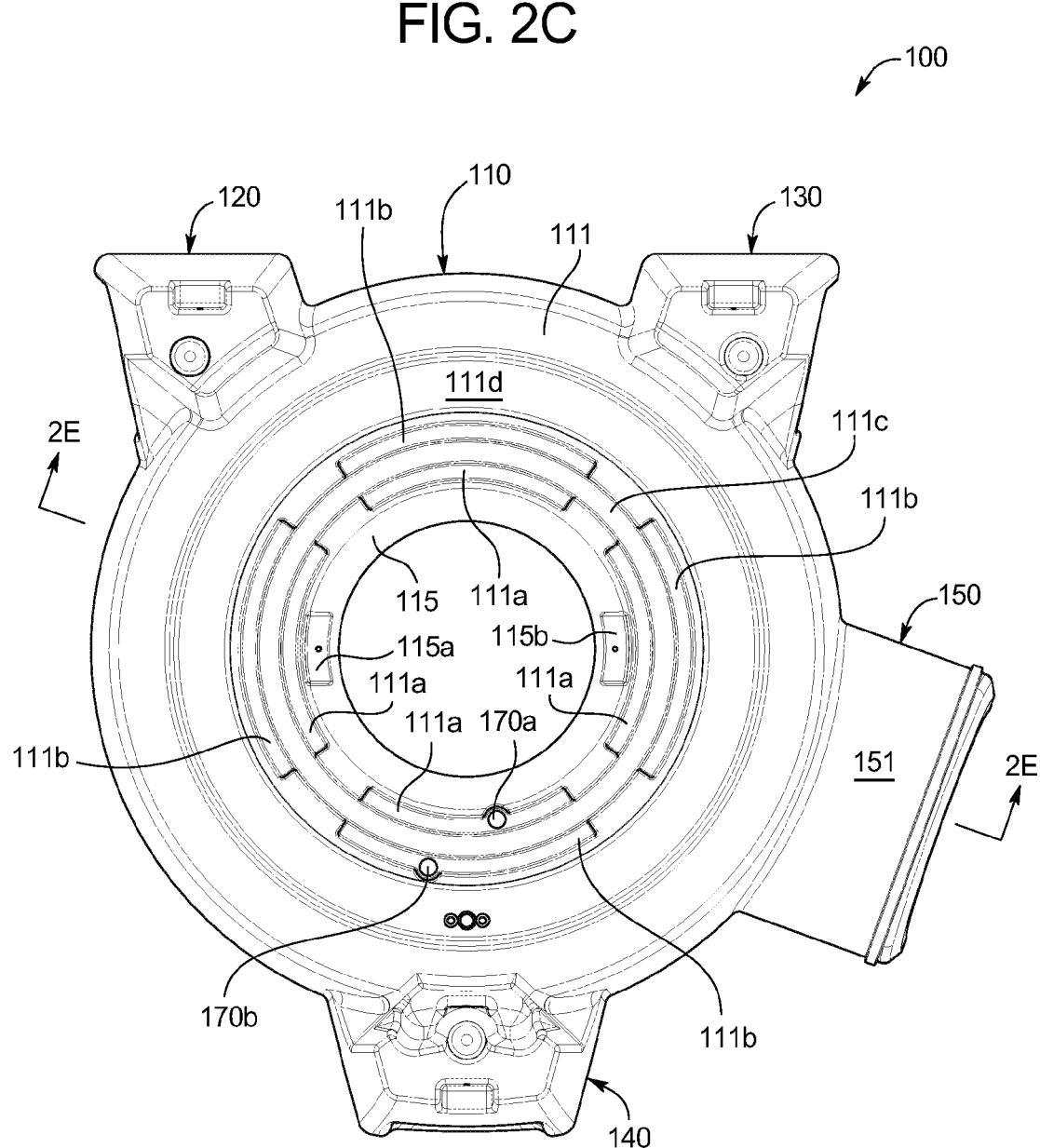

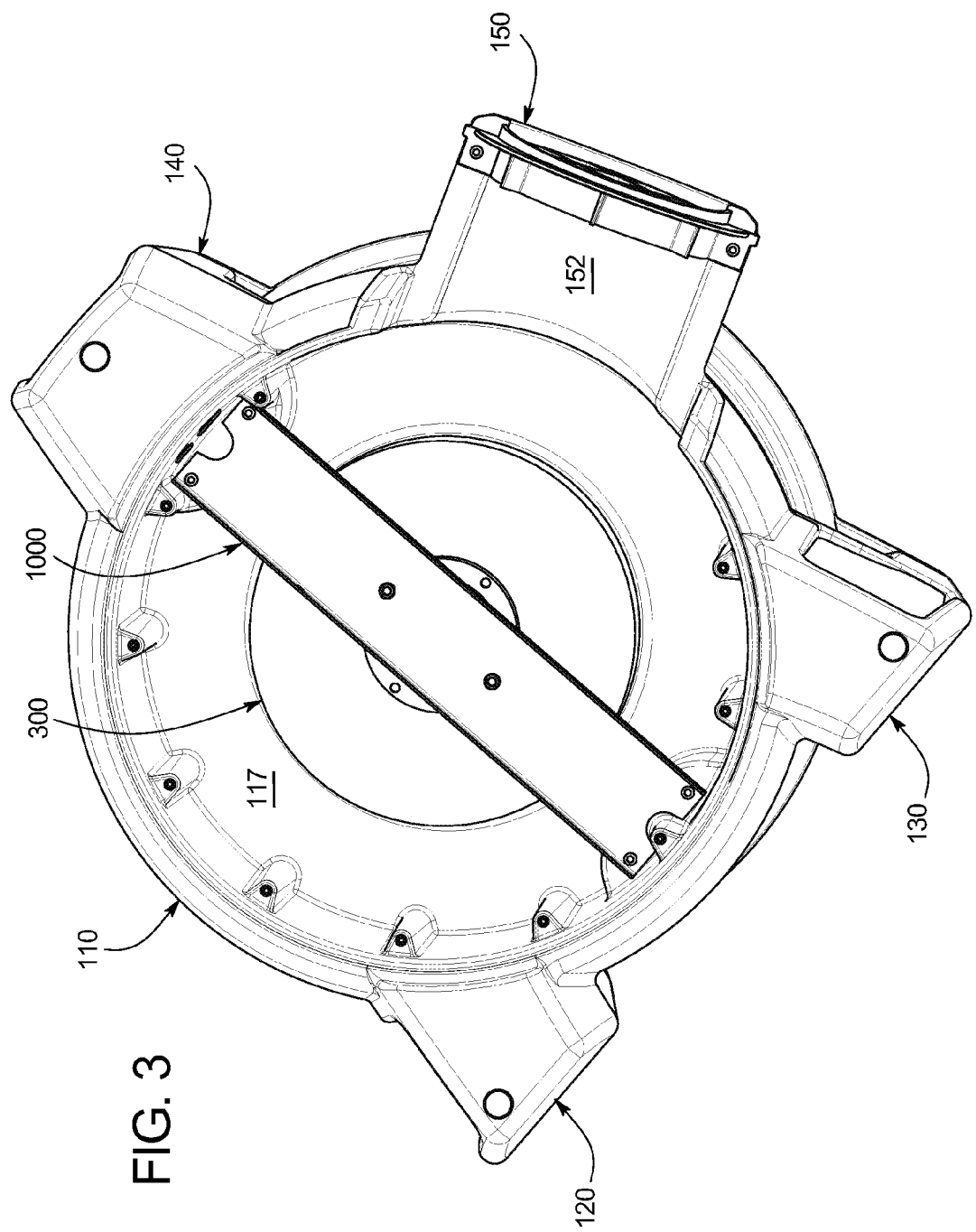

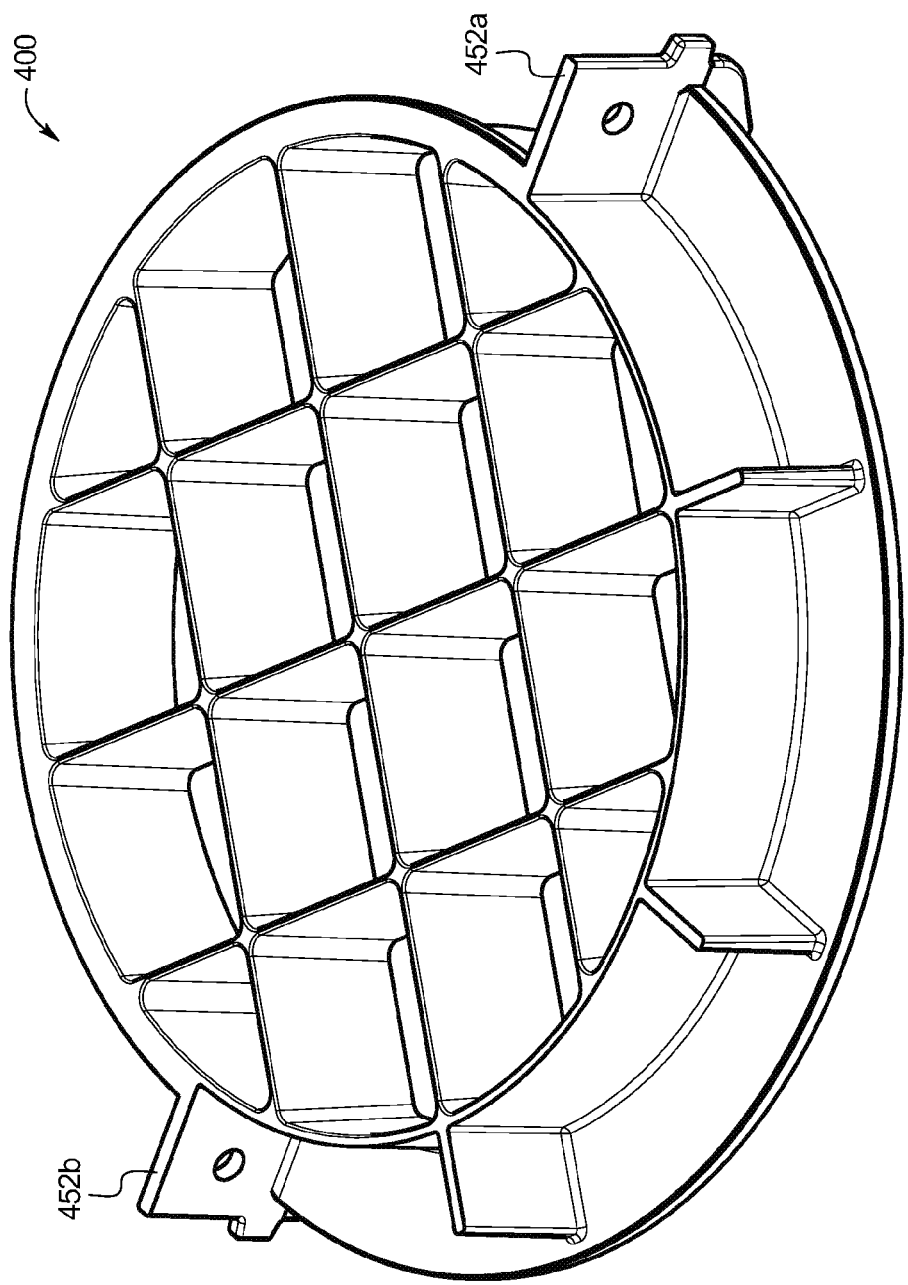

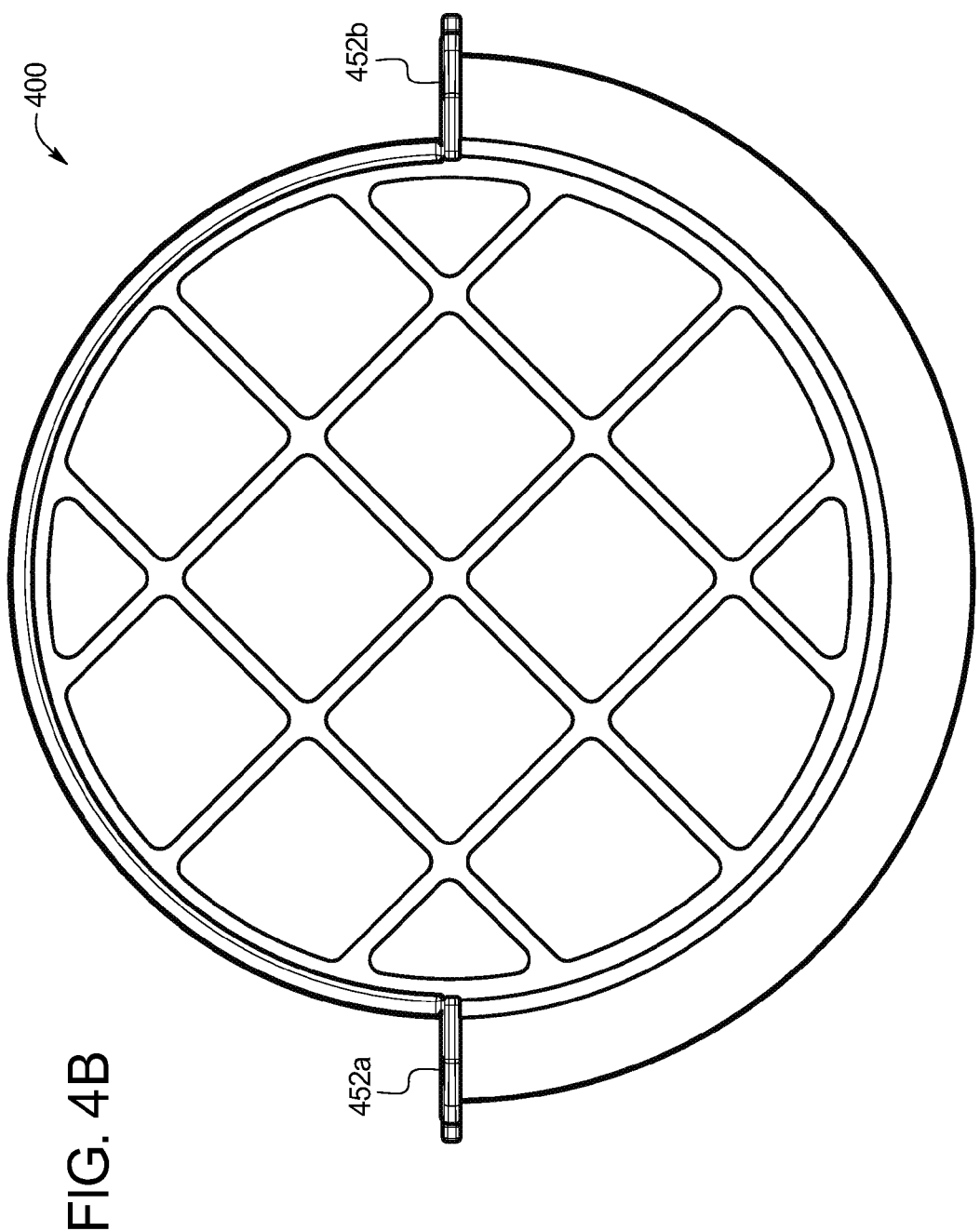

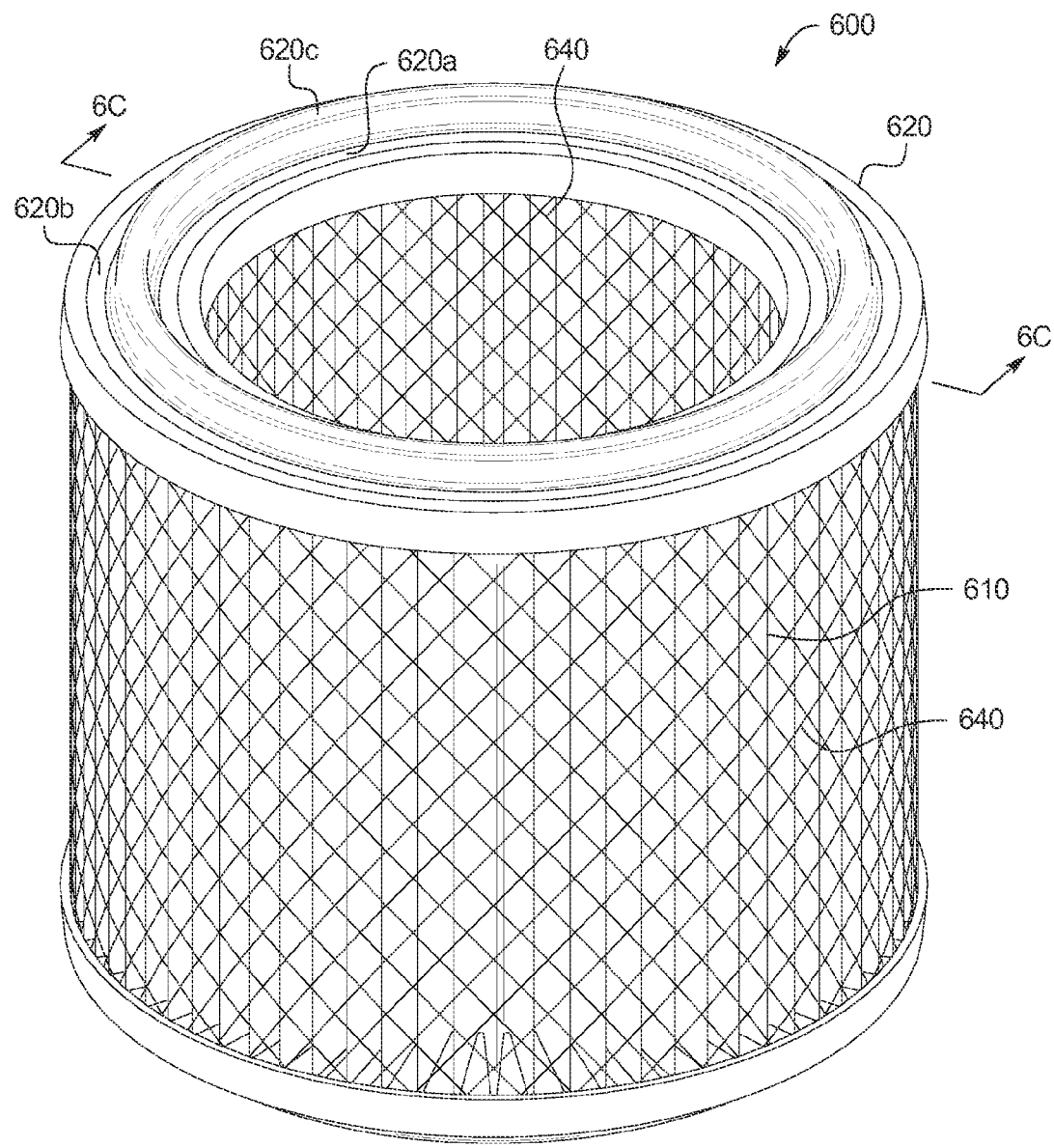

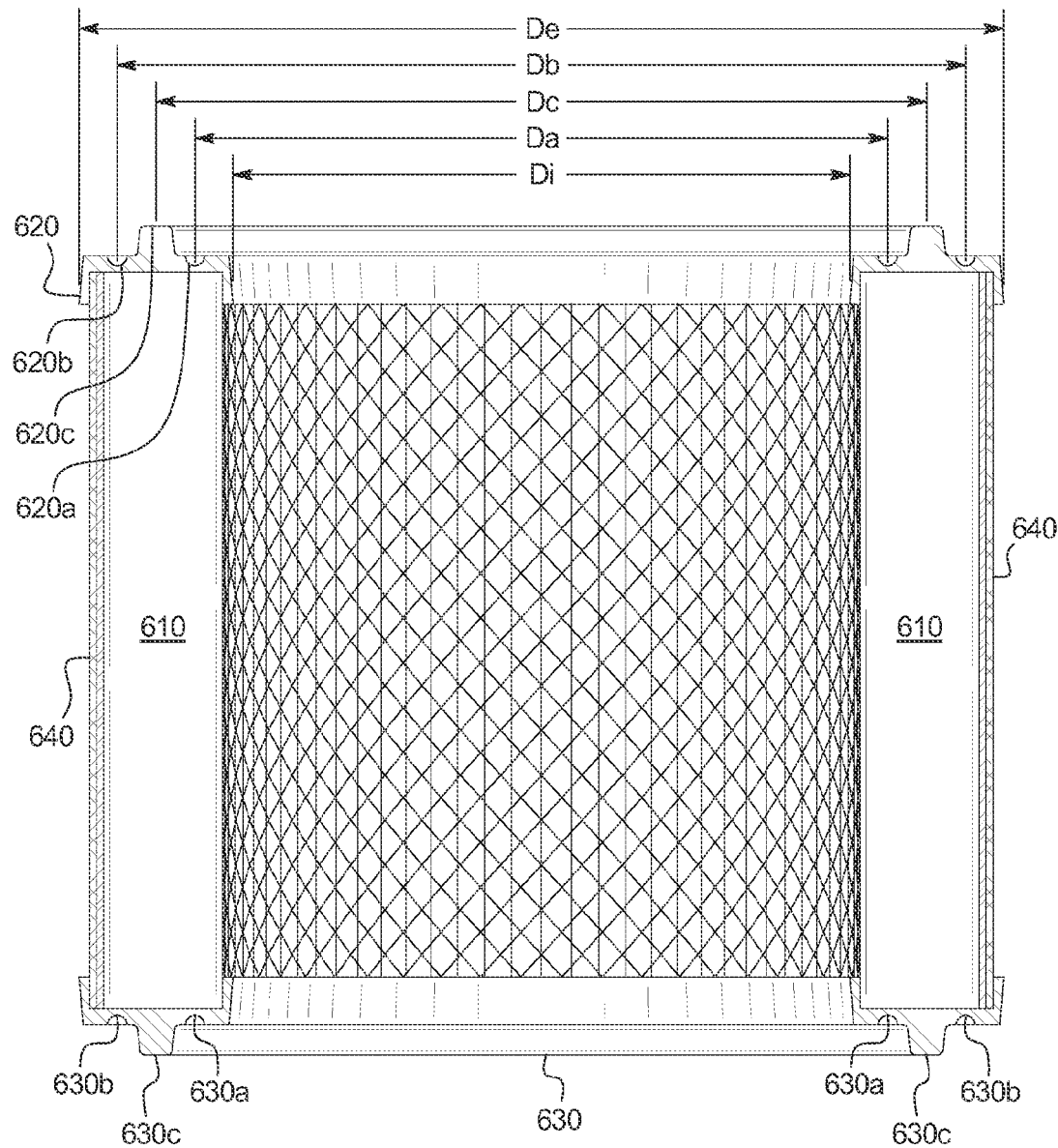

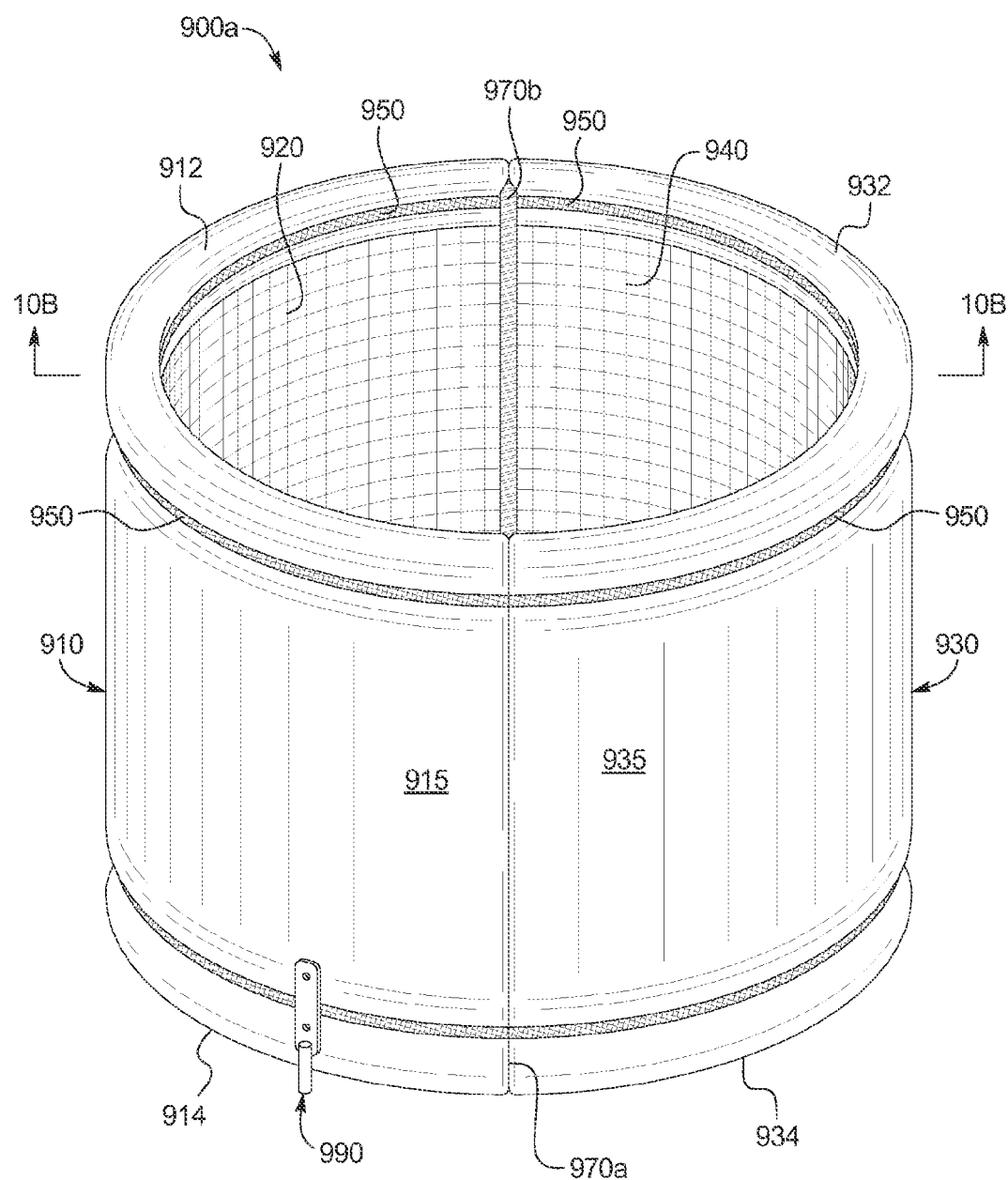

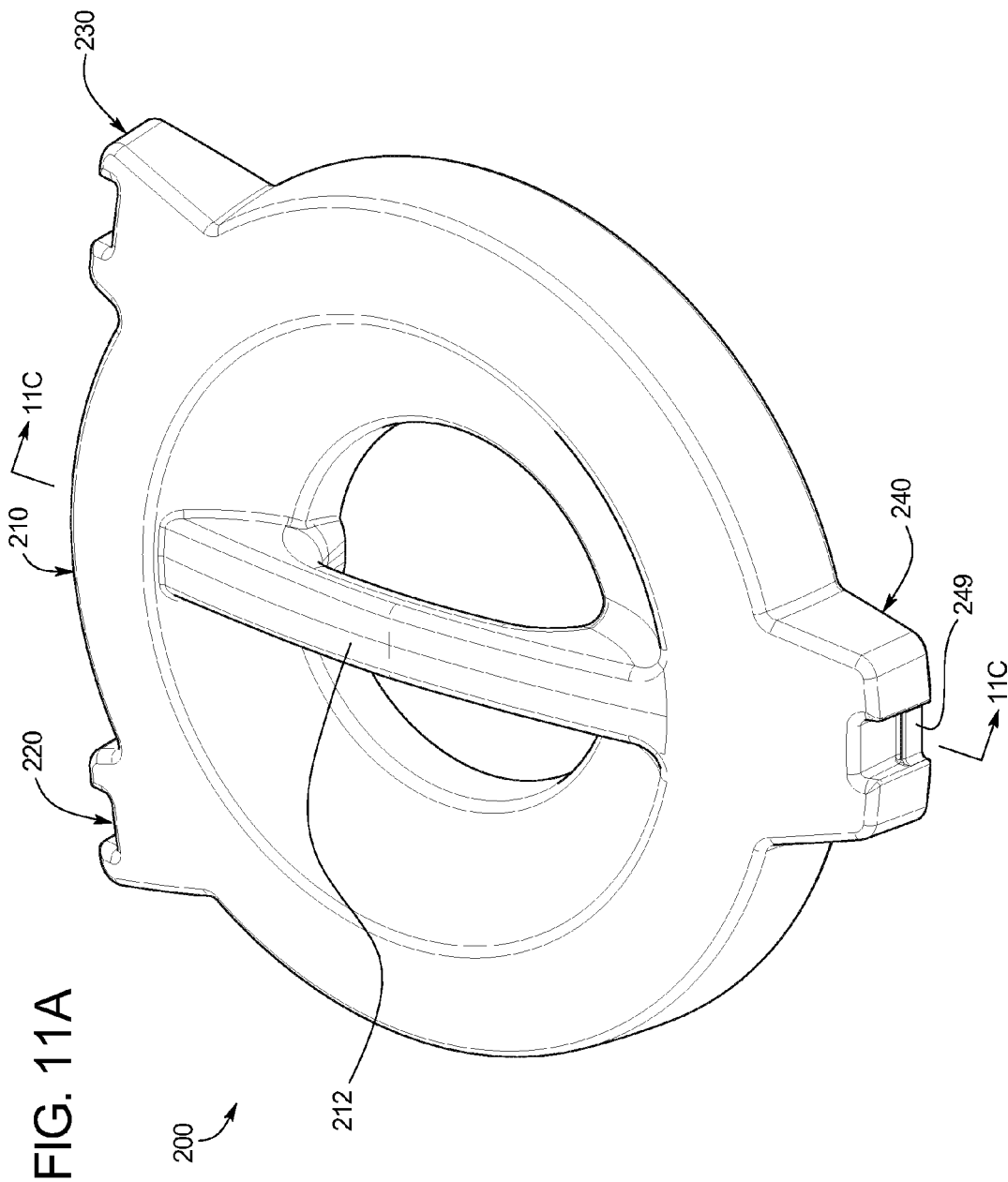

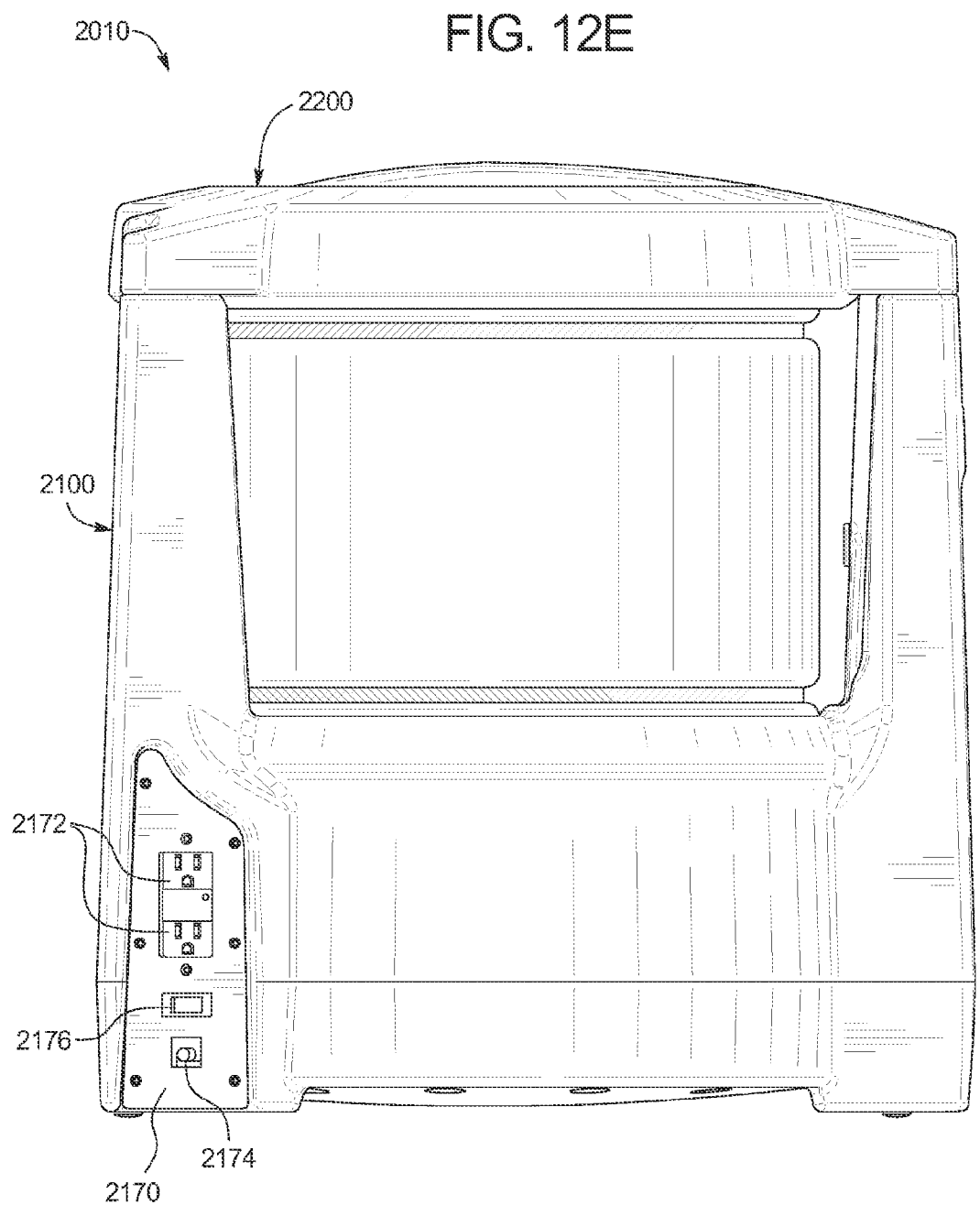

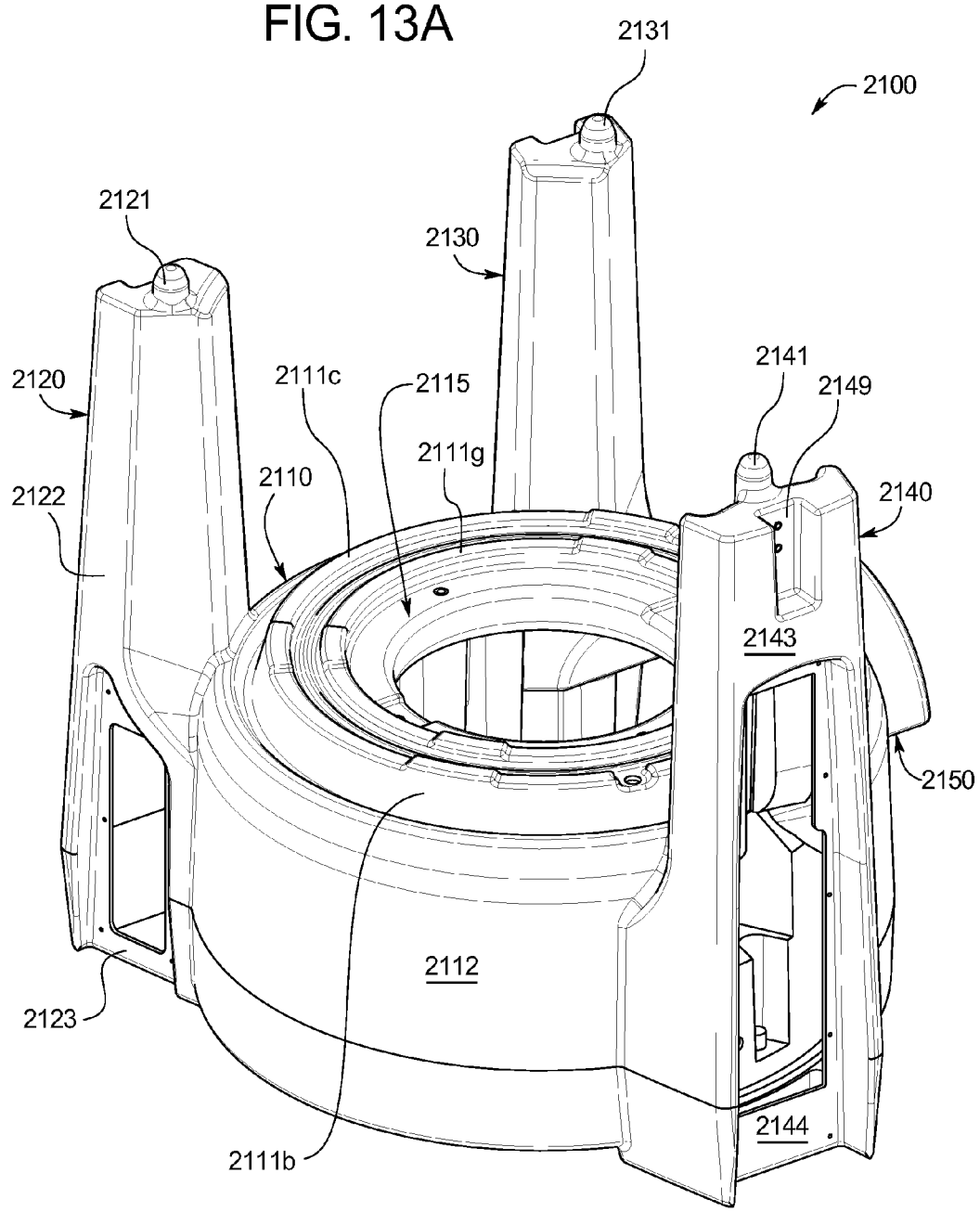

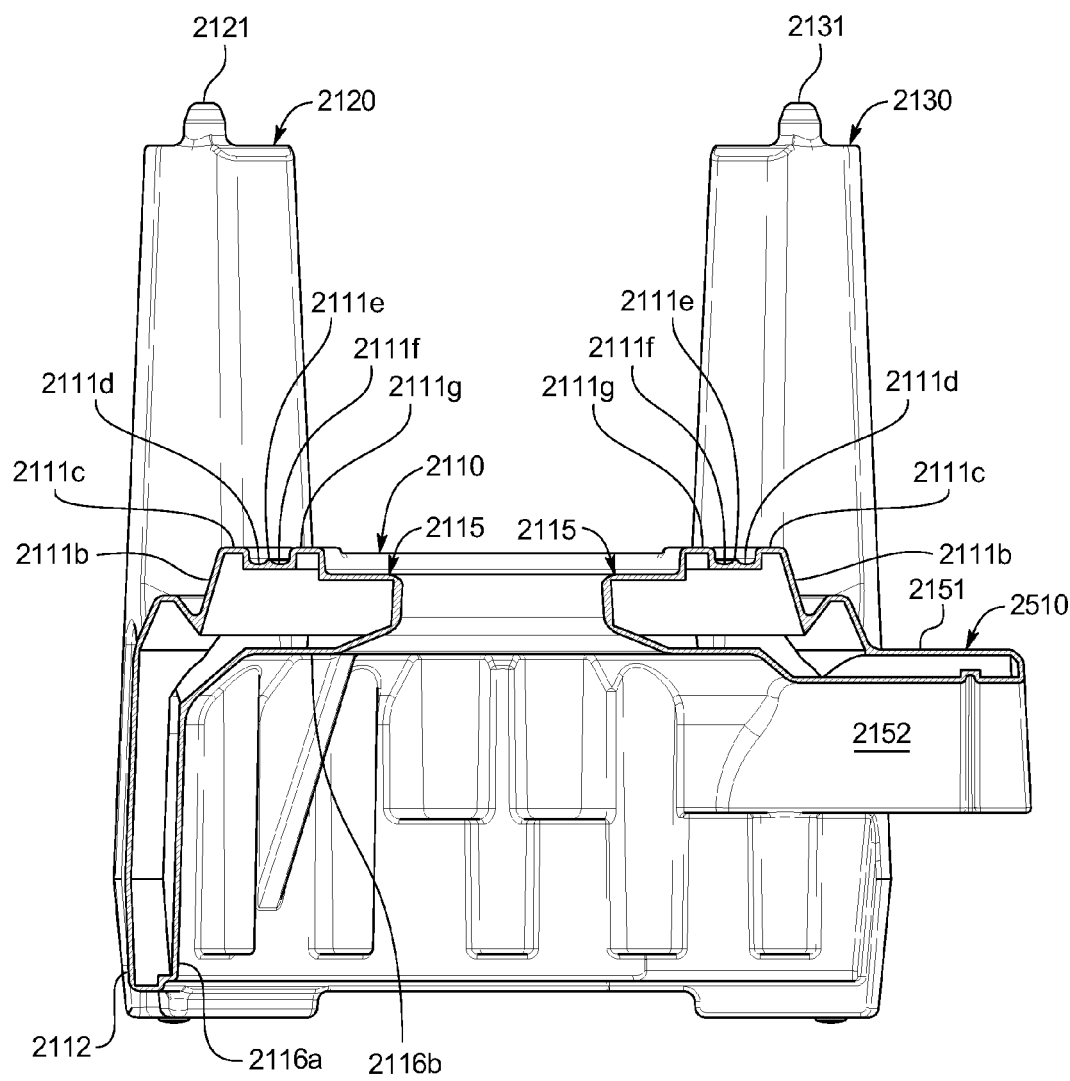

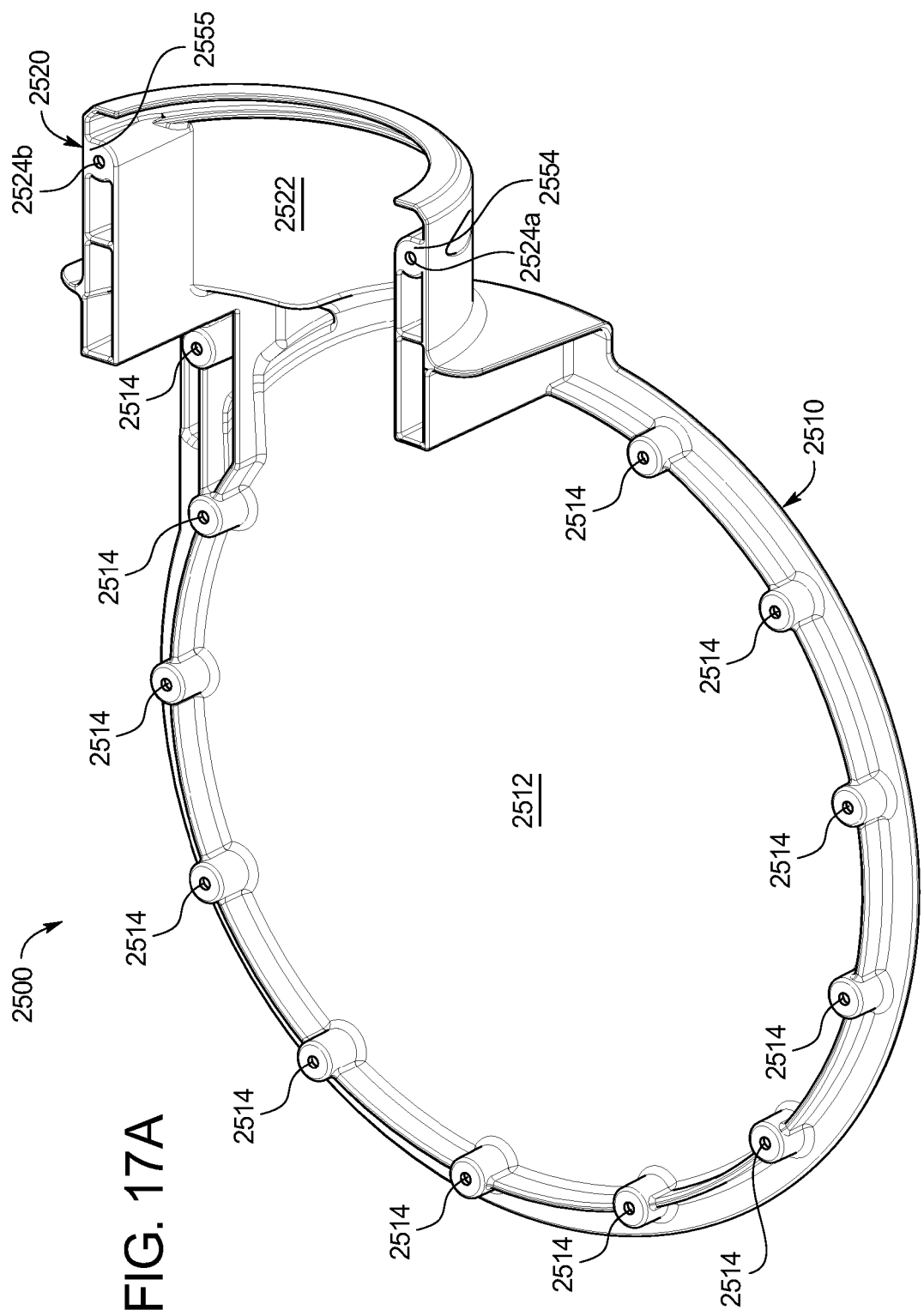

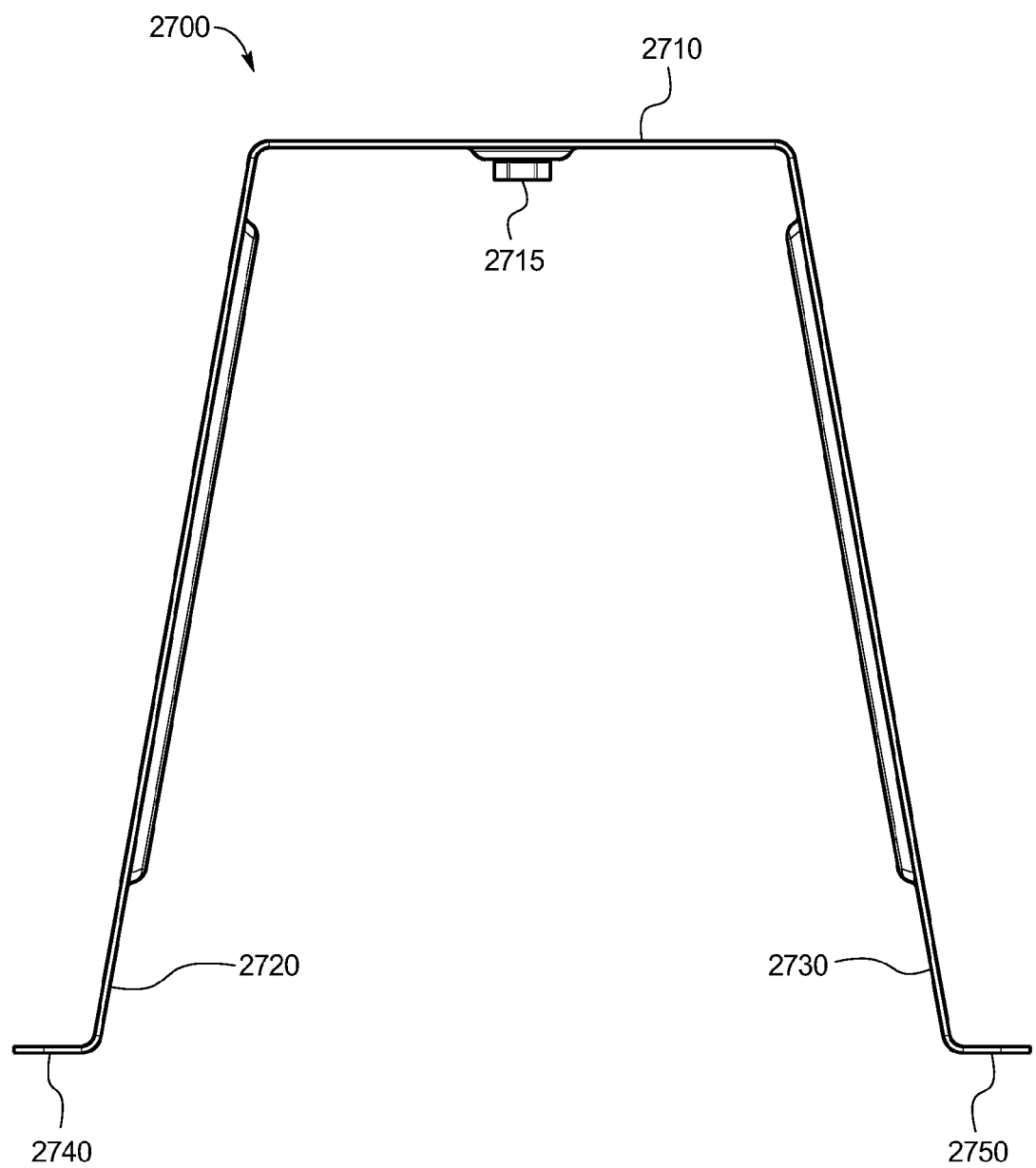

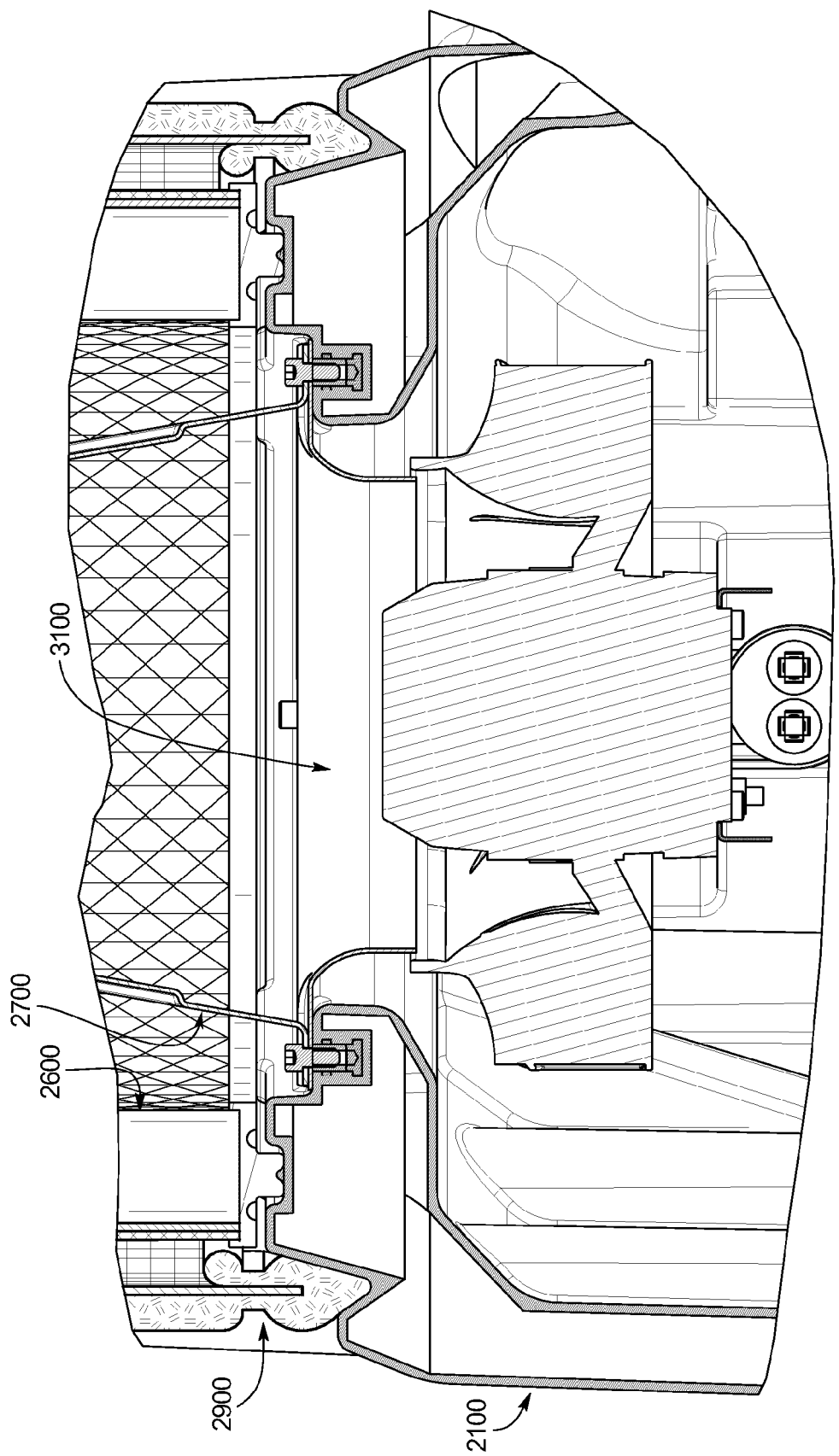

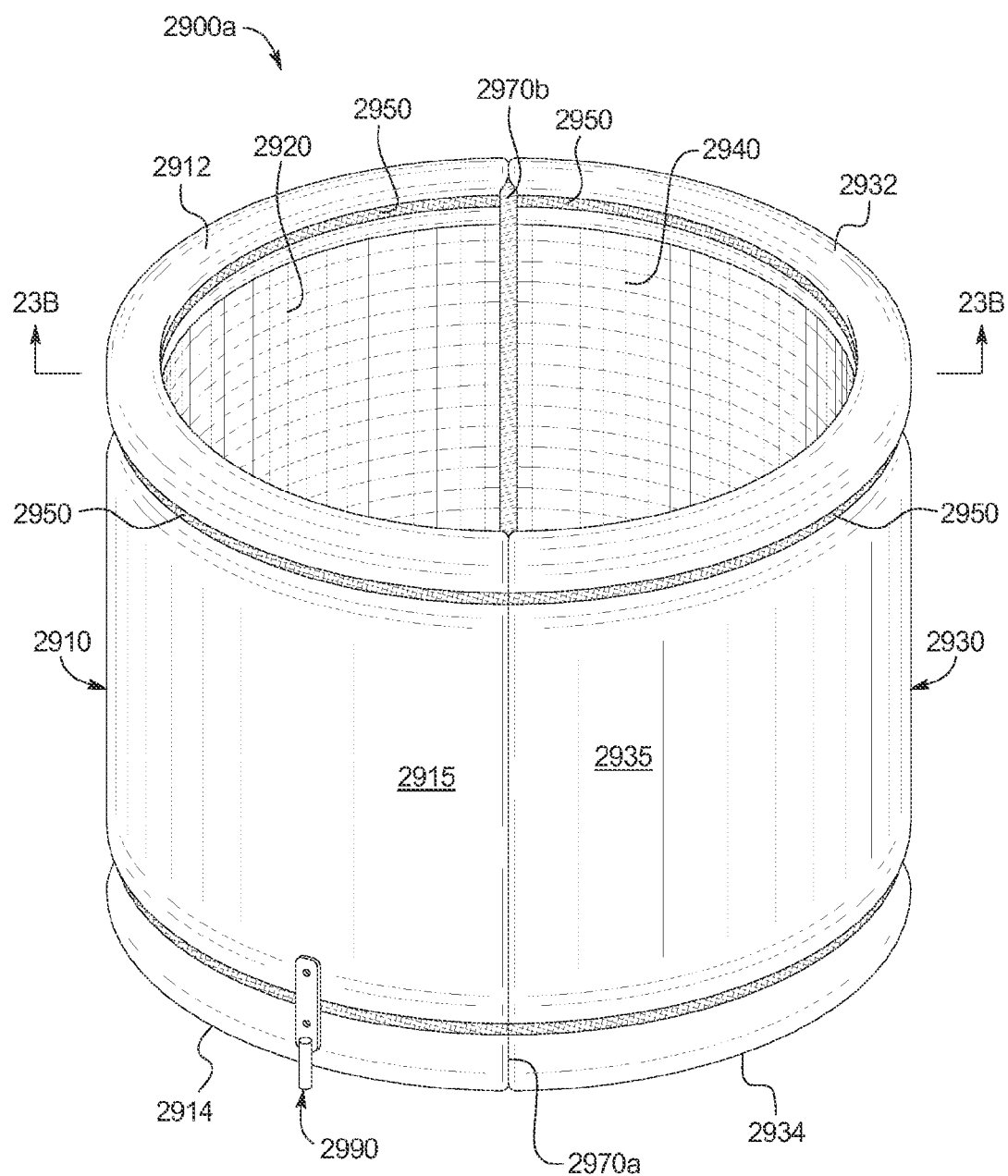

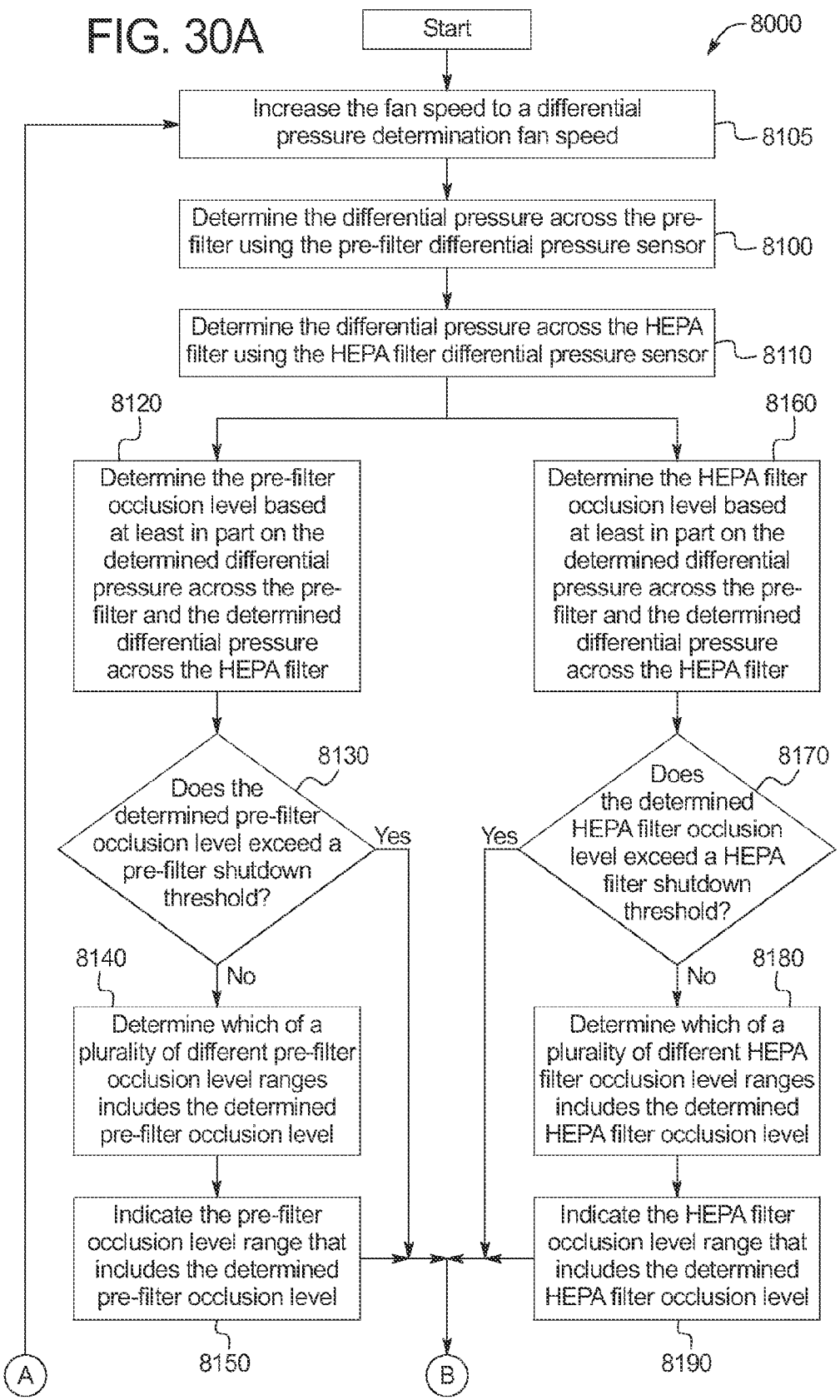

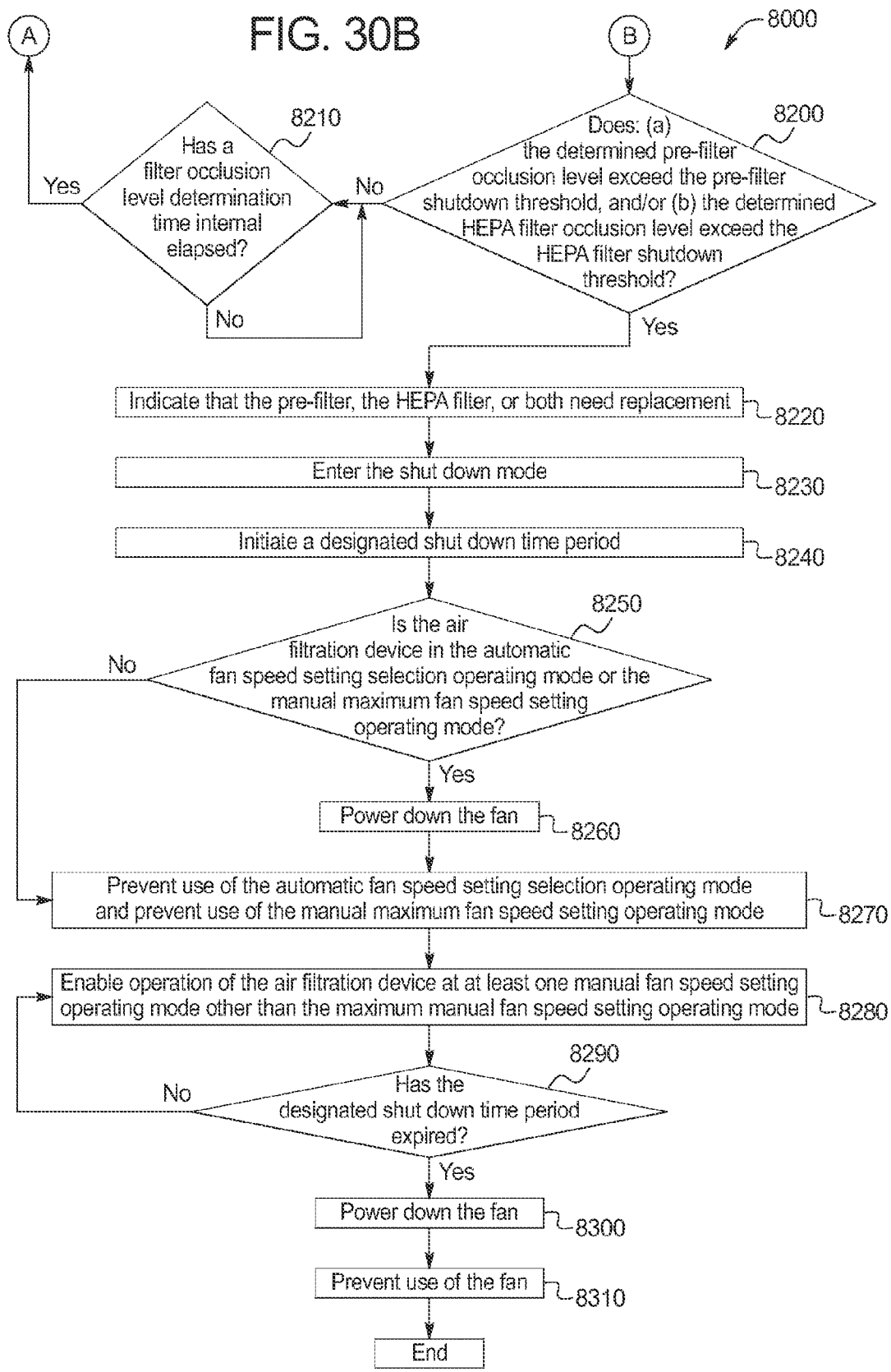

PORTABLE INDUSTRIAL AIR FILTRATION DEVICE

PRIORITY CLAIM

This patent application is a continuation of, and claims priority to and the benefit of, U.S. patent application Ser. No. 14/199,242, filed on Mar. 6, 2014, which claims priority to and the benefit of U.S. Provisional Patent Application No. 61/789,190, filed on Mar. 15, 2013, the entire contents of which are incorporated herein by reference.

BACKGROUND

Air filtration devices, also called air scrubbers, are well known and are used to remove impurities, such as particulates, from the surrounding air. Typical air filtration devices include a fan assembly and a filter assembly including one or more filters. Generally, when such an air filtration device is in operation, the fan assembly pulls or pushes air surrounding the air filtration device through the filter assembly, which captures and removes various impurities from the air. The filtered air is then expelled from the air filtration device.

One common use for air filtration devices is to filter the air in indoor or otherwise enclosed construction sites. Various activities that occur in and around such enclosed construction sites cause the air in the construction sites to become filled with impurities such as dust particles. For instance, many indoor construction projects, such as home or business constructions or renovations, involve the installation of drywall. After drywall sheets are hung, drywall joint compound is then applied to fill any imperfections in the drywall (such as to cover the fasteners) and to fill seams between the hung drywall sheets. The drywall compound is then sanded, usually more than once, until it is flush with the drywall. Each instance of sanding causes copious amounts of fine particles of the drywall compound (and the drywall itself) to be expelled into the air, creating clouds of drywall dust in the enclosed space. The drywall dust makes it difficult for workers in the construction site to see what they are doing; puts the workers at risk for various health problems, such as eye, nose, throat, and respiratory tract irritation and difficulty breathing; and eventually falls to the ground, coating the workers, the construction site, and any tools and materials with a layer of drywall dust.

In another example, many indoor construction projects involve the installation of hardwood flooring. After the hardwood flooring is laid, the flooring is sanded, usually more than once. Each instance of sanding causes copious amounts of fine particles of the flooring (i.e., the wood) to be expelled into the air, creating clouds of sawdust in the enclosed space. Similar to the drywall dust described above, the sawdust makes it difficult for workers in the construction site to see what they are doing; puts the workers at risk for various health problems, such as eye, nose, throat, and respiratory tract irritation and difficulty breathing; and eventually falls to the ground, coating the workers, the construction site, and any tools and materials with a layer of sawdust. Other common activities on such constructions sites, such as demolition (e.g., tearing down drywall and ripping up flooring); cutting various materials such as wood, drywall, ceramic, concrete, stone, and plastics; drilling various materials such as wood, drywall, ceramic, concrete, stone, and plastics; and jack hammering concrete and stone, cause similar problems.

Various precautions are used to protect against this kind of particulate-filled air. For example, workers are often required to wear protective eye goggles or glasses to protect their eyes from the particulates and nose and/or to wear face masks to reduce or inhibit the amount of the particulates they breathe in. As noted above, industrial air filtration devices are also typically used to filter the air in such enclosed construction sites to attempt to improve the breathability and safety of the air by removing some or all of these impurities.

While industrial air filtration devices are commonly used in such construction sites, certain known industrial air filtration devices have a variety of disadvantages. Certain known industrial air filtration devices are large, bulky, heavy machines that are not easily transportable to and from a construction site, around a construction site, or between construction sites, especially construction sites that are indoors, oddly shaped, or otherwise enclosed. For instance, such known industrial air filtration devices are a chore to use in the construction or renovation of an office building containing hundreds or even thousands of individual offices. Such known large, bulky, and heavy industrial air filtration devices require workers to cart or otherwise transport the devices around to each office on each floor, which adds time and expense to the project.

Certain known industrial air filtration devices operate at relatively high fan speeds and include filters having relatively small surface areas. For such an industrial air filtration device, the combination of the relatively small filter surface areas, the relatively high fan speed, and the relatively large size of the impurities captured by the filters causes the filters to occlude quickly, which results in decreased performance (explained below) and the filters having to be replaced often.

Many known industrial air filtration devices employ flat front filter assemblies. That is, such known industrial air filtration devices include a filter assembly having one or more rectangular filters along one side of the industrial air filtration device. Such an industrial air filtration device employing a flat front filter assembly may filter air from one side of the industrial air filtration device (i.e., the side on which the filter assembly is located). This limits how quickly and efficiently the industrial air filtration device is able to filter the air surrounding the other sides of the air filtration device.

Many known industrial air filtration devices require users to manually inspect the filters to determine whether the filters should be replaced to determine whether the filters are so occluded that they require replacement to maintain efficient performance). This typically requires a user to shut down such an industrial air filtration device and guess as to whether the filter(s) should be replaced. If the user incorrectly determines that a filter should be replaced, money is wasted in purchasing a new filter when the old filter is not completely used up. This also adds to the environmental waste produced by the air filtration device because the old filter is thrown away when it is not completely used up, and the packaging containing the new filter is thrown away when that new filter is not yet needed. If, on the other hand, the user incorrectly determines that a filter should not be replaced, the industrial air filtration device will not effectively filter the air.

Many known industrial air filtration devices include two to three distinct, manually controlled fan speed settings. As the filters of such an industrial air filtration device occlude (i.e., as particulates accumulate on and in the filters), the rate of air flow through the industrial air filtration device decreases. Filters are typically efficient for a narrow target range of rates of air flow through the filters, and if the rate of air flow through the filters falls above or below that target range, the performance of the filters suffers. Thus, in such known industrial air filtration devices, a user must manually change the fan speed as the filters occlude to attempt to maintain the rate of air flow through the filters within that target range. Because the industrial air filtration device only includes two to three distinct fan speed settings, in some instances the user may not be able to increase the fan speed high enough to keep the rate of air flow through the industrial air filtration device within the target range. In other instances, however, the user may increase the fan speed too much, causing the rate of air flow through the industrial air filtration device to fall outside of the target range.

Many known industrial air filtration devices require users to themselves determine how much filtering the surrounding air requires and to manually increase or decrease the fan speed of the industrial air filtration devices accordingly. If the user incorrectly overestimates the speed at which such an industrial air filtration device should be operating, unnecessary electricity costs accrue. If, on the other hand, the user incorrectly underestimates the speed at which the industrial air filtration device should be operating, the user and others in the vicinity will be exposed to (and breathe) air filled with potentially dangerous impurities.

Many known industrial air filtration devices have no way of automatically determining whether the proper filters are installed and/or whether the proper number of filters are installed. This is problematic because the industrial air filtration devices may not function properly to effectively filter the surrounding air if one or more incorrect filters, such as incorrectly sized filters or filters of the wrong class or rating, are installed or if fewer than all of the filters are installed.

Accordingly, there is a need for new and improved air filtration devices that overcome these disadvantages.

SUMMARY

Various embodiments of the present disclosure provide a portable industrial air filtration device employing an annular dual filter assembly to capture and remove various impurities from the air surrounding the portable industrial air filtration device, enabling the portable industrial air filtration device to quickly and efficiently improve the quality and safety of the air. In general, when the portable industrial air filtration device is in operation, the portable industrial air filtration device pulls (such as by drawing) air surrounding the portable industrial air filtration device through the annular dual filter assembly, which captures and removes various impurities (such as particulates and other pollutants) from the air, and expels the filtered, clean air out of the portable industrial air filtration device. Thus, when the portable industrial air filtration device is in operation, such as in an enclosed construction site manned by a number of workers performing activities that cause particulates to fill the air, the portable industrial air filtration device continuously filters and cleans the surrounding air, improving its breathability by reducing the amount of potentially dangerous impurities in the air.

In various embodiments, the portable industrial air filtration device includes a two-piece housing including a lower housing component and a locking cover that is removably attachable to the lower housing component. The dual filter assembly is mounted or installed within the housing between the locking cover and the lower housing component. The dual filter assembly includes a removable and replaceable self-supporting outer pre-filter surrounding a separately removable and replaceable inner high-efficiency particulate air (HEPA) filter. The pre-filter initially filters the surrounding air by capturing and removing relatively large or coarse impurities from the air as the air is pulled through the pre-filter toward the HEPA filter. The pre-filter media includes a tacifier, which is a sticky substance that helps trap particulates (such as dust) in the pre-filter media. The HEPA filter further filters the air pulled through the pre-filter by capturing and removing relatively small or fine impurities from the air as the air is pulled through the HEPA filter toward the interior of the portable industrial air filtration device. A user may access both filters (such as to remove one or more of the filters) by detaching and removing the locking cover from the lower housing component.

In various embodiments, the pre-filter is formed from two different materials: pre-filter media, which forms the eventual exterior surface of the pre-filter, and a rigidized backing, which forms the eventual interior surface of the pre-filter. The use of the rigidized backing in combination with the pre-filter media provides structural support to the pre-filter, rendering it rigid enough to support itself and stand on its own without deforming, while maintaining enough flexibility to be packed flat for shipping and storage, which enables packaging materials and storage space to be minimized. In one embodiment, the pre-filter is formed by placing the rigidized backing, which has upper and lower opposing edges and two opposing side edges, onto a sheet of the pre-filter media, which has upper and lower opposing edges and two opposing side edges. The upper edge of the pre-filter media is folded over the upper edge of the rigidized backing and heat sealed to hold it in place. Similarly, the lower edge of the pre-filter media is folded over the lower edge of the rigidized backing and heat sealed to hold it in place.

This above process is repeated, resulting in two sheets of rigidized pre-filter media. The pre-filter is formed by sewing the corresponding side edges of the two sheets of rigidized pre-filter media to one another to form an annular or ring-shaped structure such that the two sewed side seams run lengthwise down the height of the pre-filter, the rigidized backing forms the interior surface of the pre-filter, and the pre-filter media forms the exterior surface of the pre-filter. In certain embodiments, at least one surface of the pre-filter includes a pre-filter sensor triggering component configured to trigger a pre-filter sensor (such as a pre-filter limit switch actuator sized to actuate a pre-filter limit switch) when the pre-filter is properly installed, which enables the portable industrial air filtration device to determine that an acceptable pre-filter is installed.

As described in detail below, the portable industrial air filtration device of the present disclosure overcomes the above-explained disadvantages. The portable industrial air filtration device of various embodiments of the present disclosure is a small, lightweight device that is easily transportable to and from a construction site, around a construction site, or between construction sites, especially those that are indoors or otherwise enclosed. In one embodiment, the portable industrial air filtration device is approximately 22 inches×22 inches×24 inches (56 centimeters×56 centimeters×61 centimeters) (L×W×H) and weighs approximately 40 pounds (18.1 kilograms). In comparison, one known industrial air filtration device is approximately 33 inches×32 inches×25.5 inches (83.8 centimeters×81.3 centimeters×64.8 centimeters) (L×W×H) and weighs approximately 150 pounds (68 kilograms). Thus, unlike certain known portable industrial air filtration devices, the portable industrial air filtration device of the present disclosure is easily liftable and transportable to and from a construction site, around a construction site, or between construction sites by a single worker. Further, the portable industrial air filtration device includes a plurality of stabilizers configured to guard the surfaces of the filters from being inadvertently contacted, be used as handles to increase maneuverability of the portable industrial air filtration device, and enable the portable industrial air filtration device to be positioned in a variety of different manners (such as upright or on its side).

Additionally, the annular dual filter assembly of the portable industrial air filtration device of various embodiments of the present disclosure provides increased filter surface area compared to the filter surface area of certain known industrial air filtration devices employing flat front filter assemblies. This increased surface area enables the filters to last longer between filter changes and enables the portable industrial air filtration device of the present disclosure to filter more air than such known industrial air filtration devices in the same amount of time.

The annular dual filter assembly of various embodiments of the portable industrial air filtration device of the present disclosure also enables the portable industrial air filtration device to filter the air surrounding the portable industrial air filtration device around the circumference of the portable air filtration device rather than just on one side, as is the case with industrial air filtration devices employing flat front filter assemblies. This enables the portable industrial air filtration device of the present disclosure to quickly and efficiently filter the air surrounding the portable industrial air filtration device.

The portable industrial air filtration device of various embodiments of the present disclosure monitors the occlusion of the filters (i.e., the amount of particulates accumulated on and in the filters). The portable industrial air filtration device alerts the user when the filters have reached the ends of their useful lives and, therefore, should be replaced. This enables users to quickly and easily determine how used up each of the filters is and when the filters need replacement, thereby eliminating the time wasted manually checking each filter to determine whether that filter is used up or not. This also eliminates the inherent guesswork as to whether or not a filter is used up, and the consequences caused by guessing incorrectly (such as the increased environmental and monetary waste).

The portable industrial air filtration device of various embodiments of the present disclosure employs dynamic fan speed control to adjust the fan speed to achieve a desired air flow rate through the air filtration device. Generally, when employing dynamic fan speed control, the air filtration device uses the pressure drop across the fan and the desired air flow rate through the air filtration device to determine a desired fan speed that achieves the desired flow rate through the air filtration device. This enables the air filtration device to maintain that desired air flow rate through the air filtration device by varying the fan speed as the pre-filter and the HEPA filter occlude during operation of the air filtration device, which prevents the air flow rate through the air filtration device from falling below the desired air flow rate and impairing the air filtration device's performance.

The portable industrial air filtration device of other embodiments of the present disclosure dynamically controls the speed of the fan of the fan assembly based on how occluded the filters are. This enables the portable industrial air filtration device to automatically adjust the fan speed as the filters occlude during operation to maintain a constant or substantially constant rate of air flow through the portable industrial air filtration device within the target range for the filters during all phases of the filters' useful lives. This prevents the rate of air flow through the portable industrial air filtration device from decreasing and falling below the target range as the filter occludes, thereby ensuring proper and efficient performance throughout the filters' useful lives and removing the guesswork inherent in requiring a user to manually adjust the fan speed.

The portable industrial air filtration device of various embodiments of the present disclosure includes an automatic fan speed setting selection operating mode. Generally, when the automatic fan speed setting selection operating mode is selected by the user, the air filtration device uses a dust sensor to measure the amount of dust in the air surrounding the air filtration device and, if necessary, automatically increases or decreases the current fan speed setting to account for the amount of dust in the air. Thus, when operating in the automatic fan speed setting selection operating mode, the air filtration device dynamically and automatically adjusts the fan speed setting in real-time to account for varying levels of dust in the air surrounding the air filtration device, which eliminates the need for the user to guess the amount of dust in the air and manually select what the user believes to be the most effective and efficient fan speed setting in which to operate the air filtration device to remove that dust.

The portable industrial air filtration device of other embodiments of the present disclosure measures the amount of impurities in the air and automatically increases or decreases fan speed when the amount of impurities reaches certain levels. This ensures that the portable industrial air filtration device operates efficiently for the amount of dust present in the environment, which eliminates the guesswork required to determine the speed at which to operate the portable industrial air filtration device, eliminates electricity costs resulting from inefficient operation of the portable industrial air filtration device, and ensures worker safety.

The portable industrial air filtration device of various embodiments of the present disclosure detects when an acceptable pre-filter and an acceptable HEPA filter are installed, and does not enable the fan to operate when an acceptable pre-filter is not installed and/or when an acceptable HEPA filter is not installed. This ensures that the portable industrial air filtration device will work properly to effectively filter and clean the surrounding air.

The portable industrial air filtration device of other embodiments of the present disclosure is also configured to detect when the proper filters are installed, and does not function when fewer than all of the filters are installed (i.e., when only one filter is installed or when no filters are installed) or when one or more improper filters are installed. This ensures that the portable industrial air filtration device will work properly to effectively filter and clean the surrounding air.

Additional features and advantages of the present invention are described in, and will be apparent from, the following Detailed Description and the Figures.

BRIEF DESCRIPTION OF THE DRAWINGS

FIG. 2C is a top view of the lower housing component of FIG. 2A.

FIG. 3 is a bottom perspective view of the fan assembly mounted to the fan assembly mounting bracket secured to the lower housing component of the portable industrial air filtration device of FIG. 1A.

FIG. 4A is a side perspective view of the exhaust screen of the portable industrial air filtration device of FIG. 1A.

FIG. 4B is a front view of the exhaust screen of FIG. 4A.

FIG. 6B is a top perspective view of the HEPA filter of FIG. 6A with the protective mesh.

FIG. 6C is a side cross-sectional view of the HEPA filter of FIG. 6B taken substantially along line 6C-6C of FIG. 6B.

FIG. 10A is a top perspective view of the pre-filter of the portable industrial air filtration device of FIG. 1A.

FIG. 11A is a top perspective view of the locking cover of the portable industrial air filtration device of FIG. 1A.

FIG. 12E is another side view of the portable industrial air filtration device of FIG. 12A.

FIG. 13A is a top perspective view of the lower housing component of the portable industrial air filtration device of FIG. 12A.

FIG. 13E is a side cross-sectional view of the lower housing component of FIG. 13A taken substantially along line 13E-13E of FIGS. 13C and 13D.

FIG. 17A is a top perspective view of the filter assembly mounting chamber cover of the portable industrial air filtration device of FIG. 12A.

FIG. 20B is a side view of the HEPA filter securing bracket of FIG. 20A.

FIG. 22 is a partial side cross-sectional view of the portable industrial air filtration device of FIG. 12A taken substantially along line 22-22 of FIG. 12F.

FIG. 23A is a top perspective view of the pre-filter of the portable industrial air filtration device of FIG. 12A.

FIGS. 30A and 30B illustrate a flowchart of one example embodiment of a filter occlusion level monitoring process.

DETAILED DESCRIPTION

A. First Example Embodiment

1. Components and Structure

Figure 1A:
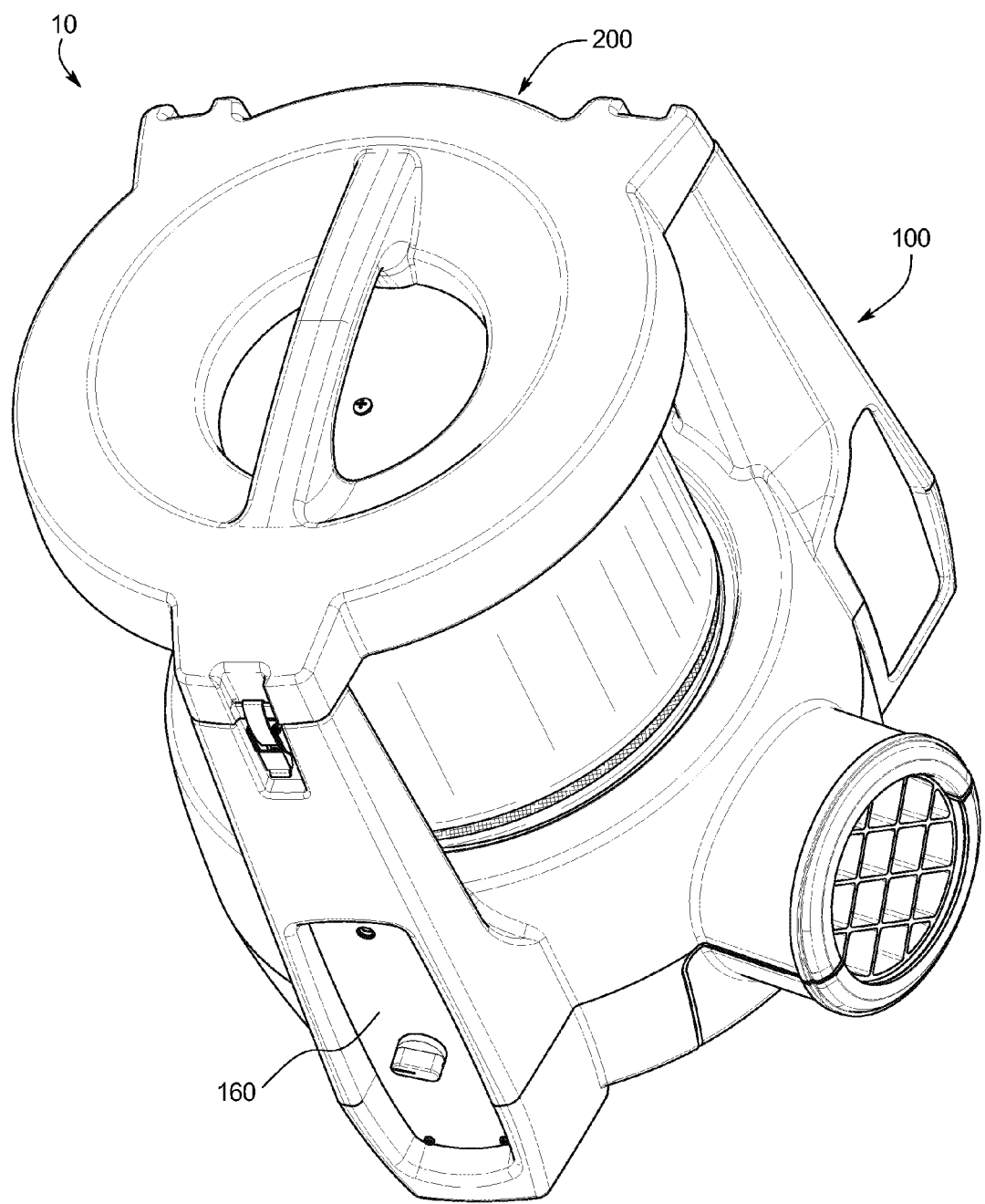
FIG. 1A is a top perspective view of an embodiment of the portable industrial air filtration device of the present disclosure.

Referring now to the drawings, FIGS. 1A, 1B, 1C, 1D, and 1E illustrate one example embodiment of the portable industrial air filtration device of the present disclosure, which is generally indicated by numeral 10 and is sometimes referred to below as the air filtration device for brevity. FIGS. 2A to 11C illustrate various components of the air filtration device 10.

Figure 1B:
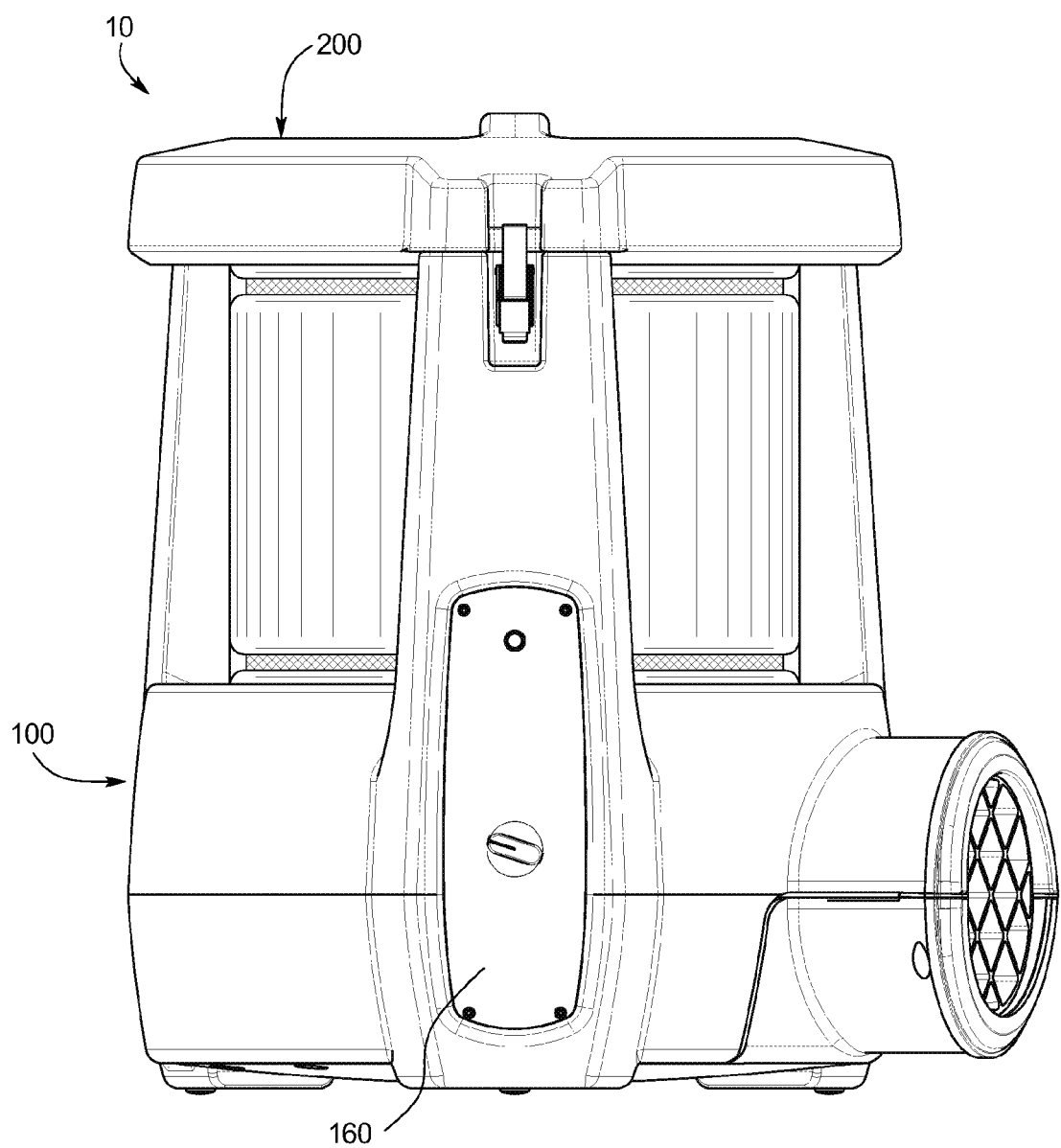
FIG. 1B is a side view of the portable industrial air filtration device of FIG. 1A.
Figure 1C:
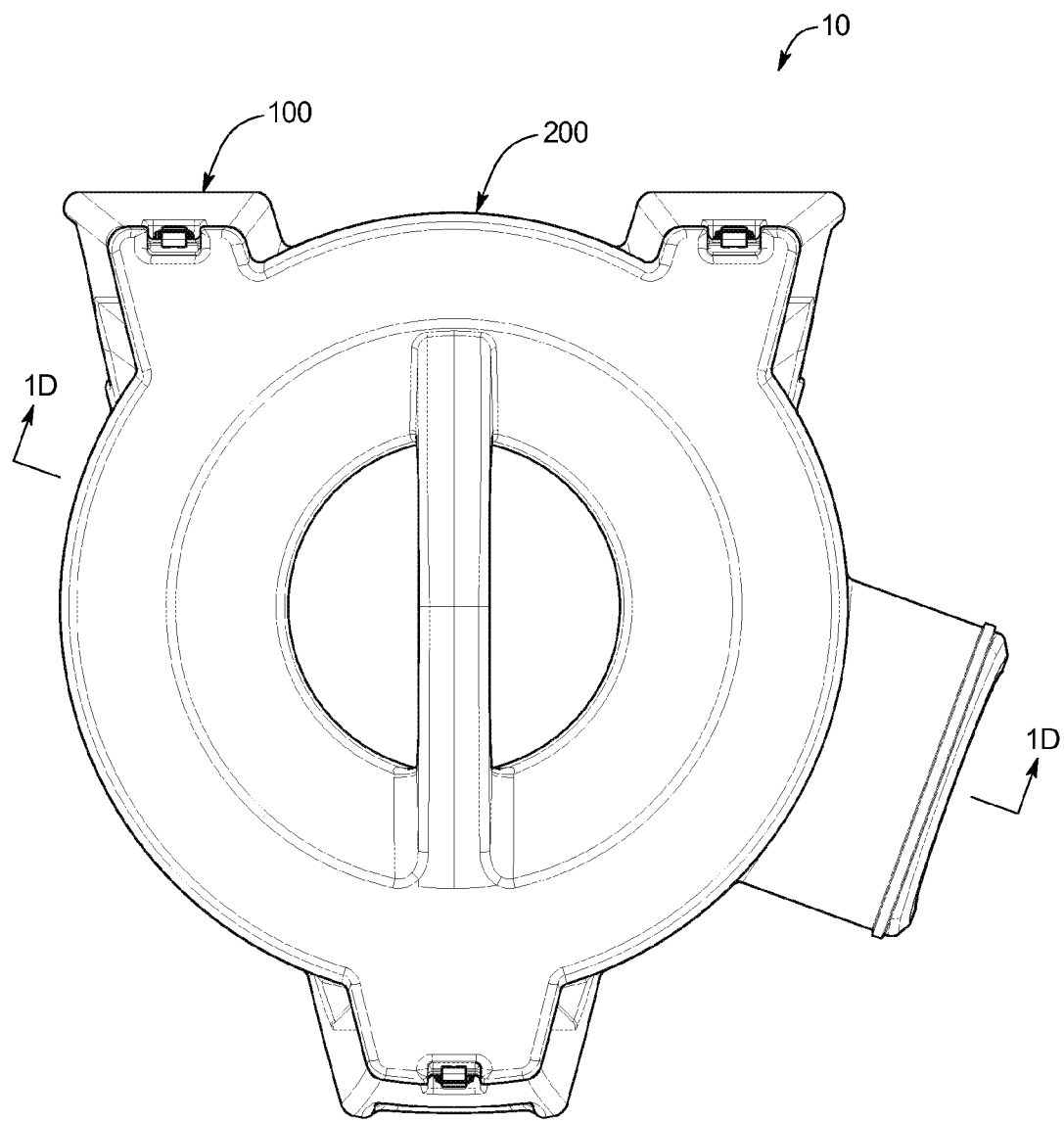
FIG. 1C is a top view of the portable industrial air filtration device of FIG. 1A.
Figure 1D:
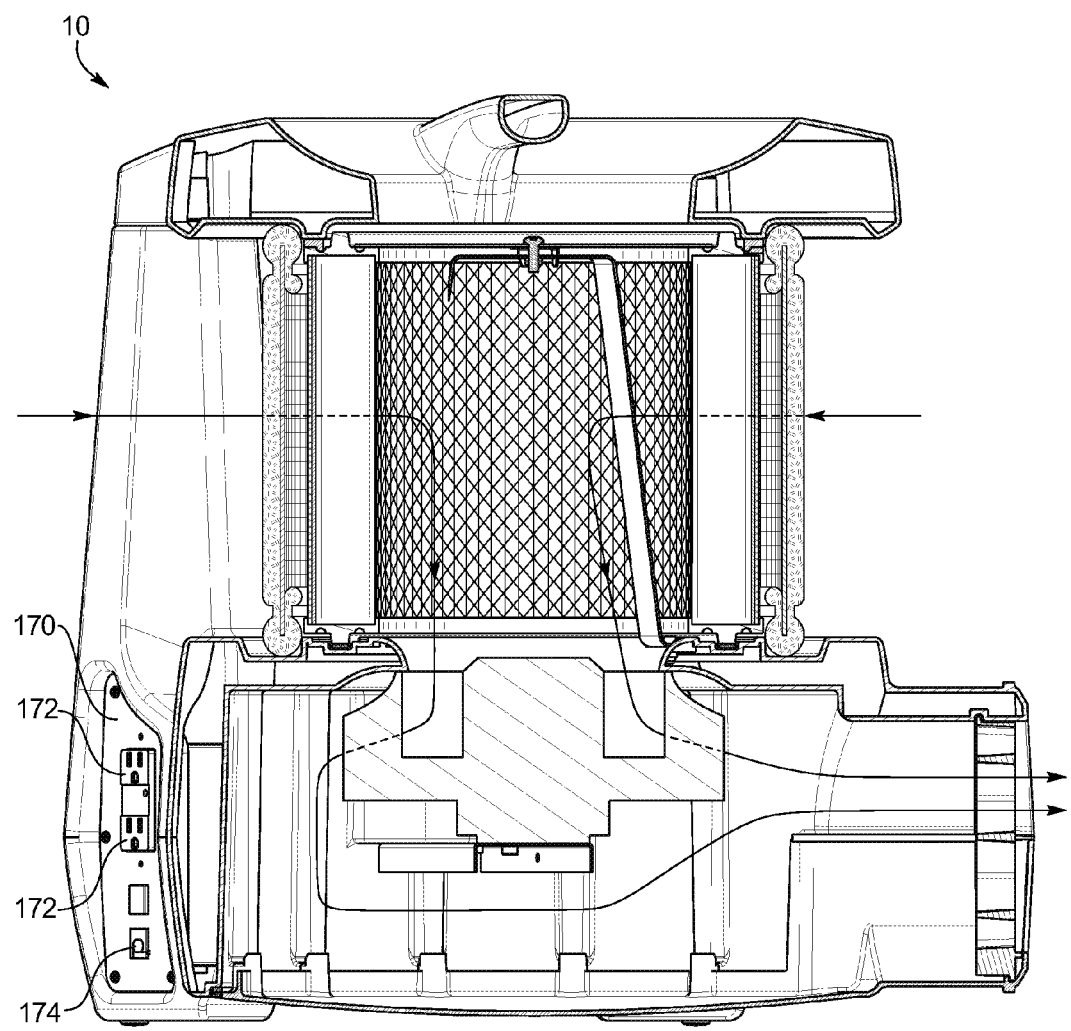
FIG. 1D is a side cross-sectional view of the portable industrial air filtration device of FIG. 1A taken substantially along line 1D-1D of FIG. 1C, and illustrates the path of air flow through the portable industrial air filtration device.
Figure 1E:
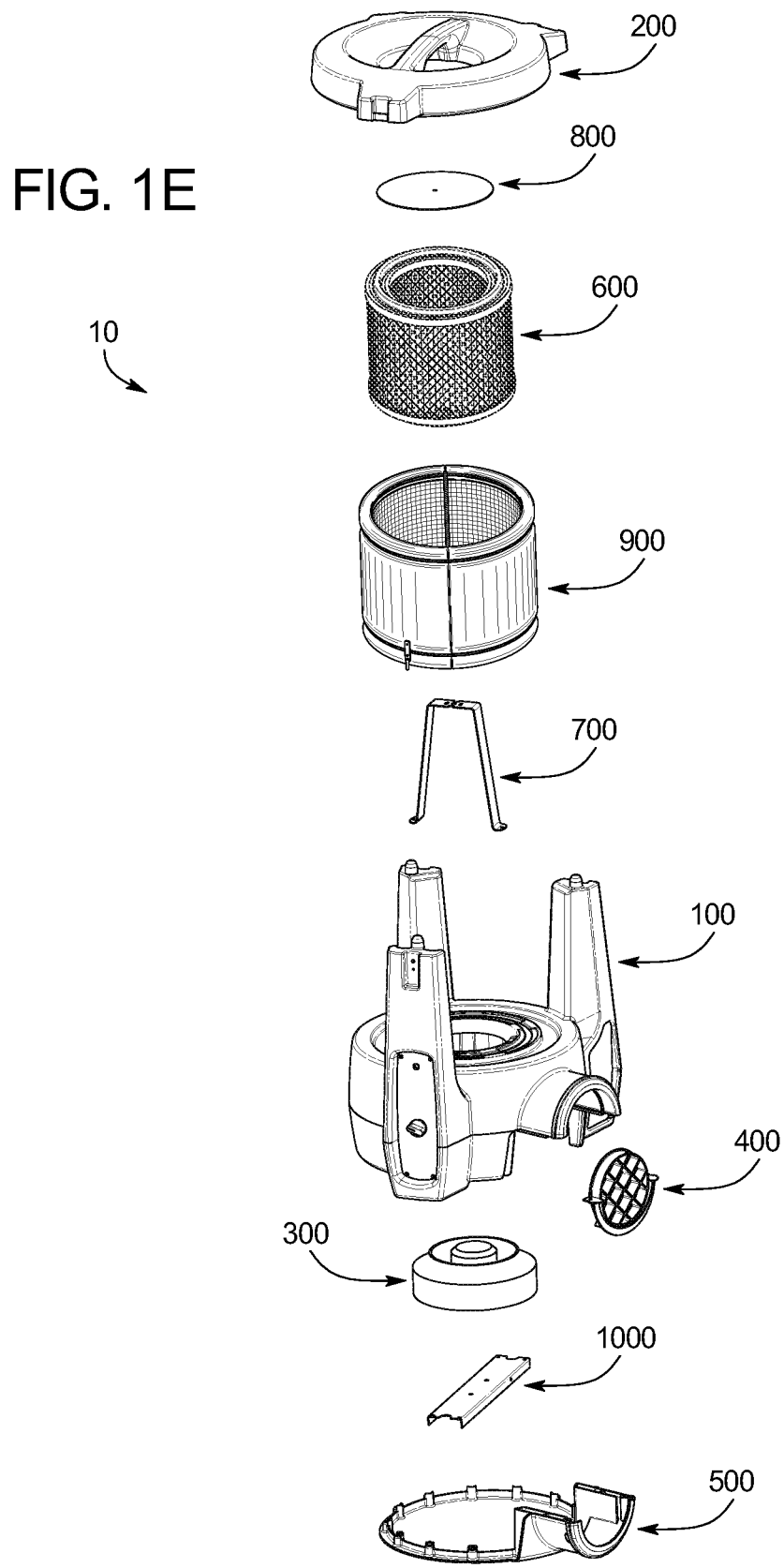
FIG. 1E is an exploded top perspective view of the portable industrial air filtration device of FIG. 1A.

More specifically, FIGS. 1A, 1B, and 1C illustrate a top perspective view, a side view, and a top view, respectively, of the air filtration device 10 in an assembled configuration; FIG. 1D illustrates a side cross-sectional view of the air filtration device 10 taken substantially along a vertical plane through line 1D-1D of FIG. 1C, and shows the path air takes when passing through the air filtration device 10; and FIG. 1E illustrates the air filtration device 10 in an exploded configuration. It should be appreciated that, for clarity, the Figures include a simplified illustration of the fan assembly 300.

The air filtration device 10 includes the following components, each of which is described in detail below: (a) a two-piece housing including a lower housing component 100 and a locking cover 200 that is removably attachable to the lower housing component 100, (b) a fan assembly 300 mounted within a fan assembly mounting chamber defined by an underside of the lower housing component 100, (c) a fan assembly mounting chamber cover 500 removably attachable to the underside of the lower housing component 100 to substantially cover the fan assembly mounting chamber and enclose the fan assembly 300 within the fan assembly mounting chamber, (d) an exhaust screen 400 mounted to the lower housing component 100 within an exhaust port, (e) a dual filter assembly mounted within the housing between the locking cover 200 and the lower housing component 100 and including a removable and replaceable self-supporting outer pre-filter 900 surrounding a separately removable and replaceable inner HEPA filter 600, and (f) a HEPA filter securing plate 800 and a HEPA filter securing bracket 700 configured to operate with the HEPA filter securing plate 800 to secure the HEPA filter 600 to the lower housing component 100.

As best illustrated in FIGS. 2A, 2B, 2C, 2D, 2E, and 2F, the lower housing component 100 includes a generally cylindrical base 110; a plurality of stabilizers 120, 130, and 140 circumferentially spaced apart around the base 110 and extending vertically from the base 110; and a half-ring shaped exhaust port upper portion 150 extending transversely from the base 110.

The base 110 includes a generally circular exterior top surface 111, a ring-shaped exterior side surface 112, a ring-shaped interior side surface 116, a generally circular interior top surface 117, and a ring-shaped bridging surface 115 bridging the exterior top surface 111 and the interior top surface 117. The bridging surface 115 defines a circular fan assembly receiving opening through the center of the base 110. The interior side surface 116 and the interior top surface 117 define a fan assembly mounting chamber on the underside of the base 110.

Figure 2A:
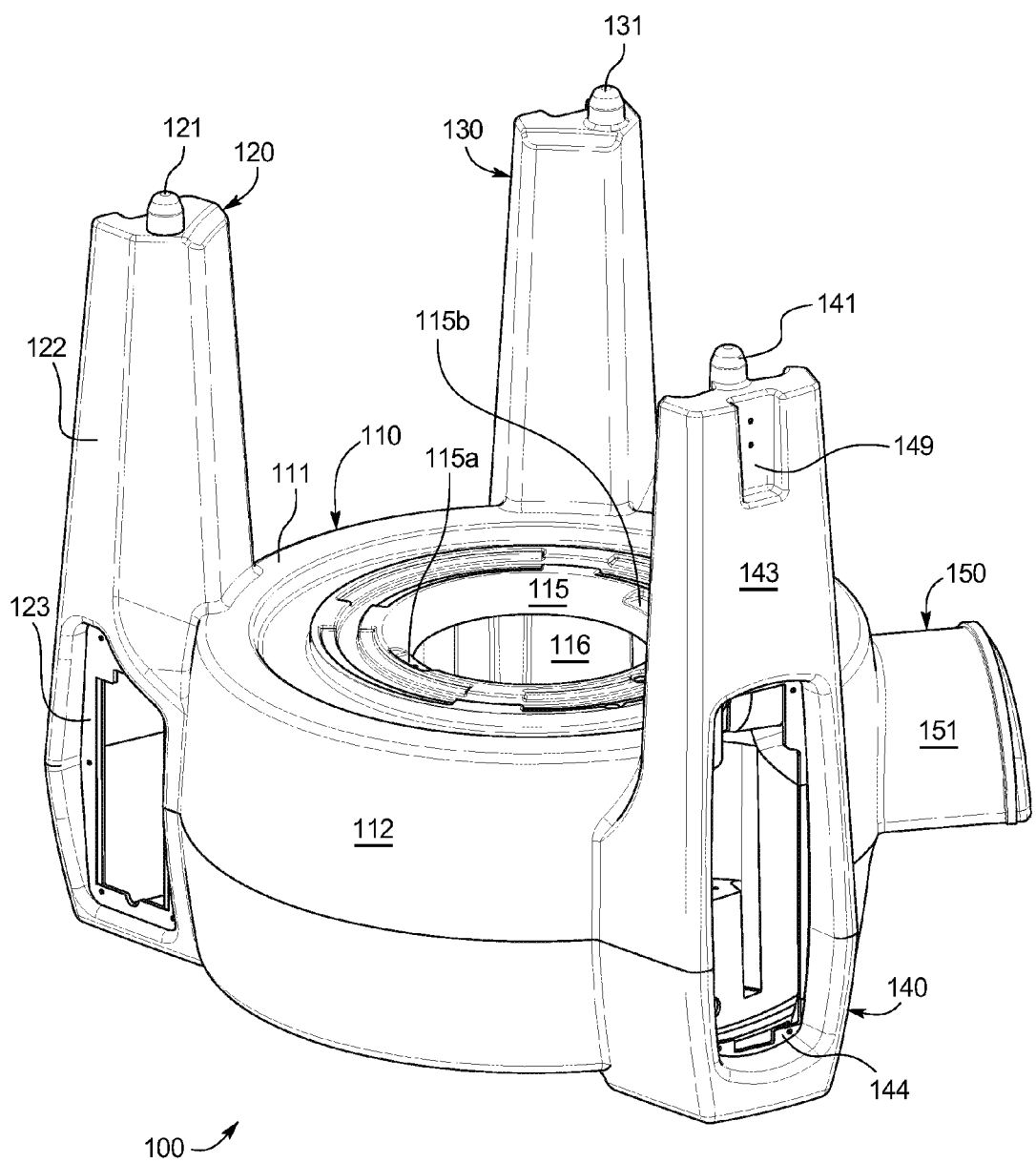
FIG. 2A is a top perspective view of the lower housing component of the portable industrial air filtration device of FIG. 1A.
Figure 2B:
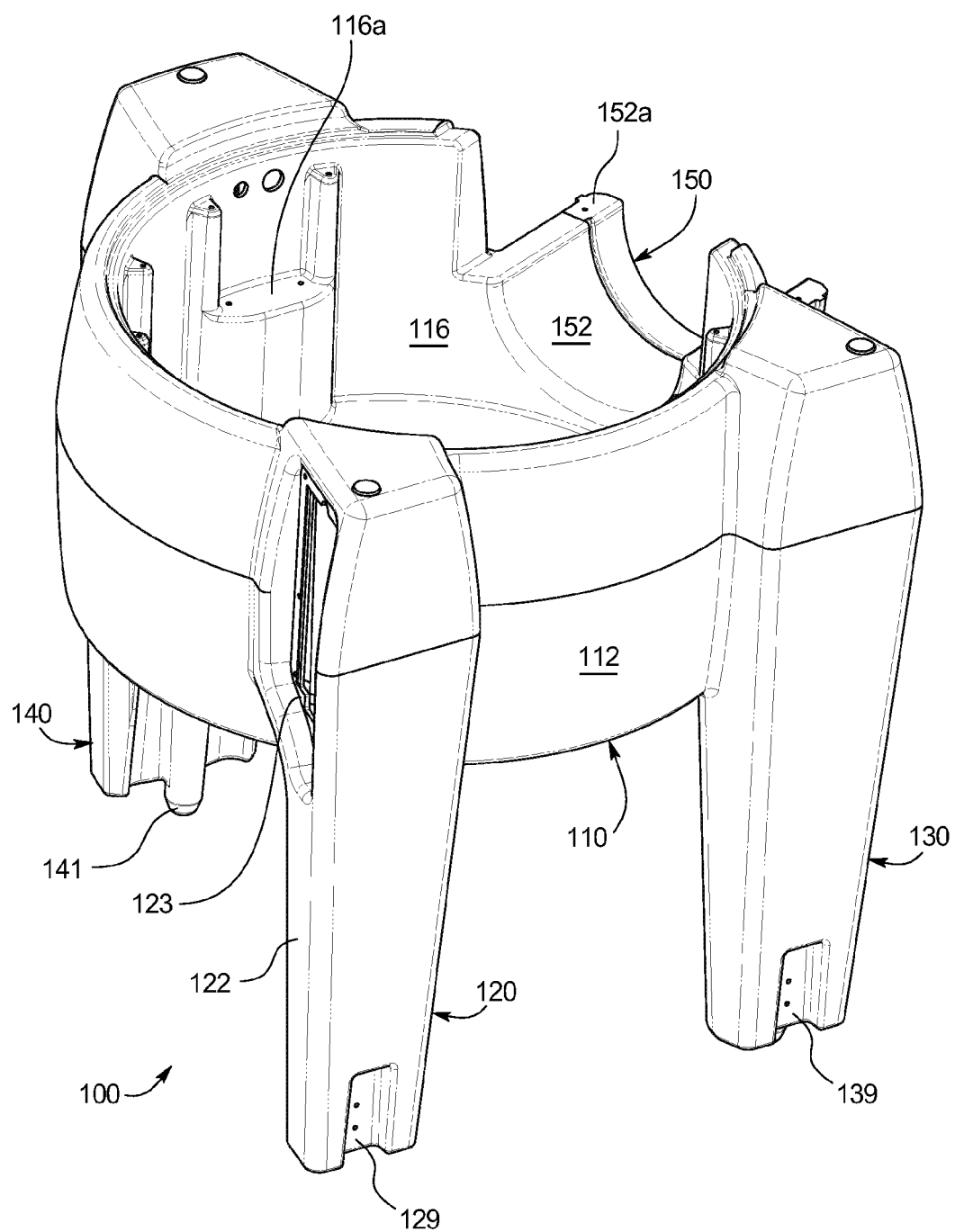
FIG. 2B is a bottom perspective view of the lower housing component of FIG. 2A.
Figure 2D:
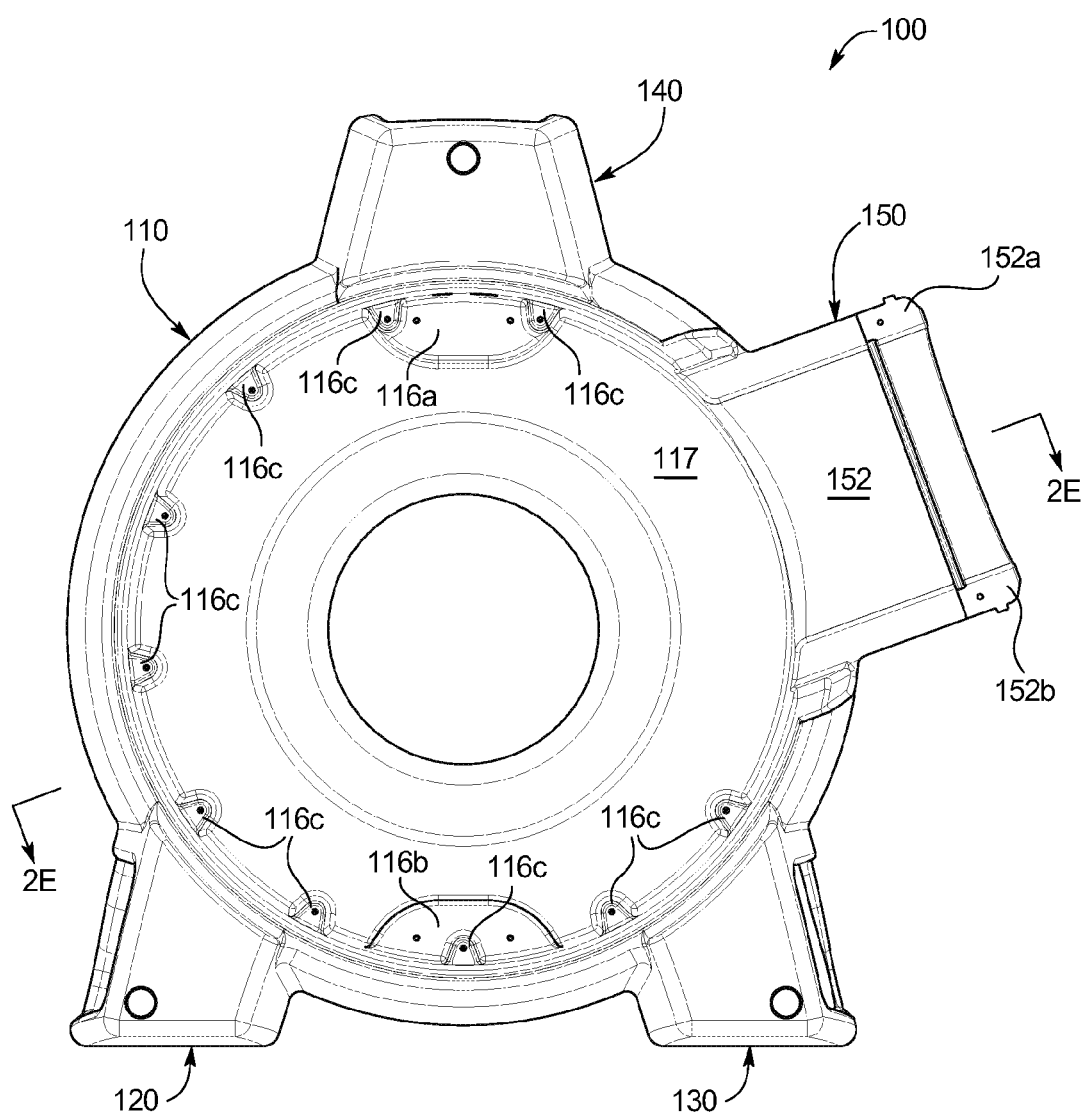
FIG. 2D is a bottom view of the lower housing component of FIG. 2A.

As best shown in FIGS. 2A and 2C, in this example, the bridging surface 115 includes two opposing HEPA filter mounting bracket mounting surfaces 115a and 115b to which the HEPA filter mounting bracket 700 is secured (as described below). Additionally, as best shown in FIGS. 2B and 2D, in this example, the interior side surface 116 of the base 110 includes two opposing fan assembly mounting bracket mounting surfaces 116a and 116b to which the fan assembly mounting bracket 1000 is secured (as described below). Further, as best shown in FIG. 2D, in this example the interior side surface 116 includes a plurality of fan assembly mounting chamber cover mounting surfaces 116c circumferentially spaced apart around the interior side surface 116 to which the fan assembly mounting chamber cover 500 is secured (as described below).

Figure 2E:
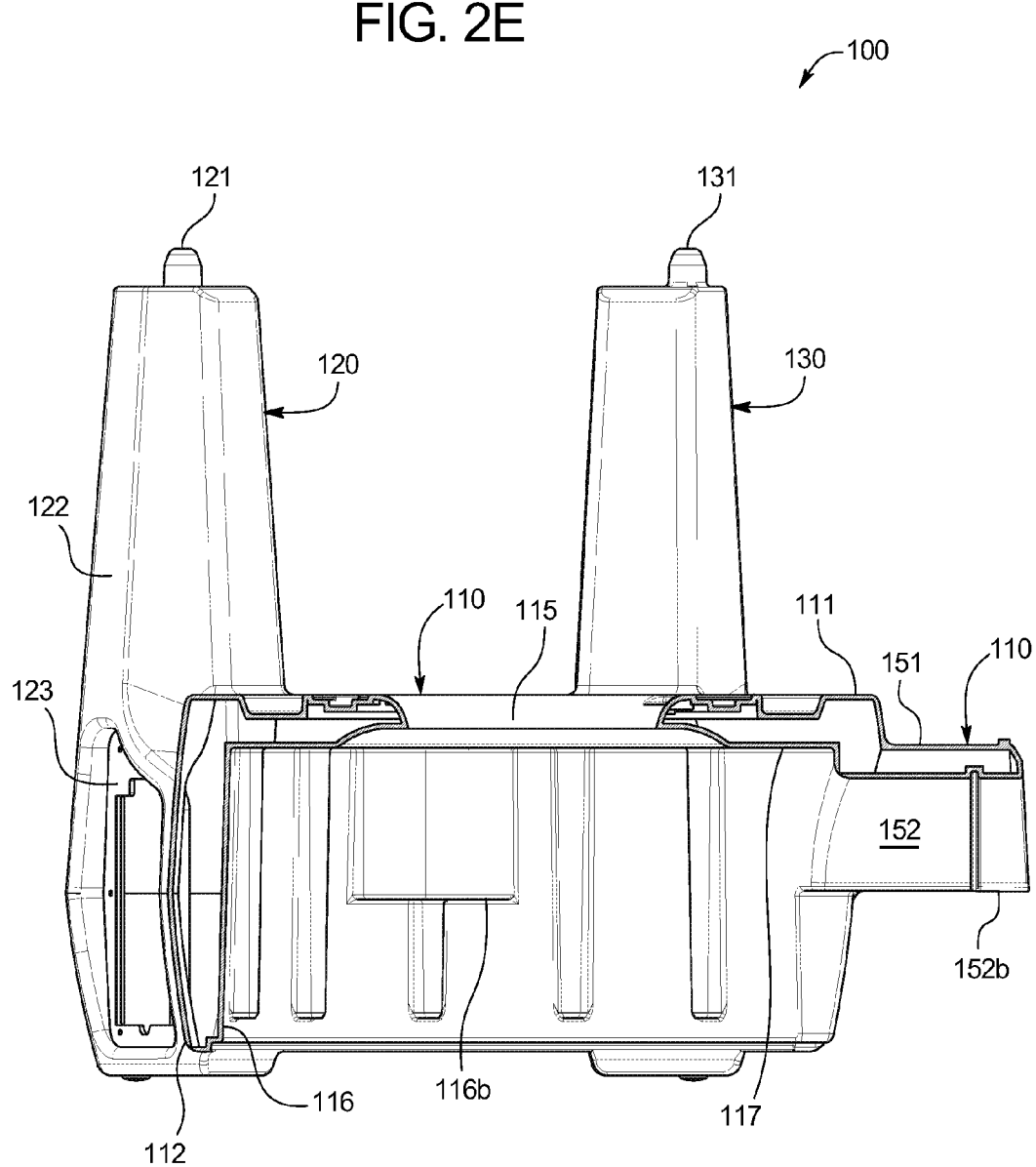
FIG. 2E is a side cross-sectional view of the lower housing component of FIG. 2A taken substantially along line 2E-2E of FIGS. 2C and 2D.
Figure 2F:
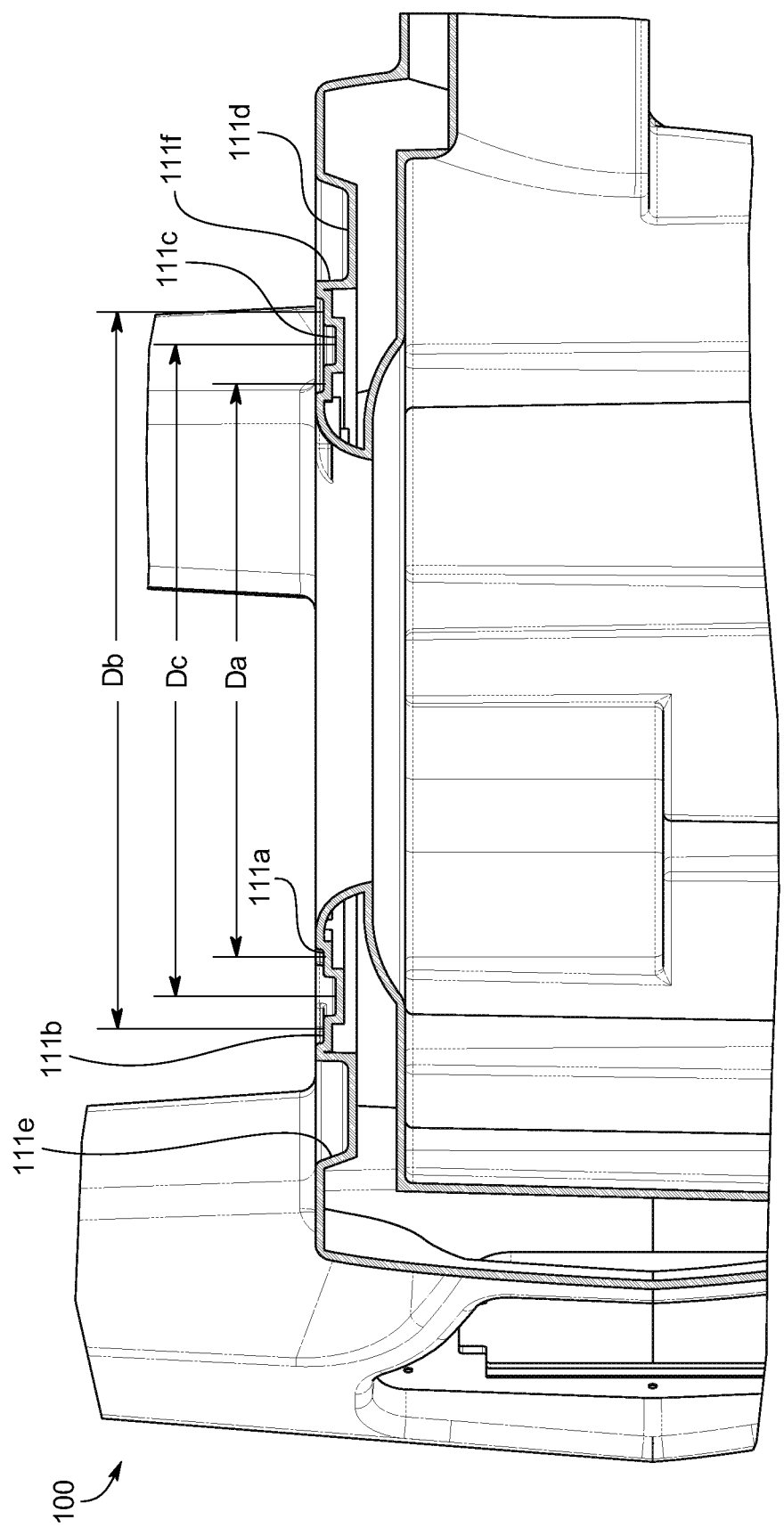
FIG. 2F is a partial side cross-sectional view of the lower housing component of FIG. 2A taken substantially along line 2E-2E of FIGS. 2C and 2D.
Figure 9:
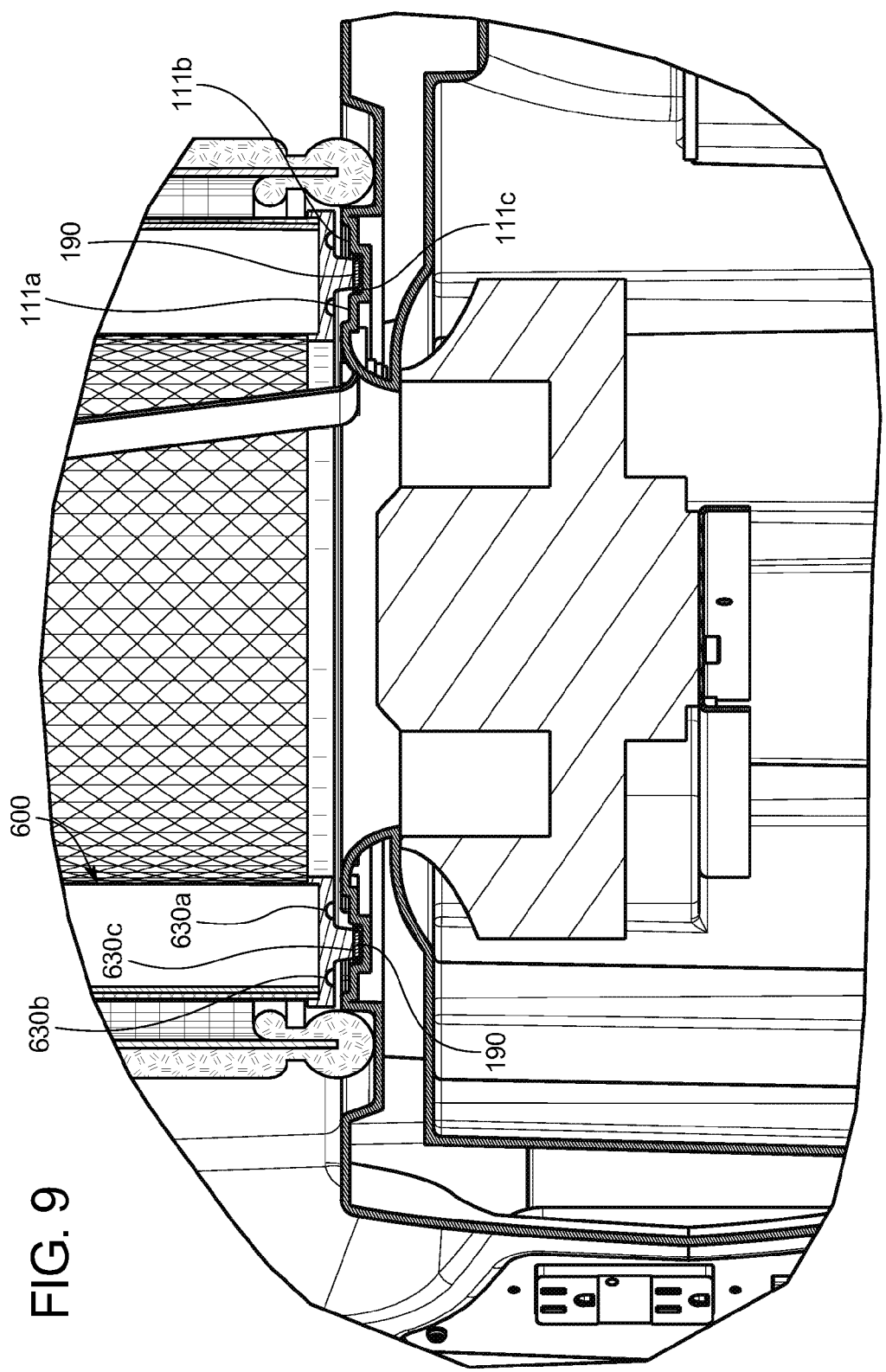
FIG. 9 is a partial side cross-sectional view of the portable industrial air filtration device of FIG. 1A taken substantially along line 1D-1D of FIG. 1C.

In this illustrated example, the HEPA filter 600 is mounted to the base 110 via a plurality of channels and surfaces (described in detail below with respect to FIG. 9). More specifically, as best shown in FIGS. 2C and 2F, the exterior top surface 111 includes a plurality of first concave surfaces 111a defining a plurality of first channels spaced around the circumference of the exterior top surface 111 at a diameter Da. The exterior top surface 111 also includes a plurality of second concave surfaces 111b defining a plurality of second channels spaced around the circumference of the exterior top surface 111 at a diameter Db, which is larger than diameter Da. The exterior top surface 111 also includes a generally flat HEPA filter mounting surface 111c around the circumference of the exterior top surface 111 at a diameter Dc. HEPA filter mounting surface 111c is recessed below first concave surfaces 111a and second concave surfaces 111b of the exterior top surface 111. As described in detail below with respect to FIG. 9, the HEPA filter is mounted to the base via the HEPA filter mounting surface.

In this example, one of the first concave surfaces 111a defines a pressure sensor receiving opening 170a therethrough, and one of the second concave surfaces 111b defines a pressure sensor receiving opening 170b therethrough. Each of the pressure sensor receiving openings 170a and 170b is configured to receive and secure (such as via a press fit or a friction fit) a pressure sensor (not shown) such as a pressure tube such that the pressure sensor is substantially flush with its corresponding concave surface. In this example, as explained below, the pressure sensor secured by the pressure sensor receiving opening 170a is configured to measure the pressure on the interior of the portable air filtration device, while the pressure sensor secured by the pressure sensor receiving opening 170b is configured to measure the pressure between the pre-filter and the HEPA filter.

It should be appreciated that, in other embodiments, the exterior top surface includes a single first concave surface defining a single first channel around the circumference of the exterior top surface at diameter Da. Similarly, in other embodiments, the exterior top surface includes a single second concave surface defining a single second channel around the circumference of the exterior top surface at diameter Db.

The pre-filter 900 is mounted to the base via a pre-filter mounting channel. More specifically, as best shown in FIG. 2F, the exterior top surface 111 includes a generally flat surface 111d, an angled surface 111e, and a generally vertical surface 111f that together define the ring-shaped pre-filter mounting channel. As described below, the pre-filter is mounted to the base via the pre-filter mounting channel.

The stabilizers 120, 130, and 140 are configured to facilitate the attachment of the locking cover 200 to the lower housing component 100, to provide structural support for the air filtration device 10, and to provide protection for the dual filter assembly. As best shown in FIGS. 1D and 2E, the stabilizers 120, 130, and 140 are also configured such that they raise the air filtration device 10 off of the ground to allow for air circulation under the air filtration device 10. While three stabilizers are employed in this example, it should be appreciated that the air filtration device may include any suitable quantity of stabilizers.

More specifically, to facilitate the attachment of the locking cover 200 to the lower housing component 110, in this example each of the stabilizers 120, 130, and 140 includes a locking cover mounting tab 121, 131, and 141, respectively, and a latch mounting surface 129, 139, and 149, respectively. The locking cover mounting tabs 121, 131, and 141 are received by the locking cover 200 (described below) and, once received by the locking cover 200, prevent the locking cover 200 from rotating. As shown in FIGS. 1A and 1B, a latch is mounted to each of the latch mounting surfaces 129, 139, and 149. The latches are attached to corresponding integrated latching surfaces on the locking cover (described below) to secure the locking cover 200 to the lower housing component 110.

In this example, side 143 of the stabilizer 140 includes a recessed control panel mounting surface 144 to which an integrated control panel 160 (shown in FIGS. 1A and 1B) is mounted. The control panel 160 enables a user to control the operation of the air filtration device 10. Additionally, in this example, side 122 of the stabilizer 120 includes a recessed outlet panel mounting plate 123 to which an outlet panel 170 (shown in FIG. 1D) is mounted. The outlet panel 170 includes a plurality of electrical outlets 172 and an electrical cord 174 ending in a plug (not shown). To power the air filtration device 10, the user plugs the plug of the electrical cord 174 into a power source (such as a wall electrical outlet). Once the air filtration device 10 is connected to the power source, a user may operate the air filtration device 10 and may plug other electronic devices into the electrical outlets 172 to power those devices.

The exhaust port upper portion 150 includes a convex exterior surface 151 and a concave interior surface 152. The interior surface 152 of the exhaust port upper portion 150 includes two opposing exhaust screen mounting surfaces 152a and 152b to which the exhaust screen 400 is mounted (as described below).

In this example, the lower housing component is dual-walled and rotationally molded out of plastic. It should be appreciated, however, that the lower housing component may be made of any suitable material or materials or manufactured in any suitable manner or manners.

As best illustrated in FIG. 3, the fan assembly 300 is mounted to the lower housing component 100 within the fan assembly mounting chamber via a fan assembly mounting bracket 1000. More specifically, in this illustrated example, the fan assembly mounting bracket 1000 is secured to the fan assembly mounting bracket mounting surfaces 116a and 116b of the interior side surface 116 of the base 110, and the fan assembly 300 is mounted to the top side of the fan assembly mounting bracket 1000 such that a portion of the fan assembly 300 is located within the fan assembly receiving opening through the center of the base 110 defined by the connecting surface 115.

In this example, the fan assembly is a RadiCal centrifugal fan R2E250-RB02-15 available from ebmpapst, though it should be appreciated that any suitable fan assembly may be employed.

It should be appreciated that the fan assembly mounting bracket 1000 may be secured to the fan assembly mounting bracket mounting surfaces of the interior surface of the base in any suitable manner or manners, such as through the use of threaded fasteners. In this example, the fan assembly mounting bracket 1000 is a sheet metal bracket, though it should be appreciated that the fan assembly mounting bracket 1000 may be made of any suitable material.

The exhaust screen 400, as best illustrated in FIGS. 4A and 4B, includes a plurality of exhaust screen mounting tabs 452a and 452b. The exhaust screen 400 is mounted to the exhaust port upper portion 150 of the lower housing component 100 by securing the exhaust screen mounting tab 452a to the exhaust screen mounting surface 152a and the exhaust screen mounting tab 452b to the exhaust screen mounting surface 152b. After the air filtration device is assembled, the exhaust screen is configured to restrict access through the exhaust channel (described below) to the moving portions of the fan assembly.

In this illustrated embodiment, the exhaust screen 400 is mounted to the exhaust screen mounting surfaces 152a and 152b via, threaded fasteners, though it should be appreciated that the exhaust screen may be mounted in any suitable manner. In this example, the exhaust screen 400 is an injection molded plastic component. It should be appreciated, however, that the exhaust screen may be made of any suitable material or materials or manufactured in any suitable manner or manners.

Figure 5A:
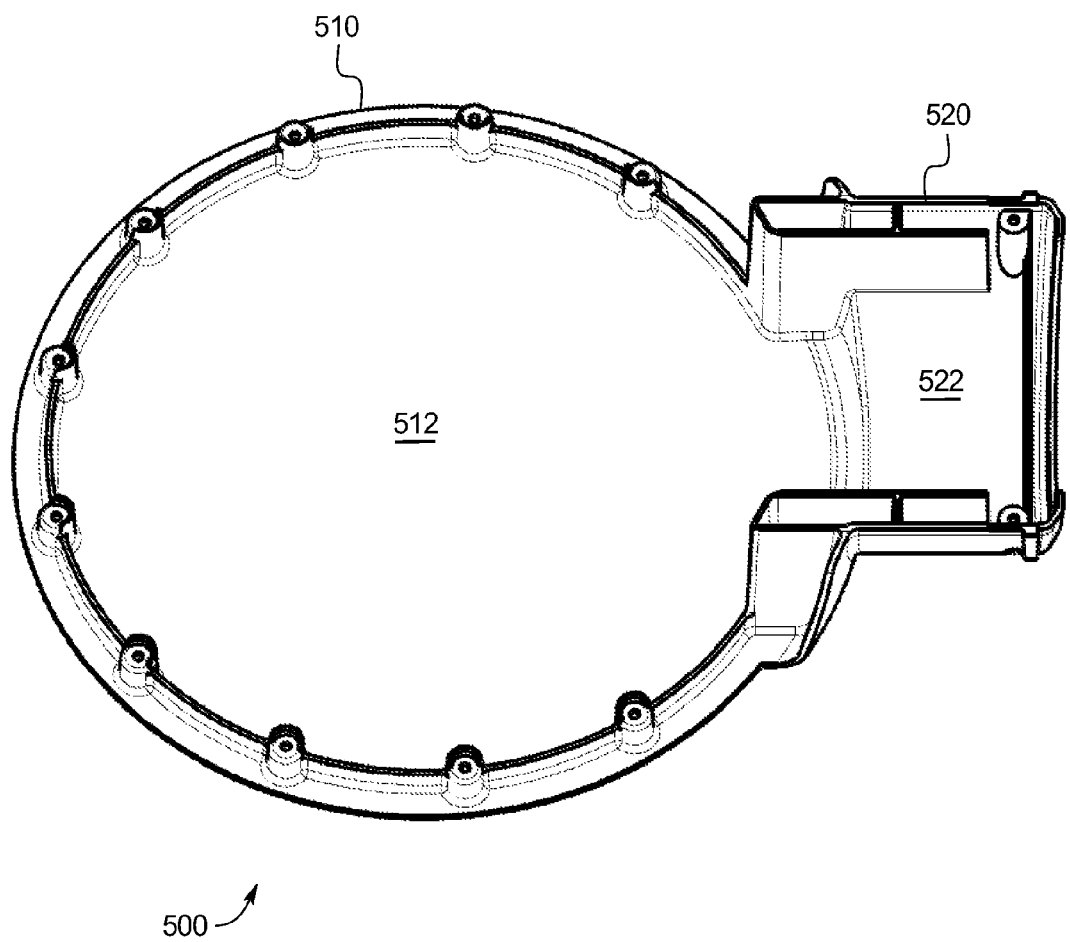
FIG. 5A is a top perspective view of the filter assembly mounting chamber cover of the portable industrial air filtration device of FIG. 1A.
Figure 5B:
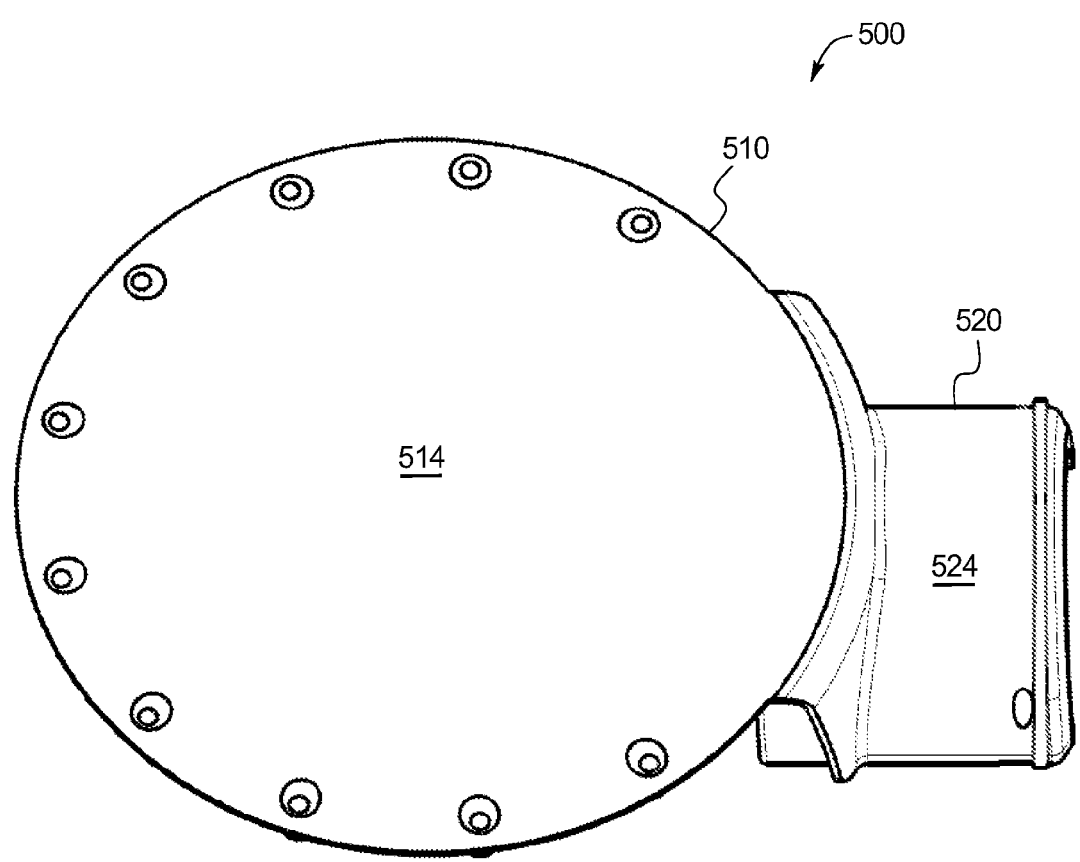
FIG. 5B is a bottom perspective view of the filter assembly mounting chamber cover of FIG. 5A.

As best illustrated in FIGS. 5A and 5B, the fan assembly mounting chamber cover 500 includes a circular portion 510 having a slightly concave interior surface 512 and a slightly convex exterior surface 514 and an exhaust channel lower portion 520 extending transversely from the circular portion 510 and having a concave interior surface 522 and a convex exterior surface 524. The fan assembly mounting chamber cover 500 is mounted to the base 110 via the fan assembly mounting chamber cover mounting surfaces 116c such that the fan assembly mounting chamber cover 500 substantially covers the fan assembly mounting chamber and encloses the fan assembly 300 and the fan assembly mounting bracket 1000 within the fan assembly mounting chamber. Once the fan assembly mounting chamber cover 500 is mounted to the base 110, the exhaust port upper portion 150 of the base 110 and the exhaust port lower portion 520 of the fan assembly mounting chamber cover 500 form an exhaust port that defines an exhaust channel.

In this example, the fan assembly mounting chamber cover 500 is a thin walled plastic component, though it should be appreciated that the fan assembly mounting chamber cover may be made of any suitable material.

Figure 6A:
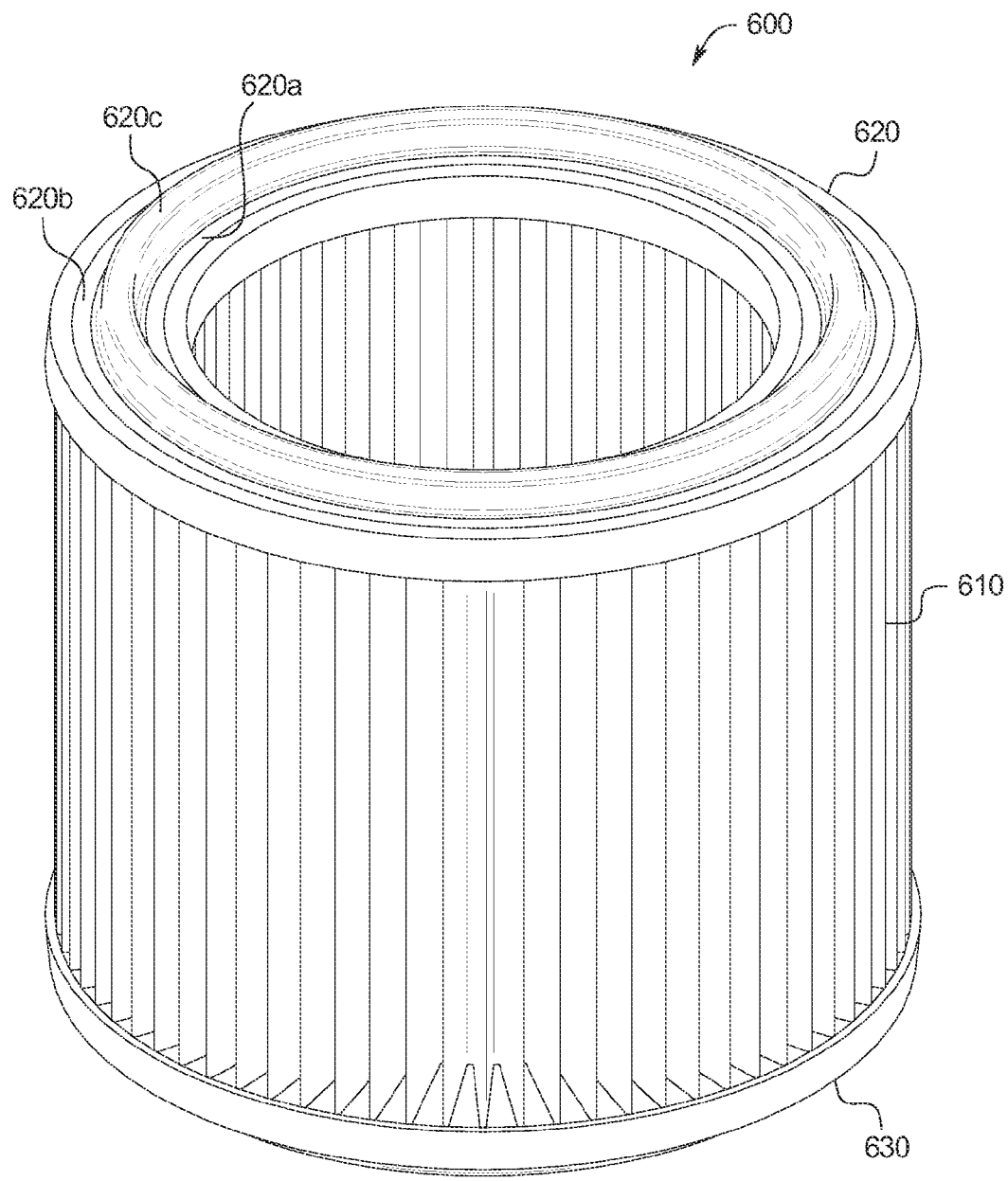
FIG. 6A is a top perspective view of the HEPA filter of the portable industrial air filtration device of FIG. 1A without the protective mesh.

As best illustrated in FIGS. 6A, 6B, and 6C, the HEPA filter 600 includes pleated HEPA filter media 610 sandwiched between upper and lower ring-shaped end caps 620 and 630, respectively. The HEPA filter media 610 and the upper and lower end caps 620 and 630 form or define a cylindrical interior channel. As shown in FIGS. 6B and 6C, the HEPA filter 600 also includes a protective mesh 640 covering the outer and inner surfaces of the HEPA filter media 610 around its entire outer and inner circumferences to protect the HEPA filter media 610. It should be appreciated that, for clarity, the protective mesh is not shown in FIG. 6A.

The upper and lower end caps 620 and 630 each have an exterior diameter De and an interior diameter Di. As best shown in FIG. 6C, the upper end cap 620 includes a first semi-circular surface 620a defining a first channel around the circumference of the upper end cap 620 at diameter Da. The upper end cap 620 also includes a second semi-circular surface 620b defining a second channel around the circumference of the upper end cap 620 at diameter Db. The upper end cap 620 further includes a generally flat mounting surface 620c around the circumference of the upper end cap 620 at diameter Dc. The mounting surface 620c is located between and raised above the first and second channels. Similarly, the lower end cap 630 includes a first semi-circular surface 630a defining a first channel around the circumference of the lower end cap 630 at diameter Da. The lower end cap 630 also includes a second semi-circular surface 630b defining a second channel around the circumference of the lower end cap 630 at diameter Db. The lower end cap 630 further includes a generally flat mounting surface 630c around the circumference of the lower end cap 630 at diameter Dc. The mounting surface 630c is located between and raised above the first and second channels.

Figure 7:
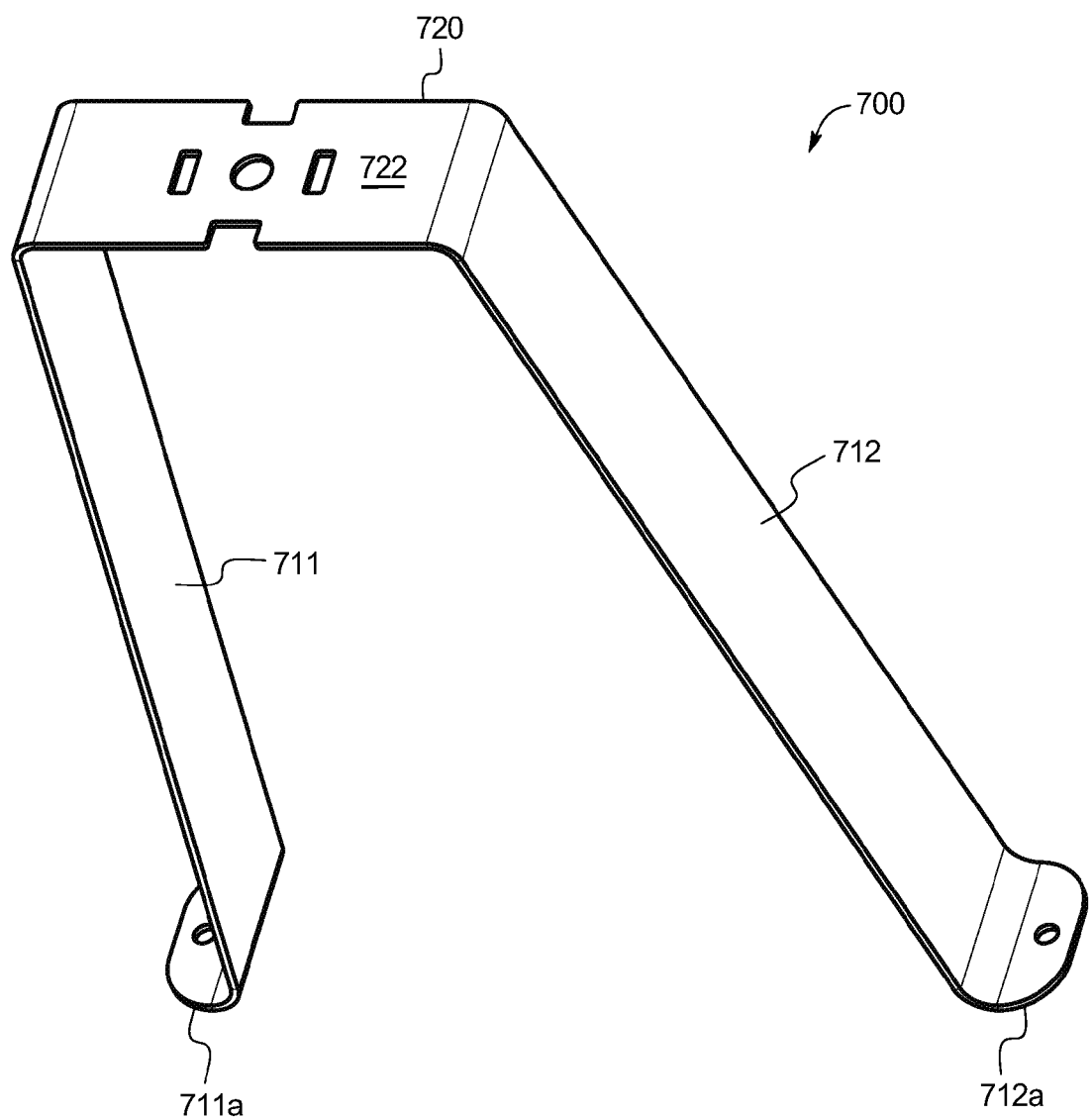
FIG. 7 is a top perspective view of the HEPA filter securing bracket of the portable industrial air filtration device of FIG. 1A.
Figure 8:
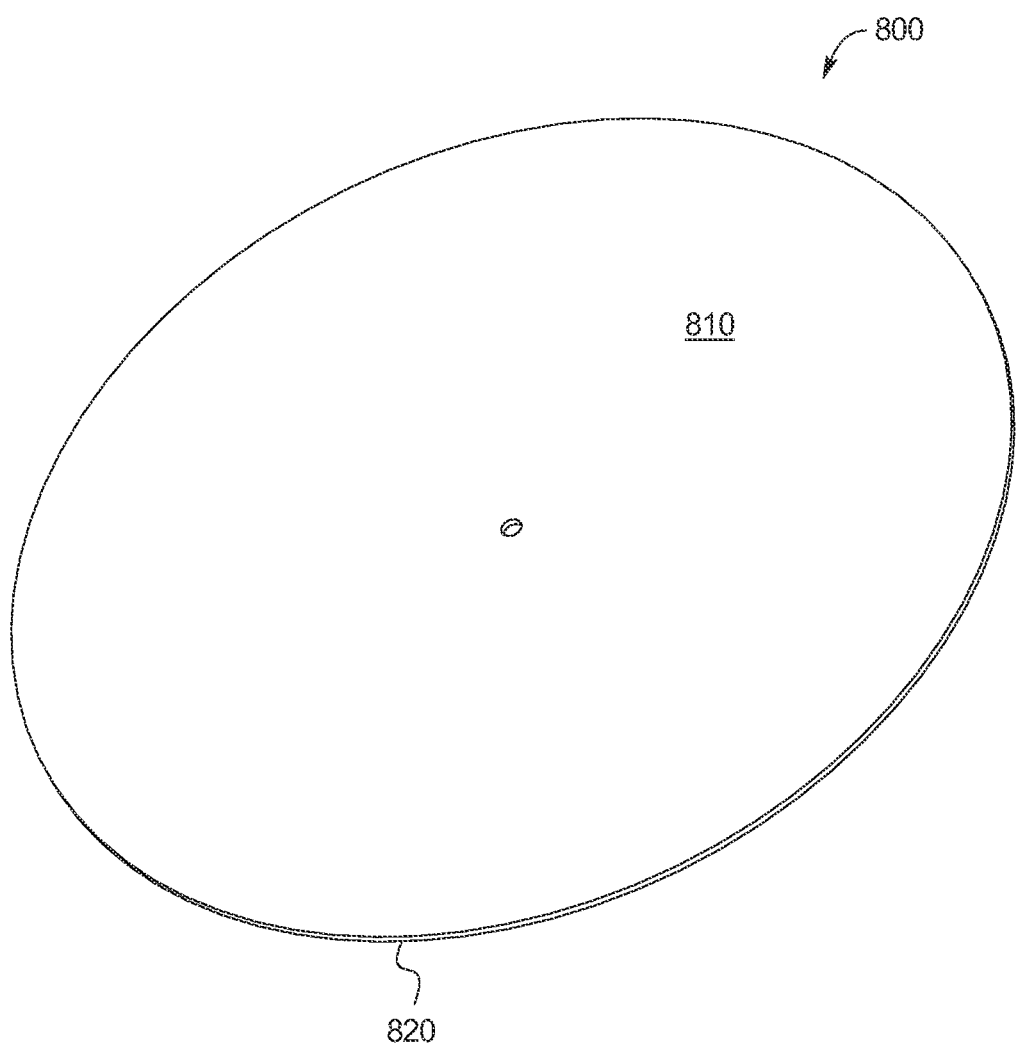
FIG. 8 is a top perspective view of the HEPA filter securing plate of the portable industrial air filtration device of FIG. 1A.

The HEPA filter 600 is mounted to the lower housing component 100 and, more specifically, to the base 110, via the HEPA filter securing plate 800 and the HEPA filter securing bracket 700. As best illustrated in FIG. 7, the HEPA filter securing bracket 700 includes two substantially vertical legs 711 and 712 connected by and extending downward from a substantially horizontal brace 720 to form an inverted U-shape. The legs 711 and 712 each include a HEPA filter securing bracket mounting tab 711a and 712a, respectively, and the brace 720 includes a HEPA filter securing plate mounting surface 722. As best illustrated in FIG. 8, the HEPA filter securing plate 800 includes a disc having an upper surface 810, a lower surface 820.

To mount the HEPA filter 600 to the lower housing component 100 and, more specifically, to the base 110, the HEPA filter securing bracket 700 is first mounted to the base 110. More particularly, the HEPA filter securing bracket mounting tabs 711a and 712a are mounted to the HEPA filter mounting bracket mounting surfaces 115a and 115b of the base 110. After being mounted to the base 110, the brace 720 of the HEPA filter securing bracket 700 is positioned above the center of the fan assembly receiving opening defined by the connecting surface 115.

The HEPA filter 600 is then mounted to the base 110 by positioning the HEPA filter 600 around the HEPA filter securing bracket 700 and resting the lower end cap 630 of the HEPA filter 600 on the exterior top surface 111 of the base 110. More specifically, as illustrated in FIG. 9, the HEPA filter 600 is mounted such that: (a) the first channel of the lower end cap defined by the first surface 630a of the lower end cap 630 is positioned above the first channel defined by the first surface 111a of the exterior top surface 111 of the base 110, (b) the second channel of the lower end cap defined by the second surface 630b of the lower end cap 630 is positioned above the second channel defined by the second surface 111b of the exterior top surface 111 of the base 110, and (c) the mounting surface 630c of the lower end cap 630 abuts the HEPA filter mounting surface 111c of the exterior top surface 111 of the base 110.

To secure the HEPA filter 600 to the lower housing component 100, the HEPA filter securing plate 800 is mounted atop the upper end cap 620 to the HEPA filter securing plate mounting surface 722 of the brace 720 of the HEPA filter securing bracket 700. Once the HEPA filter securing plate 800 is mounted to the HEPA filter securing bracket 700, the HEPA filter 600 is sandwiched between the HEPA filter securing plate 800 and the base 110, thus ensuring that the HEPA filter 600 will not disengage from the base 110 until the HEPA filter securing plate 800 is removed. In this illustrated embodiment, the HEPA filter securing bracket is mounted to the lower housing component and the HEPA filter securing plate is mounted to the brace of the HEPA filter securing bracket using threaded fasteners, though it should be appreciated that the components may be mounted in any suitable manner.

The mounting of the HEPA filter securing plate 800 to the HEPA filter securing bracket 700 causes the HEPA filter 600 and, more specifically, the mounting surface 630c, to compress a gasket 190 located within the mounting channel 111c of the exterior top surface 111 of the base 110. This creates an airtight seal between the lower end cap 630 of the HEPA filter 600 and the base 110.

In this illustrated example, both the upper and lower end caps of the HEPA filter include a specific geometry that enables airtight sealing when placed within the proper channel in the lower housing. As will be explained in detail below, the specific end cap geometry and, more specifically, the manner in which the end cap geometry enables an airtight seal to be formed, enables the air filtration device to sense whether a proper HEPA filter is installed.

In this example, the end caps of the HEPA filter are molded urethane end caps, though it should be appreciated that the end caps may be made of any suitable material. While the end caps are substantially identical in this example, it should be appreciated that in other embodiments the upper and lower end caps may have different geometries. Further, in this example, the protective mesh is a thin gage metal mesh, though it should be appreciated that any suitable mesh may be employed.

Figure 10B:
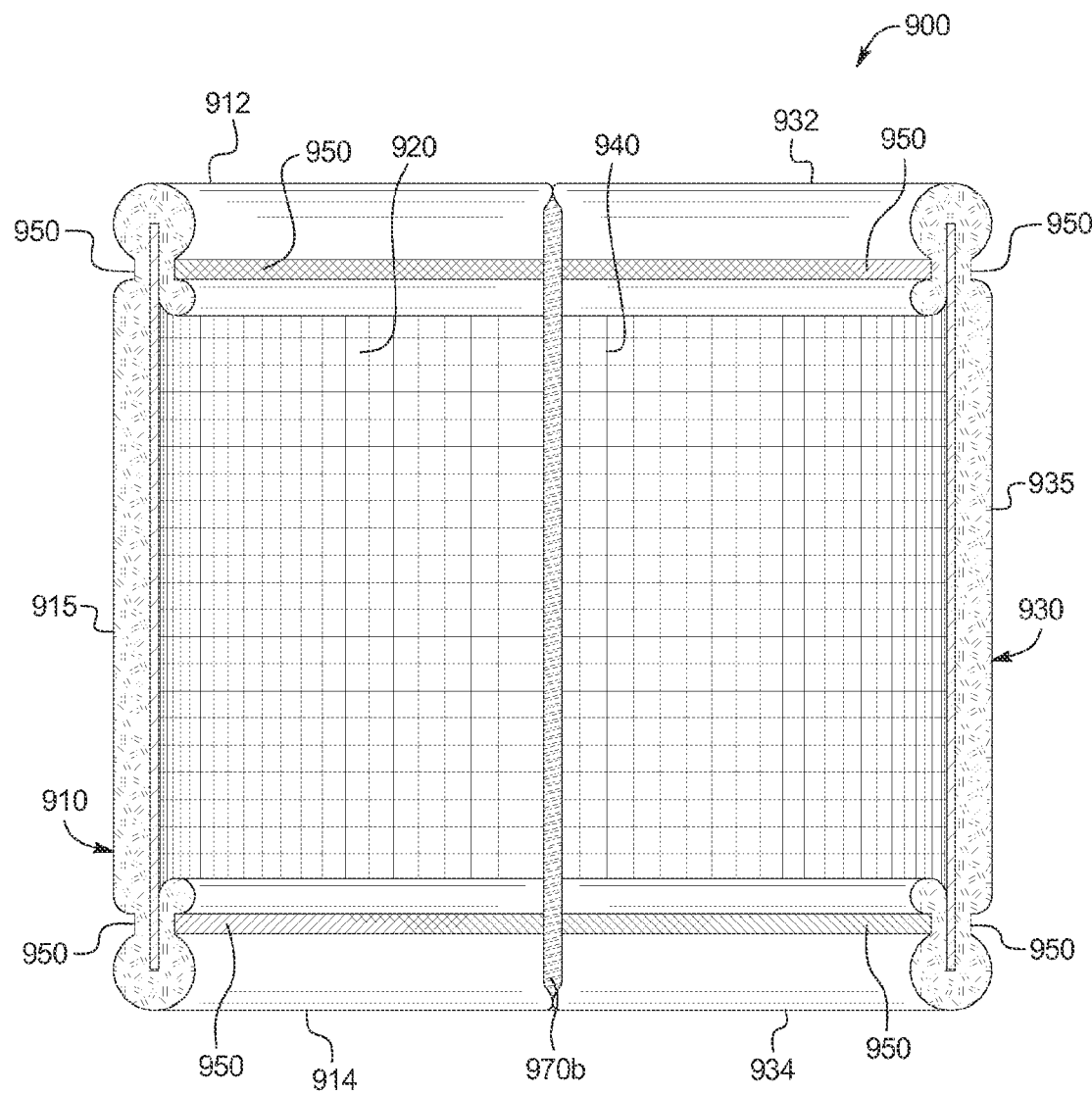
FIG. 10B is a side cross-sectional view of the pre-filter of FIG. 10A taken substantially along line 10B-10B of FIG. 10A.

FIGS. 10A and 10B illustrate the pre-filter 900. In various embodiments, the pre-filter 900 is formed from two different materials: pre-filter media and a rigidized backing. The use of the rigidized backing in combination with the pre-filter media provides structural support to the pre-filter, rendering it rigid enough to support itself and stand on its own without deforming, while maintaining enough flexibility to be packed flat for shipping and storage, which enables packaging materials and storage space to be minimized. In one embodiment, the pre-filter 900 is formed by placing the rigidized backing 920, which has upper and lower opposing edges and two opposing side edges, onto a sheet of the pre-filter media 915, which has upper and lower opposing edges and two opposing side edges. The upper edge of the pre-filter media 915 is folded over the upper edge of the rigidized backing 920 and heat sealed to hold it in place. The heat seals are generally indicated by numeral 950. Similarly, the lower edge of the pre-filter media 915 is folded over the lower edge of the rigidized backing 920 and heat sealed to hold it in place.

Figure 10C:
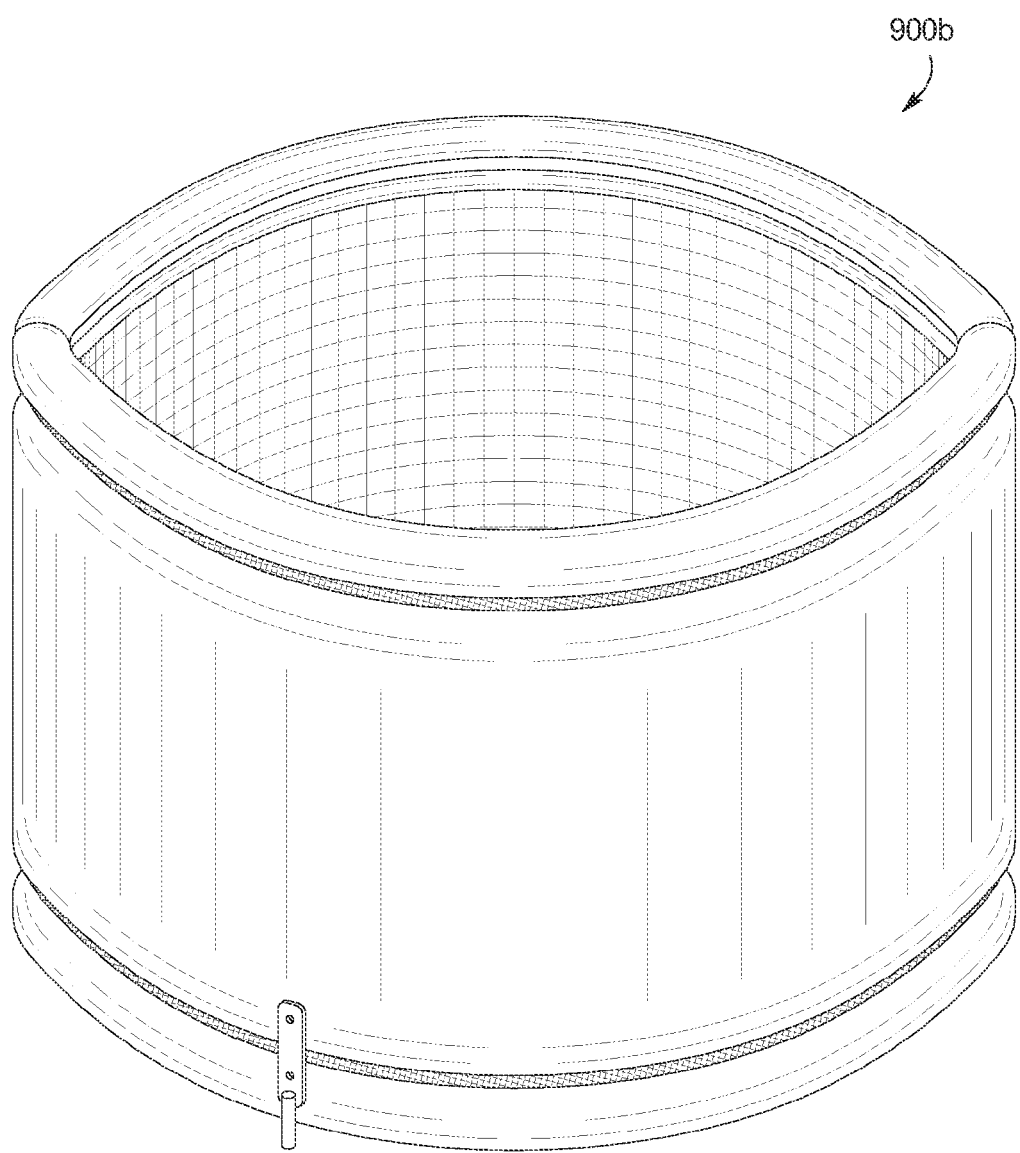
FIG. 10C is a top perspective view of another example pre-filter.

This above process is performed twice, resulting in two sheets of rigidized pre-filter media 910 and 930. The pre-filter is formed by sewing the corresponding side edges of the two sheets of rigidized pre-filter media 910 and 930 to one another to form an annular or ring-shaped structure (as shown in FIG. 10A) or an oval or fish-eye structure (as shown in FIG. 10C such that the two sewed side seams 970a and 970b run lengthwise down the full height of the pre-filter 900, the rigidized backing 920 and 940 forms the interior surface of the pre-filter 900, and the pre-filter media 915 and 935 forms the exterior surface of the pre-filter 900. The formed pre-filter 900 includes an upper edge formed by upper edges 912 and 932 of the sheets of rigidized pre-filter media 910 and 930, and a lower edge formed by lower edges 914 and 934 of the sheets of rigidized pre-filter media 910 and 930.

Figure 10D:
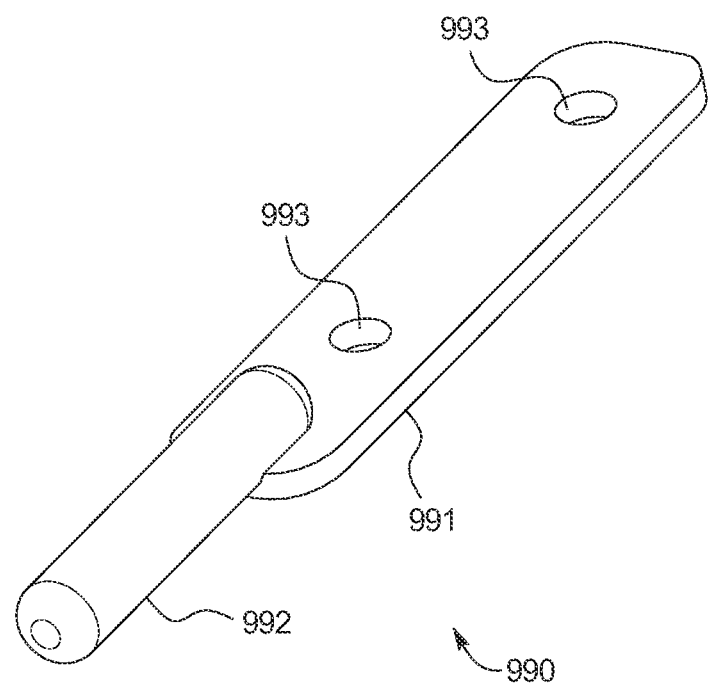
FIG. 10D is a top perspective view of the pre-filter sensor triggering component of the pre-filter of FIG. 10A.

In this example, as shown in FIGS. 10A and 10D, the pre-filter includes a pre-filter sensor triggering component 990 (such as a plastic piece). The pre-filter sensor triggering component 990 includes a rectangular base 991 and a pre-filter sensor triggerer 992 extending therefrom. The base 991 defines a plurality of attachment openings 993 therethrough. In this embodiment, the pre-filter sensor triggering component 990 is attached to the exterior of the pre-filter via the attachment openings 993 (such as by sewing, adhesive, fastener, or any other suitable manner of attachment) such that the pre-filter sensor triggerer 992 protrudes below the lower edge of the pre-filter 900 formed by the lower edges 914 and 934 of the sheets of rigidized pre-filter material 910 and 930. The pre-filter sensor triggering component 990 and, more specifically, the pre-filter sensor triggerer, is configured to trigger a pre-filter sensor, which enables the portable industrial air filtration device to determine whether a proper pre-filter is installed. It should be appreciated that the pre-filter sensor triggering component may take any suitable shape, be made of any suitable material, and attached at any suitable location on the pre-filter.

In this example, the pre-filter media is a polyspun material, though it should be appreciated that any suitable filter media may be employed. Additionally, in this example, the rigidized backing includes nylon mesh, though it should be appreciated that any suitable material may be employed, such as a material including vertical, horizontal, or diagonal boning. In this example, the combination of the polyspun material and the nylon mesh renders the pre-filter flexible enough to fold flat for shipping but rigid enough to support itself and to enable the pre-filter to be slid over and onto the HEPA filter. In other embodiments, a single sheet of rigidized pre-filter media is created and formed into an annular or oval-shaped structure by sewing the two sides of that sheet of rigidized pre-filter media together. That is, in such embodiments, the formation of the pre-filter causes the pre-filter to include a single seam. It should be appreciated that the sides of the rigidized pre-filter media may be joined in any suitable manner other than or in addition to sewing, such as by a heat seal or adhesive.

Figure 11B:
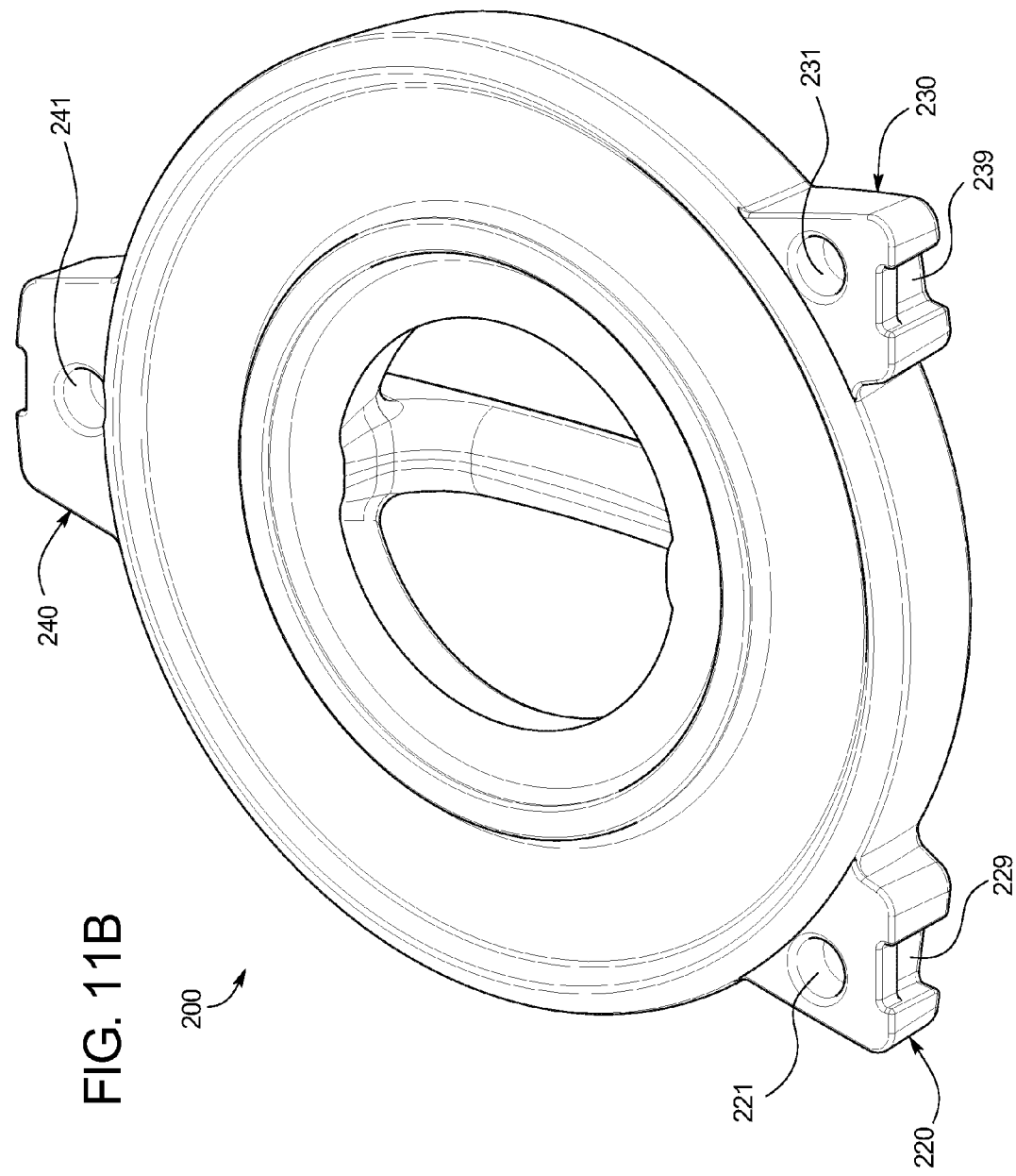
FIG. 11B is a bottom perspective view of the locking cover of FIG. 11B.
Figure 11C:
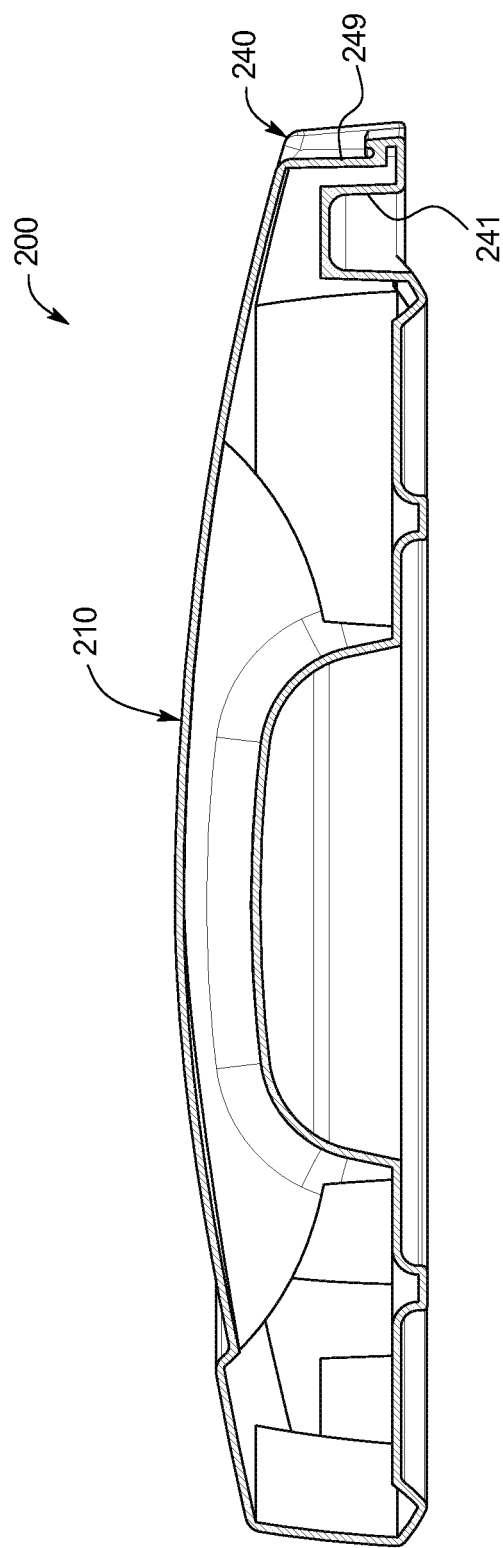
FIG. 11C is a side cross-sectional view of the locking cover of FIG. 11A taken substantially along line 11C-11C of FIG. 11A.

As best illustrated in FIGS. 11A and 11B, the locking cover 200 includes a generally circular base 210 including a handle 212 and a plurality of mounts 220, 230, and 240 circumferentially spaced apart around the base 210. Each of the mounts 220, 230, and 240 includes a generally cylindrical surface 221, 231, and 241, respectively, defining a locking cover mounting tab receiving opening each configured to receive one of the locking cover mounting tabs of the stabilizers (described above). Additionally, each of the mounts 220, 230, and 240 includes an integrated latching surface to facilitate the use of the latches mounted to the stabilizers.

To attach the locking cover 220 to the lower housing component 100, the user positions the locking cover atop the stabilizers such that: the locking cover mounting tab receiving opening defined by the surface 221 of the mount 220 receives the locking cover mounting tab 121 of the stabilizer 120, the locking cover mounting tab receiving opening defined by the surface 231 of the mount 230 receives the locking cover mounting tab 131 of the stabilizer 130, and the locking cover mounting tab receiving opening defined by the surface 241 of the mount 240 receives the locking cover mounting tab 141 of the stabilizer 140. The user then secures each latch to its respective latch strike. Once secured to the lower housing component 100, the locking cover 200 secures the pre-filter 900 in place, and a user may carry or otherwise transport the air filtration device via the handle 212.

In this example, the locking cover is a rotationally molded plastic component. It should be appreciated, however, that the locking cover may be made of any suitable material or materials or manufactured in any suitable manner or manners.

In another embodiment, the locking cover is attached to one of the stabilizers of the lower housing component via a hinge. Thus, in this embodiment, the locking cover is not completely detachable from the lower housing component. Rather, to remove the filters in this embodiment, the latches are unlocked and the locking cover is rotated via the hinge off of the lower housing component to provide access to the filters. In other embodiments, the locking cover attaches to the stabilizers in any suitable manner, such as through the use of threaded fasteners.

2. Functions

Although not shown, the air filtration device of the present disclosure includes a processor (such as a microprocessor) configured to communicate with and control various components of the air filtration device (such as the fan assembly, the pressure sensors, and the control panel), as described below.

FIG. 1D illustrates the path air takes when passing through the air filtration device. In operation, when the fan assembly is turned on, air surrounding the air filtration device is pulled through the filter assembly into the interior cylindrical channel defined or formed by the HEPA filter. More specifically, the air is first pulled through the pre-filter, which initially filters the air by capturing and removing relatively large or coarse impurities from the air as the air is pulled through the pre-filter toward the HEPA filter. The air is then pulled through the HEPA filter, which is configured to further filter the air by capturing and removing relatively small or fine impurities from the air as the air is pulled through the HEPA filter toward the interior cylindrical channel. The filtered air exits the HEPA filter into the interior cylindrical channel, and is then pulled into the fan assembly. The filtered air moves through and is pushed out of the fan assembly and through the exhaust channel, exiting the air filtration device.

In certain embodiments, the air filtration device is configured to monitor the occlusion of the filters. Put differently, the air filtration device is configured to monitor how clean the filters are. The air filtration device alerts the user to the cleanliness status of each of the filters, and when the filters have reached the ends of their useful lives and, therefore, should be replaced. This enables users to quickly and easily determine how "used up" each of the filters is and when each filter needs replacement. In one embodiment, the air filtration device ceases to operate when one or more of the filters reaches a designated level of occlusion. For example, the air filtration device ceases to operate when at least one of the pre-filter and the HEPA filter is so occluded that it may not continue to efficiently filter the air.

In some embodiments, the air filtration device is configured to dynamically control the speed of the fan of the fan assembly based on how occluded the filters are. This enables the air filtration device to automatically adjust the fan speed as the filters occlude during operation to maintain a constant or substantially constant rate of air flow through the air filtration device within the target range for the filters during all phases of the filters' useful lives. This prevents the rate of air flow through the air filtration device from decreasing and falling below the target range as the filters occlude, thereby ensuring proper and efficient performance throughout the filters' useful lives.

In various embodiments, the air filtration device employs a plurality of pressure sensors to monitor the occlusion of the filters, and dynamically controls the speed of the fan based on how occluded the filters are. In one embodiment, the air filtration device includes two independent pressure sensors configured to measure the pressure drop across each of the filters. More specifically, in this embodiment, the air filtration device includes a first pressure sensor configured to measure the pressure between the pre-filter and the HEPA filter, and a second pressure sensor positioned on the interior of the HEPA filter configured to independently measure the pressure on the interior of the air filtration device.

In this embodiment, the air filtration device uses the difference between standard atmospheric pressure (i.e., 1 atmosphere or 100 kilopascal) and the pressure measured by the first pressure sensor (i.e., the pressure drop across the pre-filter) to determine how occluded the pre-filter is. Similarly, the air filtration device uses the difference between the pressure measured by the first pressure sensor and the pressure measured by the second pressure sensor (i.e., the pressure drop across the HEPA filter) to determine how occluded the HEPA filter is. The air filtration device uses this occlusion information to: (a) determine whether either of the filters needs to be replaced, and (b) adjust the speed of the fan to maintain a substantially constant rate of air flow through the air filtration device that is within the target range for the filters. It should be appreciated that, in other embodiments, the air filtration device employs at least one additional pressure sensor to measure the pressure of the air surrounding the air filtration device rather than assuming standard atmospheric pressure. In certain embodiments, at least one of the first pressure sensor and the second pressure sensor is configured to additionally measure ambient pressure.

In one embodiment, the air filtration device includes a pressure sensor configured to measure the pressure in the exhaust chamber, which enables the air filtration device to adapt to changes at the exhaust (such as when a duct is added).

In various embodiments, the air filtration device is configured to indicate to the user, such as via the control panel, when the filter or filters need replacement. Additionally or alternatively, in some embodiments, the air filtration device is configured to indicate how occluded each filter is at any given time, such as on a scale of not occluded at all (e.g., a new filter) to completely occluded.

In this embodiment, the pressure sensors are Freescale +/−1.45 PSI MPXV7002DP sensors available from Freescale Semiconductor, though it should be appreciated that any suitable pressure sensors or any other types of sensors may be employed.

In certain embodiments, the air filtration device employs a speed sensor to measure the fan's speed. In one such embodiment, the speed sensor is an optical sensor, though it should be appreciated that any suitable speed sensor may be employed.

In various embodiments, the air filtration device is configured to measure the amount of impurities in the air and surrounding the air filtration device and automatically modify the fan speed of the fan assembly in response to the amount of impurities present in the air immediately surrounding the air filtration device. This ensures that the air filtration device operates efficiently. In one embodiment, the air filtration device employs a Sharp GP2Y1010AU0F optical dust sensor to sense the level of impurities in the air surrounding the air filtration device. It should be appreciated that any suitable sensor may be employed to detect the amount of impurities in the air.

In certain embodiments, the air filtration device is configured to detect when the proper filters are installed, when the proper number of filters are installed, or both. In such embodiments, the air filtration device does not function when one or more improper filters are installed; when fewer than all of the filters are installed (i.e., when only one filter is installed or when no filters are installed); or when one or more improper filters are installed or when fewer than all of the filters are installed. This ensures that the portable industrial air filtration device will work properly to effectively filter and clean the surrounding air.

In one embodiment, as described above, the pre-filter includes a pre-filter sensor triggering component. The pre-filter sensor triggering component is configured to trigger a pre-filter sensor (such as a limit switch) when the pre-filter is properly installed. This enables the air filtration device to determine whether a proper pre-filter is installed, lithe limit switch is not triggered, the air filtration device determines that either no pre-filter is installed or an improper pre-filter is installed, and will not operate.

In another embodiment, the upper and lower edges of the pre-filter each include an integrated metallic element (such as a 0.003 inch thick×1 inch high element) that spans the pre-filter's circumference. In this embodiment, the air filtration device includes a sensor (such as a magnet and Hall sensor) configured to detect the metallic element. In this embodiment, if the sensor does not detect any metallic element, the air filtration device determines that either no pre-filter is installed or an improper pre-filter is installed, and will not operate.

In another embodiment, the air filtration device is configured to use pressure sensors (as described above) to measure the pressure drop across the pre-filter. In this embodiment, the pre-filter media is modified such that the pressure drop across the pre-filter falls within a designated range that is different than (such as higher than) the pressure drop across a pre-filter employing non-modified pre-filter media. In this embodiment, if the measured pressure drop across the pre-filter is not within the designated range, the air filtration device determines that either no pre-filter is installed or an improper pre-filter is installed, and will not operate.

In one embodiment, as described above, the HEPA filter includes end caps having a specifically designed geometry that enables the HEPA filter to properly seal against the base. In this embodiment, the air filtration device includes a plurality of integrated pressure sensors (such as those described above) configured to detect whether such an airtight seal is formed between the end cap and the base. If the pressure sensors do not detect such an airtight seal, the air filtration device will not operate.

In another embodiment, the air filtration device is configured to use pressure sensors to measure the pressure drop across the HEPA filter. In this embodiment, the HEPA filter media is configured such that the pressure drop across the HEPA filter falls within a designated range. Here, if the measured pressure drop across the HEPA filter is not within the designated range, the air filtration device determines that either no HEPA filter is installed or an improper HEPA filter is installed, and will not operate.

In another embodiment, the HEPA filter includes one or more integrated hollow pressure tubes positioned vertically among the pleats of the HEPA filter media. An end of each of these pressure tubes is flush with the bottom of the lower HEPA filter end cap. In this embodiment, the air filtration device includes one or more pressure sensors configured to detect the presence of the pressure tubes. Thus, in this embodiment, if a HEPA filter without such pressure tubes is installed, the air filtration device will determine that an improper HEPA filter is installed, and will not operate.

It should be understood that modifications and variations may be effected without departing from the scope of the novel concepts of the present disclosure, and it should be understood that this application is to be limited only by the scope of the appended claims.

B. Second Example Embodiment

1. Components and Structure

Referring now to the drawings, FIGS. 12A, 12B, 12C, 12D, 12E, 12F, 12G, 12H, and 12I illustrate another example embodiment of the air filtration device of the present disclosure, which is generally indicated by numeral 2010. FIGS. 13A to 24D illustrate the various components of the air filtration device 2010 generally shown in FIG. 12I, which is an exploded view of the air filtration device 2010. It should be appreciated that, for clarity, the Figures include a simplified illustration of the fan assembly 2300.

Figure 12A:
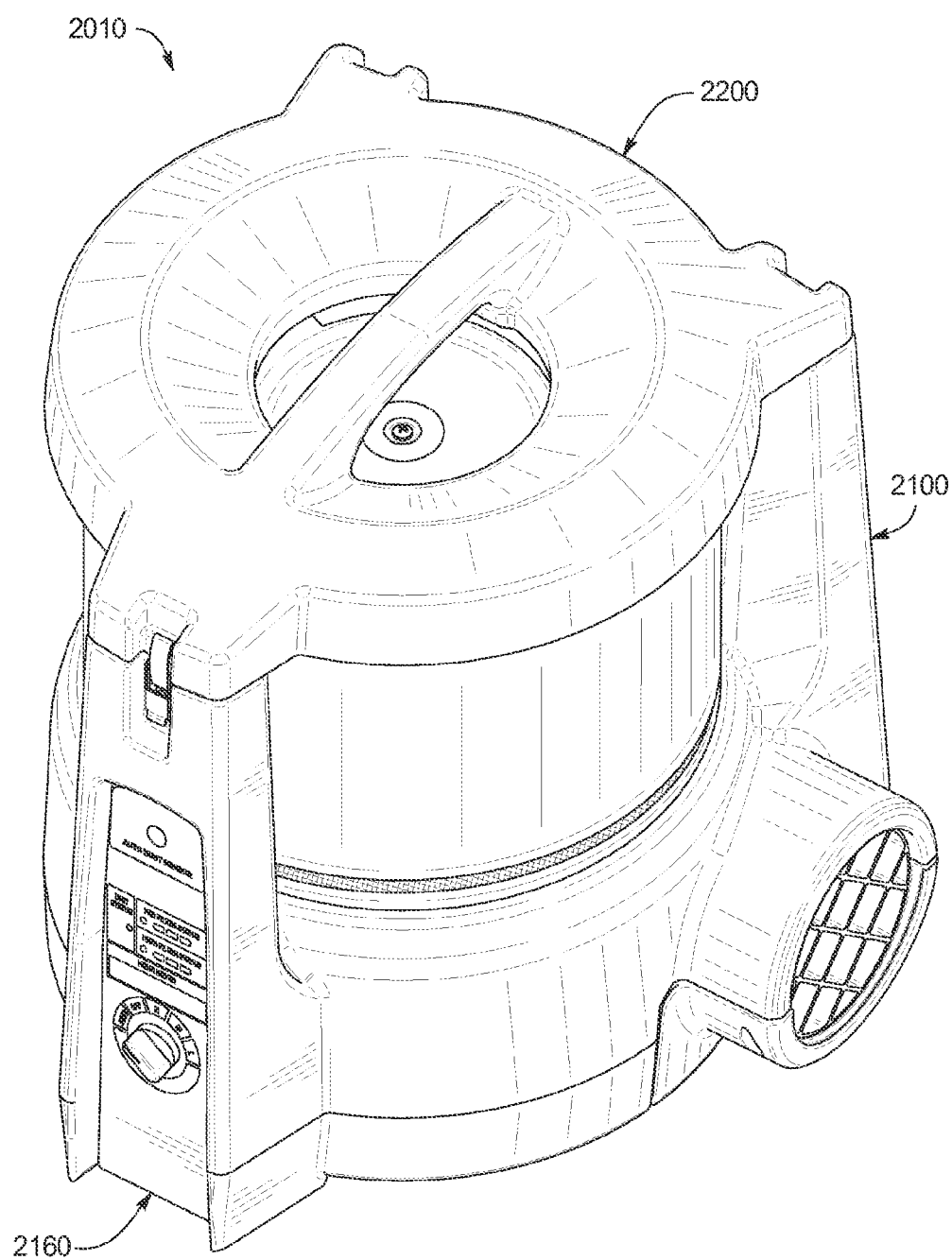
FIG. 12A is a top perspective view of another embodiment of the portable industrial air filtration device of the present disclosure.
Figure 12B:
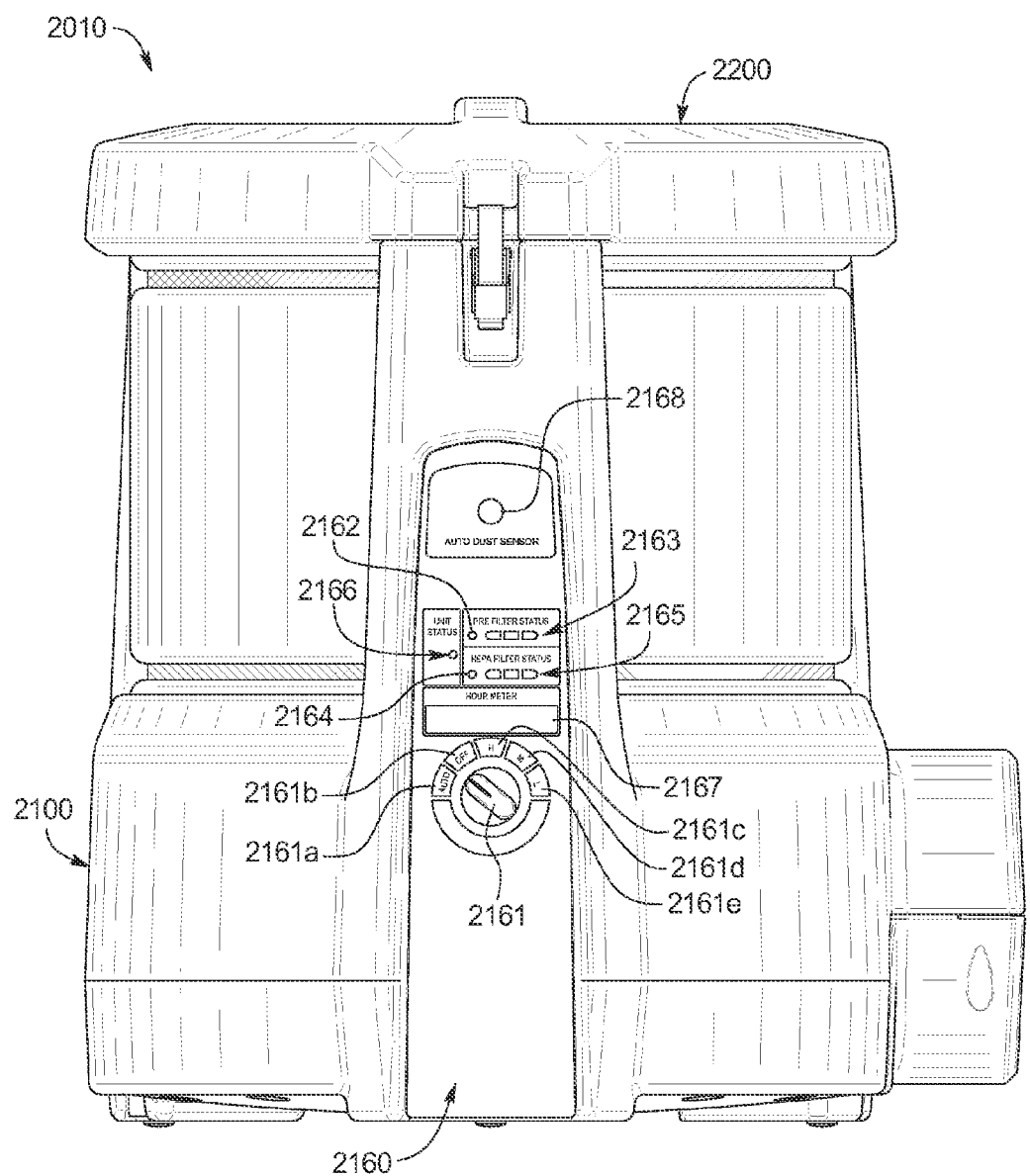
FIG. 12B is a side view of the portable industrial air filtration device of FIG. 12A.
Figure 12C:
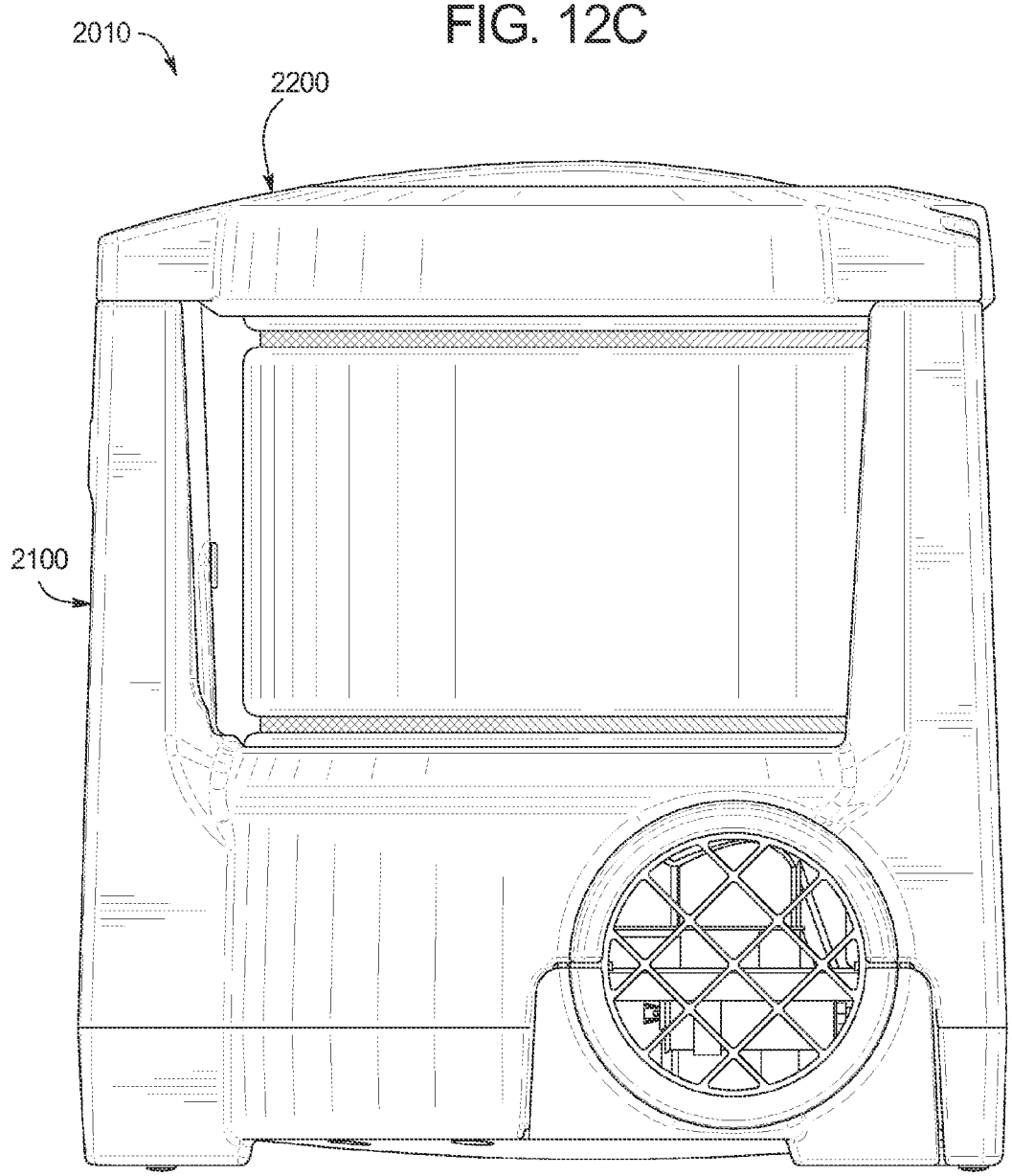
FIG. 12C is another side view of the portable industrial air filtration device of FIG. 12A.
Figure 12D:
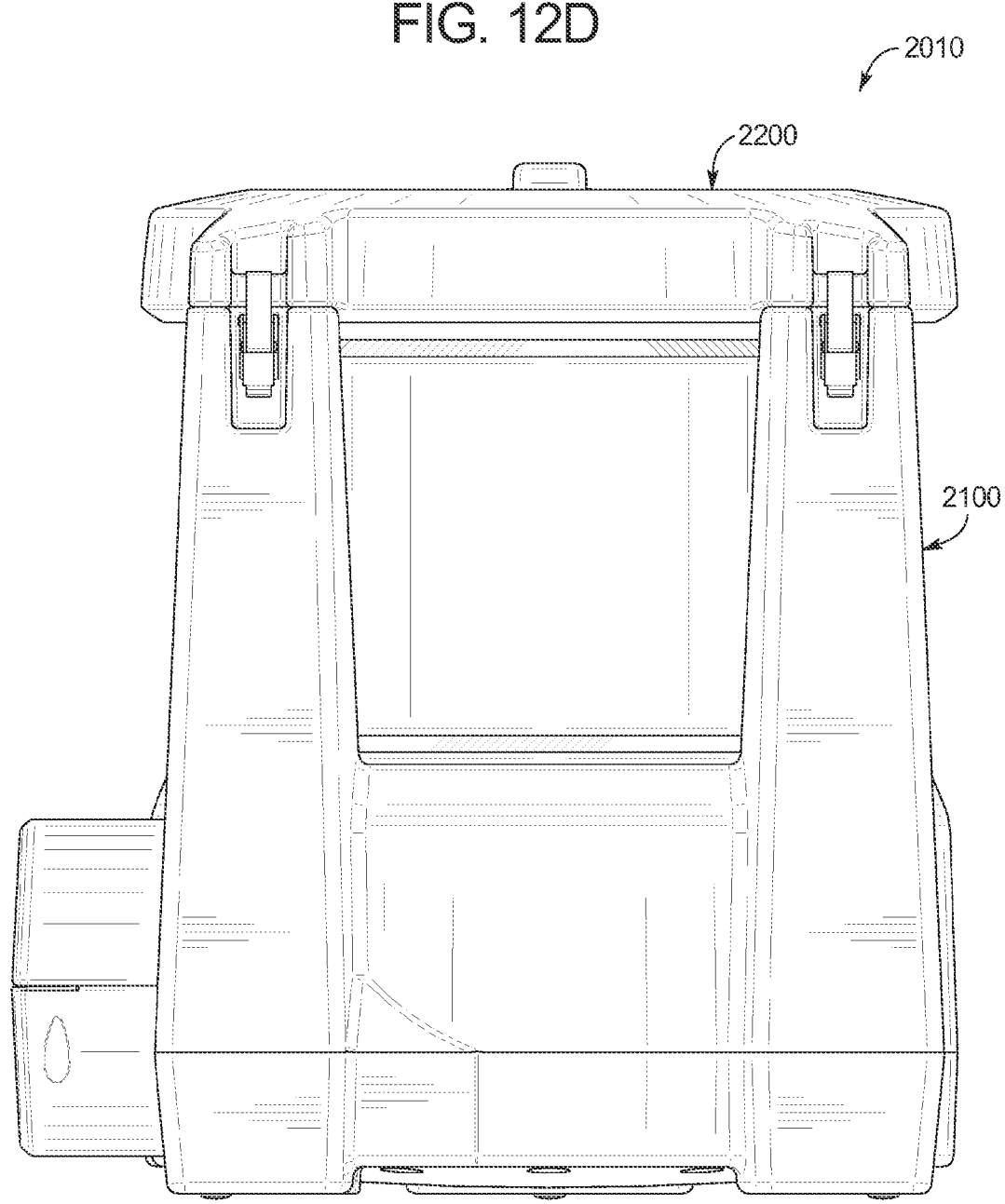
FIG. 12D is another side view of the portable industrial air filtration device of FIG. 12A.
Figure 12F:
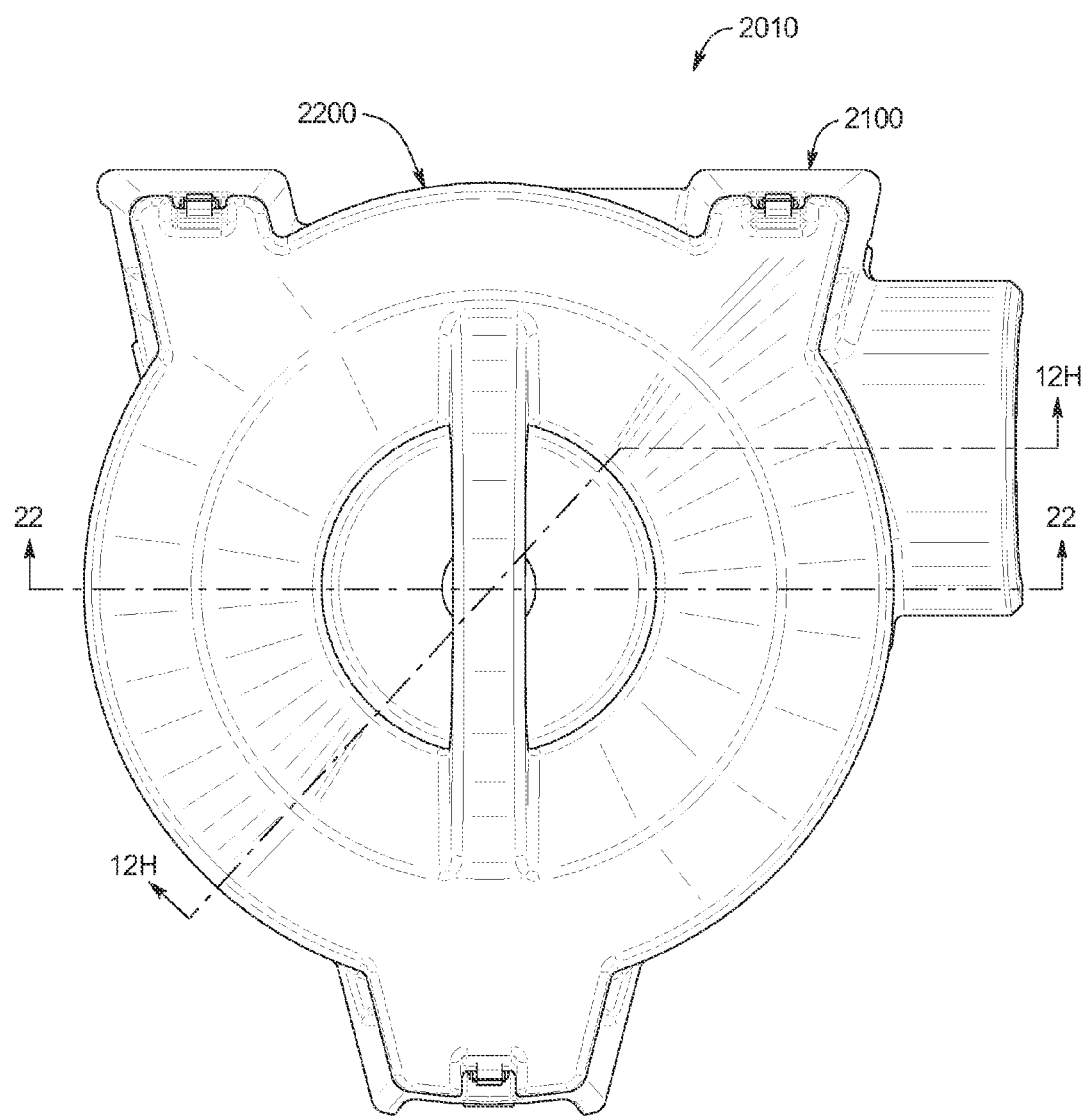
FIG. 12F is a top view of the portable industrial air filtration device of FIG. 12A.
Figure 12G:
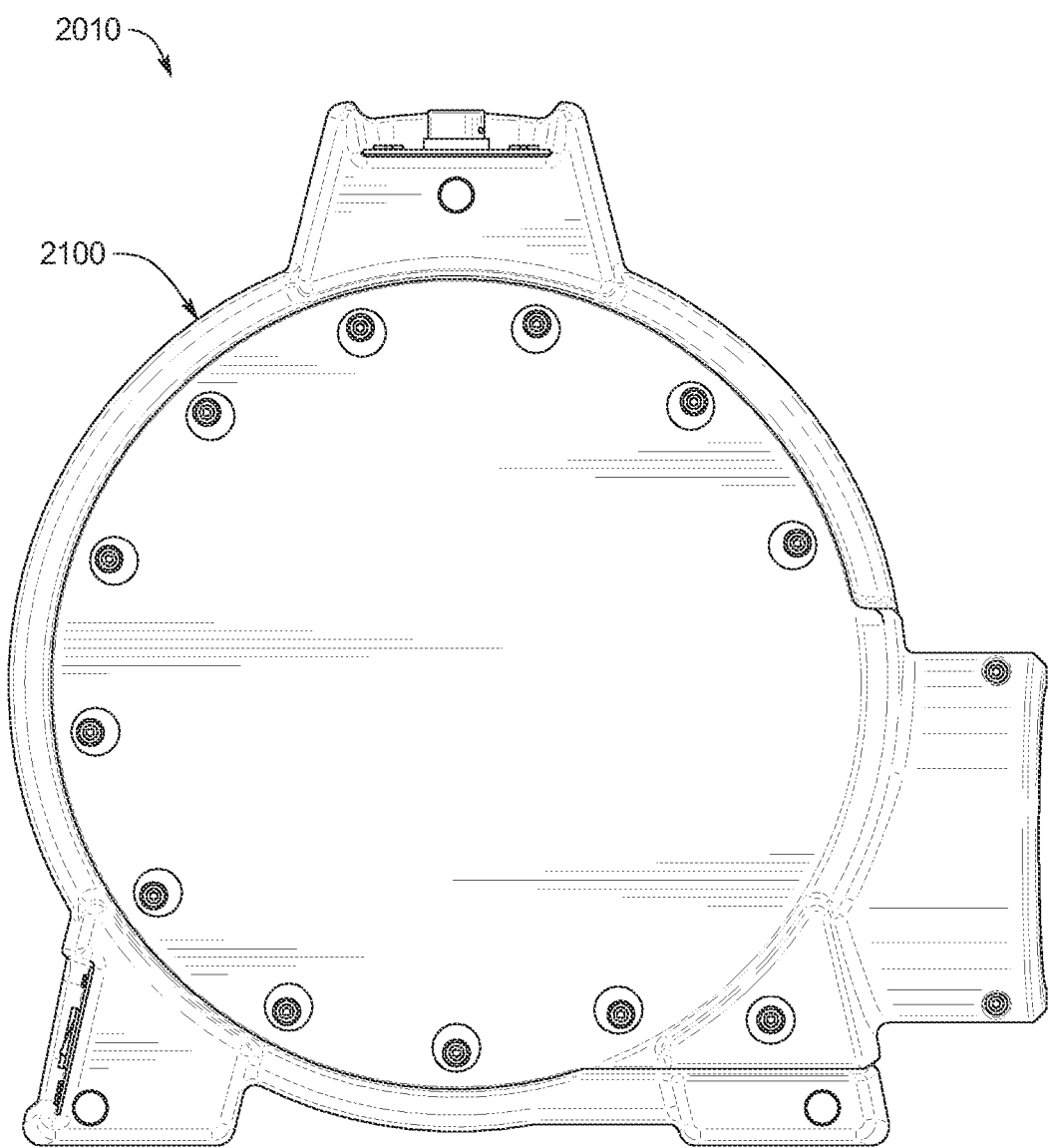
FIG. 12G is a bottom view of the portable industrial air filtration device of FIG. 12A.
Figure 12H:
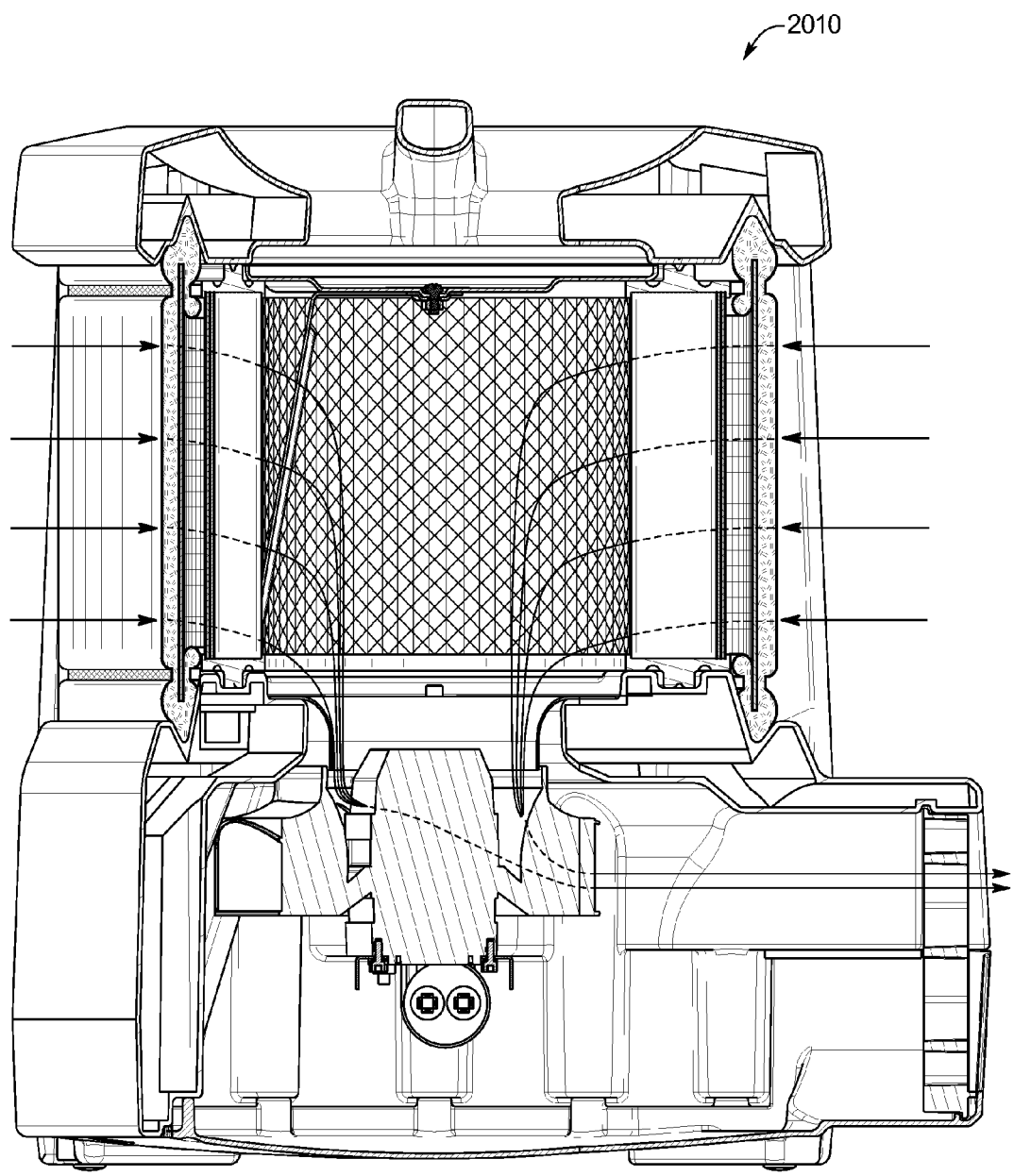
FIG. 12H is a side cross-sectional view of the portable industrial air filtration device of FIG. 12A taken substantially along line 12H-12H of FIG. 12F, and illustrates the path of air flow through the portable industrial air filtration device.
Figure 12I:
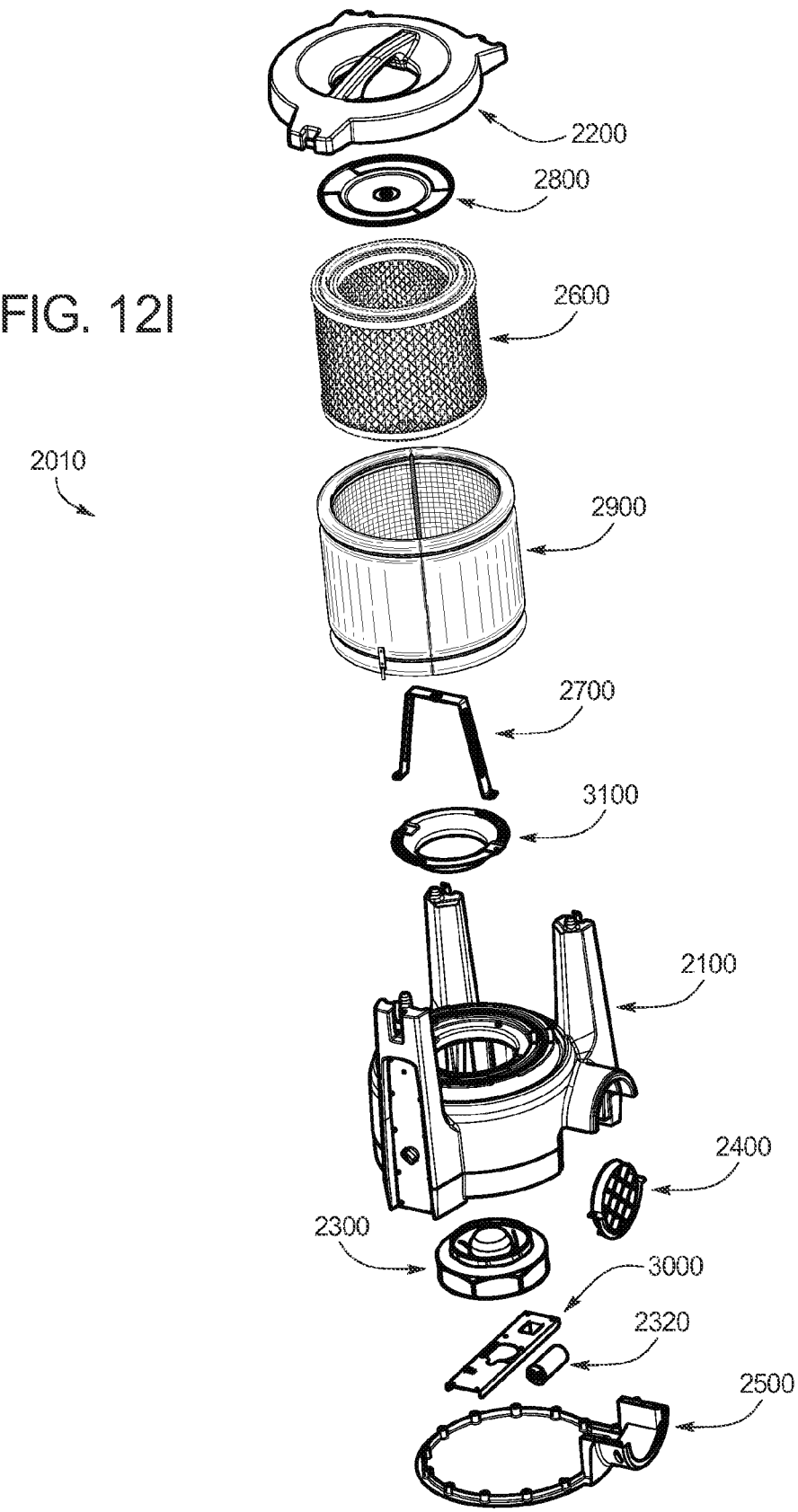
FIG. 12I is an exploded top perspective view of the portable industrial air filtration device of FIG. 12A.

As best shown in FIG. 12I, the air filtration device 2010 includes the following components, each of which is described in detail below: (a) a two-piece housing including a lower housing component 2100 and a locking cover 2200 that is removably attachable to the lower housing component 2100, (b) a fan assembly mounting bracket 3000 attached to the lower housing component 2100 within a fan assembly mounting chamber defined by an underside of the lower housing component 2100, (c) a fan assembly 2300 attached to the fan assembly mounting bracket 3000, (d) a fan assembly mounting chamber cover 2500 attached to the underside of the lower housing component 2100 to substantially cover the fan assembly mounting chamber and enclose the fan assembly mounting bracket 3000 and the fan assembly 2300 within the fan assembly mounting chamber, (e) an exhaust screen 2400 positioned within an exhaust port formed by the lower housing component 2100 and the fan assembly mounting chamber cover 2500, (f) an air director 3100 attached to the lower housing component 2100 upstream of the fan assembly 2300, (g) a dual filter assembly installed within the housing between the locking cover 2200 and the lower housing component 2100 and including a removable and replaceable self-supporting outer pre-filter 2900 surrounding a separately removable and replaceable inner HEPA filter 2600, (h) a HEPA filter securing bracket 2700 attached to the lower housing component 2100, and (i) a HEPA filter securing plate 2800 attached to the HEPA filter securing bracket 2800 that secures the HEPA filter 2600 to the lower housing component 2100.

FIG. 12H generally illustrates the path air takes when passing through this example embodiment of the air filtration device 2010. In operation, air surrounding the air filtration device is drawn through the dual filter assembly into the interior cylindrical channel defined or formed by the HEPA filter. More specifically, the air is first drawn through the pre-filter, which initially filters the air by capturing and removing relatively large or coarse impurities from the air as the air is drawn through the pre-filter toward the HEPA filter. The air is then drawn through the HEPA filter, which further filters the air by capturing and removing relatively small or fine impurities from the air as the air is drawn through the HEPA filter toward the interior cylindrical channel. The filtered air exits the HEPA filter into the interior cylindrical channel, and is then drawn through the air director, which directs the filtered air into the fan assembly. The fan draws the filtered air into the fan assembly and expels the air from the fan assembly and through the exhaust channel, exiting the air filtration device.

As best illustrated in FIGS. 13A, 13B, 13C, 13D, 13E, and 13F, the lower housing component 2100 includes: (a) a base 2110; (b) a plurality of stabilizers 2120, 2130, and 2140 extending vertically from and circumferentially spaced apart around the base 2110 (with respect to the orientation shown in FIGS. 13E and 13F); and (c) an exhaust port upper portion 2150 extending transversely from the base 2110.

The base 2110 includes: (a) a generally cylindrical exterior side surface 2112 to which the stabilizers 2120, 2130, and 2140 are attached; (b) a generally annular exterior upper surface including a plurality of surfaces to which various other components of the air filtration device are mounted (described below); (c) a generally cylindrical interior side surface 2116a; and (d) a generally annular interior upper surface 2116b. The interior side surface 2116a and the interior top surface 2116b generally define a fan assembly mounting chamber on the underside of the base 2110.

Figure 13B:
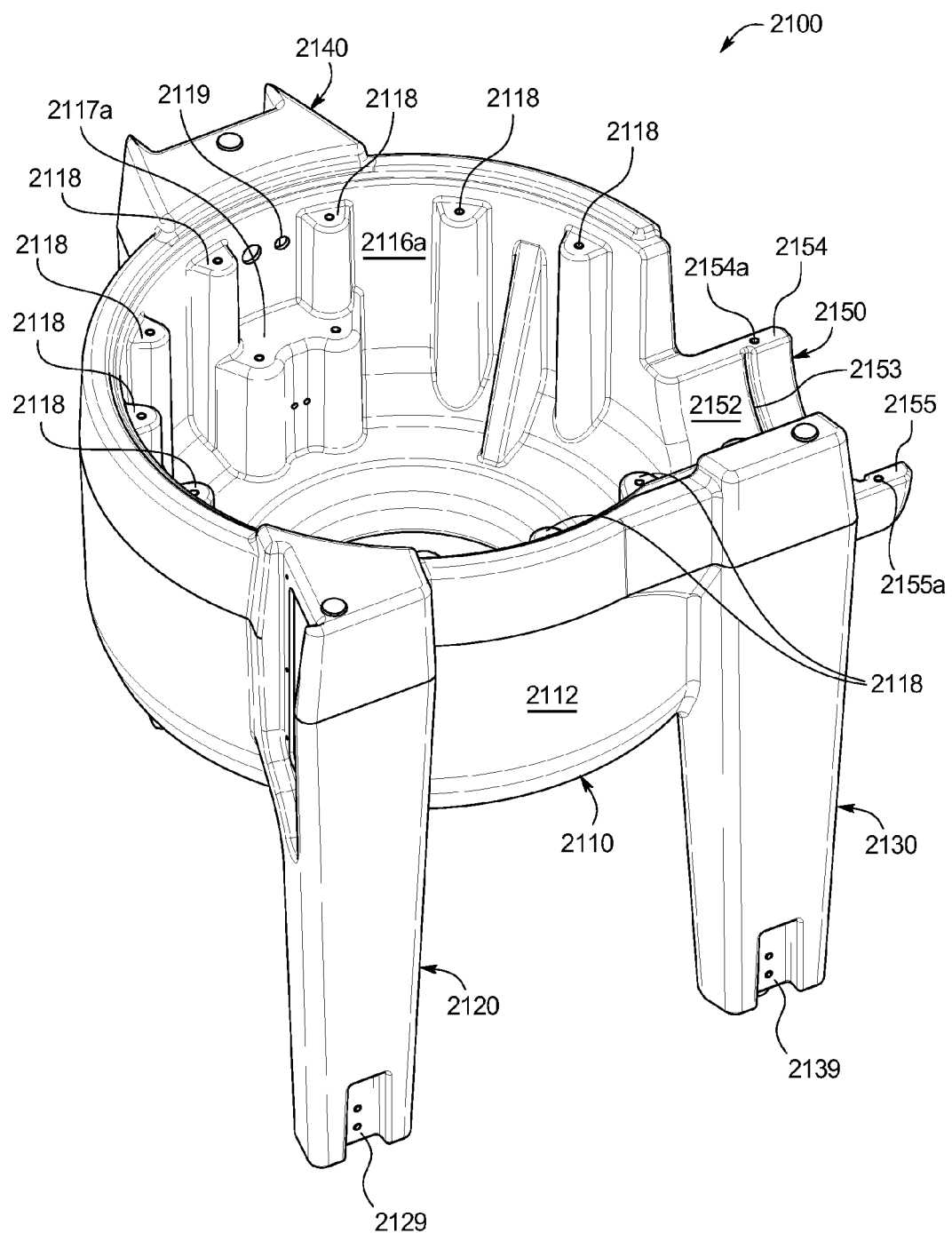
FIG. 13B is a bottom perspective view of the lower housing component of FIG. 13A.
Figure 13C:
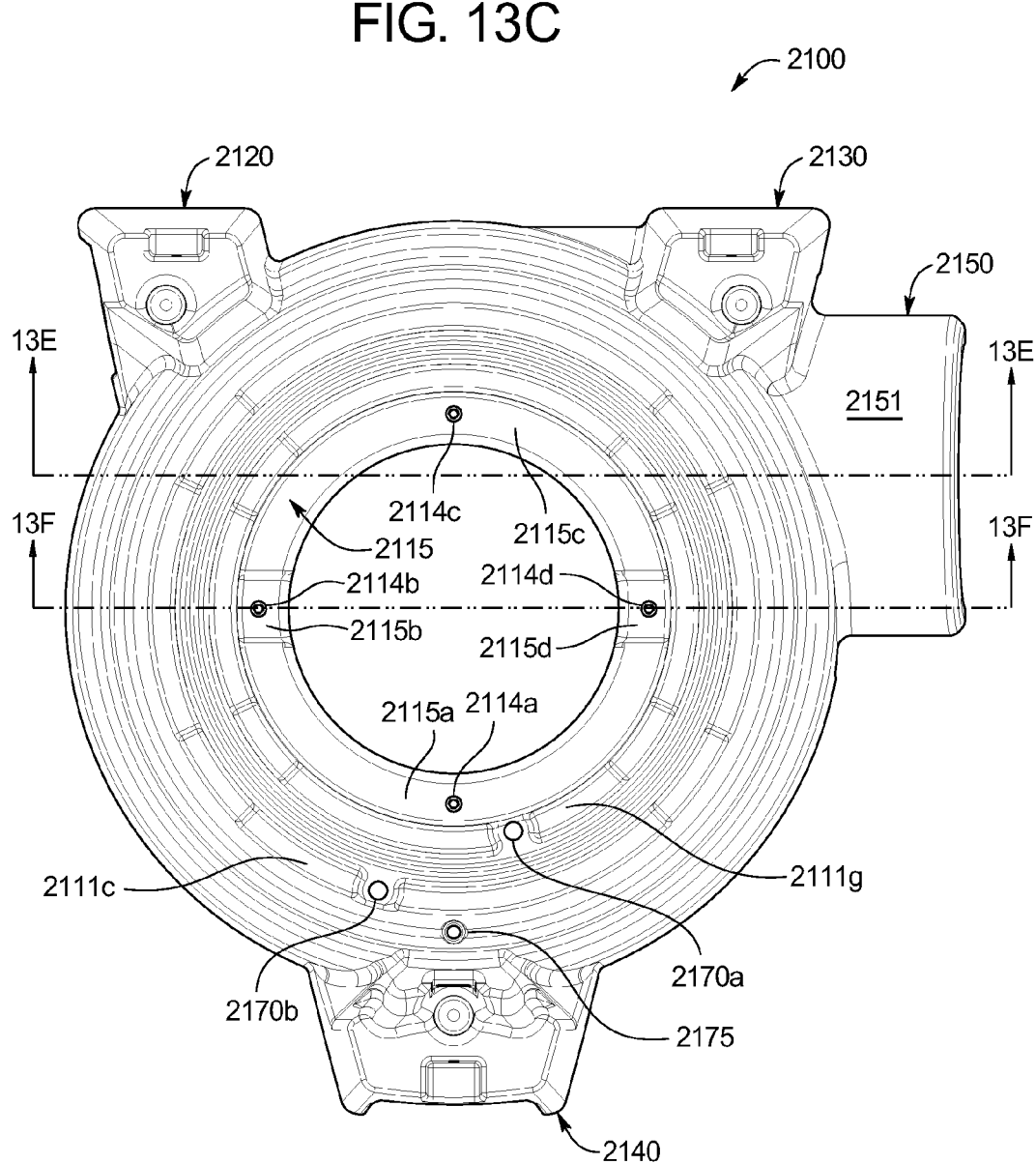
FIG. 13C is a top view of the lower housing component of FIG. 13A.

Turning to the exterior of the base 2110, as best shown in FIGS. 13A and 13C, the exterior upper surface of the base 2110 includes a generally annular air director mounting surface 2115 to which the air director 3100 is attached (described below). In this example embodiment, the air director mounting surface 2115 includes four sections: (a) first and second opposing sections 2115b and 2115d, and (b) third and fourth opposing sections 2115a and 2115c. In this example embodiment, the first and second sections 2115*b* and 2115*d* are recessed with respect to the third and fourth sections 2115*a* and 2115*c* (with respect to the orientation shown FIG. 13C).

In this example embodiment, the base 2110 defines fastener receiving openings 2114*a*, 2114*b*, 2114*c*, and 2114*d* at least partially therethrough. The fastener receiving opening 2114*a* is partially defined through the third section 2115*a* of the air director mounting surface 2115, the fastener receiving opening 2114*b* is partially defined through the first section 2115*c* of the air director mounting surface 2115, the fastener receiving opening 2114*c* is partially defined through the fourth section 2115*c* of the air director mounting surface 2115, and the fastener receiving opening 2114*d* is partially defined through the second section 2115*d* of the air director mounting surface 2115. It should be appreciated that the fastener receiving openings 2114 are substantially equally circumferentially spaced around a vertical axis through the center of the base 2110.

As best shown in FIGS. 13A, 13C, 13E, and 13F, the exterior upper surface of the base 2110 includes a surface 2111*b* having a "V-shaped" cross-section that defines a pre-filter securing channel around a vertical axis through the center of the base 2110. The base 2110 defines a pre-filter limit switch actuator receiving opening 2175 at least partially therethrough. The pre-filter limit switch actuator is partially defined through the surface 2111*b*, and is sized to receive a pre-filter limit switch actuator of the pre-filter 2900 (described below). Generally, the base 2110 supports a pre-filter limit switch (not shown) that is actuatable by the pre-filter limit switch actuator of the pre-filter 2900, and the pre-filter limit switch actuator receiving opening 2175 enables the pre-filter limit switch actuator to actuate the pre-filter limit switch when the pre-filter 2900 is installed.

Figure 13D:
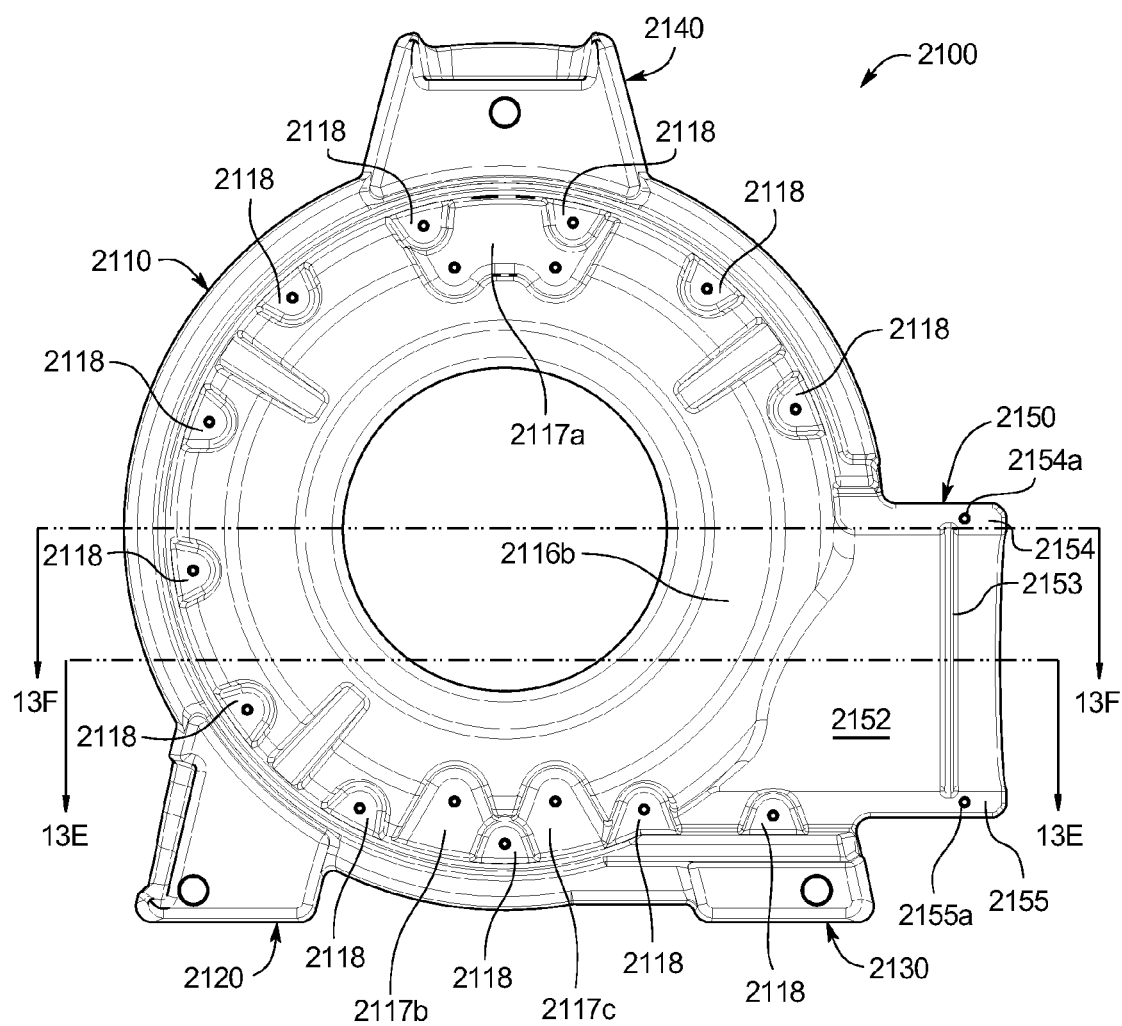
FIG. 13D is a bottom view of the lower housing component of FIG. 13A.
Figure 13F:
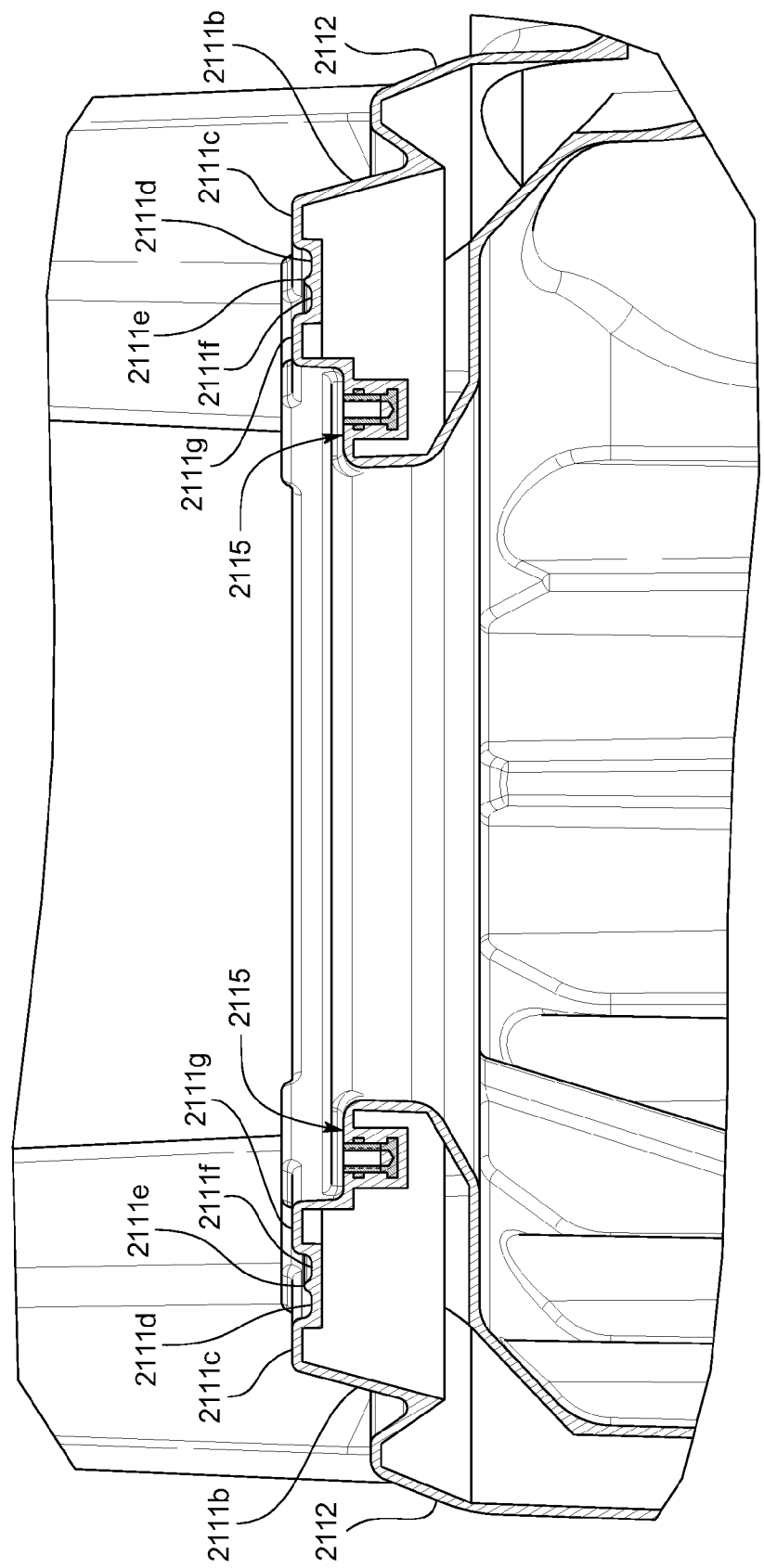
FIG. 13F is a partial side cross-sectional view of the lower housing component of FIG. 13A taken substantially along line 13F-13F of FIGS. 13C and 13D.
Figure 14A:
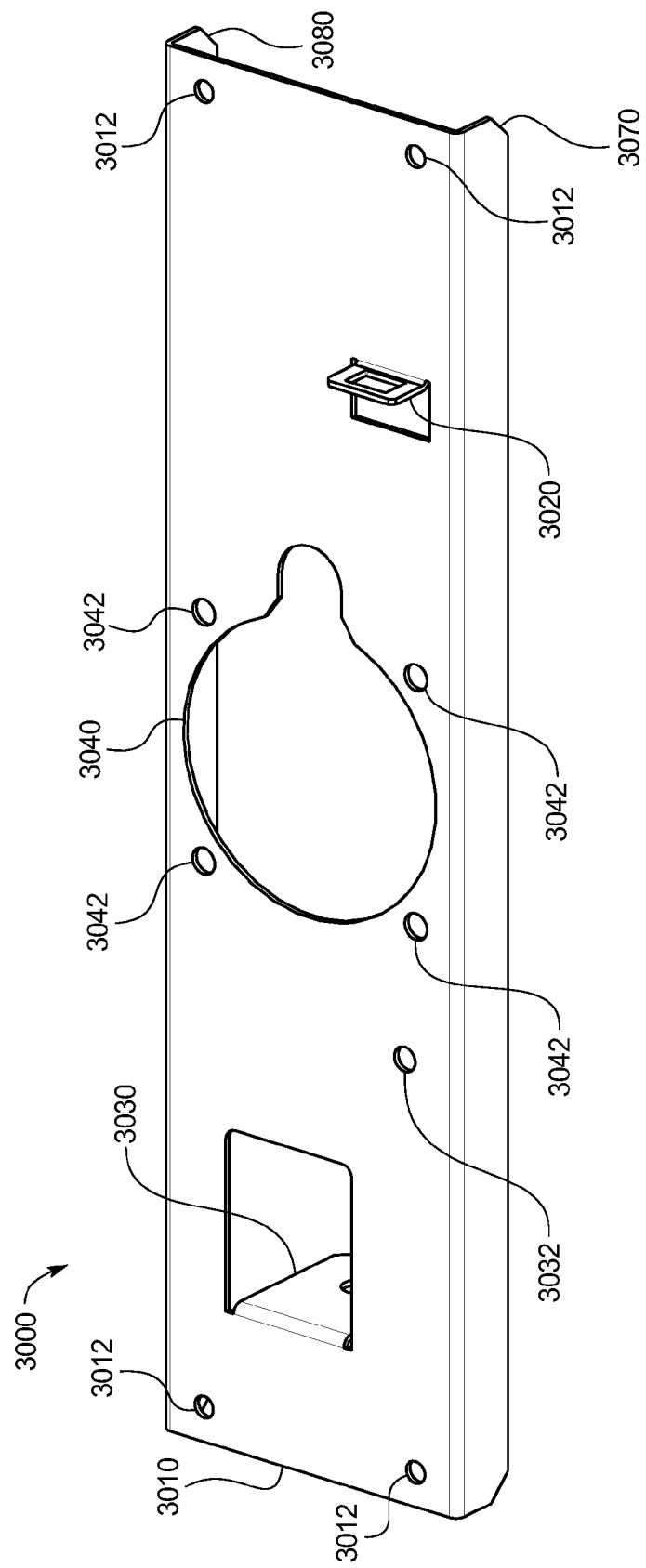
FIG. 14A is a top perspective view of the fan assembly mounting bracket of the portable industrial air filtration device of FIG. 12A.
Figure 14B:
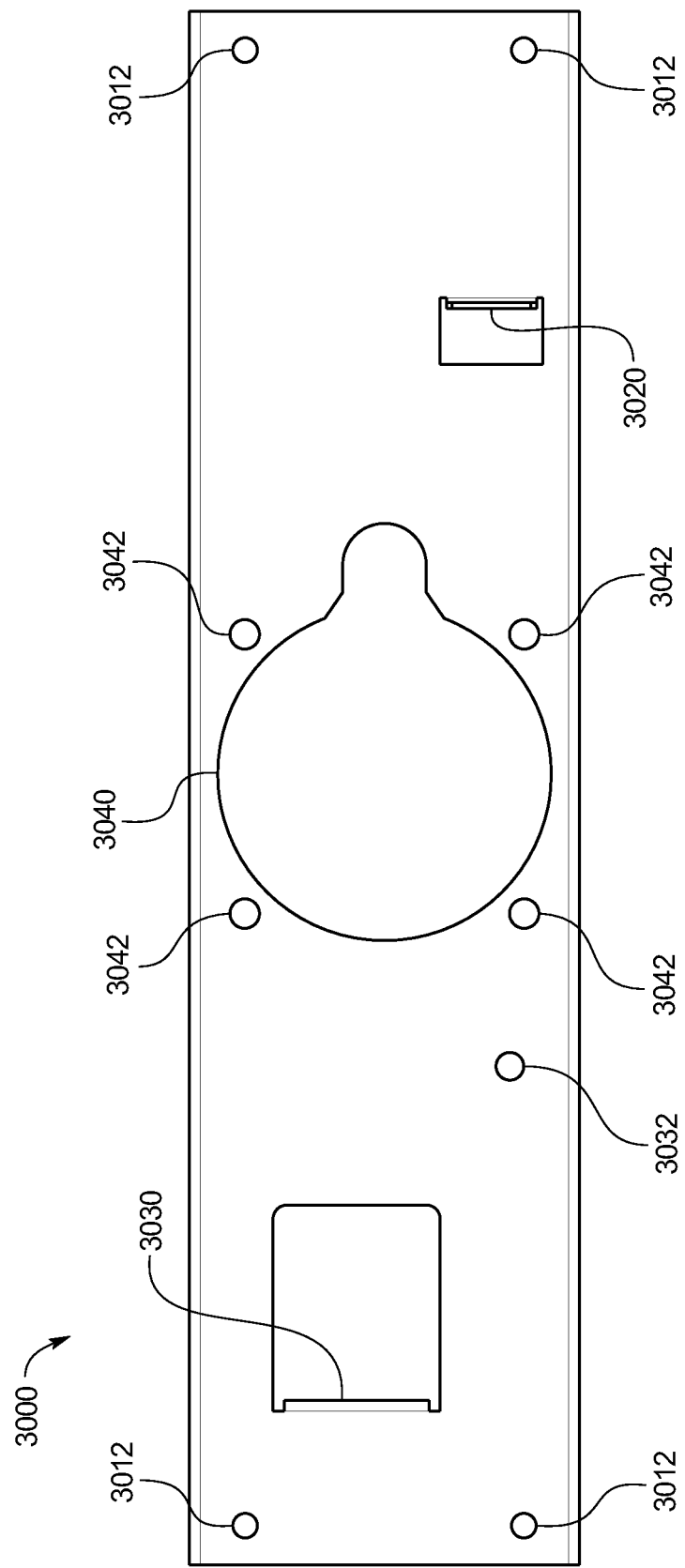
FIG. 14B is a top view of the fan assembly mounting bracket of FIG. 14A.
Figure 14C:
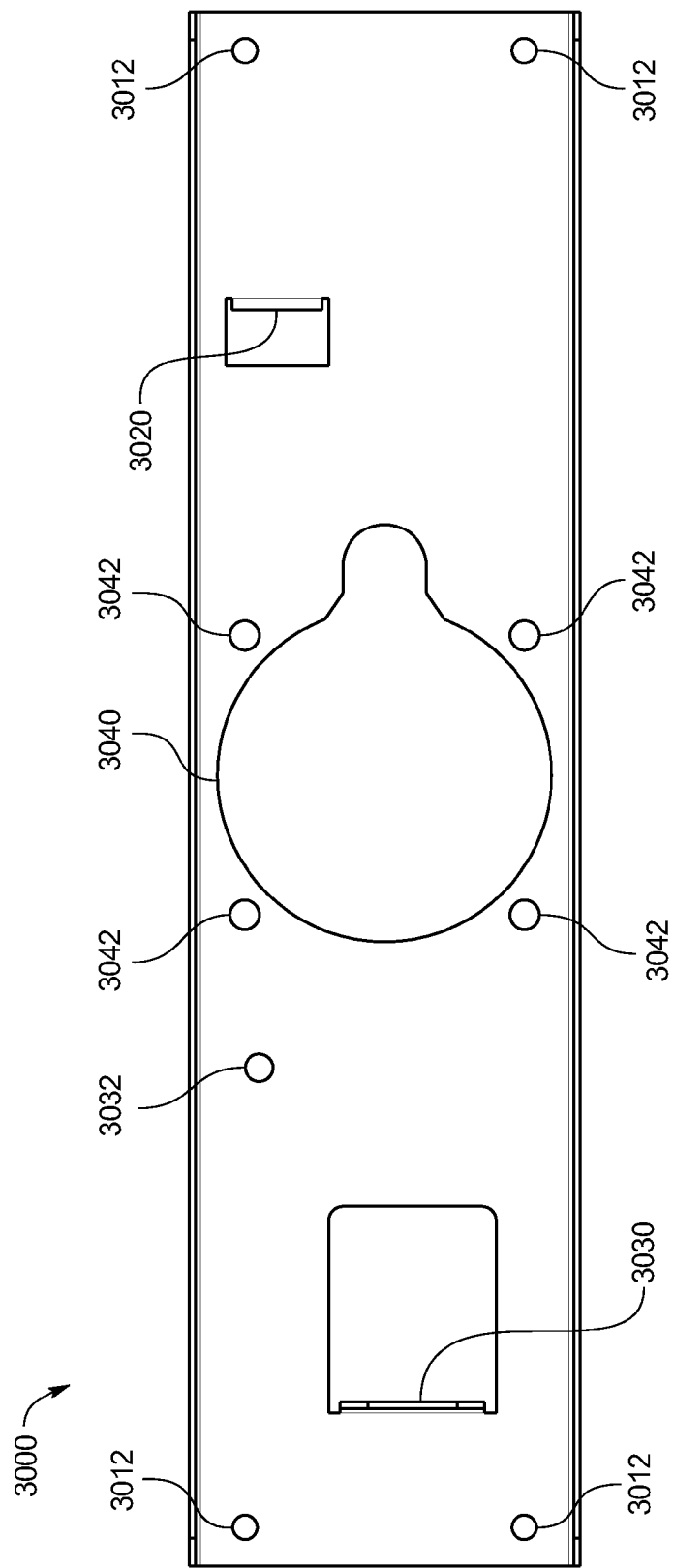
FIG. 14C is a bottom view of the fan assembly mounting bracket of FIG. 14A.
Figure 14D:
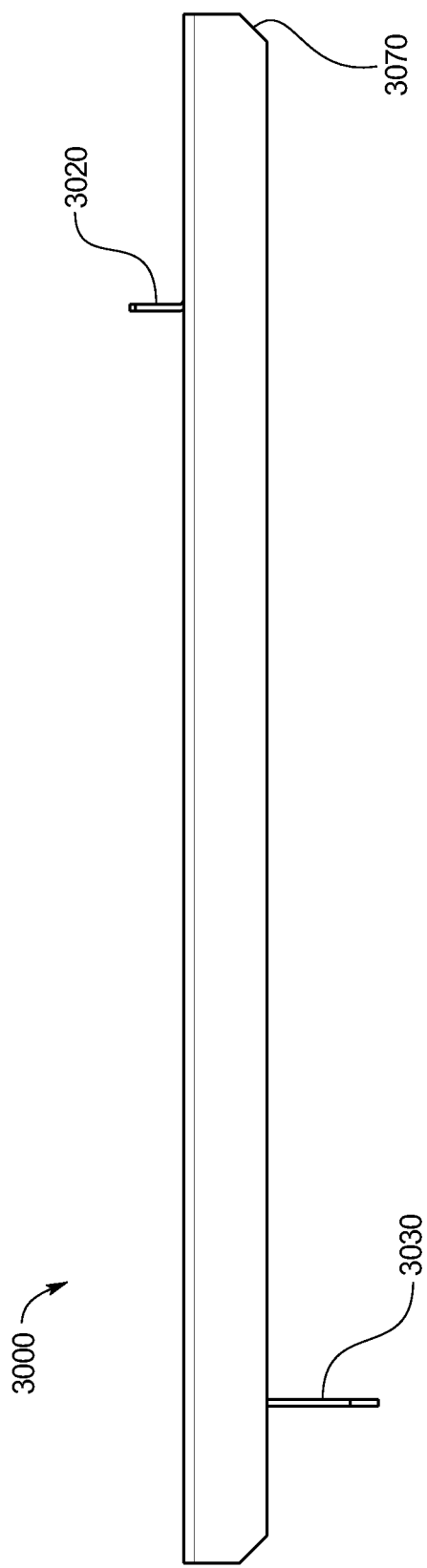
FIG. 14D is a side view of the fan assembly mounting bracket of FIG. 14A.

As also best shown in FIGS. 13A, 13C, 13E, and 13F, the exterior upper surface of the base 2110 includes a plurality of annular surfaces 2111*d* and 2111*f* that are connected by an upwardly-protruding sealing rib 2111*e* (with respect to the orientation shown in FIGS. 13E and 13F). Together, the surfaces 2111*d* and 2111*f* and the sealing rib 2111*e* form a HEPA filter mounting channel around a vertical axis through the center of the base 2110.

As also best shown in FIGS. 13A, 13C, 13E, and 13F, the exterior upper surface of the base 2110 includes an annular surface 2111*c* bridging the pre-filter securing channel and the HEPA filter mounting channel and an annular surface 2111*g* partially bridging the HEPA filter mounting channel and the air director mounting surface 2115. The base 2110 defines a pressure sensor port 2170*b* at least partially therethrough to which one or more pressure sensors may be attached to measure the pressure between the pre-filter and the HEPA filter, as described below. The base 2110 also defines a pressure sensor port 2170*a* at least partially therethrough to which one or more pressure sensors may be attached to measure the pressure downstream of the HEPA filter and upstream of the fan assembly, as described below. The pressure sensor port 2170*b* is partially defined through the surface 2111*c*, and the pressure sensor port 2170*a* is partially defined through the surface 2111*g*.

Turning to the interior of the base 2110, as best shown in FIGS. 13B and 13D, the interior side surface 2116*a* of the base 2110 includes three fan assembly mounting bracket mounting surfaces 2117*a*, 2117*b*, and 2117*c* extending inwardly therefrom (with respect to the orientation shown in FIG. 13D) to which the fan assembly mounting bracket 3000 is attached (described below). As best shown in FIG. 13D, the interior side surface 2116*a* includes a plurality of fan assembly mounting chamber cover mounting surfaces 2118 spaced apart around the interior side surface 2116*a* and extending inwardly therefrom (with respect to the orientation shown in FIG. 13D) to which the fan assembly mounting chamber cover 2500 is attached (described below). The interior side surface 2116*a* also defines a pressure sensor port 2119 at least partially therethrough to which one or more pressure sensors may be attached to measure the pressure downstream of the fan assembly, as described below.

The stabilizers 2120, 2130, and 2140 facilitate attachment of the locking cover 2200 to the lower housing component 2100, provide structural support for the air filtration device 2010, and provide protection for the dual filter assembly. Additionally, as best shown in FIGS. 12B, 12C, 12D, 12E, and 13E, the stabilizers raise the air filtration device off of the ground to enable air to circulate under the air filtration device. While the air filtration device includes three stabilizers in this example embodiment, it should be appreciated that the air filtration device may include any suitable quantity of stabilizers.

To facilitate attachment of the locking cover 2200 to the lower housing component 2110, in this example embodiment, each of the stabilizers 2120, 2130, and 2140 includes a locking cover mounting tab 2121, 2131, and 2141, respectively, and a latch mounting surface 2129, 2139, and 2149, respectively. The locking cover mounting tabs 2121, 2131, and 2141 are received by the locking cover 2200 (described below) and, thereafter, prevent the locking cover 2200 from rotating with respect to the lower housing component 2100. As shown in FIGS. 12A, 12B, 12C, 12D, 12D, and 12F, a latch is mounted to each of the latch mounting surfaces 2129, 2139, and 2149. The latches are attached to corresponding integrated latch strikes on the locking cover 2200 (described below) to secure the locking cover 2200 to the lower housing component 2110.

In this example embodiment, side 2143 of the stabilizer 2140 includes a recessed control panel mounting surface 2144 to which an integrated control panel 2160 is attached. The control panel 2160, which is shown in FIGS. 12A and 12B, enables the user to select a desired operating mode of the air filtration device and provides information regarding the status of the air filtration device and the filters. In this example embodiment, the control panel 2160 includes or is otherwise associated with: (i) an operating mode selector 2161; (ii) a plurality of operating mode indicators 2161*a*, 2161*b*, 2161*c*, 2161*d*, and 2161*e* that each indicate or identify one of the operating modes of the air filtration device (described below); (iii) a pre-filter fault indicator 2162; (iv) a plurality of pre-filter status indicators 2163; (v) a HEPA filter fault indicator 2164; (vi) a plurality of HEPA filter status indicators 2165; (vii) an air filtration device status indicator 2166; (viii) an hour meter display 2167; and (ix) a dust sensor receiving port 2168 into which a dust sensor (not shown) is fit. It should be appreciated that each of these components is described in detail below with respect to FIGS. 25, 26, 27, 28, 29, and 30.

Additionally, in this example embodiment, side 2122 of the stabilizer 2120 includes a recessed power panel mounting surface 2123 to which a power panel 2170 is attached. The power panel 2170, which is shown in FIG. 12E, includes: (a) a plurality of electrical outlets 2172, (b) a power switch 2176 having "ON" and "OFF" positions, and (c) a strain relief bushing 2174 for a power cord that ends in a plug (not shown). In this example embodiment, to power the air filtration device 2010, the user plugs the plug of the power cord into an A/C power source (such as a wall electrical outlet), and switches the power switch 2176 to the "ON" position. To cut power to the air filtration device 2010, the user either unplugs the plug of the power cord from the A/C power source or switches the power switch 2176 to the "OFF" position. In this example embodiment, once the air filtration device 2010 is connected to the A/C power source via the plug of the power cord, the electrical outlets 2172 are powered and the user may plug other electronic devices into the electrical outlets 2172 to power those electronic devices.

It should be appreciated that, in other embodiments, the air filtration device includes fewer electrical outlets, more electrical outlets, or no electrical outlets. In other embodiments, the air filtration device is operable using any suitable power source other than and/or in addition to an A/C power source, such as one or more replaceable or rechargeable batteries.

As best shown in FIGS. 13C and 13D, the exhaust port upper portion 2150 extends transversely from the base such that the exhaust port upper portion 2150 is substantially parallel to a plane extending between the stabilizers 2120 and 2130. The exhaust port upper portion 2150 includes a convex exterior surface 2151l and a concave interior surface 2152. The interior surfaces 2152 of the exhaust port upper portion 2150 includes two exhaust screen mounting surfaces 2154 and 2155 to which the exhaust screen 2400 is attached (described below). The base 2110 defines fastener receiving openings 2154a and 2155a at least partially therethrough. The fastener receiving opening 2154a is partially defined through the exhaust screen mounting surface 2154 and the fastener receiving opening 2155a is partially defined through the exhaust screen mounting surface 2155. The base also defines an exhaust screen mounting channel 2153 partially through the interior surface 2152 of the exhaust port upper portion 2150.

In this example embodiment, the lower housing component is dual-walled and rotationally molded out of plastic. It should be appreciated, however, that the lower housing component may be made of any suitable material(s) or manufactured in any suitable manner(s).

As best illustrated in FIGS. 14A, 14B, 14C, and 14D the fan assembly mounting bracket 3000 includes: (a) a generally rectangular fan assembly mounting bracket body 3010 defining: (i) a fastener receiving opening 3012 therethrough proximate each corner of the fan assembly mounting bracket body 3010, (ii) a fan assembly receiving opening 3040 therethrough proximate the center of the fan assembly mounting bracket body 3010, (iii) a plurality of fastener receiving openings 3042 therethrough spaced around the fan assembly receiving opening 3040, and (iv) a fan motor capacitor fastener receiving opening 3032 therethrough; (b) generally rectangular flanges 3070 and 3080 extending substantially perpendicularly in a first direction from opposing edges of the fan assembly mounting bracket body 3010; (c) a fan motor capacitor mounting bracket 3030 extending substantially perpendicularly in the first direction from the fan assembly mounting bracket body 3010; and (d) a fan speed sensor mounting bracket 3020 extending substantially perpendicularly in a second direction, which is opposite the first direction, from the fan assembly mounting bracket body 3010. In this example embodiment, the fan assembly mounting bracket 3000 is made of sheet metal, though it should be appreciated that the fan assembly mounting bracket may be made of any suitable material.

Figure 16A:
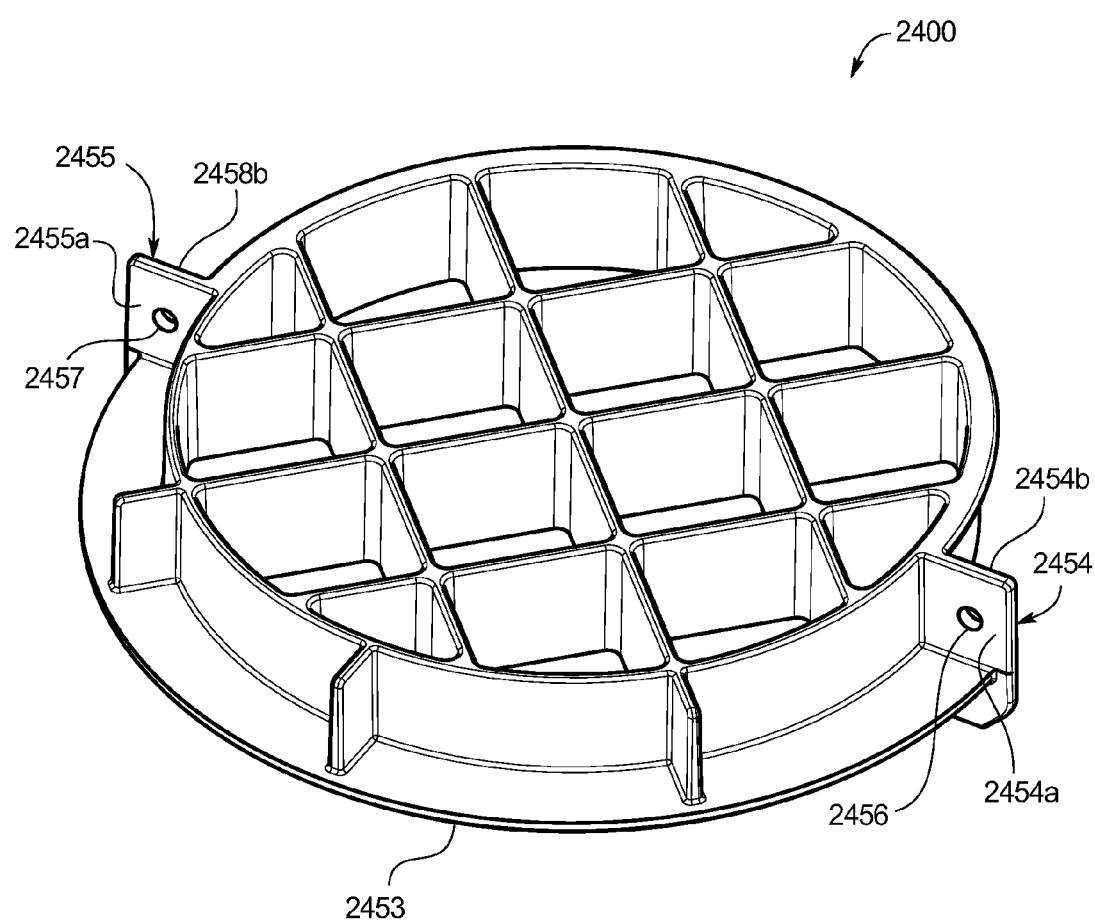
FIG. 16A is a side perspective view of the exhaust screen of the portable industrial air filtration device of FIG. 12A.
Figure 16B:
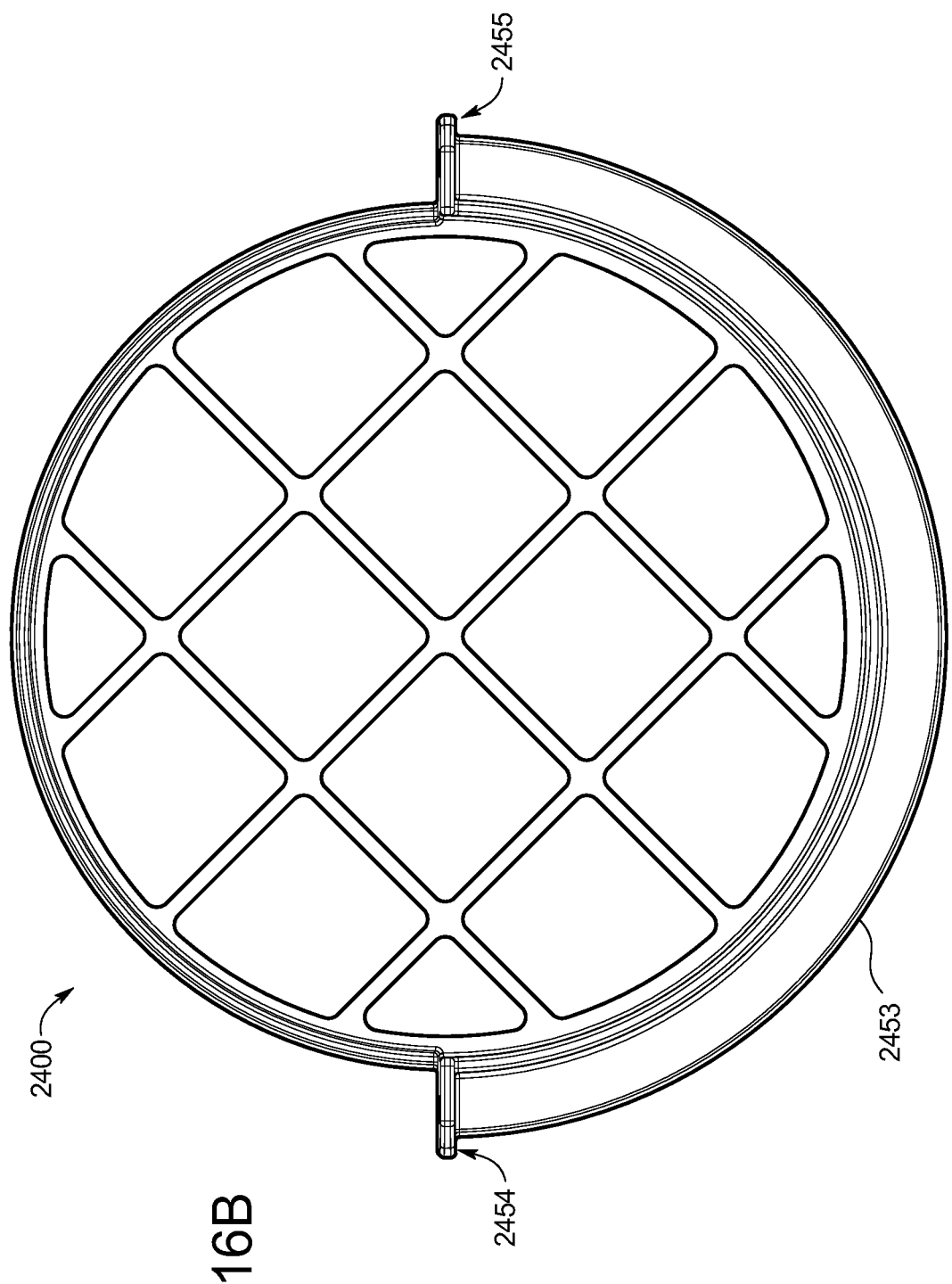
FIG. 16B is a front view of the exhaust screen of FIG. 16A.

As best illustrated in FIGS. 16A and 16B, the exhaust screen 2400 includes a plurality of exhaust screen mounting tabs 2454 and 2455 and a flange 2453 spanning the exhaust screen mounting tabs. The exhaust screen mounting tab 2454 includes a base mounting surface 2454a and an opposing fan assembly mounting chamber cover mounting surface 2454b and defines a fastener receiving opening 2456 therethrough. Similarly, the exhaust screen mounting tab 2455 includes a base mounting surface 2455a and an opposing fan assembly mounting chamber cover mounting surface 2455b and defines a fastener receiving opening 2457 therethrough.

In this example embodiment, the exhaust screen 2400 is an injection molded plastic component. It should be appreciated, however, that the exhaust screen may be made of any suitable material or materials or manufactured in any suitable manner or manners.

Figure 17B:
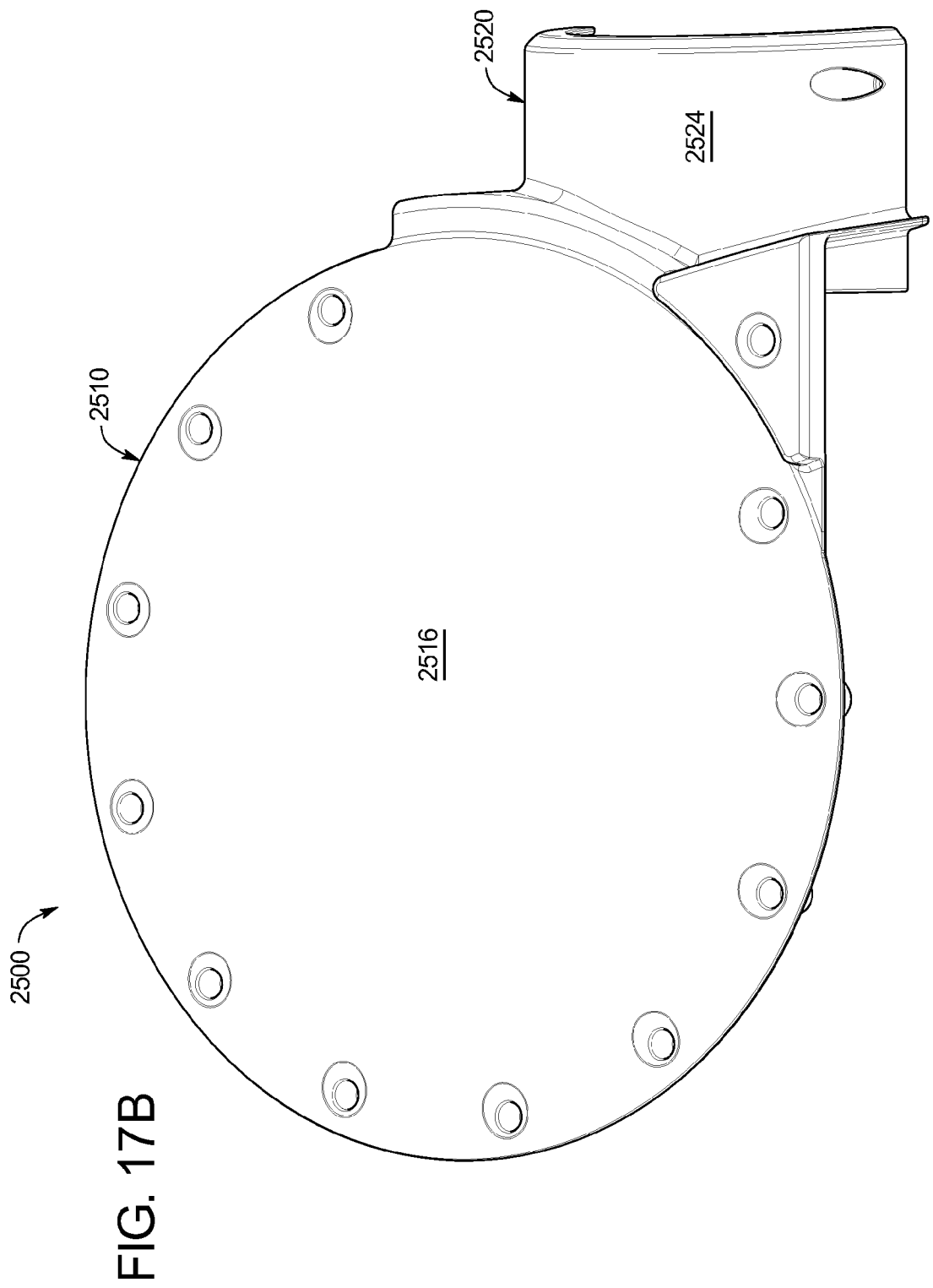
FIG. 17B is a bottom perspective view of the filter assembly mounting chamber cover of FIG. 17A.

As best illustrated in FIGS. 17A and 17B, the fan assembly mounting chamber cover 2500 includes: (a) a circular portion 2510 having a slightly concave interior surface 2512 and a slightly convex exterior surface 2514, and (b) an exhaust channel lower portion 2520 extending transversely from the circular portion 2510 and having a concave interior surface 2522 and a convex exterior surface 2524. The circular portion defines a plurality of fastener receiving openings 2154 therethrough. The exhaust channel lower portion 2520 includes two exhaust screen mounting surfaces 2554 and 2555 to which the exhaust screen 2400 is attached (described below). The exhaust channel lower portion 2520 defines fastener receiving openings 2524a and 2524b therethrough. The fastener receiving opening 2524a is partially defined through the exhaust screen mounting surface 2554 and the fastener receiving opening 2524b is partially defined through the exhaust screen mounting surface 2555.

In this example embodiment, the fan assembly mounting chamber cover 2500 is a thin walled plastic component, though it should be appreciated that the fan assembly mounting chamber cover may be made of any suitable material.

As best illustrated in FIGS. 18A, 18B, 18C, and 18D, the air director 3100 includes: (a) an annular portion 3110, (b) a bridging portion 3120 extending downwardly and inwardly from the inner edge of the annular portion 3110 (with respect to the orientation shown in FIG. 18D), and (c) a ring-shaped portion 3130 extending downwardly from the inner edge of the bridging portion 3120 (with respect to the orientation shown in FIG. 18D).

Figure 18A:
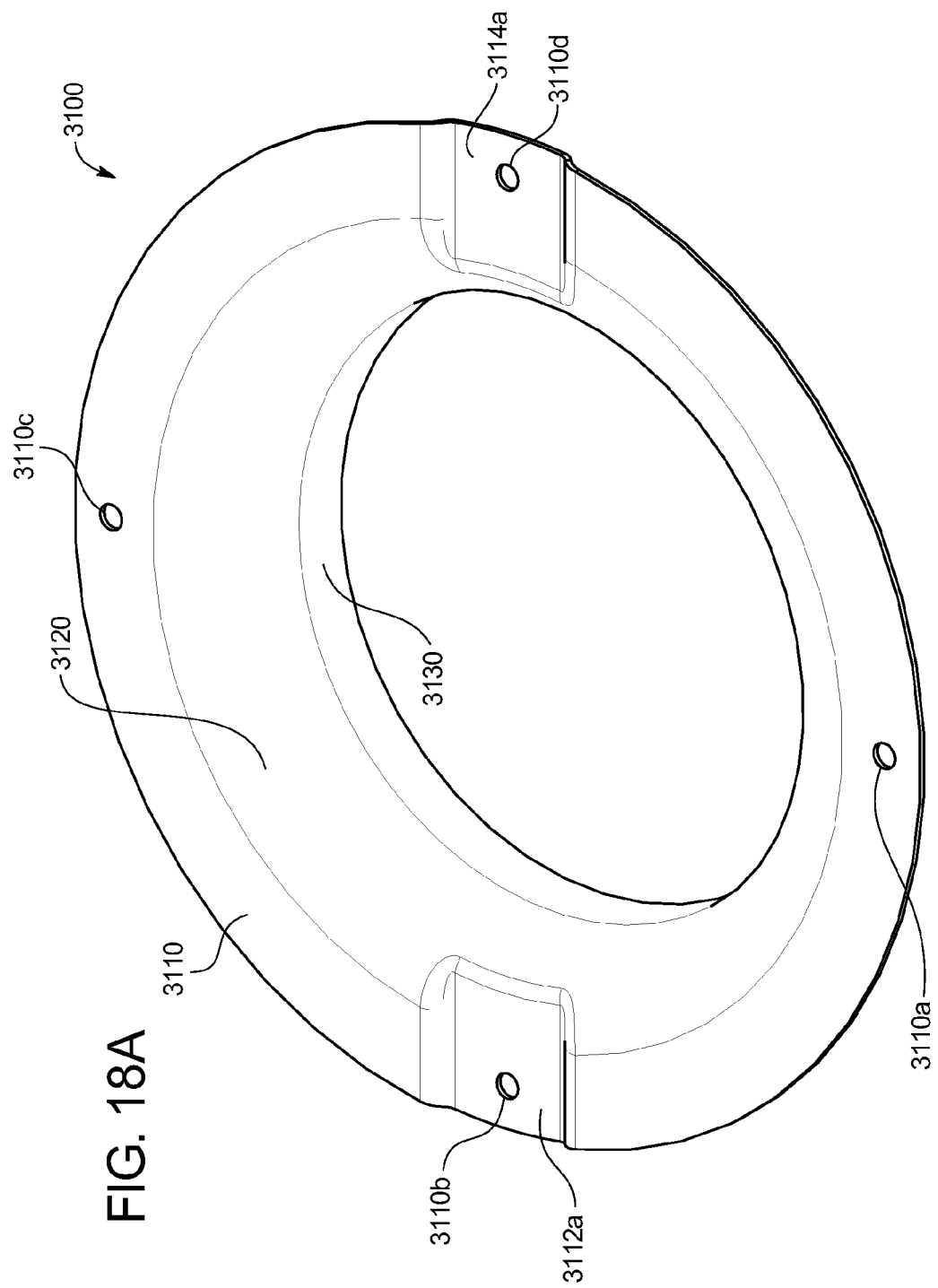
FIG. 18A is a top perspective view of the air director of the portable industrial air filtration device of FIG. 12A.
Figure 18B:
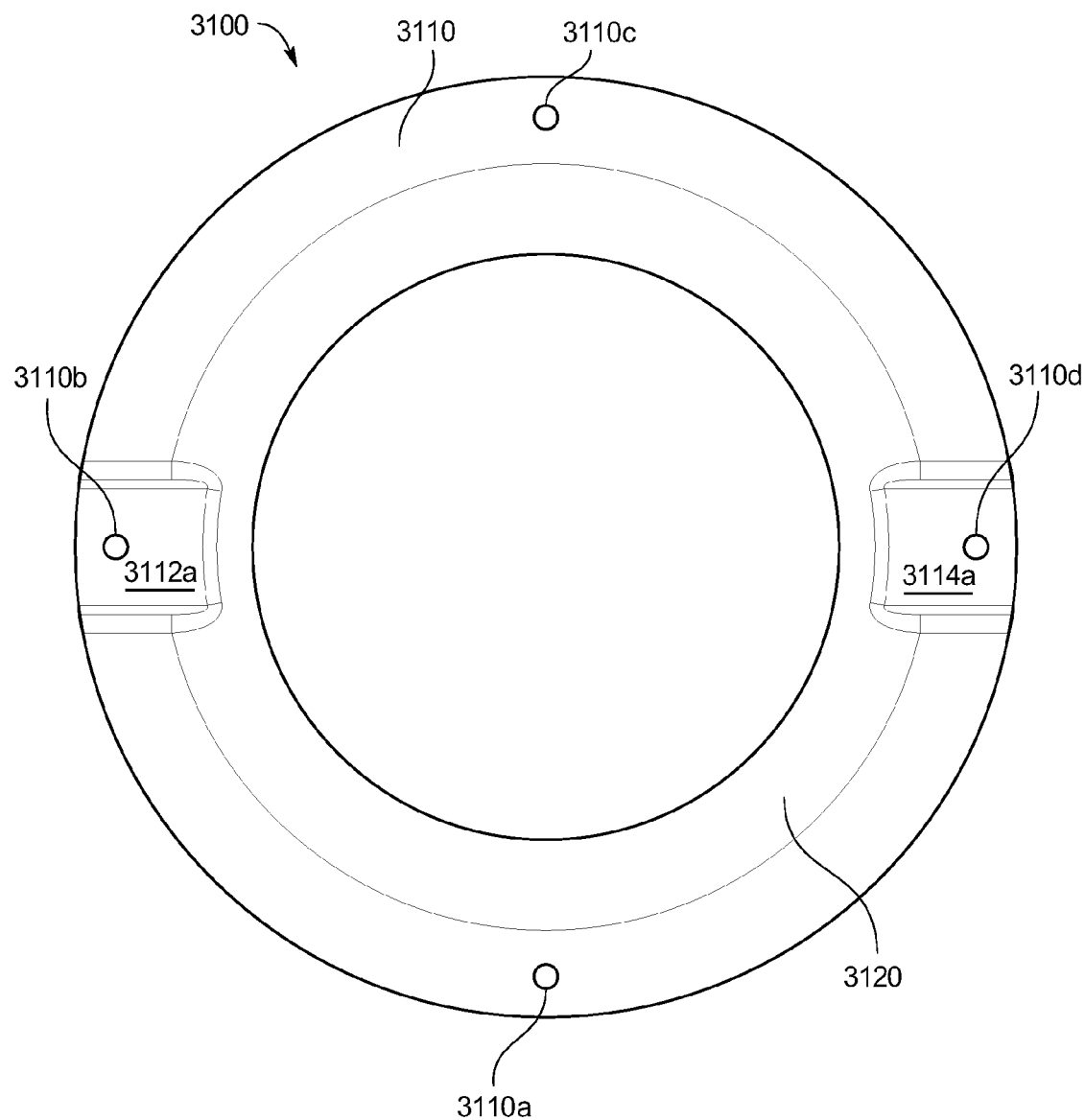
FIG. 18B is a top view of the air director of FIG. 18A.
Figure 18C:
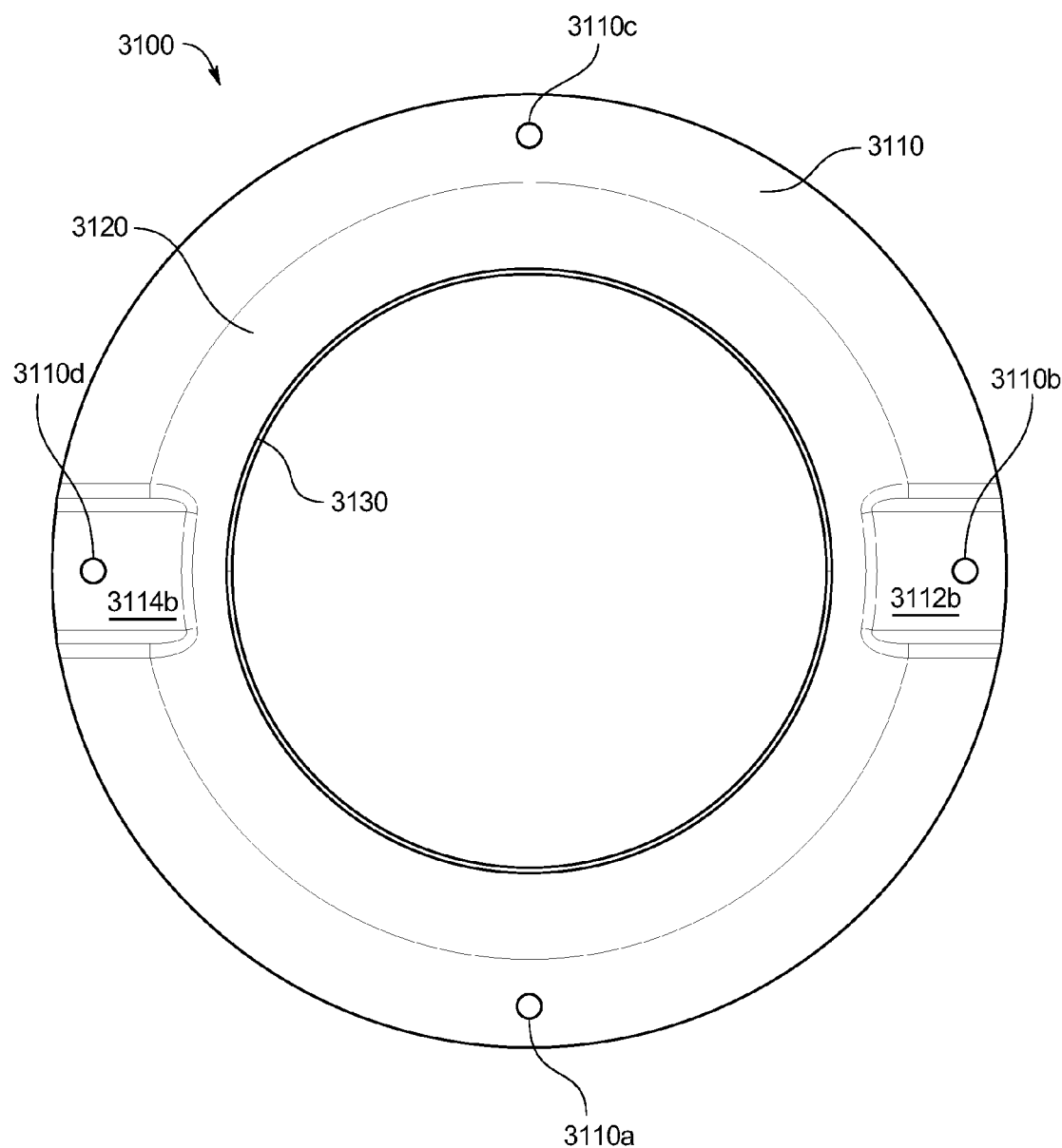
FIG. 18C is a bottom view of the air director of FIG. 18A.
Figure 18D:
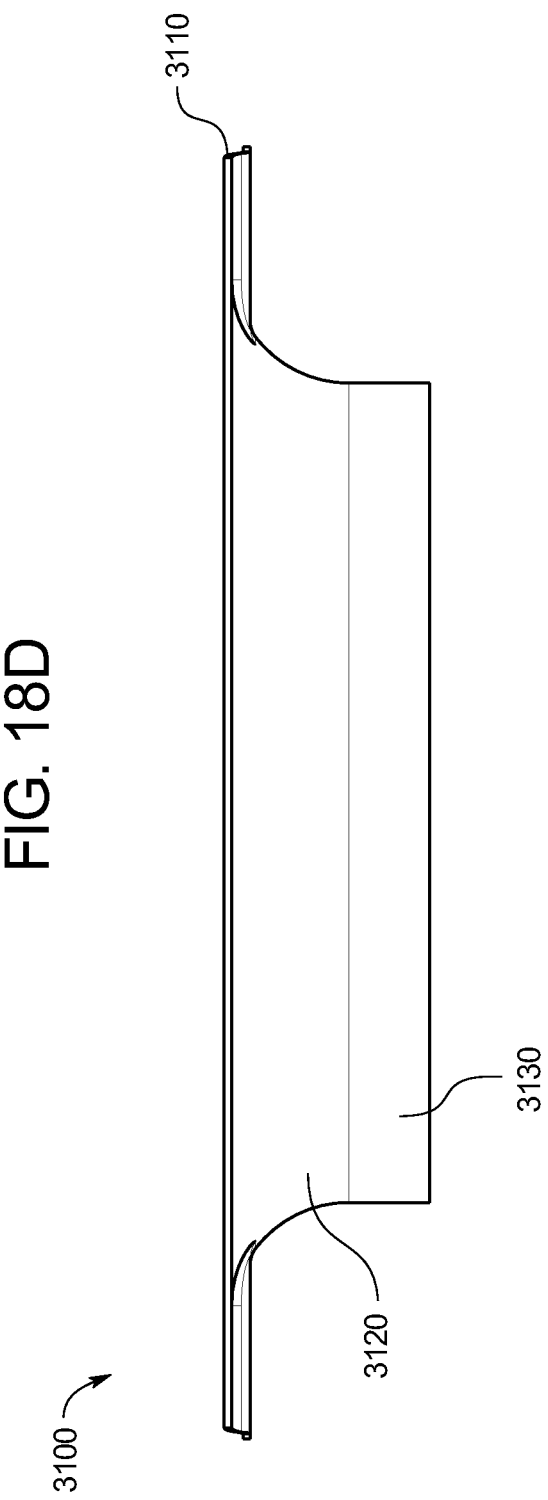
FIG. 18D is a side view of the air director of FIG. 18A.

The annular portion 3110 defines fastener receiving openings 3110a, 3110b, 3110c, and 3110d therethrough. In this example embodiment, the fastener receiving openings 3110a, 3110b, 3110c, and 3110d are substantially equally circumferentially spaced around a vertical axis through the center of the annular portion 3110. As best shown in FIGS. 18A and 18B, the air director 3100 includes rectangular HEPA filter mounting bracket mounting surfaces 3112a and 3114a proximate the fastener receiving openings 3110b and 3110d, respectively. It should be appreciated that the HEPA filter mounting bracket mounting surfaces 3112a and 3114a are recessed relative to the annular portion 3110 (with respect to the orientation shown in FIG. 18D). As best shown in FIG. 18C, the air director 3100 includes rectangular air director mounting surfaces 3112b and 3114b, which are opposite the HEPA filter mounting bracket mounting surfaces 3112a and 3114a, respectively.

Figure 19A:
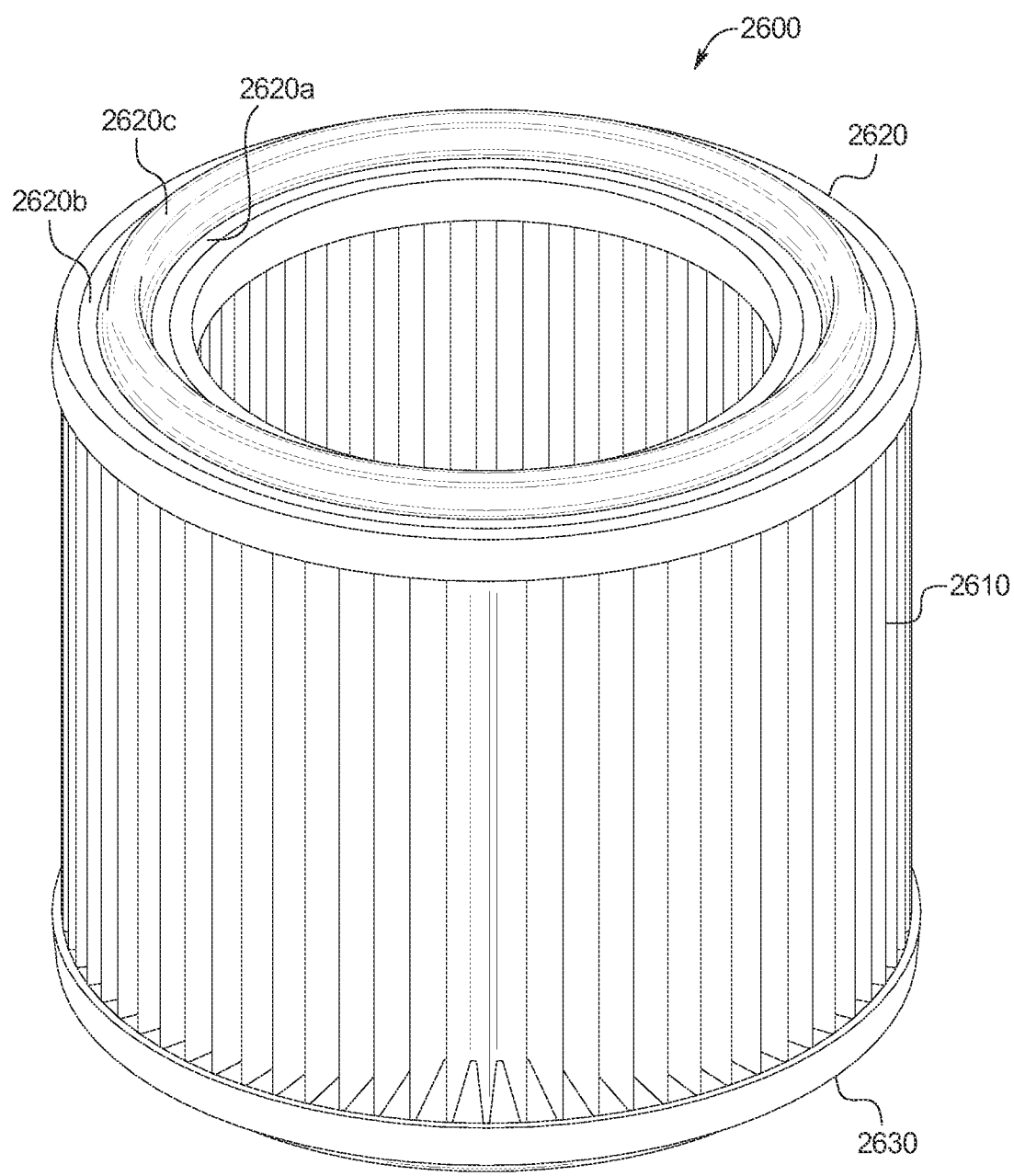
FIG. 19A is a top perspective view of the HEPA filter of the portable industrial air filtration device of FIG. 12A without the protective mesh.
Figure 19B:
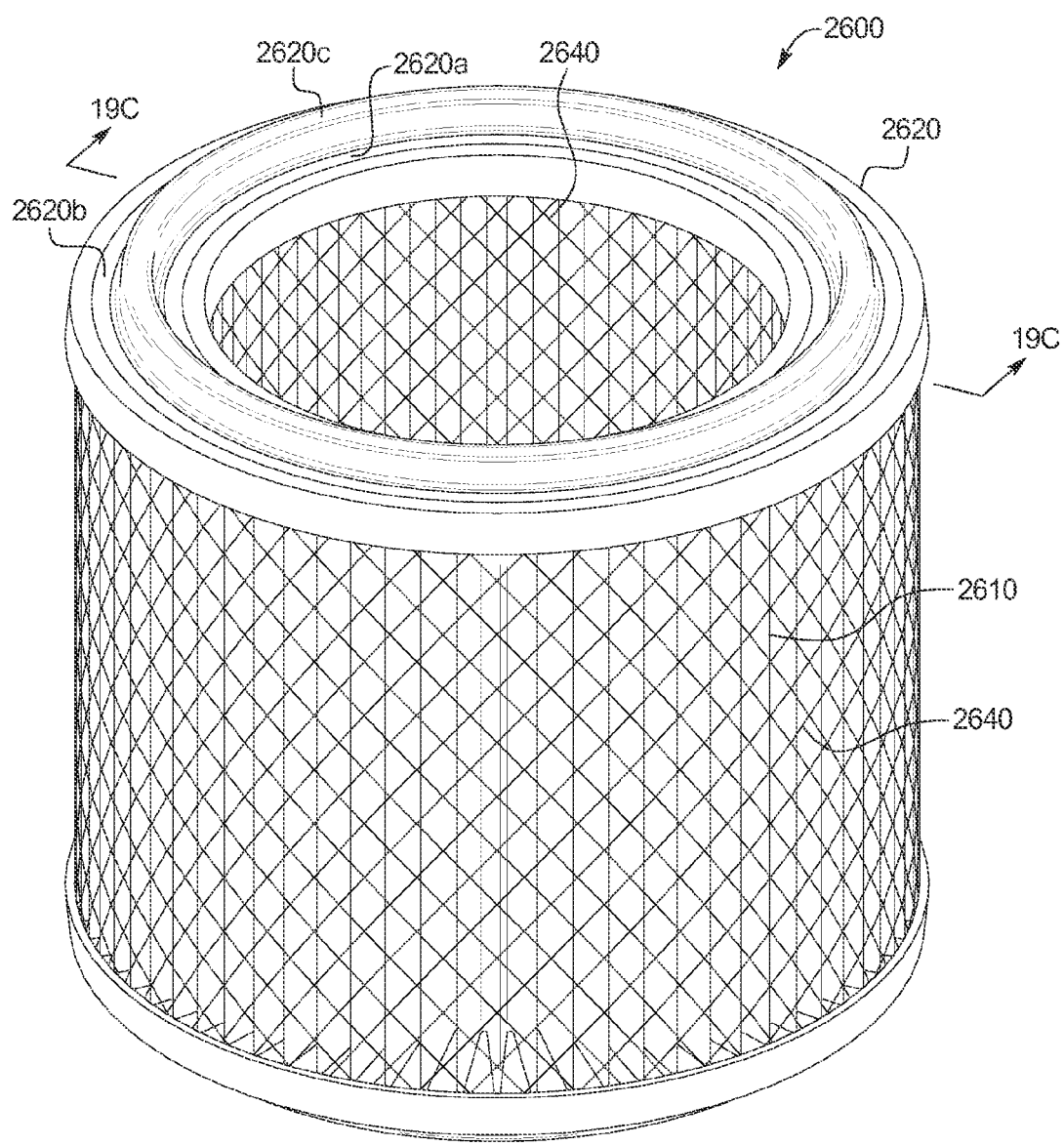
FIG. 19B is a top perspective view of the HEPA filter of FIG. 19A with the protective mesh.
Figure 19C:
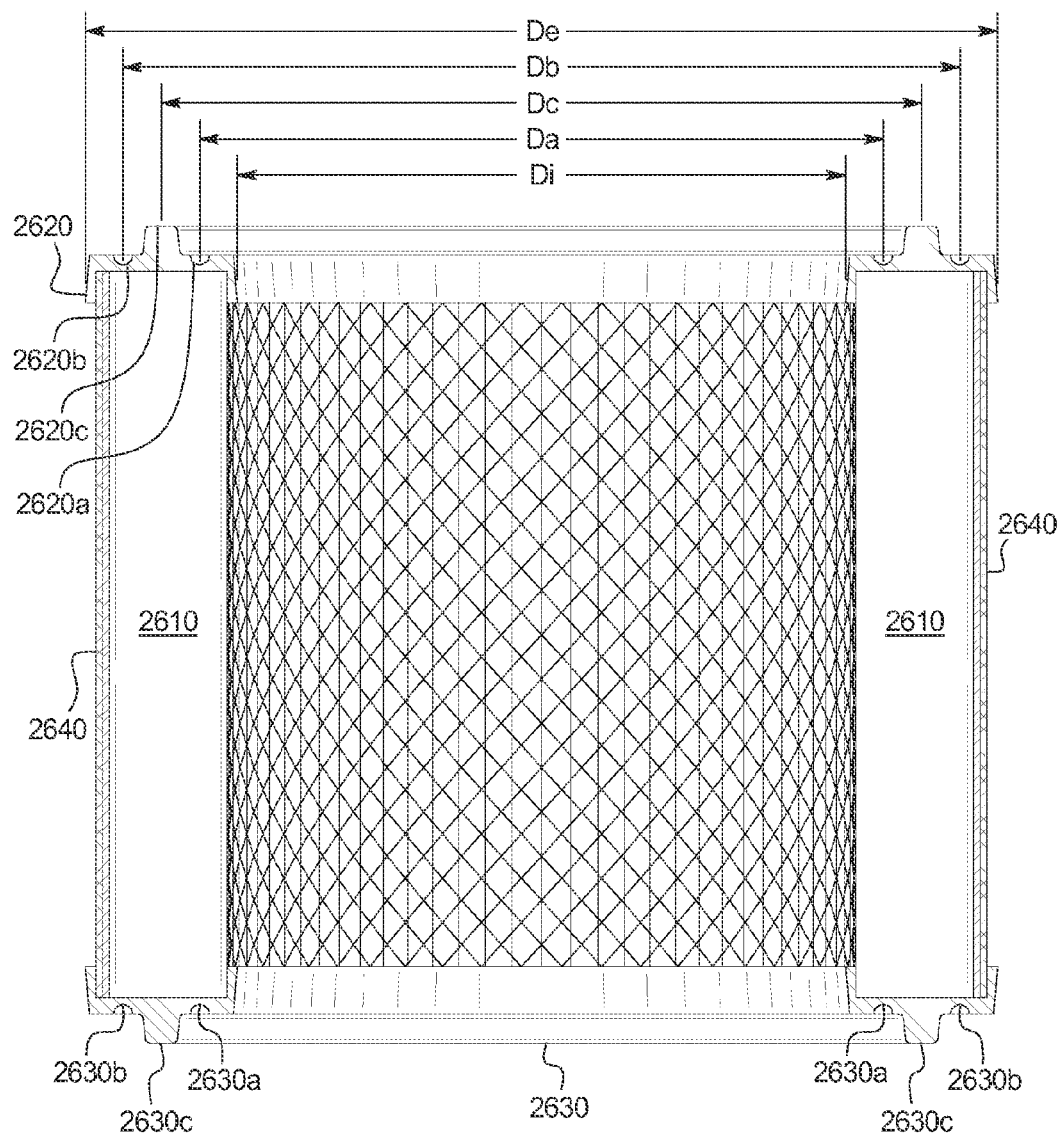
FIG. 19C is a side cross-sectional view of the HEPA filter of FIG. 19B taken substantially along line 19C-19C of FIG. 19B.

As best illustrated in FIGS. 19A, 19B, and 19C, the HEPA filter 2600 includes pleated HEPA filter media 2610 sandwiched between upper and lower ring-shaped end caps 2620 and 2630, respectively. The HEPA filter media 2610 and the upper and lower end caps 2620 and 2630 form or define a cylindrical interior channel. As shown in FIGS. 19B and 19C, the HEPA filter 2600 also includes a protective mesh 2640 covering the outer and inner surfaces of the HEPA filter media 2610 around its entire outer and inner circumferences to protect the HEPA filter media 2610. It should be appreciated that, for clarity, the protective mesh is not shown in FIG. 19A.

The upper and lower end caps 2620 and 2630 each have an exterior diameter De and an interior diameter Di. As best shown in FIG. 19C, the upper end cap 2620 includes a first surface 2620*a* having a semi-circular cross-section that defines a first channel around the circumference of the upper end cap 2620 at diameter Da. The upper end cap 2620 also includes a second surface 2620*b* having a semi-circular cross-section defining a second channel around the circumference of the upper end cap 2620 at diameter Db. The upper end cap 2620 further includes a generally flat mounting surface 2620*c* around the circumference of the upper end cap 2620 at diameter Dc. The mounting surface 2620*c* is located between and above (with respect to the orientation shown in FIG. 19C) the first and second channels. Similarly, the lower end cap 2630 includes a first surface 2630*a* having a semi-circular cross-section that defines a first channel around the circumference of the lower end cap 2630 at diameter Da. The lower end cap 2630 also includes a second surface 2630*b* having a semi-circular cross-section that defines a second channel around the circumference of the lower end cap 2630 at diameter Db. The lower end cap 2630 further includes a generally flat mounting surface 2630*c* around the circumference of the lower end cap 2630 at diameter Dc. The mounting surface 2630*c* is located between and below (with respect to the orientation shown in FIG. 19C) the first and second channels.

In this example embodiment, both the upper and lower end caps of the HEPA filter include a specific geometry that enables airtight sealing when the HEPA filter is installed. As will be explained in detail below, this specific end cap geometry and, more specifically, the manner in which the end cap geometry enables an airtight seal to be formed, enables the air filtration device to accurately measure various pressures and perform certain functions using those measured pressures. In this example embodiment, the end caps of the HEPA filter are made of molded urethane, though it should be appreciated that the end caps may be made of any suitable material. While the end caps are substantially identical in this example embodiment, it should be appreciated that in other embodiments the upper and lower end caps may have different geometries. Further, in this example embodiment, the outer protective mesh is made of plastic and the inner protective mesh is made of a thin gage metal, though it should be appreciated that the protective mesh may be made of any suitable material.

Figure 20A:
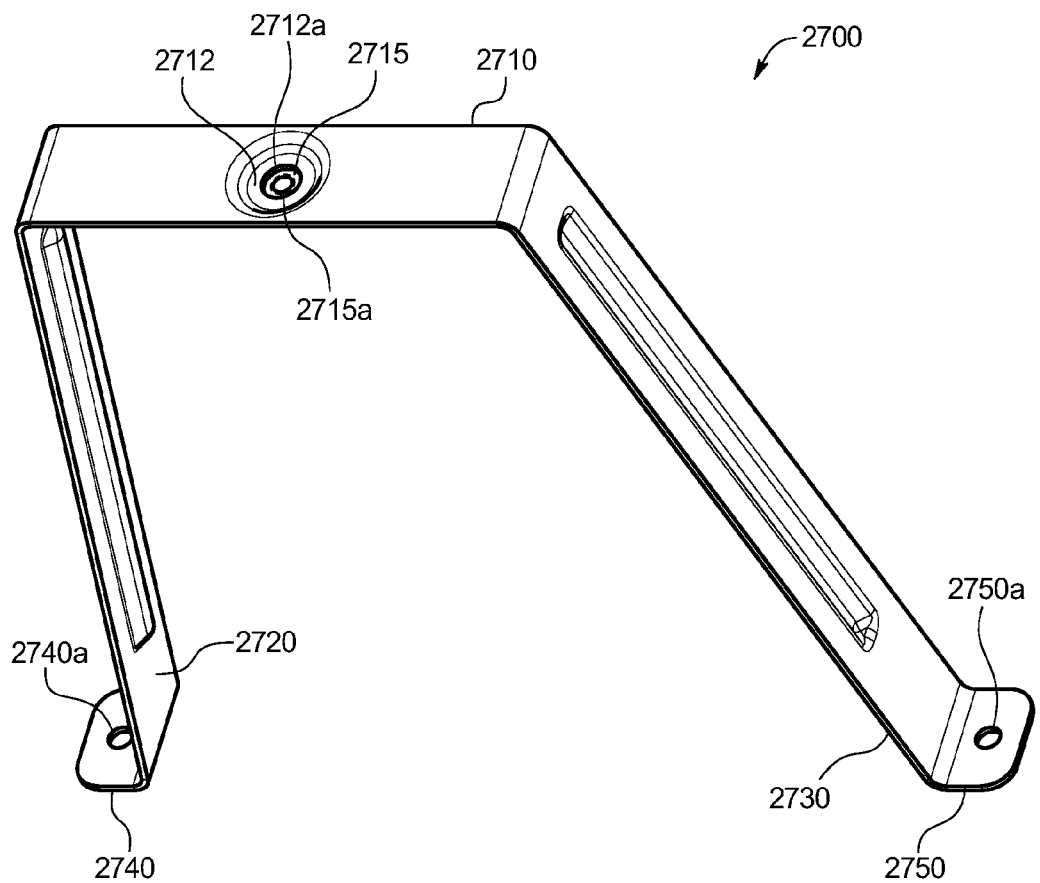
FIG. 20A is a top perspective view of the HEPA filter securing bracket of the portable industrial air filtration device of FIG. 12A.

As best illustrated in FIGS. 20A and 20B, the HEPA filter securing bracket 2700 includes: (a) a rectangular brace 2710, (b) a first leg 2720 connected to and extending down and away from a first edge of the brace 2710 (with respect to the orientation shown in FIG. 20B), (c) a second leg 2730 connected to and extending down and away from a second edge of the brace 2710 that is opposite the first edge (with respect to the orientation shown in FIG. 20B), (d) a first HEPA filter securing bracket mounting tab 2740 that is substantially parallel to the brace 2710 and extends away from the edge of the first leg 2720 opposite the edge connected to the first edge of the brace 2710, and (e) a second HEPA filter securing bracket mounting tab 2750 that is substantially parallel to the brace 2710 and extends away from the edge of the second leg 2723 opposite the edge connected to the second edge of the brace 2710.

The brace 2710 includes an annular, downwardly embossed HEPA filter securing plate nesting surface 2712 (with respect to the orientation shown in FIG. 20B) that defines a nut receiving opening 2712*a* therethrough. The nut receiving opening 2712*a* includes an integrated nut 2715 that defines a HEPA filter securing plate fastener receiving opening 2715*a* therethrough. The first and second HEPA filter securing bracket mounting tabs 2740 and 2750 each define HEPA filter securing bracket fastener receiving openings 2740*a* and 2750*a*, respectively, therethrough.

Figure 21A:
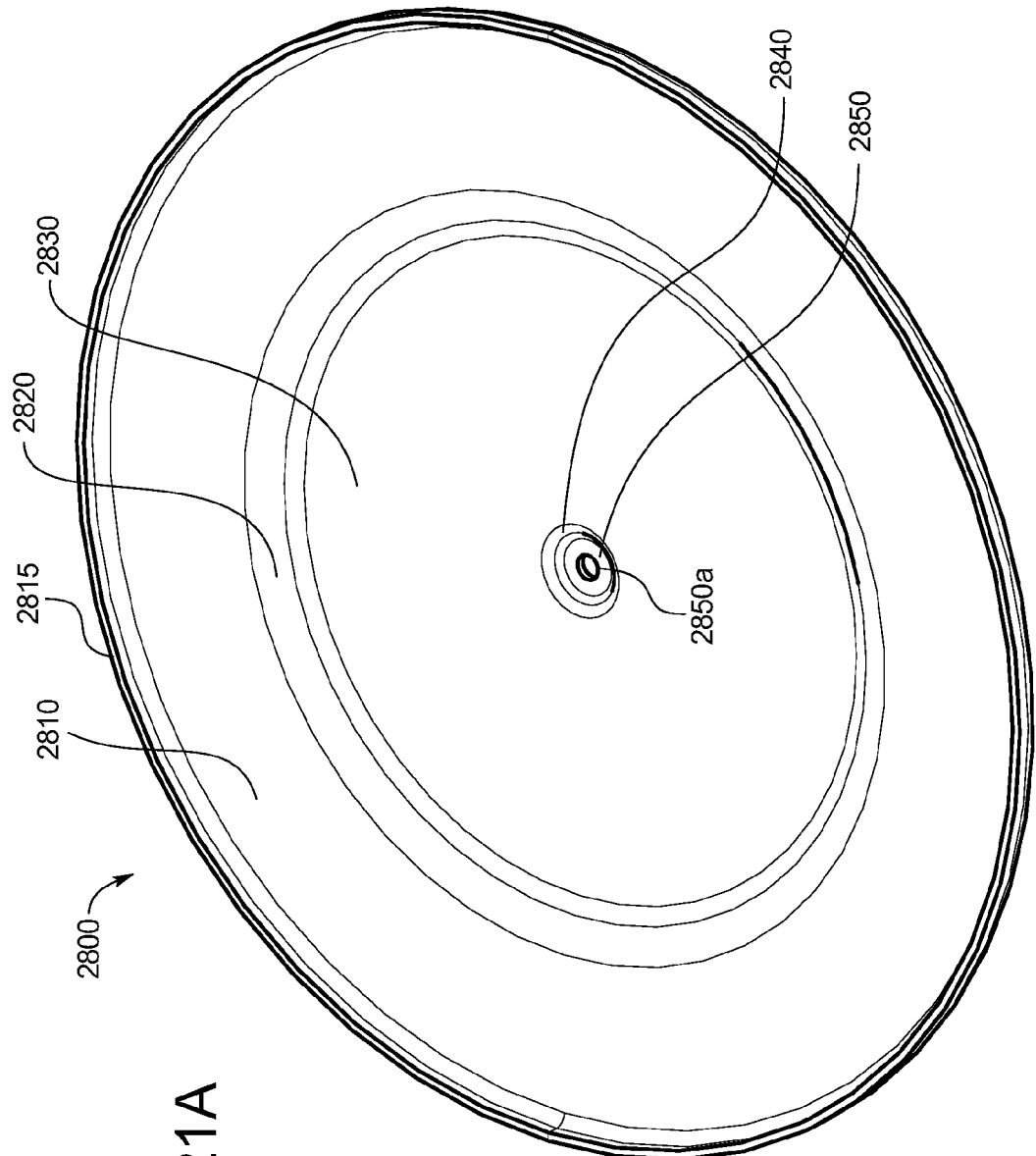
FIG. 21A is a top perspective view of the HEPA filter securing plate of the portable industrial air filtration device of FIG. 12A.
Figure 21B:
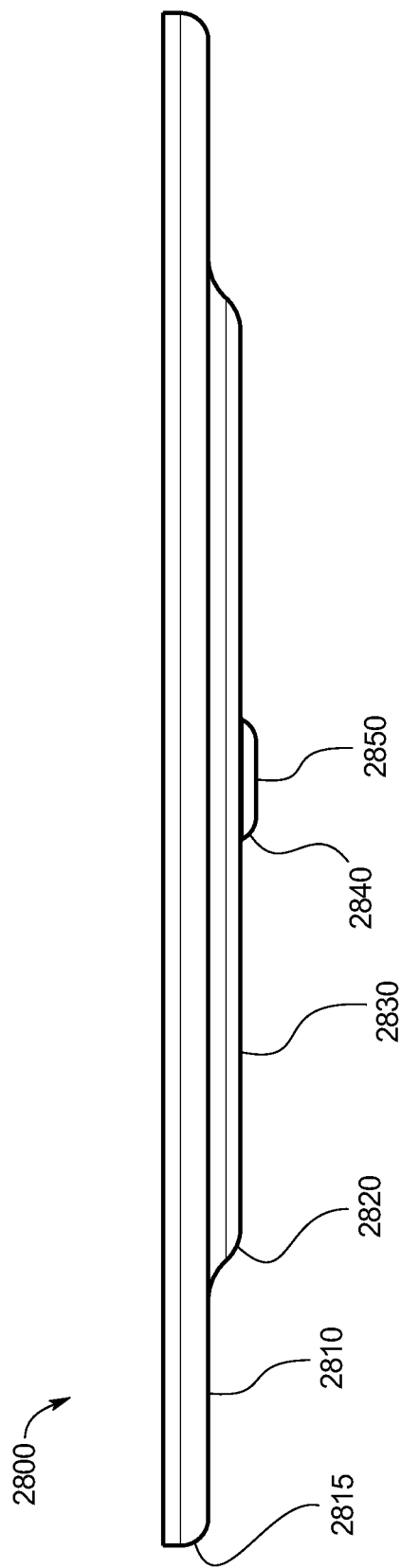
FIG. 21B is a side view of the HEPA filter securing plate of FIG. 21A.

As best illustrated in FIGS. 21A and 21B, the HEPA filter securing plate 2800 includes: (a) a first annular portion 2810, (b) a flange 2815 extending upwardly from an outer edge of the first annular portion 2810 around the circumference of the outer edge of the first annular portion 2810 (with respect to the orientation shown in FIG. 21B), (c) a first annular bridging portion 2820 extending downwardly and inwardly from the inner edge of the first annular portion 2810 (with respect to the orientation shown in FIG. 21B), (d) a second annular portion 2830 connected to and extending inwardly from the first annular bridging portion 2820 (with respect to the orientation shown in FIG. 21B), (e) a second annular bridging portion 2840 extending downwardly and inwardly from the inner edge of the second annular portion 2830 (with respect to the orientation shown in FIG. 21B), and (f) a third annular portion 2850 extending inwardly from the second annular bridging portion 2840 (with respect to the orientation shown in FIG. 21B). The third annular portion 2850 defines a fastener receiving opening 2850*a* therethrough.

Figure 23B:
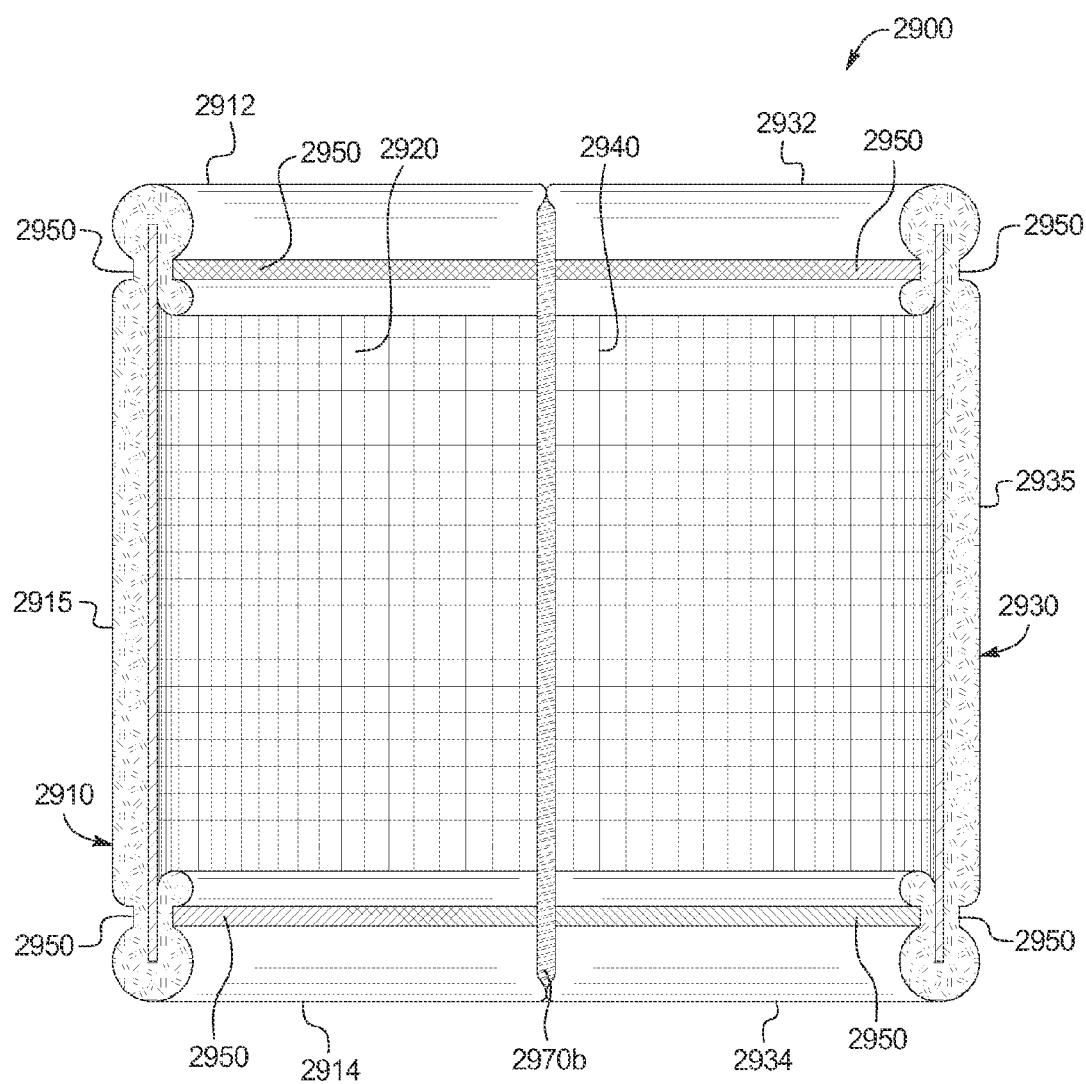
FIG. 23B is a side cross-sectional view of the pre-filter of FIG. 23A taken substantially along line 23B-23B of FIG. 23A.

FIGS. 23A and 23B illustrate the pre-filter 2900. In various embodiments, the pre-filter 2900 is formed from two different materials: pre-filter media and a rigidized backing. The use of the rigidized backing in combination with the pre-filter media provides structural support to the pre-filter, rendering it rigid enough to support itself and stand on its own without deforming, while maintaining enough flexibility to be packed flat for shipping and storage, which enables packaging materials and storage space to be minimized. In one embodiment, the pre-filter 2900 is formed by placing the rigidized backing 2920, which has upper and lower opposing edges and two opposing side edges, onto a sheet of the pre-filter media 2915, which has upper and lower opposing edges and two opposing side edges. The upper edge of the pre-filter media 2915 is folded over the upper edge of the rigidized backing 2920 and heat sealed to hold it in place. The heat seals are generally indicated by numeral 2950. Similarly, the lower edge of the pre-filter media 2915 is folded over the lower edge of the rigidized backing 2920 and heat sealed to hold it in place.

Figure 23C:
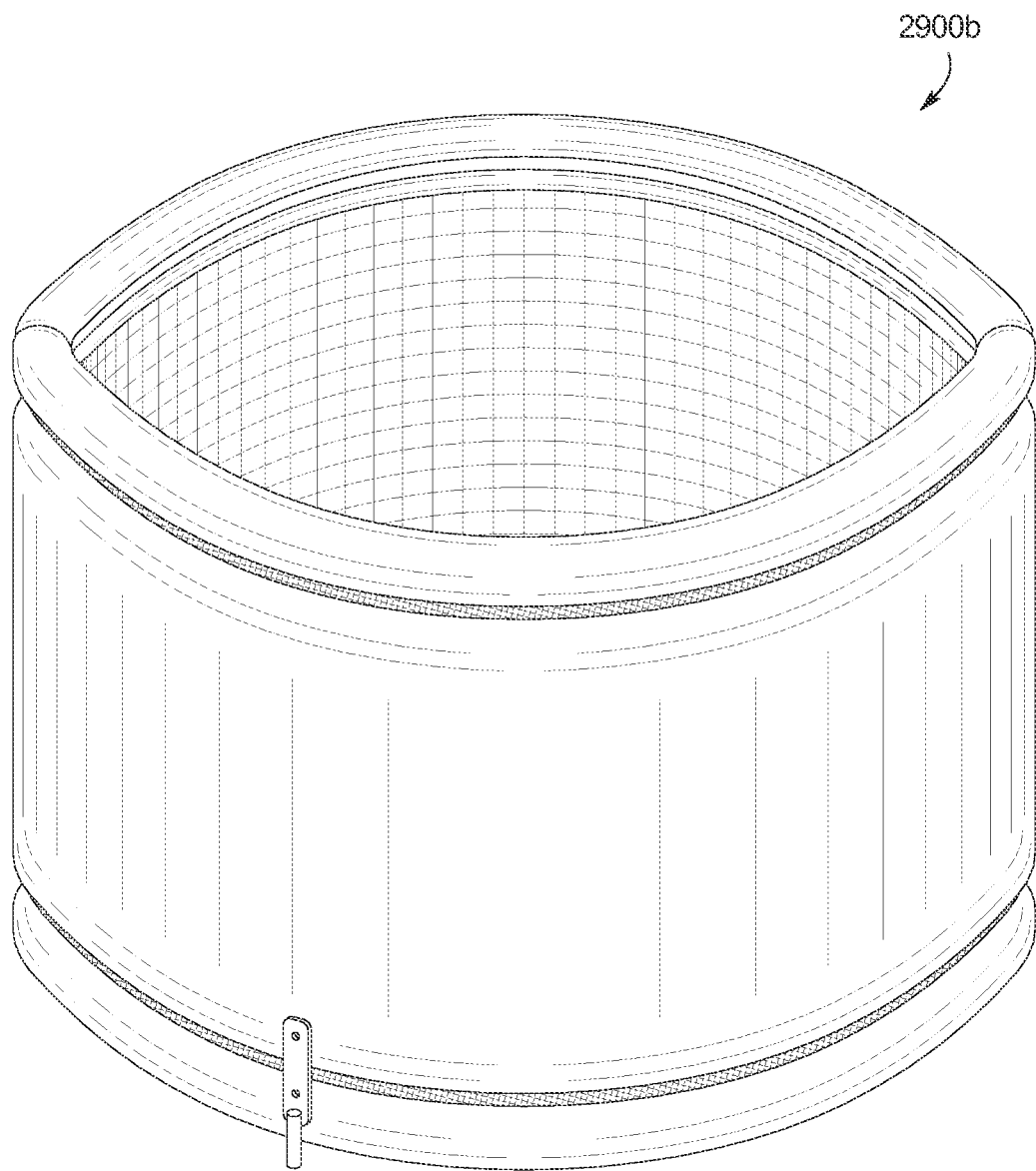
FIG. 23C is a top perspective view of another example pre-filter.

This above process is performed twice, resulting in two sheets of rigidized pre-filter media 2910 and 2930. The pre-filter is formed by sewing the corresponding side edges of the two sheets of rigidized pre-filter media 2910 and 2930 to one another to form an annular or ring-shaped structure (as shown in FIG. 23A) or an oval or fish-eye structure (as shown in FIG. 23C) such that the two sewed side seams 2970*a* and 2970*b* run lengthwise down the full height of the pre-filter 2900, the rigidized backing 2920 and 2940 forms the interior surface of the pre-filter 2900, and the pre-filter media 2915 and 2935 forms the exterior surface of the pre-filter 2900. The formed pre-filter 2900 includes an upper edge formed by upper edges 2912 and 2932 of the sheets of rigidized pre-filter media 2910 and 2930, and a lower edge formed by lower edges 2914 and 2934 of the sheets of rigidized pre-filter media 2910 and 2930.

Figure 23D:
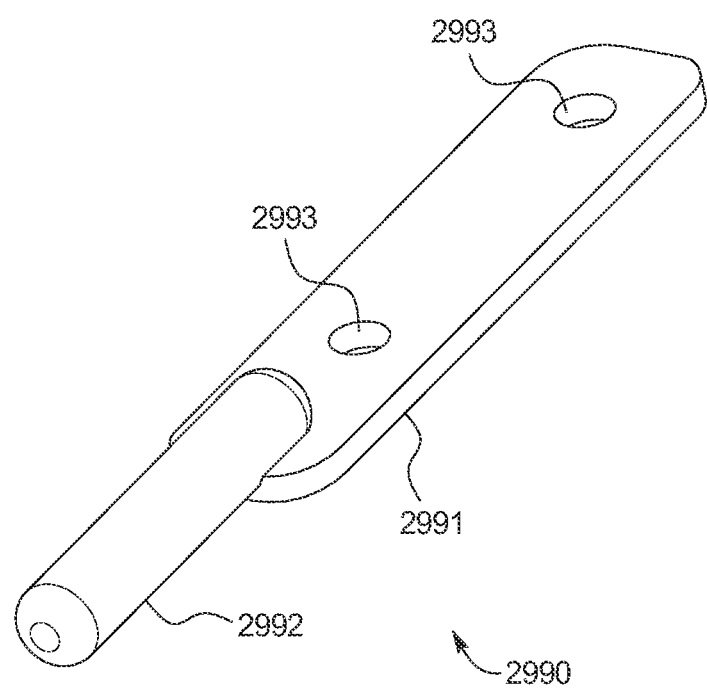
FIG. 23D is a top perspective view of the pre-filter limit switch actuator of the pre-filter of FIG. 23A.

In this example embodiment, as shown in FIGS. 23A and 23D, the pre-filter includes a pre-filter limit switch actuator 2990 (such as a plastic piece). The pre-filter limit switch actuator 2990 includes a rectangular base 2991 and an actuator 2992 extending therefrom. The base 2991 defines a plurality of attachment openings 2993 therethrough. In this embodiment, the pre-filter limit switch actuator 2990 is attached to the exterior of the pre-filter via the attachment openings 2993 (such as by sewing, adhesive, fastener, or any other suitable manner of attachment) such that the pre-filter limit switch actuator 2992 extends below the lower edge of the pre-filter 2900 formed by the lower edges 2914 and 2934 of the sheets of rigidized pre-filter material 2910 and 2930. The pre-filter sensor limit switch actuator 2990 is sized to actuate the pre-filter limit switch, as described above, which enables the air filtration device to determine whether an acceptable pre-filter is installed. It should be appreciated that the pre-filter limit switch actuator may take any suitable shape, be made of any suitable material, and attached at any suitable location on the pre-filter, such as the interior of the pre-filter.

In this example embodiment, the pre-filter media is a polyspun material, though it should be appreciated that any suitable filter media may be employed. Additionally, in this example embodiment, the rigidized backing includes nylon mesh, though it should be appreciated that any suitable material may be employed, such as a material including vertical, horizontal, or diagonal boning. In this example embodiment, the combination of the polyspun material and the nylon mesh renders the pre-filter flexible enough to fold flat for shipping but rigid enough to support itself and to enable the pre-filter to be slid over and onto the HEPA filter. In other embodiments, a single sheet of rigidized pre-filter media is created and formed into an annular or oval-shaped structure by sewing the two sides of that sheet of rigidized pre-filter media together. That is, in such embodiments, the formation of the pre-filter causes the pre-filter to include a single seam. It should be appreciated that the sides of the rigidized pre-filter media may be joined in any suitable manner other than or in addition to sewing, such as by a heat seal or adhesive.

As best illustrated in FIGS. 24A, 24B, 24C, and 24D, the locking cover 2200 includes a generally circular base 2210 including a handle 2212 and a plurality of mounts 2220, 2230, and 2240 circumferentially spaced apart around the base 2210. Each of the mounts 2220, 2230, and 2240 includes a generally cylindrical surface 2221, 2231, and 2241, respectively, defining a locking cover mounting tab receiving cavity configured to receive one of the locking cover mounting tabs of the stabilizers (described above). Additionally, each of the mounts 2220, 2230, and 2240 includes an integrated latch strike to facilitate the use of the latches mounted to the stabilizers.

Figure 24A:
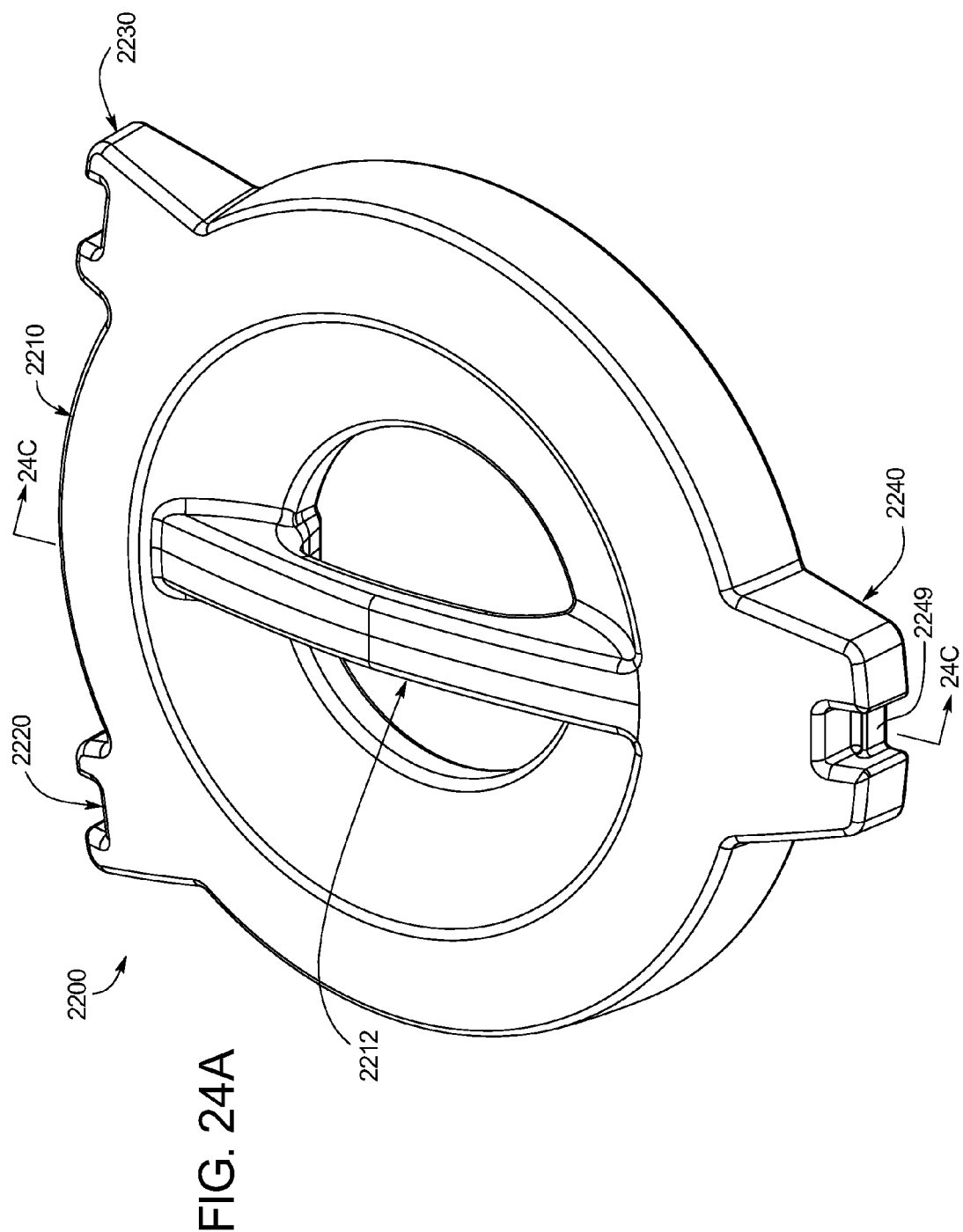
FIG. 24A is a top perspective view of the locking cover of the portable industrial air filtration device of FIG. 12A.
Figure 24B:
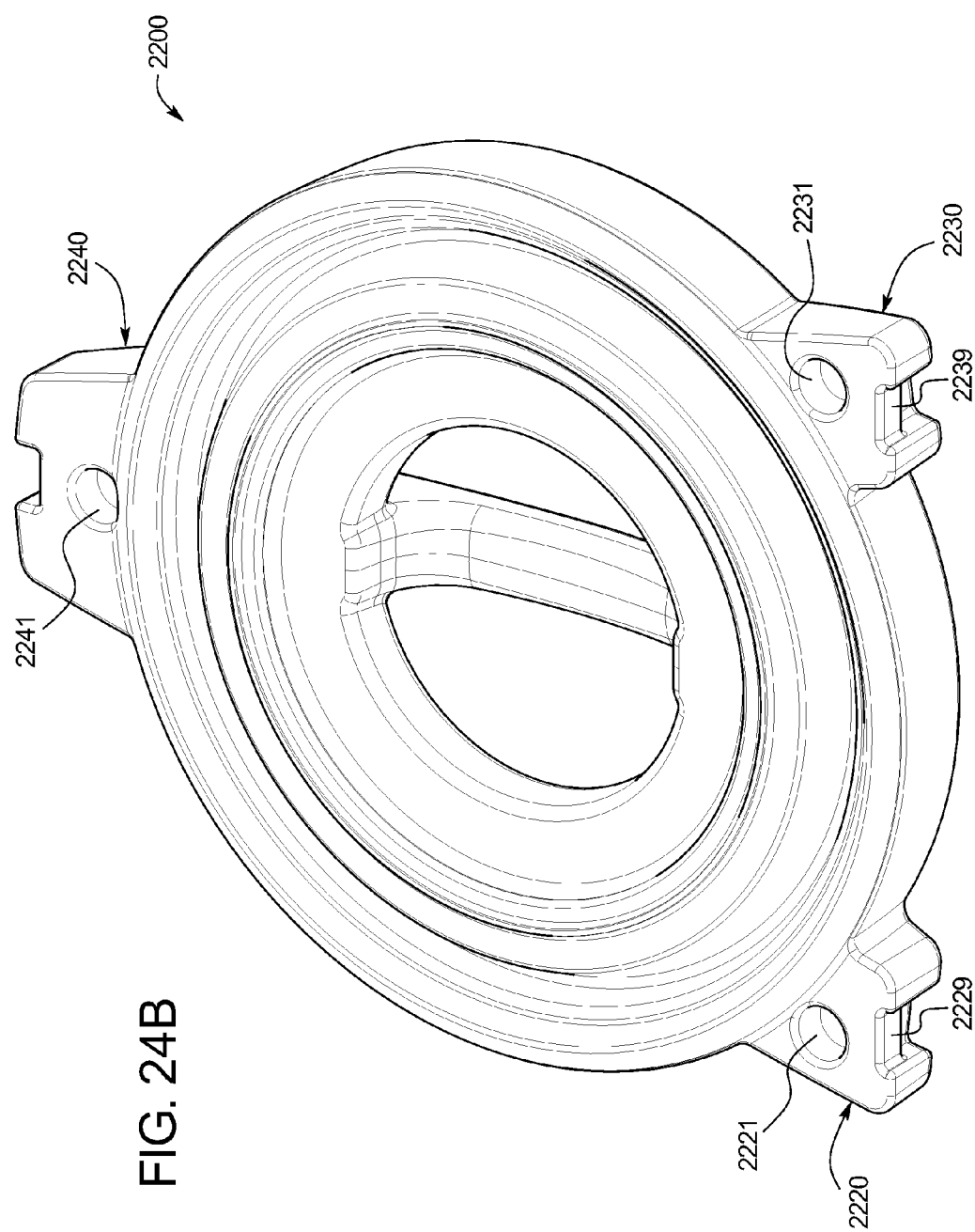
FIG. 24B is a bottom perspective view of the locking cover of FIG. 24B.
Figure 24C:
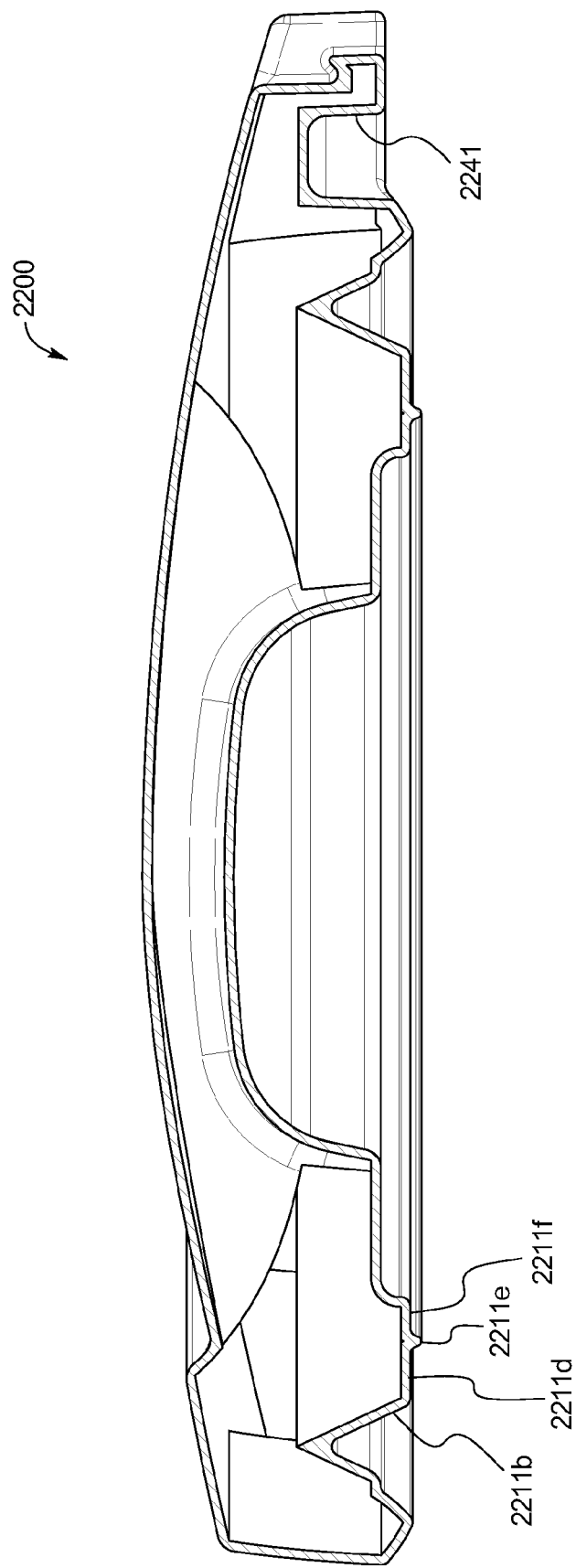
FIG. 24C is a side cross-sectional view of the locking cover of FIG. 24A taken substantially along line 24C-24C of FIG. 24A.
Figure 24D:
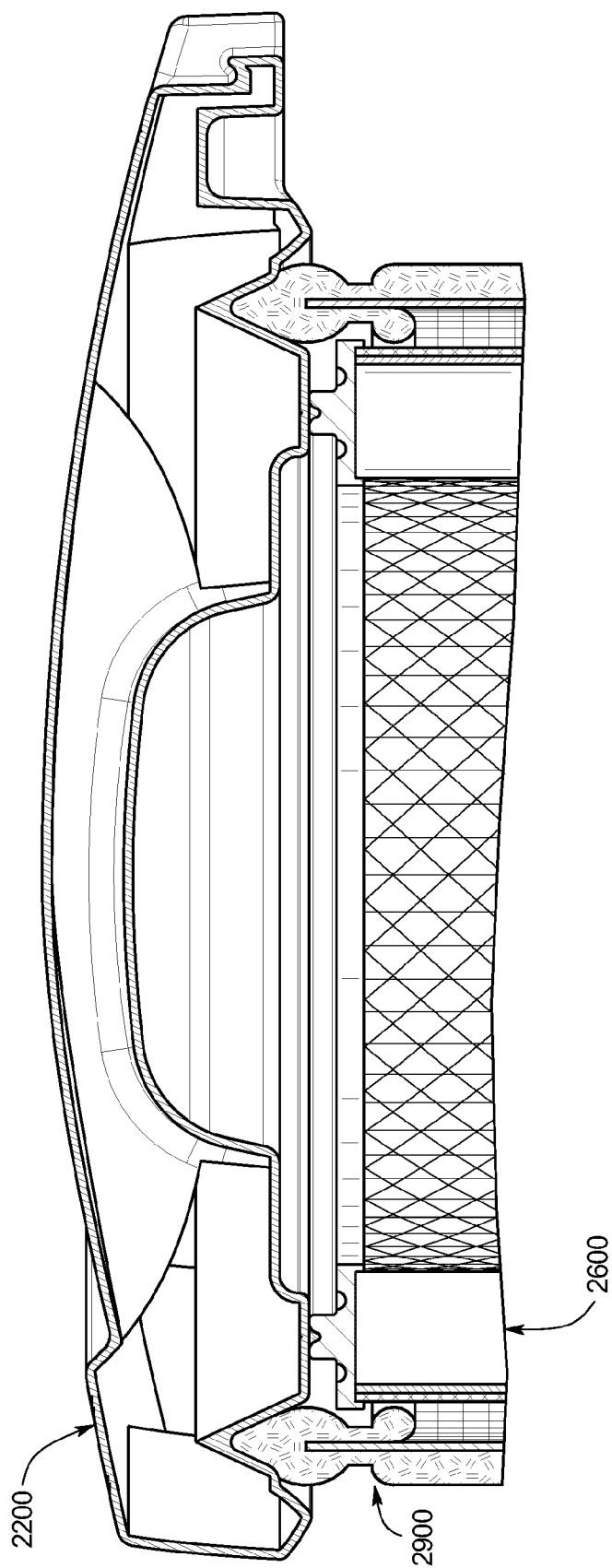
FIG. 24D is the side cross-sectional view of FIG. 24C including the pre-filter and the HEPA filter.

As best shown in FIGS. 24C and 24D, the underside of the locking cover 2200 includes a surface 2211*b* having a "inverted V-shaped" cross-section that defines a pre-filter securing channel around a vertical axis through the center of the locking cover 2200. The pre-filter 2900 is mounted to the locking cover by being press-fit into the pre-filter mounting channel. The underside of the locking cover 2200 also includes a plurality of generally flat annular surfaces 2211*d* and 2211*f* that are connected by a downwardly-protruding sealing rib 2211*e* (with respect to the orientation shown in FIGS. 24C and 24D).

In this example embodiment, the locking cover is a rotationally molded plastic component. It should be appreciated, however, that the locking cover may be made of any suitable material or materials or manufactured in any suitable manner or manners.

2. Assembly

In this example embodiment, each fastener receiving opening of the lower housing component 2100 either: (a) is a threaded fastener receiving opening configured to receive a threaded fastener, or (b) includes an integrated threaded insert (formed into the component or inserted after the component is formed) configured to receive a threaded fastener. It should be appreciated, however, that any suitable fastening mechanisms may be employed to attach the components of the air filtration device to one another.

Figure 15:
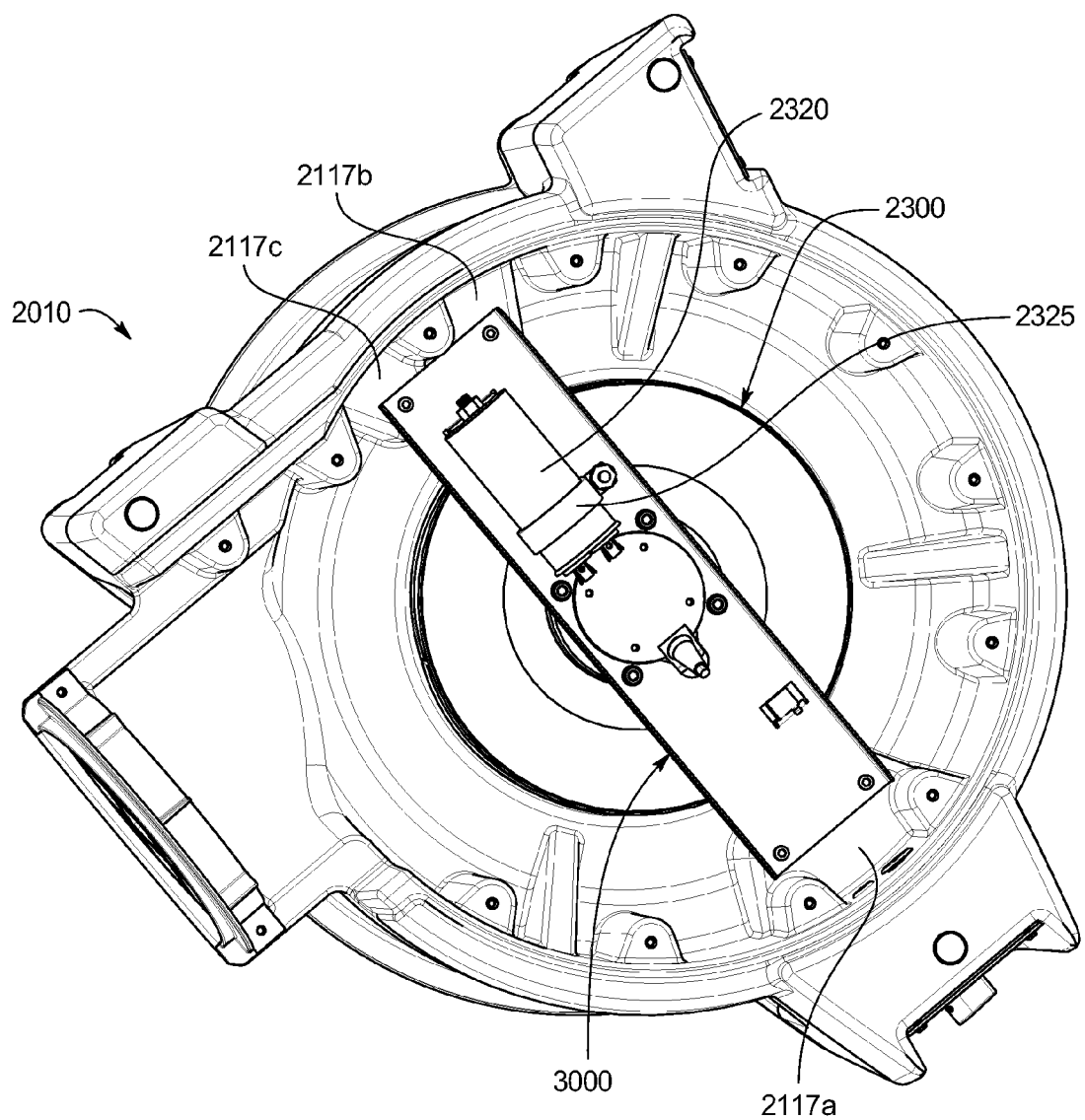
FIG. 15 is a bottom perspective view of the fan assembly mounted to the fan assembly mounting bracket secured to the lower housing component of the portable industrial air filtration device of FIG. 12A.

As best illustrated in FIG. 15, the fan assembly 2300 is attached to the fan assembly mounting bracket 3000 by: (a) inserting a portion of the bottom of the fan assembly 2300 through the fan assembly receiving opening 3040 of the fan assembly mounting bracket 3000, and (b) inserting fasteners through the fastener receiving openings 3040 of the fan assembly mounting bracket 3000 and threading those fasteners into fastener receiving openings of the fan assembly 2300.

As also best illustrated in FIG. 15, the motor capacitor 2320 is attached to the fan assembly mounting bracket 3000 by: (a) attaching one end of the motor capacitor 2320 to the fan motor capacitor mounting bracket 3020, such as via any suitable fastener(s); (b) wrapping a fan motor capacitor body securer 2325 around a portion of the body of the fan motor capacitor 2320; and (c) attaching the fan motor capacitor body securer 2325 to the fan assembly mounting bracket 3000 via the fastener receiving opening 3032 using any suitable fastener(s). Although not shown, in this example embodiment, a fan speed sensor (described below) is attached to the fan speed sensor mounting bracket 3020 using any suitable fastener(s).

As also best illustrated in FIG. 15, the fan assembly mounting bracket 3000 is attached to the lower housing component 2100 within the fan assembly mounting chamber by inserting fasteners through the fastener receiving openings 3012 and threading those fasteners into corresponding fastener receiving openings of the fan assembly mounting bracket mounting surfaces 2117*a*, 2117*b*, and 2117*c* of the interior side surface 2116*a* of the base 2110.

The exhaust screen 2400 and the fan assembly mounting chamber cover 2500 are attached to the base 2110 by: (a) positioning the exhaust screen 2400 such that the flange 2453 is partially disposed within the exhaust screen mounting channel 2153, the base mounting surface 2454*a* abuts the exhaust screen mounting surface 2154 of the base 2110, and the base mounting surface 2455*a* abuts the exhaust screen mounting surface 2155 of the base 2110; (b) positioning the fan assembly mounting chamber cover 2500 such that the exhaust screen mounting surface 2554 abuts the fan assembly mounting chamber cover mounting surface 2454*b* of the exhaust screen 2400 and the exhaust screen mounting surface 2555 abuts the fan assembly mounting chamber cover mounting surface 2455*b* of the exhaust screen 2400; (c) inserting a fastener through the fastener receiving opening 2524*a* of the fan assembly mounting chamber cover 2500 and the fastener receiving opening 2456 of the exhaust screen 2400 and threading that fastener into the fastener receiving opening 2154*a* of the base 2110; (d) inserting a fastener through the fastener receiving opening 2524*b* of the fan assembly mounting chamber cover 2500 and the fastener receiving opening 2457 of the exhaust screen 2400 and threading that fastener into the fastener receiving opening 2155*a* of the base 2110; and (e) inserting fasteners through the fastener receiving openings 2514 of the fan assembly mounting chamber cover 2500 and threading those fasteners into the corresponding fastener receiving openings 2118 of the base 2110.

It should be appreciated that once the fan assembly mounting chamber cover is attached to the base, the fan assembly mounting chamber cover substantially covers the fan assembly mounting chamber and encloses the fan assembly and the fan assembly mounting bracket within the fan assembly mounting chamber. Additionally, once the fan assembly mounting chamber cover is mounted to the base, the exhaust port upper portion of the base and the exhaust port lower portion of the fan assembly mounting chamber cover form an exhaust port that defines an exhaust channel.

In this example embodiment, the exhaust port is substantially parallel to a plane extending between the stabilizers 2120 and 2130. This angle of the exhaust port improves fan efficiency by eliminating turbulence and back pressure within the fan assembly mounting chamber. Further, the fact that the exhaust port is substantially parallel to a plane extending between the stabilizers 2120 and 2130 ensures that the air filtration device will expel the filtered air substantially parallel to the ground regardless of whether the air filtration device is operating in an upright orientation or on its side (i.e., resting on the stabilizers 2120 and 2130).

The air director 3100 is attached to the base 2110 by: (a) positioning the air director 3100 such that the air director mounting surfaces 3112b and 3114b abut the first and second opposing sections 2115b and 2115d, respectively, of the air director mounting surface 2115 of the exterior upper surface of the base 2110; (b) inserting a fastener through the fastener receiving opening 3110a of the air director 3100 and threading that fastener into the fastener receiving opening 2114a of the base 2110; and (c) inserting a fastener through the fastener receiving opening 3110c of the air director 3100 and threading that fastener into the fastener receiving opening 2114c of the base 2110. It should be appreciated that the use of the air director to direct air drawn through the filters into the fan assembly improves fan efficiency.

The HEPA filter securing bracket 2700 is mounted to the base 2110 by: (a) positioning the first and second filter securing bracket mounting tabs 2740 and 2750 atop the HEPA filter mounting bracket mounting surfaces 3112a and 3114a, respectively, of the air director 3100; (b) inserting a fastener through the fastener receiving opening 2740a of the HEPA filter mounting bracket and through the fastener receiving opening 3110b of the air director 3100 and threading that fastener into the fastener receiving opening 2114b of the base 2110; and (c) inserting a fastener through the fastener receiving opening 2750a of the HEPA filter mounting bracket and the fastener receiving opening 3110d of the air director 3100 and threading that fastener into the fastener receiving opening 2114d of the base 2110.

To install the HEPA filter 2600, the HEPA filter 2600 is positioned around the HEPA filter securing bracket 2700 and onto the base 2110 such that the lower end cap 2630 of the HEPA filter 2600 rests within the HEPA filter mounting channel. More specifically, as illustrated in FIG. 22, the HEPA filter 2600 is positioned such that the mounting surface 2630c of the lower end cap 2630 rests atop securing rib 2111e of the exterior upper surface of the base 2110.

The HEPA filter securing plate 2800 is then attached to the HEPA filter securing bracket 2700 by: (a) nesting the second annular bridging portion 2840 and the third annular portion 2850 of the HEPA filter securing plate 2800 within the HEPA filter securing plate nesting surface 2712 of the brace 2710 of the HEPA filter securing bracket 2700; and (b) inserting a fastener through the fastener receiving opening 2850a of the HEPA filter securing plate 2800 and threading that fastener into the fastener receiving opening 2715a of the nut 2715 of the HEPA filter securing bracket 2700.

As best shown in FIGS. 12H and 22, after the HEPA filter securing plate 2800 is attached to the HEPA filter securing bracket 2700, the HEPA filter 2600 is sandwiched between the HEPA filter securing plate 2800 and the base 2110, thus ensuring that the HEPA filter 2600 will not disengage from the base 2110 until the HEPA filter securing plate 2800 is removed. Further, mounting the HEPA filter securing plate 2800 to the HEPA filter securing bracket 2700 causes the material of the lower end cap 2630 proximate the mounting surface 2630c to compress around the securing rib 2111e, which creates an airtight seal between the lower end cap 2630 of the HEPA filter 2600 and the base 2110.

The pre-filter 2900 is installed by aligning the pre-filter limit switch actuator 2990 with the pre-filter limit switch actuator receiving opening 2175 of the base 2110 and press-fitting the pre-filter 2900 downward into the pre-filter securing channel of the base 2110 until the pre-filter limit switch actuator 2990 actuates the pre-filter limit switch.

The locking cover 2220 is attached to the lower housing component 2100 by: (a) positioning the locking cover 2200 atop the stabilizers such that the locking cover mounting tab receiving opening defined by the surface 2221 of the mount 2220 receives the locking cover mounting tab 2121 of the stabilizer 2120, the locking cover mounting tab receiving opening defined by the surface 2231 of the mount 2230 receives the locking cover mounting tab 2131 of the stabilizer 2130, and the locking cover mounting tab receiving opening defined by the surface 2241 of the mount 2240 receives the locking cover mounting tab 2141 of the stabilizer 2140; and (b) securing the latches attached to the stabilizers to their respective latch strikes of the locking cover 2200. Once the locking cover is attached to the lower housing component, the user may can or otherwise transport the air filtration device via the handle 2212.

As best shown in FIG. 24D, attaching the locking cover 2200 to the lower housing component 2100 causes: (a) the upper edges 2912 and 2932 of the pre-filter 2900 to be press-fit into the pre-filter securing channel of the locking cover 2200, which secures the pre-filter 2900 in place; and (b) the material of the upper end cap 2620 of the HEPA filter proximate the mounting surface 2620c to compress around the securing rib 2211e of the locking cover 2200, which creates an airtight seal between the upper end cap 2620 of the filter 2600 and the locking cover 2200.

In another embodiment, the locking cover is attached to one of the stabilizers of the lower housing component via a hinge. Thus, in this embodiment, the locking cover is not completely detachable from the lower housing component. Rather, to remove the filters in this embodiment, the latches are unlocked and the locking cover is rotated via the hinge off of the lower housing component to provide access to the filters. In other embodiments, the locking cover attaches to the stabilizers in any suitable manner, such as through the use of threaded fasteners.

In this example embodiment, to replace the pre-filter the user detaches the locking cover from the lower housing component, removes the old pre-filter, and installs a new pre-filter as described above, and attaches the locking cover to the lower housing component. To replace the HEPA filter, the user detaches the locking cover from the lower housing component, detaches the HEPA filter securing plate from the HEPA filter securing bracket, removes the old HEPA filter, installs anew HEPA filter as described above, attaches the HEPA filter securing plate to the HEPA filter securing bracket, and attaches the locking cover to the lower housing component. It should be appreciated that, in this example embodiment, the pre-filter and the HEPA filter are separately replaceable.

It should be appreciated that the geometry of the base, the locking cover, and the HEPA filter end caps that enable airtight sealing when the HEPA filter is installed eliminates need to include an additional gasket to ensure proper sealing. It should also be appreciated that the geometry of the pre-filter securing channels provides improved sealing when the pre-filter is installed. It should further be appreciated that the fact that: (a) the pre-filter securing channel of the lower housing component is lower relative to the HEPA filter mounting channel of the lower housing component, and (b) the pre-filter securing channel of the locking cover is higher than the HEPA filter mounting channel of the locking cover improves the accuracy of the measurements taken by the pressure sensors.

3. Electronics

Figure 25:
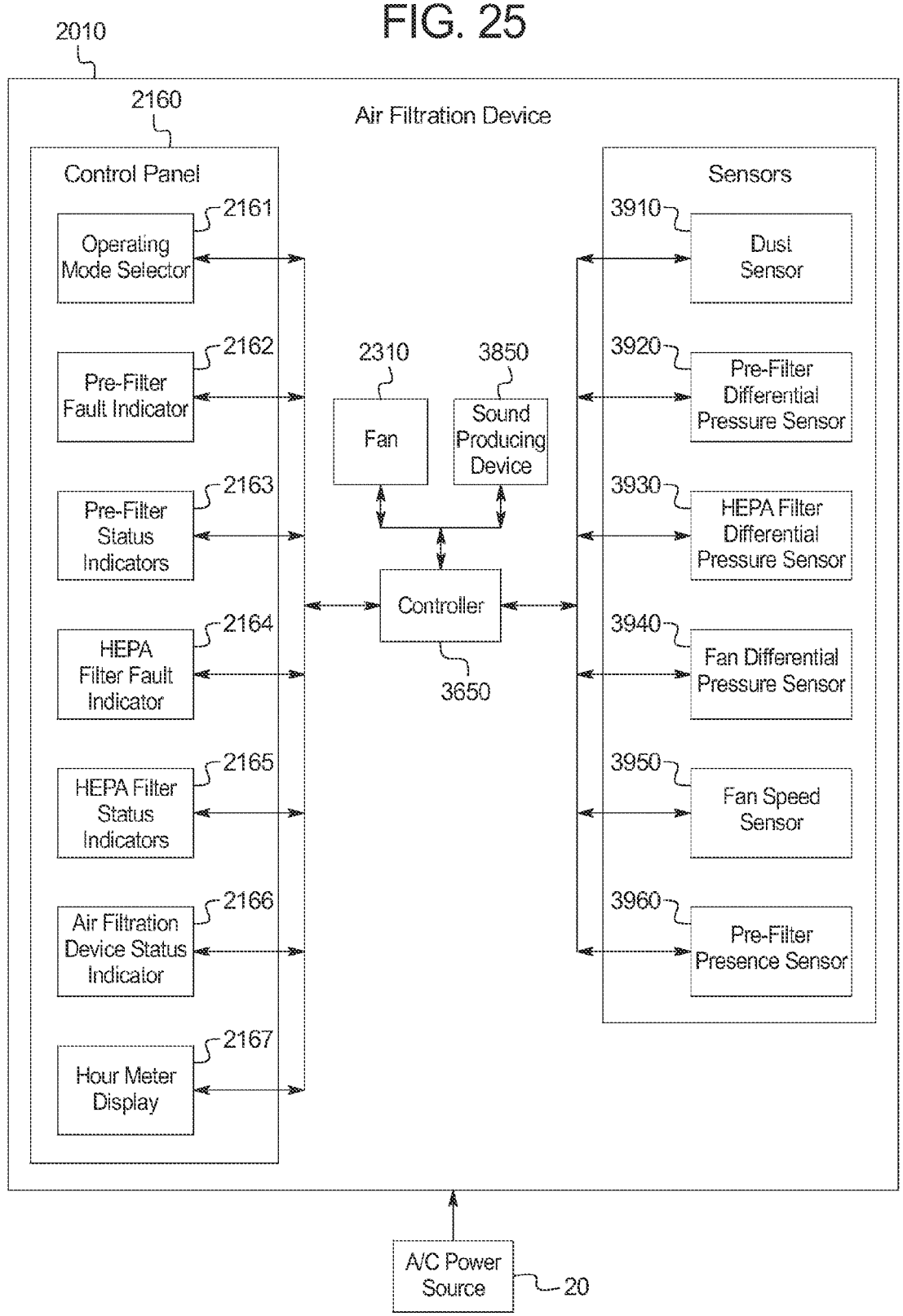
FIG. 25 is a block diagram showing certain electronic components of the portable industrial air filtration device of FIG. 12A.

FIG. 25 is a block diagram showing certain electronic components of this example embodiment of the air filtration device of the present disclosure. In this example embodiment, the air filtration device 2010 includes: (a) a controller 3650; (b) the fan 2310 of the fan assembly 2300; (c) at least one sound producing device 3850; (d) a control panel 2160 including or otherwise associated with: (i) an operating mode selector 2161, (ii) a pre-filter fault indicator 2162, (iii) a plurality of pre-filter status indicators 2163, (iv) a HEPA filter fault indicator 2164, (v) a plurality of HEPA filter status indicators 2165, (vi) an air filtration device status indicator 2166, and (vii) an hour meter display 2167; and (e) a plurality of sensors including: (i) a dust sensor 3910, (ii) a pre-filter differential pressure sensor 3920, (iii) a HEPA filter differential pressure sensor 3930, (iv) a fan differential pressure sensor 3940, (v) a fan speed sensor 3950, and (vi) a pre-filter presence sensor 3960. It should be appreciated that the air filtration device 2010 and each of the above-listed electronic components are powered by a power source, such as an A/C power source 20.

In this example embodiment, the controller 3650: (1) communicates with each of the other electronic components, (2) receives communications from each of the other electronic components, and (3) controls each of the other electronic components. The controller may be any suitable processing device or set of processing devices, such as a microprocessor, a microcontroller-based platform, a suitable integrated circuit, one or more application-specific integrated circuits (ASICs), or any other suitable circuit boards.

In certain embodiments, the controller of the air filtration device is configured to communicate with, configured to access, and configured to exchange signals with the at least one memory device or data storage device. In various embodiments, the at least one memory device includes random access memory (RAM), which can include non-volatile RAM (NVRAM), magnetic RAM (MRAM), ferroelectric RAM (FeRAM), and other suitable firms of RAM. In other embodiments, the at least one memory device includes read only memory (ROM). In certain embodiments, the at least one memory device includes flash memory and/or electrically erasable programmable read only memory (EEPROM). It should be appreciated that the at least one memory device may include any other suitable magnetic, optical, and/or semiconductor memory.

As generally described below, in various embodiments, the at least one memory device of the air filtration device stores program code and instructions executable by the controller of the air filtration device to control various processes performed by the air filtration device. The at least one memory device also stores other operating data, such as image data, event data, and/or input data. In various embodiments, part or all of the program code and/or the operating data described above is stored in at least one detachable or removable memory device including, but not limited to, a cartridge, a disk, a CD-ROM, a DVD, a USE memory device, or any other suitable non-transitory computer readable medium. In certain such embodiments, a user uses such a removable memory device to implement at least part of the present disclosure. In other embodiments, part or all of the program code and/or the operating data is downloaded to the at least one memory device of the air filtration device through any suitable data network (such as an internet, an intranet, or a cellular communications network).

In this example embodiment, the fan assembly 2300 is a RadiCal R2E250-RB02-15 centrifugal fan, though it should be appreciated that any other suitable fan assembly may be employed.

In this example embodiment, the sound producing device 3850 is a Mallory Sonalert Products Inc. PB-1224PE-05Q sound producing device, though it should be appreciated that any suitable sound producing device may be employed. In this example embodiment, as described in detail below, the air filtration device uses the sound producing device 3850 to output the following audible tones: (a) a major air filtration device malfunction tone when the air filtration device determines that a major air filtration device malfunction occurs (described below), (b) a filter change alarm tone when the air filtration device determines that the pre-filter occlusion level exceeds the pre-filter shutdown threshold and needs replacement and/or when the HEPA filter occlusion level exceeds the HEPA filter shutdown threshold and needs replacement (as described below), and (c) a filter fault indicator tone when the air filtration device determines that an acceptable pre-filter is not installed and/or an acceptable HEPA filter is not installed (as described below).

In this example embodiment, the major air filtration device malfunction tone, the filter change alarm tone, and the filter fault tone are different. More specifically: (a) the major air filtration device malfunction tone includes a continuous tone; (b) the filter change alarm tone includes a one tone combination (beep-pause, beep-pause); and (c) the filter fault tone includes a two tone combination (beep-beep-pause, beep-beep-pause). In this example embodiment, setting the air filtration device to the standby operating mode or powering the air filtration device off causes the controller to silence the sound producing device 3850.

i. Control Panel

The operating mode selector 2161 enables the user to select the operating mode in which the user desires the air filtration device to operate. More specifically, in this example embodiment, the operating mode selector 2161 enables the user to select one of the following operating modes: one of the manual fan speed setting operating modes, the automatic fan speed setting selection operating mode, or the standby operating mode, each of which are described below. In this example embodiment, the operating mode selector 2161 includes a control knob that the user may rotate to indicate the desired operating mode.

In another embodiment, the operating mode selector includes a touch screen display that enables the user to select the desired operating mode by touching an appropriate area of the touch screen. The air filtration device sets the operating mode to the desired operating mode after receiving such input. In another embodiment, the operating mode selector includes a display and one or more associated buttons. In this embodiment, the user selects an operating mode by using the one or more buttons to select the desired operating mode. The air filtration device sets the operating mode to the desired operating mode after receiving such input.

In another embodiment, the air filtration device enables the user to use a computing device, such as (but not limited to) a cellular phone, a tablet computing device, a laptop computing device, and/or a desktop computing device, to select the desired operating mode. That is, in this embodiment: (a) the computing device receives an input of the user's desired operating mode; (b) the computing device communicates the user's desired operating mode to the air filtration device, such as (but not limited to) through a wireless network connection, a cellular network connection, a wired network connection, an infrared connection, or a Bluetooth connection; and (c) the air filtration device receives the communication from the computing device and sets the operating mode to the desired operating mode. It should be appreciated that, in this embodiment, the air filtration device enables the user to remotely change the operating mode of the air filtration device, such as from across the room or across the jobsite, which saves the time it would otherwise take the user to travel to the air filtration device to change the operating mode (such as via the control knob).

In another embodiment, the air filtration device enables the user to use a remote control to select the desired operating mode. That is, in this embodiment: (a) the remote control receives an input of the user's desired operating mode; (b) the remote control communicates the user's desired operating mode to the air filtration device, such as through any of the above-listed connections; and (c) the air filtration device receives the communication from the remote control and sets the operating mode to the desired operating mode. In one such embodiment, the remote control also displays one or more of the pre-filter fault indicator, the HEPA filter fault indicator, the air filtration device status indicator, the pre-filter status indicators, and the HEPA filter status indicators.

The air filtration device employs the pre-filter fault indicator 2162 to indicate that there is a problem with the pre-filter. In this example embodiment, the pre-filter fault indicator 2162 includes a red light-emitting diode (LED). As described in detail below, the air filtration device lights the red LED of the pre-filter fault indicator when any of: (a) an acceptable pre-filter is not installed; and (b) the pre-filter occlusion level exceeds the pre-filter shutdown threshold (i.e., when the pre-filter needs replacement). It should be appreciated that any suitable pre-filter fault indicator(s) may be employed in addition to or instead of a red LED, such as (but not limited to): a different-colored light other than an LED, a display screen, a remote control display, a computing device, and/or a non-display indicator such as an audible tone.

The air filtration device employs the pre-filter status indicators 2163 to indicate the occlusion level of the pre-filter. In this example embodiment, the pre-filter status indicators 2163 include a green LED, a yellow LED, and a red LED. As described in detail below, the air filtration device: (a) lights the green LED of the pre-filter status indicators when the Clean pre-filter occlusion level range includes the determined pre-filter occlusion level; (b) lights the yellow of the pre-filter status indicators when the Slightly Occluded pre-filter occlusion level range includes the determined pre-filter occlusion level; (c) lights the red LED of the pre-filter status indicators when the Highly Occluded pre-filter occlusion level range includes the determined pre-filter occlusion level; and (d) lights the red LED of the pre-filter status indicators in a flashing or blinking manner when the pre-filter occlusion level range exceeds the pre-filter shutdown threshold (i.e., when the pre-filter needs replacement). It should be appreciated that any suitable pre-filter status indicators may be employed in addition to or instead of green, yellow, and red LEDs, such as (hut not limited to): a single LED that can display a plurality of different colors, different-colored LED, lights other than LEDs, one or more display screens, a remote control display, a computing device, and/or a non-display indicator such as an audible tone.

The air filtration device employs the HEPA filter fault indicator 2164 to indicate that there is a problem with the HEPA filter. In this example embodiment, the HEPA filter fault indicator 2164 includes a red LED. As described in detail below, the air filtration device lights the red LED of the HEPA filter fault indicator when any of: (a) an acceptable HEPA filter is not installed, and (b) the HEPA filter occlusion level exceeds the HEPA filter shutdown threshold (i.e., when the HEPA filter needs replacement). It should be appreciated that any suitable HEPA filter fault indicator(s) may be employed in addition to or instead of a red LED, such as (but not limited to): a different-colored LED, a light other than an LED, a display screen, a remote control display, a computing device, and/or a non-display indicator such as an audible tone.

The air filtration device employs the HEPA filter status indicators 2165 to indicate the occlusion level of the HEPA filter. In this example embodiment, the HEPA filter status indicators 2165 include a green LED, a yellow LED, and a red LED. As described in detail below, the air filtration device: (a) lights the green LED of the HEPA filter status indicators when the Clean HEPA filter occlusion level range includes the determined HEPA filter occlusion level; (b) lights the yellow LED of the HEPA filter status indicators when the Slightly Occluded HEPA filter occlusion level range includes the determined HEPA filter occlusion level; (c) lights the red LED of the HEPA filter status indicators when the Highly Occluded HEPA filter occlusion level range includes the determined HEPA filter occlusion level; and (d) lights the red LED of the HEPA filter status indicators in a flashing or blinking manner when the HEPA filter occlusion level range exceeds the HEPA filter shutdown threshold (i.e., when the HEPA filter needs replacement). It should be appreciated that any suitable HEPA filter status indicators may be employed in addition to or instead of green, yellow, and red LEDs, such as (but not limited to): a single LED that can display a plurality of different colors, different-colored LED, lights other than LEDs, one or more display screens, a remote control display, a computing device, and/or a non-display indicator such as an audible tone.

The air filtration device employs the air filtration device status indicator 2166 to indicate that the air filtration device is operating normally or to indicate that there is a problem with the air filtration device. In this example embodiment, the air filtration device status indicator 2166 includes an LED that can display a green or red light. As described in detail below, the air filtration device: (a) lights the LED of the air filtration device status indicator green when the air filtration device is operating in any of the manual fan speed setting operating modes, the automatic fan speed setting selection operating mode, or the standby operating mode; and (b) lights the LED of the air filtration device status indicator red when any of (i) an acceptable pre-filter is not installed; (ii) an acceptable HEPA filter is not installed; (iii)

the air filtration device is in shutdown mode and the automatic fan speed setting selection operating mode or the manual maximum fan speed setting operating mode is selected; (iv) the air filtration device is in shutdown mode, the manual medium fan speed setting operating mode or the manual minimum fan speed setting operating mode is selected, and the designated shutdown time period has expired; and (v) a major air filtration device malfunction occurs. In this example embodiment, whenever the air filtration device lights the LED of the air filtration device status indicator red, the power switch must be cycled "OFF" and back "ON" to clear the fault. In certain embodiments, when the air filtration device is in shutdown mode and the automatic fan speed setting selection operating mode or the manual maximum fan speed setting operating mode is selected such that the air filtration device lights the LED of the air filtration device status indicator red, the air filtration device clears the fault when the standby operating mode, the manual medium fan speed setting operating mode, or the manual minimum fan speed setting operating mode is selected.

It should be appreciated that any suitable air filtration device status indicators may be employed in addition to or instead of an LED, such as (but not limited to): different-colored LED, lights other than LEDs, a plurality of LEDs, one or more display screens, a remote control display, and/or a computing device.

The air filtration device tracks or counts the number of hours the fan is operating at any fan speed and displays that number of hours on the hour meter display 2167. In this example embodiment, the hour meter display 2167 includes a six digit LED display. Additionally, in this example embodiment, the air filtration device does not enable a user to reset the hour count; the air filtration device retains the hour count when the power is disconnected when the air filtration device is unplugged); and the air filtration device can roll over the hour counter once the hour meter display reaches a maximum displayed number of hours (such as 99999.9 hours for a six-digit hour meter display including one decimal place). It should be appreciated that the hour meter display may be any suitable indicator other than or in addition to a six-digit LED display.

In certain embodiments, the air filtration device communicates with a computing device of the user, such as (but not limited to) a cellular phone, a tablet computing device, a laptop computing device, and/or a desktop computing device, and causes the computing device to display certain information, such as one or more of: the pre-filter fault indicator, the HEPA filter fault indicator, the air filtration device status indicator, the pre-filter status indicators, the HEPA filter status indicators, and the selected operating mode. For instance, in one example, the user executes an application on the user's smartphone that syncs and communicates with the air filtration device. The user may then use the application to monitor the status of the air filtration device (such as by viewing one or more of the pre-filter fault indicator, the HEPA filter fault indicator, the air filtration device status indicator, the pre-filter status indicators, the HEPA filter status indicators, and the selected operating mode) remotely, such as from across the room or across the jobsite. Additionally, as described above, in certain embodiments the computing device of the user enables the user to input instructions to control certain aspects of the air filtration device and communicates such instructions to the air filtration device.

ii. Sensors

The dust sensor 3910 determines the level of dust or impurities in the air surrounding the air filtration device. In this example embodiment, the dust sensor includes an optical dust sensor, such as a Sharp GP2Y1010 AU0F optical dust sensor, though it should be appreciated that any suitable sensor may be employed to detect the level of dust in the air.

The pre-filter differential pressure sensor 3920 measures the differential pressure across the pre-filter. More specifically, the pre-filter differential pressure sensor includes two ports: (1) a first open port; and (2) a second port connected to the pressure sensor port 2170b located between the pre-filter and the HEPA filter (i.e., located downstream of the pre-filter and upstream of the HEPA filter). The pre-filter differential pressure sensor determines the differential pressure across the pre-filter by measuring the pressures at the first and second ports and determining the difference between those pressure measurements.

The HEPA filter differential pressure sensor 3930 measures the differential pressure across the HEPA filter. More specifically, the HEPA filter differential pressure sensor includes two ports: (1) a first port connected to the pressure sensor port 2170b located between the pre-filter and the HEPA filter (i.e., located downstream of the pre-filter and upstream of the HEPA filter); and (2) a second port connected to the pressure sensor port 2170a located between the HEPA filter and the fan assembly (i.e., located downstream of the HEPA filter and upstream of the fan assembly). The HEPA filter differential pressure sensor determines the differential pressure across the HEPA filter by measuring the pressures at the first and second ports and determining the difference between those pressure measurements.

The fan differential pressure sensor 3940 measures the differential pressure across the fan. More specifically, the fan differential pressure sensor includes two ports: (1) a first port connected to the pressure sensor port 2170a located between the HEPA filter and the fan assembly (i.e., located downstream of the HEPA filter and upstream of the fan assembly); and (2) a second port connected to the pressure sensor port 2119 located downstream of the fan assembly. The fan differential pressure sensor determines the differential pressure across the fan by measuring the pressures at the first and second ports and determining the difference between those pressure measurements.

In this embodiment, the differential pressure sensors are Freescale +/−1.45 PSI MPXV7002DP differential pressure sensors, though it should be appreciated that any suitable differential pressure sensors may be employed.

In other embodiments, rather than employing three differential pressure sensors, the air filtration device includes absolute pressure sensors and determines the appropriate differential pressures using measured absolute pressures. For instance, in one example embodiment, the air filtration device includes: (a) a first absolute pressure sensor including an open port, (b) a second absolute pressure sensor including a port connected to the pressure sensor port located between the pre-filter and the HEPA filter, (c) a third absolute pressure sensor including a port connected to the pressure sensor port located between the HEPA filter and the fan assembly, and (d) a fourth absolute pressure sensor including a port connected to the pressure sensor port located downstream of the fan assembly. In this example embodiment, the air filtration device: (a) determines the differential pressure across the pre-filter by determining the difference between the pressure measurements of the first and second absolute pressure sensors, (b) determines the differential pressure across the HEPA filter by determining the difference between the pressure measurements of the second and third absolute pressure sensors, and (c) determines the differential pressure across the fan by determining the difference between the pressure measurements of the third and fourth absolute pressure sensors.

The fan speed sensor 3950 measures the speed of the fan 2310, such as the number of revolutions per minute at which the fan 2310 is spinning. In this example embodiment, the fan speed sensor includes an optical fan speed sensor, such as an Optek OPB716Z sensor, though it should be appreciated that any suitable fan speed sensor may be employed. In another embodiment, the fan assembly includes an integrated fan speed sensor and communicates the fan speed to the controller. In this embodiment, the air filtration device does not include a separate fan speed sensor in addition to the integrated fan speed sensor of the fan assembly.

The pre-filter presence sensor 3960 determines whether an acceptable pre-filter is installed in the air filtration device, as described below with respect to the pre-filter presence detection process 6000. In this example embodiment, the lower housing component supports or otherwise includes a pre-filter presence sensor in the form of a pre-filter limit switch that is actuatable by the pre-filter limit switch actuator of the pre-filter. In another embodiment, the pre-filter presence sensor is a Hall Effect sensor that detects a metallic element included in the pre-filter, as described below. In another embodiment, the pre-filter presence sensor is a radio frequency identification (RFID) reader configured to read or recognize an RFID tag included in the pre-filter, as described below. It should be appreciated that any other suitable pre-filter presence sensor may be employed.

4. Operations

It should be appreciated that the below-described operations and processes may be performed regardless of the shapes of the filters. For instance, the below-described operations and processes may be performed in an air filtration device employing two substantially flat filters or semi-circular filters positioned one in front of the other.

a. Power-up Process

In this example embodiment, as noted above, the air filtration device includes a power switch 2176 that powers the air filtration device on and off when the air filtration device is connected to a power source (such as an A/C power source). When the air filtration device is connected to a power source and the air filtration device is powered on (i.e., the power switch is switched to "ON"), the air filtration device: (a) displays "CAL" on the hour meter display; (b) lights the LED of the air filtration device status indicator green; (c) lights the green LED of the pre-filter status indicators in a flashing manner; (d) lights the green LED of the HEPA filter status indicators in a flashing manner; and (e) after waiting (if necessary) for the fan speed to fall below 100 revolutions per minute, calibrates the pre-filter differential pressure sensor, the HEPA filter differential pressure sensor, and the fan differential pressure sensor by taking and averaging several pressure measurements.

After calibrating the differential pressure sensors: (a) if the standby operating mode is selected, the air filtration device enters full standby mode (described below); and (b) if the automatic fan speed setting selection operating mode or any of the manual fan speed setting operating modes is selected, the air filtration device enters that selected (non-standby) operating mode.

It should be appreciated that this is one example of the power-up process. In other embodiments, the power-up process may include different or additional steps and/or may not include certain of the above-described steps.

b. Fan Speed Settings

In this example embodiment, the air filtration device is operable at any of a plurality of different fan speed settings including at least a minimum fan speed setting and a maximum fan speed setting. Each fan speed setting corresponds to a different desired air flow rate through the air filtration device. For instance, in this example embodiment, the air filtration device is operable at any of three fan speed settings including: (a) a minimum fan speed setting that corresponds to a first desired air flow rate through the air filtration device, (b) a medium fan speed setting that corresponds to a second desired air flow rate through the air filtration device, and (c) a maximum fan speed setting that corresponds to a third desired rate of air flow through the air filtration device. In this example embodiment, the third desired air flow rate through the air filtration device is 600 cubic feet per minute, which is greater than the second desired air flow rate through the air filtration device, which is 400 cubic feet per minute, which is greater than the first desired air flow rate through the air filtration device, which is 200 cubic feet per minute.

It should be appreciated that, in other embodiments, the air filtration device may be operable at any suitable number of different fan speed settings. It should also be appreciated that the particular air flow rates associated with the different fan speed settings may be any suitable air flow rates.

It should also be appreciated that "current fan speed setting" as used herein refers to the fan speed setting at which the air filtration device is operating at a particular point in time. For instance: (a) at a particular point in time, if one of the manual fan speed setting operating modes (described below) is selected, the current fan speed setting (i.e., the fan speed setting at that particular point in time) is the fan speed setting associated with that selected manual fan speed setting operating mode; and (b) at a particular point in time, if the automatic fan speed setting selection operating mode (described below) is selected, the current fan speed setting (i.e., the fan speed setting at that particular point in time) is the fan speed setting selected by the air filtration device via the automatic fan speed setting selection process (described below).

c. Operating Modes

In this example embodiment, the air filtration device includes a plurality of different user-selectable operating modes including a plurality of different manual fan speed setting operating modes, an automatic fan speed setting selection operating mode, and a standby operating mode. As described above, the operating modes are selectable using the operating mode selector.

i. Manual Fan Speed Setting Operating Modes

In this example embodiment, the air filtration device includes a different user-selectable manual fan speed setting operating mode corresponding to each fan speed setting at which the air filtration device may operate. This enables the user to manually select and set the fan speed setting at which the user desires the air filtration device to operate.

In this example embodiment, the air filtration device includes: (a) a user-selectable manual minimum fan speed setting operating mode that, when selected by the user, sets the fan speed setting to the minimum fan speed setting (which corresponds to the first desired air flow rate through the air filtration device) and causes the air filtration device to operate at the minimum fan speed setting; (b) a user-selectable manual medium fan speed setting operating mode that, when selected by the user, sets the fan speed setting to the medium fan speed setting (which corresponds to the second desired air flow rate through the air filtration device)

and causes the air filtration device to operate at the medium fan speed setting; and (c) a user-selectable manual maximum fan speed setting operating mode that, when selected by the user, sets the fan speed setting to the maximum fan speed setting (which corresponds to the third desired air flow rate through the air filtration device) and causes the air filtration device to operate at the maximum fan speed setting.

In this example embodiment, when the air filtration device is operating in either the manual maximum fan speed setting operating mode or the manual medium fan speed setting operating mode such that the fan speed setting is either the maximum fan speed setting or the medium fan speed setting, the air filtration device employs dynamic fan speed control to adjust the fan speed to achieve the desired air flow rate through the air filtration device. Dynamic fan speed control is described in detail below.

On the other hand, in this example embodiment, when the air filtration device is operating in the manual minimum fan speed setting operating mode such that the fan speed setting is the minimum fan speed setting, the air filtration device operates the fan at a substantially constant, designated fan speed. In other words, when the air filtration device is operating in the manual minimum fan speed setting operating mode such that the fan speed setting is the minimum fan speed setting, the air filtration device does not employ dynamic fan speed control in this example embodiment. It should be appreciated, however, that in other embodiments the air filtration device employs dynamic fan speed control when the fan speed setting is the minimum fan speed setting.

In other embodiments, the air filtration device does not include a manual fan speed setting operating mode associated with each fan speed setting at which the air filtration device may operate. For instance, in one example embodiment in which the air filtration device includes five fan speed settings at which the air filtration device may operate, the air filtration device includes manual fan speed setting operating modes associated with a first, third, and fifth fan speed setting and does not include a manual fan speed setting operating mode associated with a second and fourth fan speed setting. In another embodiment, the air filtration device does not include any manual fan speed setting operating modes. In another embodiment, the air filtration device includes a single manual fan speed setting operating mode.

ii. Automatic Fan Speed Setting Selection Operating Mode

In this example embodiment, the air filtration device includes a user-selectable automatic fan speed setting selection operating mode. Generally, when the automatic fan speed setting selection operating mode is selected by the user, the air filtration device uses the dust sensor to measure the amount of dust in the air surrounding the air filtration device and, if necessary, automatically increases or decreases the fan speed setting to account for the amount of dust in the air. Thus, when operating in the automatic fan speed setting selection operating mode, the air filtration device dynamically and automatically adjusts the fan speed setting in real-time to account for varying levels of dust in the air surrounding the air filtration device, which eliminates the need for the user to guess the amount of dust in the air and manually select what the user believes to be the most effective and efficient fan speed setting in which to operate the air filtration device to remove that dust.

More specifically, in this example embodiment, each of the fan speed settings is associated with a different range of dust levels. The range of dust levels associated with a particular fan speed setting includes the dust levels that the air filtration device may most effectively and efficiently manage or clean when operating at that particular fan speed setting. For instance, in this example embodiment: (a) the minimum fan speed setting is associated with a first range of dust levels beginning at zero and ending at a maximum dust level associated with the minimum fan speed setting; (b) the medium fan speed setting is associated with a second range of dust levels beginning at a minimum dust level associated with the medium fan speed setting, which is greater than the maximum dust level associated with the minimum fan speed setting, and ending at a maximum dust level associated with the medium fan speed setting; and (c) the maximum fan speed setting is associated with a third range of dust levels beginning at a minimum dust level associated with the maximum fan speed setting, which is greater than the maximum dust level associated with the medium fan speed setting, and ending at a maximum measurable dust level, which is the highest dust level measurable by the dust sensor.

For instance, Table 1 below includes example ranges of dust levels associated with the minimum, medium, and maximum fan speed settings. In this example, the dust levels range from zero to ten. It should be appreciated that each fan speed setting may be associated with any suitable range of dust levels, and that each range of dust levels may include any suitable dust levels.

TABLE 1

Example Ranges of
Dust Levels Associated With
Example Fan Speed Settings

| Fan Speed Setting | Range of Dust Levels |
|---|---|
| Minimum | 0 to 3 |
| Medium | 4 to 6 |
| Maximum | 7 to 10 |

Thus, in this example: (a) when the measured dust level is 0, 1, 2, or 3, the air filtration device most effectively and efficiently manages or cleans the dust when operating at the minimum Jim speed setting; (b) when the measured dust level is 4, 5, or 6, the air filtration device most effectively and efficiently manages or cleans the dust when operating at the medium fan speed setting; and (c) when the measured dust level is 7, 8, 9, or 10, the air filtration device most effectively and efficiently manages or cleans the dust when operating at the maximum fan speed setting.

At each of a plurality of predetermined dust level sensing time intervals, such as every fifteen seconds (or any other suitable length of time), the air filtration device measures the dust level using the dust level sensor and determines whether the range of dust levels associated with the current fan speed setting includes the measured dust level. If the range of dust levels associated with the current fan speed setting includes the measured dust level, the air filtration device maintains the current fan speed setting. If the measured dust level exceeds the range of dust levels associated with the current fan speed setting, the air filtration device increases the fan speed setting. If the measured dust level falls below the range of dust levels associated with the current fan speed setting for a designated number of consecutive dust level sensing time intervals, the air filtration device decreases the fan speed setting.

Figure 26:
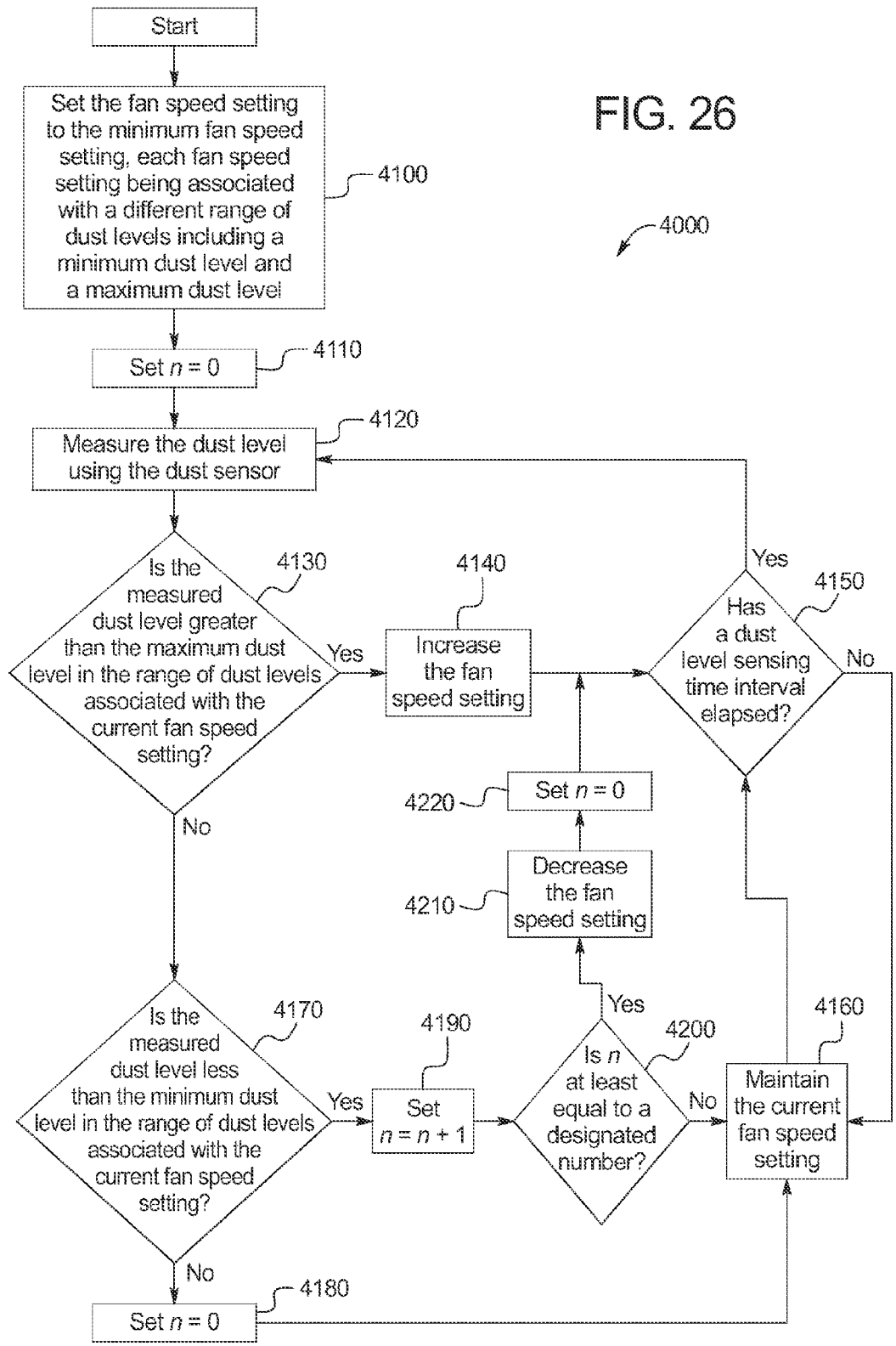
FIG. 26 illustrates a flowchart of one example embodiment of an automatic fan speed setting selection process.

FIG. 26 illustrates a flowchart of one example embodiment of an automatic fan speed setting selection process or method 4000 of the present disclosure. In various embodiments, the automatic fan speed setting selection process 4000 is represented by a set of instructions stored in one or more memories and executed by the controller. Although the automatic fan speed setting selection process 4000 is described with reference to the flowchart shown in FIG. 26, it should be appreciated that many other processes of performing the acts associated with this illustrated automatic fan speed setting selection process may be employed. For example, the order of certain of the illustrated blocks and/or diamonds may be changed, certain of the illustrated blocks and/or diamonds may be optional, and/or certain of the illustrated blocks and/or diamonds may not be employed.

The automatic fan speed setting selection process 4000 starts when the air filtration device receives a selection of the automatic fan speed setting selection operating mode. The air filtration device sets the fan speed setting to the minimum fan speed setting such that the current fan speed setting is the minimum fan speed setting, as indicated by block 4100. As explained above, each fan speed setting is associated with a different range of dust levels including a minimum dust level and a maximum dust level. The air filtration device sets the variable n equal to zero, as indicated by block 4110. The variable n represents a number of dust level sensing time intervals in which the measured dust level during that particular dust level sensing time interval is less than the minimum dust level in the range of dust levels associated with the current fan speed setting during that particular dust level sensing time interval. The air filtration device measures the dust level using the dust sensor, as indicated by block 4120.

The air filtration device determines if the measured dust level is greater than the maximum dust level in the range of dust levels associated with the current fan speed setting, as indicated by diamond 4130. If the air filtration device determines that the measured dust level is greater than the maximum dust level in the range of dust levels associated with the current fan speed setting, the air filtration device increases the fan speed setting, such as by one level from the minimum fan speed setting to the medium fan speed setting or from the medium fan speed setting to the maximum fan speed setting), as indicated by block 4140. The air filtration device determines whether a dust level sensing time interval has elapsed, as indicated by diamond 4150. If the air filtration device determines that the dust level sensing time interval has elapsed, the process 4000 returns to the block 4120. If, on the other hand, the air filtration device determines that the dust level sensing time interval has not elapsed, the air filtration device maintains the current fan speed setting, as indicated by block 4160, and the process 4000 returns to the diamond 4150.

Returning to the diamond 4130, if the air filtration device determines that the measured dust level is not greater than the maximum dust level in the range of dust levels associated with the current fan speed setting, the air filtration device determines if the measured dust level is less than the minimum dust level in the range of dust levels associated with the current fan speed setting, as indicated by diamond 4170. If the air filtration device determines that the measured dust level is not less than the minimum dust level in the range of dust levels associated with the current fan speed setting, the air filtration device sets the variable n equal to zero, and the process 4000 proceeds to the block 4160, described above.

If, on the other hand, the air filtration device determines that the measured dust level is less than the minimum dust level in the range of dust levels associated with the current fan speed setting, the air filtration device sets the variable n equal to n+1, as indicated by block 4190. The air filtration device determines if the variable n is at least equal to a designated number, as indicated by diamond 4200. If the air filtration device determines that the variable n is not at least equal to the designated number, the process 4000 proceeds to the block 4160. If, on the other hand, the air filtration device determines that the variable n is at least equal to the designated number, the air filtration device decreases the fan speed setting, such as by one level (e.g., from the maximum fan speed setting to the medium fan speed setting or from the medium fan speed setting to the minimum fan speed setting), as indicated by block 4220. The air filtration device sets the variable n equal to zero, and the process 4000 proceeds to the diamond 4150.

In this example embodiment, the designated number is four such that the air filtration device decreases the fan speed setting when the air filtration device determines that the measured dust level is less than the minimum dust level in the range of dust levels associated with the current fan speed setting for four consecutive dust level sensing time intervals. It should be appreciated, however, that the designated number may be any suitable number in other embodiments. It should also be appreciated that, in certain embodiments, the designated number is equal to one. Thus, in these embodiments, the air filtration device decreases the fan speed setting when the air filtration device determines that the measured dust level is less than the minimum dust level in the range of dust levels associated with the current fan speed setting.

In the example embodiment described above with respect to FIG. 26, the air filtration device increases or decreases the fan speed setting one level at a time. In other embodiments, however, the air filtration device may increase or decrease the fan speed level a plurality of levels at a time. For instance, in one example embodiment, if the measured dust level is not within the range of dust levels associated with the current fan speed setting, the air filtration device switches the fan speed setting to the fan speed setting associated with the range of dust levels that includes the measured dust level. For instance, if the current fan speed setting is the minimum fan speed setting and the measured dust level is included in the range of dust levels associated with the maximum fan speed setting, the air filtration device changes the fan speed setting to the maximum fan speed setting (bypassing the medium fan speed setting). Alternatively, if the current fan speed setting is the maximum fan speed setting and the measured dust level is included in the range of dust levels associated with the minimum fan speed setting for a designated number of consecutive dust level sensing time intervals, the air filtration device changes the fan speed setting to the minimum fan speed setting (bypassing the medium fax speed setting).

In other embodiments, when operating in the automatic fan speed setting selection operating mode, the air filtration device powers the fan off when the measured dust level is a designated dust level or within a designated range of dust levels. For instance, Table 2 below includes example ranges of dust levels associated with the off, minimum, medium, and maximum fan speed settings. In this example, the dust levels range from zero to ten. It should be appreciated that each fan speed setting may be associated with any suitable range of dust levels, and that each range of dust levels may include any suitable dust levels.

TABLE 2

Example Ranges of
Dust Levels Associated With
Example Fan Speed Settings

| Fan Speed Setting | Range of Dust Levels |
|---|---|
| Off | 0 |
| Minimum | 1 to 3 |
| Medium | 4 to 6 |
| Maximum | 7 to 10 |

Thus, in this example: (a) when the measured dust level is 0, the air filtration device powers the fan off because filtration is not required; (b) when the measured dust level is 1, 2, or 3, the air filtration device most effectively and efficiently manages or cleans the dust when operating at the minimum fan speed setting; (c) when the measured dust level is 4, 5, or 6, the air filtration device most effectively and efficiently manages or cleans the dust when operating at the medium fan speed setting; and (d) when the measured dust level is 7, 8, 9, or 10, the air filtration device most effectively and efficiently manages or cleans the dust when operating at the maximum fan speed setting. Thus, in this example embodiment, when operating in the automatic fan speed setting selection operating mode, the air filtration device only operates fan when the measured dust level is greater than zero (though it should be appreciated that the threshold minimum dust level that causes operation of the fan may be any suitable dust level).

iii. Standby Operating Mode

In this example embodiment, the air filtration device includes a user-selectable standby operating mode in which the air filtration device is powered on but in which the fan does not operate. If the air filtration device receives a selection of the standby operating mode upon power-up of the air filtration device, the air filtration device lights the LED of the air filtration device status indicator green. If the standby operating mode is selected after the air filtration device has determined the occlusion levels of the filters (described below) and has indicated such occlusion levels by lighting the appropriate pre-filter and HEPA filter status indicators, the air filtration device maintains those filter occlusion level indicators for a designated period, such as 10 seconds (or any other suitable period of time). Once the designated period expires, the air filtration device enters full standby operating mode. Once in full standby operating mode, when the automatic fan speed setting selection operating mode or any of the manual fan speed setting operating modes is selected, the air filtration device performs the filter occlusion level monitoring process (described below).

d. Dynamic Fan Speed Control

As noted above, in certain instances, the air filtration device employs dynamic fan speed control to adjust the fan speed to achieve a desired air flow rate through the air filtration device. Generally, when employing dynamic fan speed control, the air filtration device uses the differential pressure across the fan and the desired air flow rate through the air filtration device to determine a desired fan speed that achieves the desired flow rate through the air filtration device. This enables the air filtration device to maintain that desired air flow rate through the air filtration device by varying the fan speed as the pre-filter and the HEPA filter occlude during operation of the air filtration device, which prevents the air flow rate through the air filtration device from falling below the desired air flow rate and impairing the air filtration device's performance.

In this example embodiment, the air filtration device employs dynamic fan speed control when the current fan speed setting is one of at least one designated fan speed setting. Here, the maximum fan speed setting and the medium fan speed setting are designated fan speed settings and, therefore, the air filtration device employs dynamic fan speed control when the air filtration device is operating at either of these fan speed settings. The minimum fan speed setting is not a designated fan speed setting in this example embodiment and, therefore, the air filtration device does not employ dynamic fan speed control when the air filtration device is operating at the minimum fan speed setting. It should be appreciated that, in other embodiments: (a) all of the fan speed settings are designated fan speed settings; (b) a plurality, but less than all, of the fan speed settings are designated fan speed settings; (c) one of the fan speed settings is a designated fan speed setting; (d) none of the fan speed settings are designated fan speed settings; and (e) any particular fan speed setting(s) may be a designated fan speed setting(s).

It should be appreciated that, in this example embodiment, the air filtration device employs dynamic fan speed control when the current fan speed setting is one of the at least one designated fan speed setting regardless of whether the air filtration device is operating in the automatic fan speed setting selection operating mode or in one of the manual fan speed setting operating modes.

Figure 27:
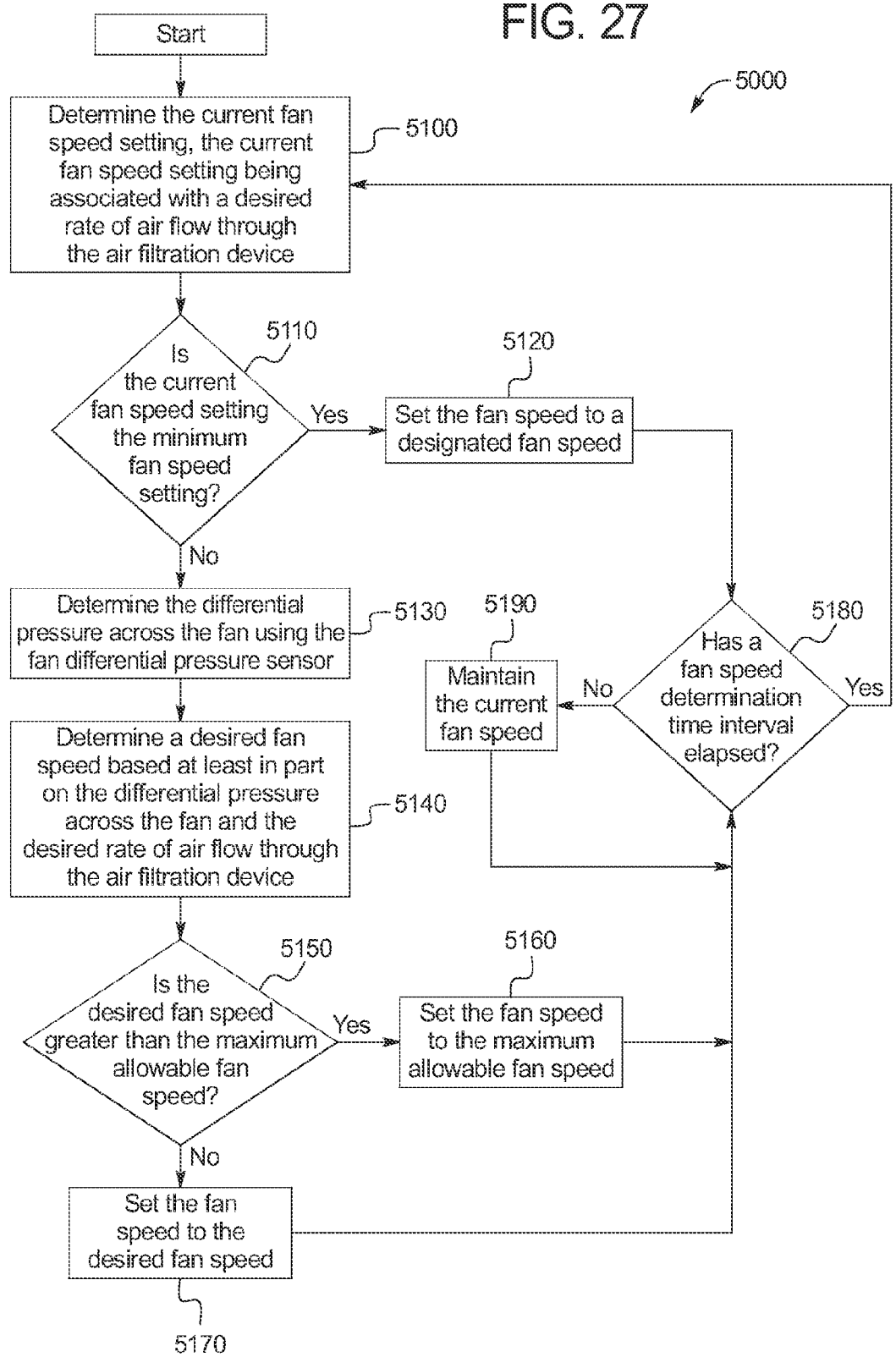
FIG. 27 illustrates a flowchart of one example embodiment of a dynamic fan speed control process.

FIG. 27 illustrates a flowchart of one example embodiment of a dynamic fan speed control process or method 5000 of the present disclosure. In various embodiments, the dynamic fan speed control process 5000 is represented by a set of instructions stored in one or more memories and executed by the controller. Although the dynamic fan speed control process 5000 is described with reference to the flowchart shown in FIG. 27, it should be appreciated that many other processes of performing the acts associated with this illustrated dynamic fan speed control process may be employed. For example, the order of certain of the illustrated blocks and/or diamonds may be changed, certain of the illustrated blocks and/or diamonds may be optional, and/or certain of the illustrated blocks and/or diamonds may not be employed.

The dynamic fan speed control process 5000 starts when the air filtration device begins operating in either the automatic fan speed setting selection operating mode or one of the manual fan speed setting operating modes. The air filtration device determines the current fan speed setting, as indicated by block 5100. As noted above, each fan speed setting is associated with or corresponds to a desired air flow rate through the air filtration device. The air filtration device determines if the current fan speed setting is the minimum fan speed setting, as indicated by diamond 5110. If the air filtration device determines that the current fan speed setting is the minimum fan speed setting, the air filtration device sets the fan speed to a designated fan speed, as indicated by block 5120.

The air filtration device determines if a fan speed determination time interval has elapsed, as indicated by diamond 5180. In this example embodiment, the fan speed determination time interval is 1 second, though it should be appreciated that any suitable time period may be employed. If the air filtration device determines that the fan speed determination time interval has elapsed, the process 5000 returns to the block 5100. If, on the other hand, the air filtration device determines that the fan speed determination time interval has not elapsed, the air filtration device maintains the current fan speed, as indicated by block 5190, and the process 5000 returns to the diamond 5180.

Returning to the diamond 5110, if the air filtration device determines that the current fan speed setting is not the minimum fan speed setting, the air filtration device determines the differential pressure such as a pressure drop) across the fan using the fan differential pressure sensor, as indicated by block 5130. The air filtration device determines a desired fan speed based at least in part on the differential pressure across the fan and the desired air flow rate through the air filtration device, as indicated by block 5140. The air filtration device determines if the desired fan speed is greater than a maximum allowable speed of the fan, as indicated by diamond 5150.

If the air filtration device determines that the desired fan speed is greater than the maximum allowable fan speed, the air filtration device sets the fan speed to the maximum allowable fan speed, as indicated by block 5160, and the process 5000 proceeds to the diamond 5180. If, on the other hand, the air filtration device determines that the desired fan speed is not greater than the maximum allowable fan speed, the air filtration device sets the fan speed to the desired fan speed, as indicated by block 5170. The process 5000 proceeds to the diamond 5180.

It should be appreciated that, in this example embodiment, the air filtration device determines the desired fan speed based at least in part on the differential pressure across the fan and the desired air flow rate through the air filtration device and does not (directly) use the pre-filter and HEPA filter occlusion levels (described below) to do so. In other words, in this example embodiment, the air filtration device determines the desired fan speed is independent of and without determining the pre-filter and HEPA filter occlusion levels.

In other embodiments, the air filtration device determines the desired fan speed based, at least in part, on the determined pre-filter and HEPA filter occlusion levels. That is, in these embodiments the determination of the desired fan speed directly depends on the determined pre-filter and HEPA filter occlusion levels.

In another embodiment, the air filtration device determines that a major air filtration device malfunction occurs when the desired fan speed exceeds the maximum fan speed.

e. Filter Presence Detection i. Pre-Filter Presence Detection

Figure 28:
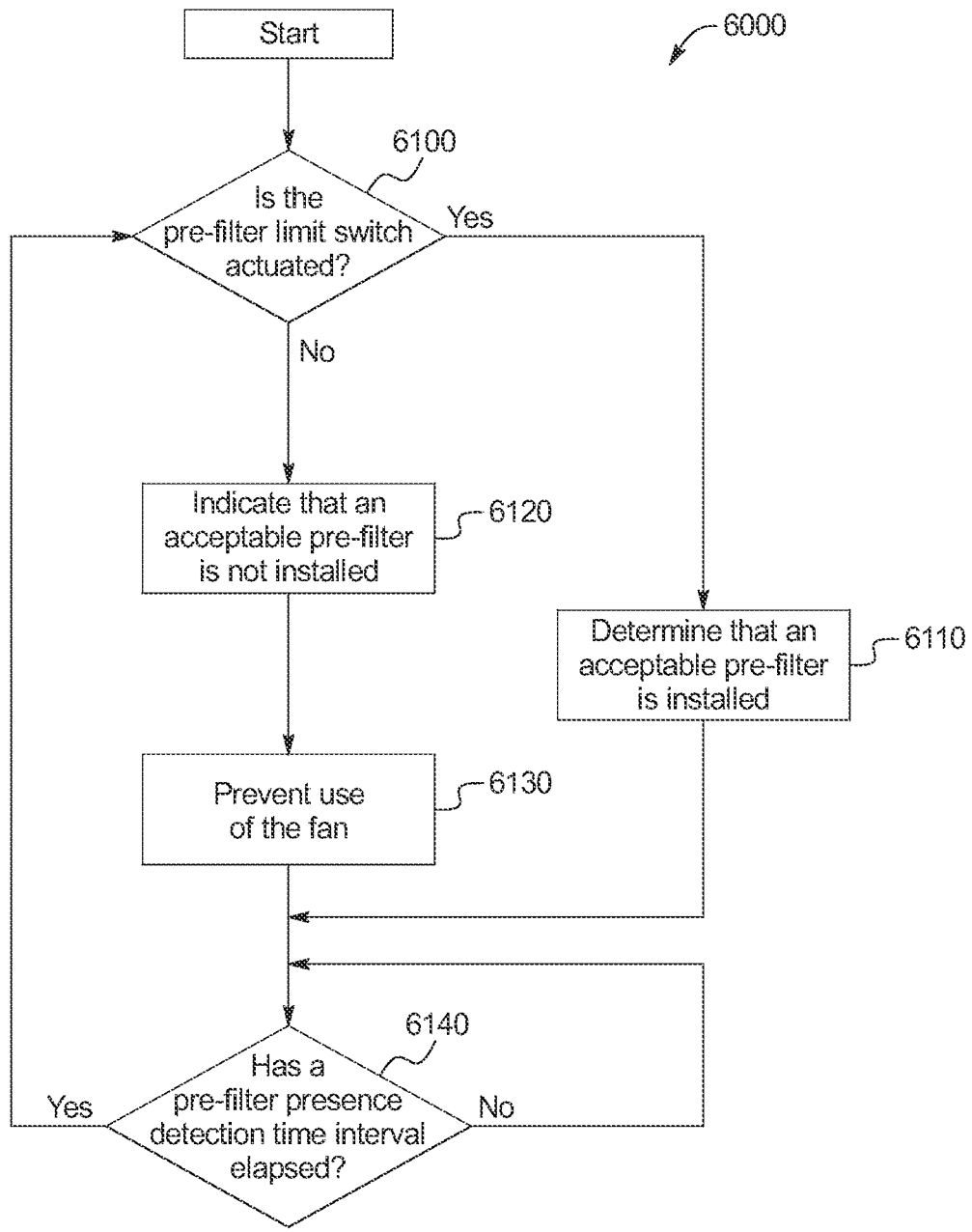
FIG. 28 illustrates a flowchart of one example embodiment of a pre-filter presence detection process.

In this example embodiment, the air filtration device determines whether an acceptable pre-filter is installed in the air filtration device using the pre-filter presence sensor, and prevents use of the fan when an acceptable pre-filter is not installed. FIG. 28 illustrates a flowchart of one example embodiment of a pre-filter presence detection process or method 6000 of the present disclosure, in various embodiments, the pre-filter presence detection process 6000 is represented by a set of instructions stored in one or more memories and executed by the controller. Although the pre-filter presence detection process 6000 is described with reference to the flowchart shown in FIG. 28, it should be appreciated that many other processes of performing the acts associated with this illustrated pre-filter presence detection process may be employed. For example, the order of certain of the illustrated blocks and/or diamonds may be changed, certain of the illustrated blocks and/or diamonds may be optional, and/or certain of the illustrated blocks and/or diamonds may not be employed.

The pre-filter presence detection process 6000 starts when the air filtration device receives a selection of one of the manual fan speed setting selection operating modes or the automatic fan speed setting selection operating mode. As described above, in this example embodiment, the lower housing component supports or otherwise includes a pre-filter limit switch that is actuatable by the pre-filter limit switch actuator of the pre-filter. The air filtration device determines whether the pre-filter limit switch is actuated, as indicated by diamond 6100. If the air filtration device determines that the pre-filter limit switch is actuated, the air filtration device determines that an acceptable pre-filter is installed, as indicated by block 6110, and the process 6000 proceeds to diamond 6140, described below. If, on the other hand, the air filtration device determines that the pre-filter limit switch is not actuated, the air filtration device indicates that an acceptable pre-filter is not installed, as indicated by block 6120, and the air filtration device prevents use of the fan, as indicated by block 6130. As indicated by the diamond 6140, once a pre-filter presence detection time interval elapses, the process 6000 returns to the diamond 6100. In this example embodiment, the pre-filter presence detection time interval is 1 second, though it should be appreciated that any suitable period of time may be employed.

In this example embodiment, the air filtration device indicates that an acceptable pre-filter is not installed by: (a) lighting the red LED of the pre-filter fault indicator, (b) lighting the LED of the air filtration device status indicator red, and (c) outputting the filter fault indicator tone. It should be appreciated that any other indications or combinations of indications may be employed instead of or in addition to the above-described indications.

In another embodiment, the air filtration device employs the pre-filter differential pressure sensor to determine whether an acceptable pre-filter is installed. In this embodiment, the air filtration device determines the differential pressure across the pre-filter using the pre-filter differential pressure sensor. The air filtration device determines if the differential pressure across the pre-filter is greater than or equal to a minimum allowable differential pressure across the pre-filter. If the air filtration device determines that the differential pressure across the pre-filter is greater than or equal to the minimum allowable differential pressure across the pre-filter, the air filtration device determines that an acceptable pre-filter is installed. If, on the other hand, the air filtration device determines that the differential pressure across the pre-filter is less than (i.e., not greater than or equal to) the minimum allowable differential pressure across the pre-filter, the air filtration device indicates that an acceptable pre-filter is not installed, and the air filtration device prevents use of the fan.

In another embodiment, the upper and lower edges of the pre-filter each include an integrated metallic element (such as a 0.003 inch thick×1 inch high element) that substantially spans the pre-filter's circumference. In this embodiment, the pre-filter presence sensor is a Hall Effect sensor that detects the metallic element. In this embodiment, if the Hall Effect sensor does not detect any metallic element, the air filtration device determines that an acceptable pre-filter is not installed and prevents use of the fan, and if the Hall Effect sensor detects a metallic element, the air filtration device determines that an acceptable pre-filter is installed.

In another embodiment, the pre-filter includes at least one RFID tag. In this embodiment, the pre-filter presence sensor is an RFID reader configured to read or recognize the RFID tag included in the pre-filter. In this embodiment, if the RFID reader does not read or recognize an RFID tag or reads or recognizes an improper RFID tag, the air filtration device determines that an acceptable pre-filter is not installed, and if the RFID reader reads or recognizes a proper RFID tag, the air filtration device determines that an acceptable pre-filter is installed. It should be appreciated that any other suitable pre-filter presence detection process may be employed.

ii. HEPA Filter Presence Detection

Figure 29:
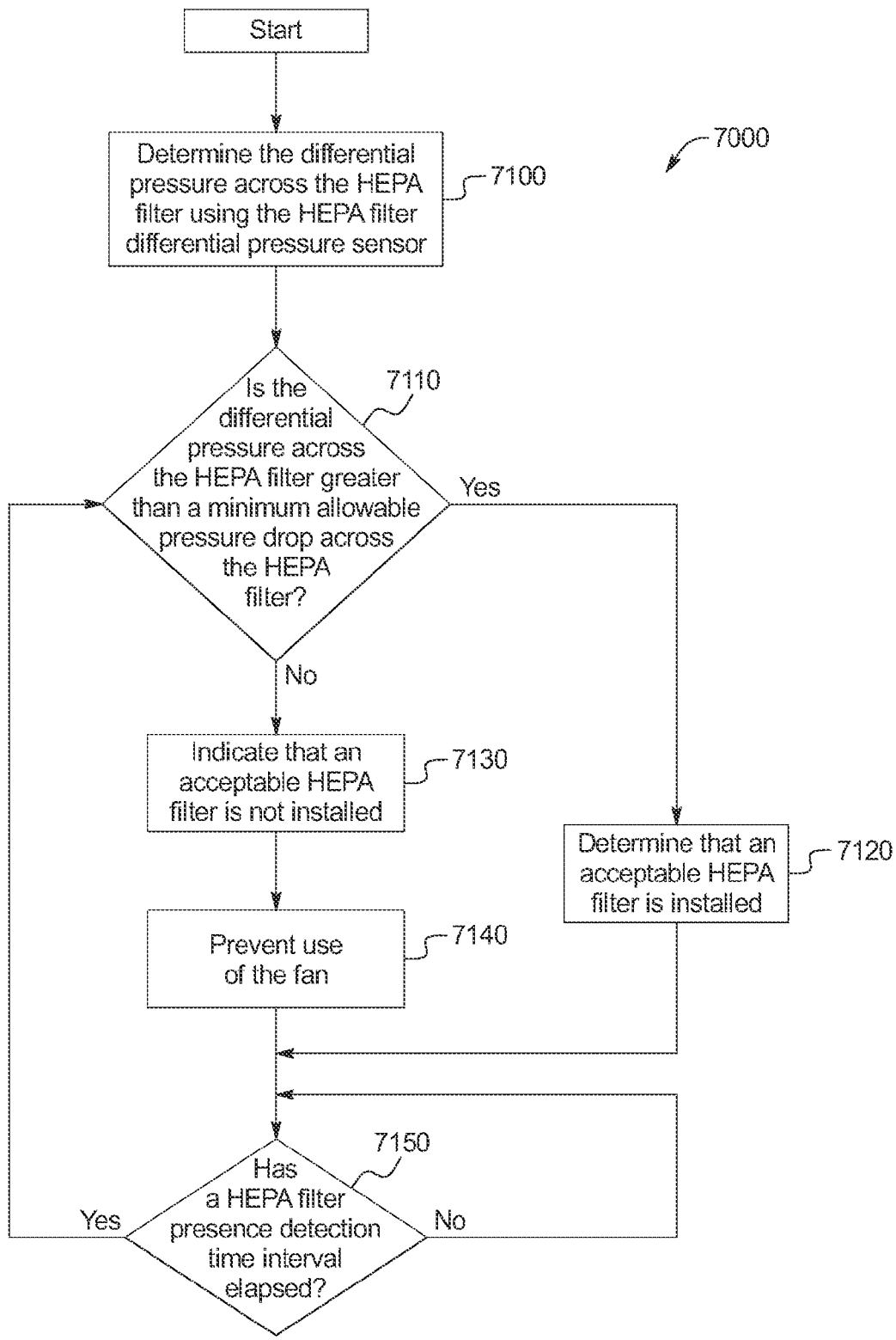
FIG. 29 illustrates a flowchart of one example embodiment of a HEPA filter presence detection process.

In this example embodiment, the air filtration device determines whether an acceptable HEPA filter is installed in the air filtration device using the differential pressure across the HEPA filter, and prevents use of the fan when an acceptable HEPA filter is not installed. FIG. 29 illustrates a flowchart of one example embodiment of a HEPA filter presence detection process or method 7000 of the present disclosure. In various embodiments, the HEPA filter presence detection process 7000 is represented by a set of instructions stored in one or more memories and executed by the controller. Although the HEPA filter presence detection process 7000 is described with reference to the flowchart shown in FIG. 29, it should be appreciated that many other processes of performing the acts associated with this illustrated HEPA filter presence detection process may be employed. For example, the order of certain of the illustrated blocks and/or diamonds may be changed, certain of the illustrated blocks and/or diamonds may be optional, and/or certain of the illustrated blocks and/or diamonds may not be employed.

The HEPA filter presence detection process 7000 starts when the air filtration device receives a selection of one of the manual fan speed setting selection operating modes or the automatic fan speed setting selection operating mode. The air filtration device determines the differential pressure (such as a pressure drop) across the HEPA filter using the HEPA filter differential pressure sensor, as indicated by block 7100. The air filtration device determines if the differential pressure across the HEPA filter is greater than or equal to a minimum allowable differential pressure across the HEPA filter, as indicated by diamond 7110. If the air filtration device determines that the differential pressure across the HEPA filter is greater than or equal to the minimum allowable differential pressure across the HEPA filter, the air filtration device determines that an acceptable HEPA filter is installed, as indicated by block 7120, and the process 7000 proceeds to diamond 7150, described below.

If, on the other hand, the air filtration device determines that the differential pressure across the HEPA filter is less than (i.e., not greater than or equal to) the minimum allowable differential pressure across the HEPA filter, the air filtration device indicates that an acceptable HEPA filter is not installed, as indicated by block 7130, and the air filtration device prevents use of the fan, as indicated by block 7140. As indicated by the diamond 7150, once a HEPA filter presence detection time interval elapses, the process 7000 returns to the block 7100.

In this example embodiment, the HEPA filter presence detection time interval is 1 hour, though it should be appreciated that any suitable period of time may be employed. Additionally, in this example embodiment, the minimum allowable differential pressure across the HEPA filter is equal to the differential pressure across 0.10 inches of water at a fan speed of 3,000 revolutions per minute, though it should be appreciated that any suitable minimum allowable differential pressure across the HEPA filter may be employed.

In this example embodiment, the air filtration device indicates that an acceptable HEPA filter is not installed by: (a) lighting the red LED of the HEPA filter fault indicator, (b) lighting the LED of the air filtration device status indicator red, and (c) outputting the filter fault indicator tone. It should be appreciated that any other indications or combinations of indications may be employed instead of or in addition to the above-described indications.

In another embodiment, the HEPA filter includes one or more integrated hollow pressure tubes positioned vertically among the pleats of the HEPA filter media. An end of each of these pressure tubes is flush with the bottom of the lower HEPA filter end cap. In this embodiment, the air filtration device includes one or more pressure sensors configured to detect the presence of the pressure tubes. Thus, in this embodiment, if a HEPA filter without such pressure tubes is installed, the air filtration device will determine that an improper HEPA filter is installed, and will not operate.

In another embodiment, the HEPA filter includes at least one RFID tag. In this embodiment, the air filtration device includes a HEPA filter presence sensor in the form of an RFID reader configured to read or recognize the RFID tag included in the HEPA filter. In this embodiment, if the RFID reader does not read or recognize an RFID tag or reads or recognizes an improper RFID tag, the air filtration device determines that an acceptable HEPA filter is not installed, and if the RFID reader reads or recognizes a proper RFID tag, the air filtration device determines that an acceptable HEPA filter is installed. It should be appreciated that any other suitable HEPA filter presence detection process may be employed.

As described below, in certain embodiments, the HEPA filter presence detection process is part of the filter occlusion level monitoring process.

f. Filter Occlusion Level Monitoring

In this example embodiment, the air filtration device monitors the occlusion levels of the pre-filter and the HEPA filter (i.e., the cleanliness levels of the pre-filter and the HEPA filter) and provides feedback regarding the filter occlusion levels to the user to enable the user to quickly and easily determine how clean (or dirty, blocked, or clogged) the pre-filter and the HEPA filter are. When the pre-filter occlusion level exceeds a pre-filter shutdown threshold, the HEPA filter occlusion level exceeds a HEPA filter shutdown threshold, or both, the air filtration device enters a shutdown mode in which the air filtration device eventually prevents any use of the fan until the appropriate filter(s) is (are) replaced. This ensures that the air filtration device does not operate for an extended period of time with a pre-filter and/or a HEPA filter so occluded as to inhibit effective and efficient operation of the air filtration device.

FIG. 30 illustrates a flowchart of one example embodiment of a filter occlusion level monitoring process or method 8000 of the present disclosure. In various embodiments, the filter occlusion level monitoring process 8000 is represented by a set of instructions stored in one or more memories and executed by t. Although the filter occlusion level monitoring process 8000 is described with reference to the flowchart shown in FIG. 30, it should be appreciated that many other processes of performing the acts associated with this illustrated filter occlusion level monitoring process may be employed. For example, the order of certain of the illustrated blocks and/or diamonds may be changed, certain of the illustrated blocks and/or diamonds may be optional, and/or certain of the illustrated blocks and/or diamonds may not be employed.

The filter occlusion level monitoring process 8000 starts after (such as a designated period of time after (such as 10 seconds or any other suitable time period)) the air filtration device receives a selection of the automatic fan speed setting selection operating mode or any of the manual fan speed setting operating modes either upon power-up of the air filtration device or when the air filtration device is in the full standby mode (described above). The air filtration device increases the fan speed to a differential pressure determination fan speed, such as 3,000 revolutions per minute or any other suitable fan speed, as indicated by block 8105. The air filtration device determines the differential pressure (such as a pressure drop) across the pre-filter using the pre-filter differential pressure sensor, as indicated by block 8100, and the differential pressure (such as a pressure drop) across the HEPA filter using the HEPA filter differential pressure sensor, as indicated by block 8110.

The air filtration device determines the pre-filter occlusion level based, at least in part, on the determined differential pressure across the pre-filter and the determined differential pressure across the HEPA filter, as indicated by block 8120. The air filtration device also determines the HEPA filter occlusion level based, at least in part, on the on the determined differential pressure across the pre-filter and the determined differential pressure across the HEPA filter, as indicated by block 8160. In this example embodiment, while determining the filter occlusion levels (which includes determining the differential pressures across the pre-filter and the HEPA filter), the air filtration device: (a) lights the yellow LED of the pre-filter status indicators in a blinking or flashing manner; (b) lights the yellow LED of the HEPA filter status indicators in a blinking or flashing manner; and (c) displays "tESt" in the hour meter display. This enables the user to quickly and easily determine when the air filtration device is measuring the filter occlusion levels. It should be appreciated that any other indications or combinations of indications may be employed instead of or in addition to the above-described indications.

The air filtration device determines if the determined pre-filter occlusion level exceeds a pre-filter shutdown threshold, as indicated by diamond 8130. The pre-filter shutdown threshold is a maximum allowable pre-filter occlusion level. Once the pre-filter occlusion level reaches the pre-filter shutdown threshold, the air filtration device may no longer efficiently and effectively clean the air (until the pre-filter is replaced). If the air filtration device determines that the determined pre-filter occlusion level exceeds the pre-filter shutdown threshold, the process 8000 proceeds to diamond 8200, described below.

If, on the other hand, the air filtration device determines that the determined pre-filter occlusion level does not exceed the pre-filter shutdown threshold, the air filtration device determines which of a plurality of different pre-filter occlusion level ranges includes the determined pre-filter occlusion level, as indicated by block 8140. In this example embodiment, each pre-filter occlusion level range is associated with a general indicator of the cleanliness of the pre-filter. For instance, in this example embodiment, the pre-filter occlusion level ranges include: (a) a first or Clean pre-filter occlusion level range, (b) a second or Slightly Occluded pre-filter occlusion level range, and (c) a third or Highly Occluded pre-filter occlusion level range. In this example embodiment, each occlusion level included in the Slightly Occluded pre-filter occlusion level range is greater than each occlusion level included in the Clean pre-filter occlusion level range, and each occlusion level included in the Highly Occluded pre-filter occlusion level range is greater than each occlusion level included in the Slightly Occluded pre-filter occlusion level range. The maximum occlusion level in the Highly Occluded pre-filter occlusion level range is the pre-filter shutdown threshold. For instance, Table 3 below includes example ranges of occlusion levels associated with the Clean, Slightly Occluded, and Highly Occluded pre-filter occlusion level ranges. In this example, the occlusion levels range from zero to ten. It should be appreciated that each cleanliness indicator may be associated with any suitable range of pre-filter occlusion levels, and that each range of pre-filter occlusion levels may include any suitable pre-filter occlusion levels.

TABLE 3

Example Occlusion Levels Associated With Example Pre-Filter Occlusion Level Ranges

| Cleanliness Indicator | Range of Pre-Filter Occlusion Levels |
| --- | --- |
| Clean | 0 to 7 |
| Slightly Occluded | 3 to 5 |
| Highly Occluded | 6 to pre-filter shutdown threshold |

Returning to the process 8000, the air filtration device indicates the pre-filter occlusion level range that includes the determined pre-filter occlusion level, as indicated by block 8150. In this example embodiment, the air filtration device does so by: (a) if the Clean pre-filter occlusion level range includes the determined pre-filter occlusion level, lighting the green LED of the pre-filter status indicators; (b) if the Slightly Occluded pre-filter occlusion level range includes the determined pre-filter occlusion level, lighting the yellow LED of the pre-filter status indicators; and (c) if the Highly Occluded pre-filter occlusion level range includes the determined pre-filter occlusion level, lighting the red LED of the pre-filter status indicators. This enables a user to quickly and easily determine how clean (or dirty) the pre-filter is. The process 8000 proceeds to the diamond 8200.

Turning to diamond 8170, the air filtration device determines if the determined HEPA filter occlusion level exceeds a HEPA filter shutdown threshold. The HEPA filter shutdown threshold is a maximum allowable HEPA filter occlusion level. Once the HEPA filter occlusion level reaches the HEPA filter shutdown threshold, the air filtration device may no longer efficiently and effectively clean the air (until the HEPA filter is replaced). If the air filtration device determines that the determined HEPA filter occlusion level exceeds the HEPA filter shutdown threshold, the process 8000 proceeds to the diamond 8200, described below.

If, on the other hand, the air filtration device determines that the determined HEPA filter occlusion level does not exceed the HEPA filter shutdown threshold, the air filtration device determines which of a plurality of different HEPA filter occlusion level ranges includes the determined HEPA filter occlusion level, as indicated by block 8180. In this example embodiment, each HEPA filter occlusion level range is associated with a general indicator of the cleanliness of the HEPA filter. For instance, in this example embodiment, the HEPA filter occlusion level ranges include: (a) a first or Clean HEPA filter occlusion level range, (b) a second or Slightly Occluded HEPA filter occlusion level range, and (c) a third or Highly Occluded HEPA filter occlusion level range. In this example embodiment, each occlusion level included in the Slightly Occluded HEPA filter occlusion level range is greater than each occlusion level included in the Clean HEPA filter occlusion level range, and each occlusion level included in the Highly Occluded HEPA filter occlusion level range is greater than each occlusion level included in the Slightly Occluded HEPA filter occlusion level range. The maximum occlusion level in the Highly Occluded HEPA filter occlusion level range is the HEPA filter shutdown threshold. For instance, Table 4 below includes example ranges of occlusion levels associated with the Clean, Slightly Occluded, and Highly Occluded HEPA filter occlusion level ranges. In this example, the occlusion levels range from zero to ten. It should be appreciated that each cleanliness indicator may be associated with any suitable range of HEPA filter occlusion levels, and that each range of HEPA filter occlusion levels may include any suitable HEPA filter occlusion levels.

TABLE 4

Example Occlusion Levels Associated With Example HEPA filter Occlusion Level Ranges

| Cleanliness Indicator | Range of HEPA Filter Occlusion Levels |
|---|---|
| Clean | 0 to 2 |
| Slightly Occluded | 3 to 5 |
| Highly Occluded | 6 to HEPA filter shutdown threshold |

Returning to the process 8000, the air filtration device indicates the HEPA filter occlusion level range that includes the determined HEPA filter occlusion level, as indicated by block 8190. In this example embodiment, the air filtration device does so by: (a) if the Clean HEPA filter occlusion level range includes the determined HEPA filter occlusion level, lighting the green LED of the HEPA filter status indicators; (b) if the Slightly Occluded HEPA filter occlusion level range includes the determined HEPA filter occlusion level, lighting the yellow LED of the HEPA filter status indicators; and (c) if the Highly Occluded HEPA filter occlusion level range includes the determined HEPA filter occlusion level, lighting the red LED of the HEPA filter status indicators. This enables a user to quickly and easily determine how clean (or dirty) the HEPA filter is. The process 8000 proceeds to the diamond 8200.

Turning to the diamond 8200, the air filtration device determines if: (a) the determined pre-filter occlusion level exceeds the pre-filter shutdown threshold, and/or (b) the determined HEPA filter occlusion level exceeds the HEPA filter shutdown threshold. If neither: (a) the determined pre-filter occlusion level exceeds the pre-filter shutdown threshold, nor (b) the determined HEPA filter occlusion level exceeds the HEPA filter shutdown threshold, as indicated by diamond 8210, once a filter occlusion level determination time interval elapses, the process 8000 returns to the block 8100. In this example embodiment, the filter occlusion level determination time interval is 60 minutes, though it should be appreciated that any suitable period of time may be employed.

If, on the other hand, at least one of (a) the determined pre-filter occlusion level exceeds the pre-filter shutdown threshold, and (b) the determined HEPA filter occlusion level exceeds the HEPA filter shutdown threshold, the air filtration device indicates that the pre-filter, the HEPA filter, or both need replacement, as indicated by block 8220. More specifically: (a) if the determined pre-filter occlusion level exceeds the pre-filter shutdown threshold, the air filtration device indicates that the pre-filter needs replacement; (b) if the determined HEPA filter occlusion level exceeds the HEPA filter shutdown threshold, the air filtration device indicates that the HEPA filter needs replacement; and (c) if the determined pre-filter occlusion level exceeds the pre-filter shutdown threshold and the determined HEPA filter occlusion level exceeds the HEPA filter shutdown threshold, the air filtration device indicates that both the pre-filter and the HEPA filter need replacement. The air filtration device enters the shutdown mode, as indicated by block 8230, and initiates a designated shutdown time period, as indicated by block 8240. In this example embodiment, the designated shutdown time period is 4 hours, though it should be appreciated that the designated shutdown time period may be any suitable time period.

The air filtration device determines if it is operating in the automatic fan speed setting selection operating mode or the manual maximum fan speed setting operating mode, as indicated by diamond 8250. If the air filtration device is not operating in either the automatic fan speed setting selection operating mode or the manual maximum fan speed setting operating mode, the process 8000 proceeds to block 8270, described below. If, on the other hand, the air filtration device is operating in the automatic fan speed setting selection operating mode or the manual maximum fan speed setting operating mode, the air filtration device powers down the fan, as indicated by block 8260.

The air filtration device prevents use of the automatic fan speed setting selection operating mode and prevents use of the manual maximum fan speed setting operating mode, as indicated by the block 8270. The air filtration device enables operation of the air filtration device in either the manual medium fan speed setting operating mode or the manual minimum fan speed setting operating mode, as indicated by block 8280. The air filtration device determines if the designated shutdown time period has expired, as indicated by diamond 8290. If the air filtration device determines that the designated shutdown time period has not expired, the process 8000 returns to the block 8280. If, on the other hand, the air filtration device determines that the designated shutdown time period has expired, the air filtration device powers down the fan, as indicated by block 8300, and prevents use of the fan, as indicated by block 8310. In other words, once the designated shutdown time period expires, the air filtration device prevents use of the automatic fan speed setting selection operating mode and any of the manual fan speed setting operating modes.

In this example embodiment, the air filtration device indicates that the pre-filter, the HEPA filter, or both need replacement in a variety of different manners. More specifically, in this example embodiment, if the pre-filter occlusion level exceeds the pre-filter shutdown threshold and the air filtration device is operating in the automatic fan speed setting selection operating mode or the manual maximum fan speed setting operating mode, the air filtration device indicates that the pre-filter needs replacement by: (a) lighting the red LED of the pre-filter status indicators in a flashing or blinking manner, (b) lighting the red LED of the pre-filter fault indicator, (c) lighting the LED of the air filtration device status indicator red, and (d) outputting the filter change alarm tone. In this example embodiment, if the pre-filter occlusion level exceeds the pre-filter shutdown threshold and the air filtration device is operating in the manual medium fan speed setting operating mode or the manual minimum fan speed setting mode, the air filtration device indicates that the pre-filter needs replacement by (a) lighting the red LED of the pre-filter status indicators in a flashing or blinking manner, (b) lighting the red LED of the pre-filter fault indicator, and (c) lighting the LED of the air filtration device status indicator green or keeping the LED of the air filtration device status indicator lit green. When the designated shutdown time period expires, the air filtration device: (a) lights the LED of the air filtration device status indicator red, and (b) outputs the filter change alarm tone while maintaining flashing the red pre-filter status indicator and lighting the red LED of the pre-filter fault indicator.

In this example embodiment, if the HEPA filter occlusion level exceeds the HEPA filter shutdown threshold and the air filtration device is operating in the automatic fan speed setting selection operating mode or the manual maximum fan speed setting operating mode, the air filtration device indicates that the HEPA filter needs replacement by: (a) lighting the red LED of the HEPA filter status indicators in a flashing or blinking manner, (b) lighting the red LED of the HEPA filter fault indicator, (c) lighting the LED of the air filtration device status indicator red, and (d) outputting the filter change alarm tone. In this example embodiment, if the HEPA filter occlusion level exceeds the HEPA filter shutdown threshold and the air filtration device is operating in the manual medium fan speed setting operating mode or the manual minimum fan speed setting mode, the air filtration device indicates that the HEPA filter needs replacement by: (a) lighting the red LED of the HEPA filter status indicators in a flashing or blinking manner, (b) lighting the red LED of the HEPA filter fault indicator, and (c) lighting the LED of the air filtration device status indicator green or keeping the LED of the air filtration device status indicator lit green. When the designated shutdown time period expires, the air filtration device: (a) lights the LED of the air filtration device status indicator red, and (b) outputs the filter change alarm tone while maintaining flashing the red HEPA filter status indicator and lighting the red LED of the HEPA filter fault indicator.

In this example embodiment, if the air filtration device receives an input to switch to the standby mode while the air filtration device is determining the pre-filter and HEPA filter occlusion levels, the air filtration device stops such determinations and shuts the fan down. The air filtration device restarts the filter occlusion level monitoring process once the air filtration device receives an input to switch from the standby mode into the automatic fan speed setting selection operating mode or any of the manual fan speed setting operating modes.

Further, in this example embodiment, if the air filtration device receives an input to switch from one of: (a) the automatic fan speed setting selection operating mode, and (b) one of the manual fan speed setting operating modes to another one of: (a) the automatic fan speed setting selection operating mode, and (b) one of the manual fan speed setting operating modes while the air filtration device is determining the pre-filter and HEPA filter occlusion levels, the air filtration device ignores this input until the determinations are complete. For instance, if the air filtration device receives an input to switch the air filtration device from the manual medium fan speed setting operating mode to the manual maximum fan speed setting operating mode while the air filtration device is determining the pre-filter and HEPA filter occlusion levels, the air filtration device does not switch from the manual medium fan speed setting operating mode to the manual maximum fan speed setting operating mode until such determinations are complete.

In another embodiment, the air filtration device prevents use of the fan once at least one of: (a) the determined pre-filter occlusion level exceeds the pre-filter shut down threshold, and (b) the determined HEPA filter occlusion level exceeds the HEPA filter shut down threshold. That is, in this embodiment, the air filtration device does not enable operation at any of the fan speed settings once the air filtration device determines that at least one of the filters needs replacement.

As noted above, in certain embodiments, the HEPA filter presence detection process is part of the filter occlusion level monitoring process. For instance, in one example embodiment, after determining the differential pressure across the HEPA filter using the HEPA filter differential pressure sensor (such as indicated by block 8110 of FIG. 30A), the air filtration device determines if the differential pressure across the HEPA filter is greater than a minimum allowable differential pressure across the HEPA filter (such as indicated by diamond 7110 of FIG. 29). If the air filtration device determines that the differential pressure across the HEPA filter is greater than the minimum allowable differential pressure across the HEPA filter, the air filtration device determines that an acceptable HEPA filter is installed (such as indicated by block 7120 of FIG. 29) and proceeds to determine the pre-filter and HEPA filter occlusion levels (such as indicated by blocks 8120 and 8160 of FIG. 30A) and the rest of the filter occlusion level monitoring process. If, on the other hand, the air filtration device determines that the differential pressure across the HEPA filter is not greater than the minimum allowable differential pressure across the HEPA filter, the air filtration device indicates than an acceptable HEPA filter is not installed (such as indicated by block 7130 of FIG. 29), prevents use of the fan (such as indicated by block 7140 of FIG. 29), and terminates the filter occlusion level monitoring process and the HEPA filter presence detection process.

g. Air Filtration Device Malfunctions

In this example embodiment, the air filtration device monitors for a plurality of different major air filtration device malfunctions, such as (hut not limited to): (a) a locked fan motor; (b) disconnected differential pressure sensor tubes; (c) disconnected electronic components (e.g., the fan, the operating mode selector, and the like); and (d) an electronics failure (e.g., an hour meter display failure or a pre-filter status indicator failure). In this example embodiment, if the air filtration device determines that one of the major air filtration device malfunctions occurs, the air filtration device: (a) powers down the fan, (b) lights the LED of the air filtration device status indicator red, and (c) outputs the audible major air filtration device malfunction tone.

In this example embodiment, the air filtration device also monitors for dust sensor failure. If the air filtration device determines that the dust sensor fails, the air filtration device: (a) enables operation of the air filtration device in any of the manual fan speed setting operating modes; and (b) if the automatic fan speed setting selection operating mode is selected, indicates that a major air filtration device malfunctions occurs, as described above.

It should be understood that modifications and variations may be effected without departing from the scope of the novel concepts of the present disclosure, and it should be understood that this application is to be limited only by the scope of the appended claims.

The invention is claimed as follows:

1. An air filtration device comprising:
a housing;
at least one filter supported by the housing;
a fan supported by the housing; and
a controller supported by the housing, the controller configured to:
(a) at a first point in time, determine a current fan speed setting;
(b) responsive to determining, at the first point in time, that the current fan speed setting is a first designated fan speed setting associated with a first desired air flow rate:
(i) determine a first desired fan speed based, at least in part, on a differential pressure across the fan and the first desired air flow rate;
(ii) determine whether the first desired fan speed is less than or equal to a maximum allowable fan speed; and (iii) responsive to determining that the first desired fan speed is less than or equal to the maximum allowable fan speed, cause the fan to operate at the first desired fan speed; and (c) responsive to determining, at the first point in time, that the current fan speed setting is a second designated fan speed setting associated with a second desired air flow rate different from the first desired air flow rate:

(i) determine a second desired fan speed based, at least in part, on the differential pressure across the fan and the second desired air flow rate;

(ii) determine whether the second desired fan speed is less than or equal to the maximum allowable fan speed; and (iii) responsive to determining that the second desired fan speed is less than or equal to the maximum allowable fan speed, cause the fan to operate at the second desired fan speed.

2. The air filtration device of claim 1, wherein the controller is further configured to, responsive to determining that the first desired fan speed is greater than the maximum allowable fan speed, cause the fan to operate at the maximum allowable fan speed.

3. The air filtration device of claim 1, which includes one or more pressure sensors, and wherein the controller is further configured to determine the differential pressure across the fan using feedback from the one or more pressure sensors.

4. The air filtration device of claim 1, wherein the one or more pressure sensors include a fan differential pressure sensor configured to measure the differential pressure across the fan.

5. The air filtration device of claim 4, wherein the fan differential pressure sensor includes a first port connected to a first pressure sensor port of the housing and a second different port connected to a second different pressure sensor port of the housing, wherein the first pressure sensor port of the housing is located upstream of the fan and the second pressure sensor port of the housing is located downstream of the fan.

6. The air filtration device of claim 1, wherein the controller is further configured to, responsive to determining, at the first point in time, that the current fan speed setting is a non-designated fan speed setting, cause the fan to operate at a designated fan speed.

7. The air filtration device of claim 1, wherein the controller is further configured to repeat (a) to (c) at a second point in time upon an expiration of a fan speed determination time interval.

8. The air filtration device of claim 1, wherein the controller is further configured to determine the first desired fan speed independent of an occlusion level of any of the at least one filter.

9. The air filtration device of claim 1, wherein the housing includes a lower housing component and a locking cover removably attachable to the lower housing component.

10. The air filtration device of claim 9, wherein the at least one filter includes a removable exterior pre-filter and a separately removable inner high-efficiency particulate air filter, wherein the pre-filter is mounted within the housing between the locking cover and the lower housing component and the high-efficiency particulate air filter is mounted within the pre-filter between the locking cover and the lower housing component.

11. The air filtration device of claim 10, wherein the fan is mounted to the housing below the pre-filter and the high-efficiency particulate air filter.

12. The air filtration device of claim 10, wherein the lower housing component includes a sealing surface and the high-efficiency particulate air filter includes an end cap that sealingly engages the sealing surface when the locking cover is attached to the lower housing component.

13. The air filtration device of claim 9, wherein the lower housing component includes a plurality of upwardly-extending stabilizers.

14. The air filtration device of claim 13, wherein the locking cover is removably attachable to the plurality of stabilizers.

15. The air filtration device of claim 1, which includes an exhaust port in fluid communication with the fan.

16. The air filtration device of claim 15, wherein the at least one filter includes a removable exterior pre-filter and a separately removable inner high-efficiency particulate air filter.

17. The air filtration device of claim 16, wherein the exhaust port is below the pre-filter and the high-efficiency particulate air filter.

18. The air filtration device of claim 17, wherein a longitudinal axis of the exhaust port is approximately perpendicular to longitudinal axes of the pre-filter and the high-efficiency particulate air filter, and the housing includes a lower housing component including a plurality of upwardly-extending stabilizers and the exhaust port is adjacent one of the stabilizers.

19. An air filtration device comprising:

a housing including a lower housing component and a locking cover removably attachable to the lower housing component;

at least one filter supported by the housing;

a fan supported by the housing; and a controller supported by the housing, the controller configured to:

(a) at a first point in time, determine a current fan speed setting;

(b) responsive to determining, at the first point in time, that the current fan speed setting is one of at least one designated fan speed setting associated with a desired air flow rate:

(i) determine a desired fan speed based, at least in part, on a differential pressure across the fan and the desired air flow rate;

(ii) determine whether the first desired fan speed is less than or equal to a maximum allowable fan speed;

(iii) responsive to determining that the desired fan speed is less than or equal to the maximum allowable fan speed, cause the fan to operate at the desired fan speed; and (iv) responsive to determining that the desired fan speed is greater than the maximum allowable fan speed, cause the fan to operate at the maximum allowable fan speed; and (c) responsive to determining, at the first point in time, that the current fan speed setting is a non-designated fan speed setting, cause the fan to operate at a designated nonzero fan speed.

20. An air filtration device comprising:
a housing;
a filter supported by the housing;
a fan supported by the housing;
a pressure sensor supported by the housing;
an operating mode selector configured to enable selection of a first operational mode, a second operational mode, or an off mode; and
a controller supported by the housing and configured to, after receiving feedback from the operating mode selector indicating that the first operational mode has been selected:
  determine a desired fan speed based at least in part on a differential pressure across the fan and the desired air flow rate;
  determine whether the desired fan speed exceeds a maximum allowable fan speed; and
  responsive to determining that the desired fan speed does not exceed the maximum allowable fan speed, cause the fan to operate at the desired fan speed.

* * * * *